US012699970B2

(12) United States Patent
Foster et al.

(10) Patent No.: US 12,699,970 B2
(45) Date of Patent: Aug. 4, 2026

(54) MOBILE CHECK DEPOSIT

(71) Applicant: U.S. Bank National Association, Minneapolis, MN (US)

(72) Inventors: Marlen L. Foster, Fairfield, CA (US); Connie K. Yung, San Francisco, CA (US); Vijay Narayanan, San Jose, CA (US); Raj M. Bharadwaj, Plymouth, MN (US); Soumitri Naga Kolavennu, Plymouth, MN (US); Jessica G. Winberg, Prescott, WI (US); Balasubramanian Narayanan, Minneapolis, MN (US); Hima Rama Subrahmanyam Vishnubhotla, Suwanee, GA (US); Jayalakshmi Mangalagiri, Lakeville, MN (US); Ali Marjani, Cary, NC (US); Teja Dade, Omaha, NE (US); Michael Starace, Oakland, CA (US); David Robinson, Burnsville, MN (US)

(73) Assignee: U.S. Bank National Association, Minneapolis, MN (US)

( * ) Notice: Subject to any disclaimer, the term of this patent is extended or adjusted under 35 U.S.C. 154(b) by 0 days.

(21) Appl. No.: 19/401,584

(22) Filed: Nov. 26, 2025

(65) Prior Publication Data

US 2026/0179063 A1 Jun. 25, 2026

Related U.S. Application Data

(63) Continuation of application No. 19/399,992, filed on Nov. 25, 2025, which is a continuation of application
(Continued)

(51) Int. Cl.
*G06Q 40/00* (2023.01)
*G06Q 20/04* (2012.01)
(Continued)

(52) U.S. Cl.
CPC ....... *G06Q 20/0425* (2013.01); *G06Q 20/108* (2013.01); *G06Q 20/3223* (2013.01);
(Continued)

(58) Field of Classification Search
CPC ............. G06Q 20/0425; G06Q 20/108; G06Q 20/3223; G06Q 20/326; G06Q 20/4016;
(Continued)

(56) References Cited

U.S. PATENT DOCUMENTS

| | | | |
|---|---|---|---|
| 6,922,487 | B2 | 7/2005 | Dance et al. |
| 7,028,886 | B1 | 4/2006 | Maloney |

(Continued)

FOREIGN PATENT DOCUMENTS

| | | |
|---|---|---|
| CA | 2773730 | 4/2012 |
| CN | 1897644 A | 1/2007 |

(Continued)

OTHER PUBLICATIONS

Remote Deposit Capture in the Consumer's Hands; 2010 5th International Conference on Future Information Technology (2010, pp. 1-5); Henkel, J. Zhan, J.; May 21, 2010. (Year: 2010).*
(Continued)

*Primary Examiner* — Tien C Nguyen
(74) *Attorney, Agent, or Firm* — Merchant & Gould P.C.

(57) ABSTRACT

Methods and systems for remote check deposit are disclosed. A check for deposit is processed without the need for a server to receive any image of the check initially. Instead, optical character recognition (OCR) data is received at the server from a mobile device. Verification processing for the check is then performed using the OCR data. If the verification process is successful, a confirmation notification is sent to the mobile device. Subsequently, after sending the confirmation notification, a check image is received, from
(Continued)

which the OCR data was determined. The check is, in turn, processed for deposit using the received check image.

20 Claims, 51 Drawing Sheets

Related U.S. Application Data

No. 19/267,178, filed on Jul. 11, 2025, which is a continuation-in-part of application No. 19/221,740, filed on May 29, 2025, now Pat. No. 12,499,423, which is a continuation of application No. 19/221,633, filed on May 29, 2025, now Pat. No. 12,499,422, which is a continuation-in-part of application No. 18/618,833, filed on Mar. 27, 2024, which is a continuation of application No. 18/466,347, filed on Sep. 13, 2023, now Pat. No. 12,039,504.

(51) Int. Cl.

| | |
|---|---|
| ***G06Q 20/10*** | (2012.01) |
| ***G06Q 20/32*** | (2012.01) |
| ***G06Q 20/40*** | (2012.01) |
| ***G06Q 20/42*** | (2012.01) |
| ***G06Q 40/02*** | (2023.01) |
| ***G06V 30/19*** | (2022.01) |
| ***G06V 30/224*** | (2022.01) |

(52) U.S. Cl.

CPC ....... *G06Q 20/326* (2020.05); *G06Q 20/4016* (2013.01); *G06Q 20/42* (2013.01); *G06Q 40/02* (2013.01); *G06V 30/19013* (2022.01); *G06V 30/19093* (2022.01); *G06V 30/1916* (2022.01); *G06V 30/2253* (2022.01)

(58) Field of Classification Search

CPC .. G06Q 20/42; G06Q 40/02; G06V 30/19013; G06V 30/19093; G06V 30/1916; G06V 30/2253

See application file for complete search history.

(56) References Cited

U.S. PATENT DOCUMENTS

| | | | |
|---|---|---|---|
| 7,120,461 | B2 | 10/2006 | Cho |
| 7,168,614 | B2 | 1/2007 | Kotovich et al. |
| 7,201,323 | B2 | 4/2007 | Kotovich et al. |
| 7,249,717 | B2 | 7/2007 | Kotovich et al. |
| 7,377,425 | B1 | 5/2008 | Ma et al. |
| 7,392,935 | B2 | 7/2008 | Byrne et al. |
| 7,416,112 | B2 | 8/2008 | Smith et al. |
| 7,424,218 | B2 | 9/2008 | Baudisch et al. |
| 7,430,310 | B2 | 9/2008 | Kotovich et al. |
| 7,620,604 | B1 | 11/2009 | Bueche, Jr. |
| 7,653,183 | B2 | 1/2010 | Patel et al. |
| 7,680,739 | B1 | 3/2010 | Venturo |
| 7,698,222 | B1 | 4/2010 | Bueche, Jr. |
| 7,711,176 | B2 | 5/2010 | Rossignoli |
| 7,778,457 | B2 | 8/2010 | Nepomniachtchi et al. |
| 7,792,752 | B1 | 9/2010 | Kay |
| 7,856,402 | B1 | 12/2010 | Kay |
| 7,873,200 | B1 | 1/2011 | Oakes, III et al. |
| 7,876,949 | B1 | 1/2011 | Oakes, III et al. |
| 7,885,451 | B1 | 2/2011 | Walls et al. |
| 7,885,880 | B1 | 2/2011 | Prasad et al. |
| 7,896,232 | B1 | 3/2011 | Prasad et al. |
| 7,900,822 | B1 | 3/2011 | Prasad et al. |
| 7,912,785 | B1 | 3/2011 | Kay |
| 7,949,176 | B2 | 5/2011 | Nepomniachtchi |
| 7,949,587 | B1 | 5/2011 | Morris et al. |
| 7,953,268 | B2 | 5/2011 | Nepomniachtchi |
| 7,962,411 | B1 | 6/2011 | Prasad et al. |
| 7,970,677 | B1 | 6/2011 | Oakes, III et al. |
| 7,974,899 | B1 | 7/2011 | Prasad et al. |
| 7,978,900 | B2 | 7/2011 | Nepomniachtchi et al. |
| 7,996,312 | B1 | 8/2011 | Beck et al. |
| 7,996,314 | B1 | 8/2011 | Smith et al. |
| 7,996,315 | B1 | 8/2011 | Smith et al. |
| 7,996,316 | B1 | 8/2011 | Smith et al. |
| 8,000,514 | B2 | 8/2011 | Nepomniachtchi et al. |
| 8,001,051 | B1 | 8/2011 | Smith et al. |
| 8,046,301 | B1 | 10/2011 | Smith et al. |
| 8,235,284 | B1 | 8/2012 | Prasad et al. |
| 8,290,237 | B1 | 10/2012 | Burks et al. |
| 8,320,657 | B1 | 11/2012 | Burks et al. |
| 8,326,015 | B2 | 12/2012 | Nepomniachtchi |
| 8,351,677 | B1 | 1/2013 | Oakes, III et al. |
| 8,351,678 | B1 | 1/2013 | Medina, III |
| 8,358,826 | B1 | 1/2013 | Medina, III et al. |
| 8,374,963 | B1 | 2/2013 | Billman |
| 8,379,914 | B2 | 2/2013 | Nepomniachtchi et al. |
| 8,391,599 | B1 | 3/2013 | Medina, III |
| 8,392,332 | B1 | 3/2013 | Oakes, III et al. |
| 8,422,758 | B1 | 4/2013 | Bueche, Jr. |
| 8,433,127 | B1 | 4/2013 | Harpel et al. |
| 8,452,689 | B1 | 5/2013 | Medina, III |
| 8,464,933 | B1 | 6/2013 | Prasad et al. |
| 8,483,473 | B2 | 7/2013 | Roach et al. |
| 8,538,124 | B1 | 9/2013 | Harpel et al. |
| 8,542,921 | B1 | 9/2013 | Medina |
| 8,577,118 | B2 | 11/2013 | Nepomniachtchi et al. |
| 8,582,862 | B2 | 11/2013 | Nepomniachtchi et al. |
| 8,611,635 | B1 | 12/2013 | Medina, III |
| 8,620,058 | B2 | 12/2013 | Nepomniachtchi et al. |
| 8,688,579 | B1 | 4/2014 | Ethington et al. |
| 8,699,779 | B1 | 4/2014 | Prasad et al. |
| 8,708,227 | B1 | 4/2014 | Oakes, III et al. |
| 8,724,924 | B2 | 5/2014 | Nepomniachtchi et al. |
| 8,732,081 | B1 | 5/2014 | Oakes, III et al. |
| 8,799,147 | B1 | 8/2014 | Walls et al. |
| 8,837,806 | B1 | 9/2014 | Ethington et al. |
| 8,944,234 | B1 | 2/2015 | Csulits |
| 8,959,033 | B1 | 2/2015 | Oakes, III et al. |
| 8,977,571 | B1 | 3/2015 | Bueche, Jr. et al. |
| 8,983,170 | B2 | 3/2015 | Nepomniachtchi et al. |
| 9,058,512 | B1 | 6/2015 | Medina, III |
| 9,129,340 | B1 | 9/2015 | Medina, III et al. |
| 9,159,101 | B1 | 10/2015 | Pollack et al. |
| 9,177,197 | B1 | 11/2015 | Prasad et al. |
| 9,177,198 | B1 | 11/2015 | Prasad et al. |
| 9,208,393 | B2 | 12/2015 | Kotovich et al. |
| 9,224,136 | B1 | 12/2015 | Oakes, III et al. |
| 9,286,514 | B1 | 3/2016 | Newman |
| 9,292,737 | B2 | 3/2016 | Nepomniachtchi et al. |
| 9,298,979 | B2 | 3/2016 | Nepomniachtchi et al. |
| 9,324,073 | B2 | 4/2016 | Nepomniachtchi et al. |
| 9,336,517 | B1 | 5/2016 | Prasad et al. |
| 9,401,011 | B2 | 7/2016 | Medina, III et al. |
| 9,536,139 | B2 | 1/2017 | Nepomniachtchi et al. |
| 9,569,756 | B1 | 2/2017 | Bueche, Jr. et al. |
| 9,607,484 | B2 | 3/2017 | de Abreu Amorim |
| 9,619,872 | B1 | 4/2017 | Medina, III et al. |
| 9,626,662 | B1 | 4/2017 | Prasad et al. |
| 9,672,510 | B2 | 6/2017 | Roach et al. |
| 9,679,214 | B2 | 6/2017 | Kotovich et al. |
| 9,710,702 | B2 | 7/2017 | Nepomniachtchi et al. |
| 9,779,297 | B2 | 10/2017 | Nepomniachtchi et al. |
| 9,779,392 | B1 | 10/2017 | Prasad et al. |
| 9,779,452 | B1 | 10/2017 | Medina et al. |
| 9,818,090 | B1 | 11/2017 | Bueche, Jr. et al. |
| 9,842,331 | B2 | 12/2017 | Nepomniachtchi et al. |
| 9,886,628 | B2 | 2/2018 | Nepomniachtchi et al. |
| 9,892,454 | B1 | 2/2018 | Pollack et al. |
| 9,898,778 | B1 | 2/2018 | Pollack et al. |
| 9,898,808 | B1 | 2/2018 | Medina, III et al. |
| 9,904,848 | B1 | 2/2018 | Newman |
| 9,946,923 | B1 | 4/2018 | Medina |
| 10,013,605 | B1 | 7/2018 | Oakes, III et al. |
| 10,013,681 | B1 | 7/2018 | Oakes, III et al. |
| 10,102,583 | B2 | 10/2018 | Strange |
| 10,192,108 | B2 | 1/2019 | Nepomniachtchi et al. |

(56) References Cited

U.S. PATENT DOCUMENTS

| | | | |
|---|---|---|---|
| 10,235,660 B1 | 3/2019 | Bueche, Jr. et al. | |
| 10,275,673 B2 | 4/2019 | Kotovich et al. | |
| 10,296,909 B1 | 5/2019 | Buentello et al. | |
| 10,303,937 B2 | 5/2019 | Nepomniachtchi et al. | |
| 10,346,813 B2 * | 7/2019 | Kumar | G06Q 20/18 |
| 10,354,235 B1 | 7/2019 | Medina, III | |
| 10,360,447 B2 | 7/2019 | Nepomniachtchi et al. | |
| 10,360,448 B1 | 7/2019 | Newman | |
| 10,373,136 B1 * | 8/2019 | Pollack | H04N 1/38 |
| 10,380,559 B1 | 8/2019 | Oakes, III et al. | |
| 10,380,562 B1 | 8/2019 | Prasad et al. | |
| 10,380,565 B1 | 8/2019 | Prasad | |
| 10,380,993 B1 | 8/2019 | Salyers | |
| 10,402,638 B1 | 9/2019 | Oakes, III et al. | |
| 10,402,790 B1 * | 9/2019 | Clark | G06Q 40/00 |
| 10,423,826 B2 | 9/2019 | Nepomniachtchi et al. | |
| 10,423,938 B1 | 9/2019 | Gaeta et al. | |
| 10,460,295 B1 | 10/2019 | Oakes, III et al. | |
| 10,460,381 B1 | 10/2019 | Pollack et al. | |
| 10,482,432 B1 | 11/2019 | Oakes, III et al. | |
| 10,504,185 B1 | 12/2019 | Buentello | |
| 10,506,281 B1 | 12/2019 | Mortensen et al. | |
| 10,521,781 B1 | 12/2019 | Singfield | |
| 10,528,925 B2 | 1/2020 | Roach et al. | |
| 10,552,810 B1 | 2/2020 | Ethington et al. | |
| 10,558,972 B2 | 2/2020 | Nepomniachtchi et al. | |
| 10,574,879 B1 | 2/2020 | Prasad et al. | |
| 10,607,073 B2 | 3/2020 | Nepomniachtchi et al. | |
| 10,621,559 B1 | 4/2020 | Oakes, III et al. | |
| 10,621,660 B1 | 4/2020 | Medina et al. | |
| 10,685,223 B2 | 6/2020 | Nepomniachtchi et al. | |
| 10,706,466 B1 | 7/2020 | Ethington et al. | |
| 10,713,629 B1 | 7/2020 | Medina, III | |
| 10,719,815 B1 | 7/2020 | Oakes, III et al. | |
| 10,769,598 B1 | 9/2020 | Oakes, III et al. | |
| 10,769,603 B1 | 9/2020 | Prasad et al. | |
| 10,789,496 B2 | 9/2020 | Kotovich et al. | |
| 10,810,561 B1 | 10/2020 | Pollack et al. | |
| 10,818,282 B1 | 10/2020 | Salyers | |
| 10,839,358 B1 | 11/2020 | Prasad et al. | |
| 10,848,665 B1 | 11/2020 | Prasad et al. | |
| 10,855,914 B1 | 12/2020 | Prasad et al. | |
| 10,878,401 B2 | 12/2020 | Nepomniachtchi et al. | |
| 10,896,408 B1 | 1/2021 | Prasad et al. | |
| 10,909,362 B2 | 2/2021 | Nepomniachtchi et al. | |
| 10,915,879 B1 | 2/2021 | Pollack et al. | |
| 10,956,728 B1 | 3/2021 | Voutour | |
| 11,017,478 B2 | 5/2021 | Strange | |
| 11,023,719 B1 | 6/2021 | Oakes, III et al. | |
| 11,030,752 B1 | 6/2021 | Backlund et al. | |
| 11,062,130 B1 | 7/2021 | Medina, III | |
| 11,062,131 B1 | 7/2021 | Medina, III | |
| 11,062,283 B1 | 7/2021 | Prasad | |
| 11,064,111 B1 | 7/2021 | Prasad et al. | |
| 11,068,976 B1 | 7/2021 | Voutour et al. | |
| 11,070,868 B1 | 7/2021 | Mortensen et al. | |
| 11,127,008 B1 | 9/2021 | Beuentello et al. | |
| 11,144,753 B1 | 10/2021 | Newman | |
| 11,151,369 B2 | 10/2021 | Nepomniachtchi et al. | |
| 11,157,731 B2 | 10/2021 | Nepomniachtchi et al. | |
| 11,182,753 B1 | 11/2021 | Oakes, III et al. | |
| 11,200,550 B1 | 12/2021 | Singfield | |
| 11,348,075 B1 | 5/2022 | Oakes, III et al. | |
| 11,361,286 B1 | 6/2022 | Gaeta et al. | |
| 11,393,272 B2 | 7/2022 | Kriegsfeld et al. | |
| 11,461,743 B1 * | 10/2022 | Oakes, III | G06Q 40/00 |
| 11,562,332 B1 | 1/2023 | Oakes, III et al. | |
| 11,605,060 B1 | 3/2023 | Hecht | |
| 11,783,306 B1 | 10/2023 | Prasad | |
| 12,039,504 B1 | 7/2024 | Foster et al. | |
| 12,198,111 B2 * | 1/2025 | Jurss | G06Q 20/3223 |
| 12,229,734 B1 | 2/2025 | Foster | |
| 12,265,952 B1 | 4/2025 | Foster | |
| 12,346,884 B2 | 7/2025 | Foster | |
| 2003/0126082 A1 | 7/2003 | Omura | |
| 2004/0260636 A1 * | 12/2004 | Marceau | G06Q 20/108 705/42 |
| 2005/0097046 A1 | 5/2005 | Singfield | |
| 2006/0112013 A1 * | 5/2006 | Maloney | G06Q 40/00 705/16 |
| 2006/0120587 A1 | 6/2006 | Prakash et al. | |
| 2006/0242062 A1 | 10/2006 | Peterson et al. | |
| 2007/0172148 A1 | 7/2007 | Hawley | |
| 2007/0183652 A1 | 8/2007 | Backstrom et al. | |
| 2007/0262148 A1 | 11/2007 | Yoon et al. | |
| 2008/0135609 A1 | 6/2008 | Dcosta et al. | |
| 2009/0173781 A1 | 7/2009 | Ramachandran | |
| 2009/0185737 A1 | 7/2009 | Nepomniachtchi | |
| 2009/0236412 A1 | 9/2009 | Amorim | |
| 2009/0252437 A1 | 10/2009 | Li et al. | |
| 2012/0113489 A1 | 5/2012 | Heit et al. | |
| 2012/0150601 A1 | 6/2012 | Fisher | |
| 2013/0085935 A1 | 4/2013 | Nepomniachtchi et al. | |
| 2013/0097076 A1 | 4/2013 | Love | |
| 2013/0120595 A1 | 5/2013 | Roach et al. | |
| 2013/0148862 A1 | 6/2013 | Roach et al. | |
| 2013/0155474 A1 | 6/2013 | Roach et al. | |
| 2013/0297353 A1 | 11/2013 | Strange et al. | |
| 2014/0032406 A1 | 1/2014 | Roach et al. | |
| 2014/0037182 A1 | 2/2014 | Williams | |
| 2014/0247998 A1 | 9/2014 | Nepomniachtchi et al. | |
| 2014/0279488 A1 | 9/2014 | Drake | |
| 2014/0372295 A1 * | 12/2014 | Tatham | G06Q 20/0425 705/40 |
| 2015/0032605 A1 | 1/2015 | Williams | |
| 2015/0117747 A1 | 4/2015 | Smith et al. | |
| 2015/0117749 A1 | 4/2015 | Smith et al. | |
| 2015/0120563 A1 | 4/2015 | Smith | |
| 2015/0278793 A1 * | 10/2015 | Roberts | G06Q 20/22 705/45 |
| 2016/0019530 A1 | 1/2016 | Wang | |
| 2016/0350590 A1 | 12/2016 | Cooper | |
| 2017/0270508 A1 | 9/2017 | Roach et al. | |
| 2017/0309108 A1 | 10/2017 | Sadovsky | |
| 2018/0089675 A1 * | 3/2018 | Cooper | G06Q 20/42 |
| 2019/0122184 A1 * | 4/2019 | Yarbrough | G06Q 20/0425 |
| 2020/0097930 A1 | 3/2020 | Roach et al. | |
| 2020/0104808 A1 | 4/2020 | Schwabline | |
| 2020/0304650 A1 | 9/2020 | Roach et al. | |
| 2020/0311407 A1 | 10/2020 | Nepomniachtchi et al. | |
| 2020/0364480 A1 | 11/2020 | Kotovich et al. | |
| 2021/0073786 A1 | 3/2021 | Nepomniachtchi et al. | |
| 2021/0090086 A1 | 3/2021 | Kriegsfeld et al. | |
| 2021/0090372 A1 | 3/2021 | Kriegsfeld et al. | |
| 2021/0103723 A1 | 4/2021 | Nepomniachtchi et al. | |
| 2021/0166207 A1 | 6/2021 | Hunter | |
| 2021/0304318 A1 | 9/2021 | Strange | |
| 2021/0360149 A1 | 11/2021 | Mukul | |
| 2022/0012487 A1 | 1/2022 | Nepomniachtchi et al. | |
| 2022/0027613 A1 | 1/2022 | Nepomniachtchi et al. | |
| 2022/0319216 A1 | 10/2022 | Kolavennu | |
| 2023/0222460 A1 * | 7/2023 | Prasad | G06Q 20/3223 705/42 |
| 2023/0290166 A1 | 9/2023 | Roach | |
| 2023/0334441 A1 | 10/2023 | Sherman | |
| 2024/0046242 A1 * | 2/2024 | Vudathu | G06Q 40/02 |
| 2025/0148441 A1 | 5/2025 | Fietsam | |
| 2025/0292220 A1 | 9/2025 | Foster | |
| 2025/0292221 A1 | 9/2025 | Foster | |
| 2026/0024062 A1 | 1/2026 | Watts | |

FOREIGN PATENT DOCUMENTS

| | | |
|---|---|---|
| EP | 1398726 | 3/2004 |
| JP | 2004-023158 | 1/2004 |
| WO | 2001/61436 | 8/2001 |

(56) References Cited

FOREIGN PATENT DOCUMENTS

| | | |
|---|---|---|
| WO | 2012/051624 | 4/2012 |
| WO | 2019/110972 | 6/2019 |

OTHER PUBLICATIONS

Malik, Hafiz et al., "Remote Check Truncation Systems: Vulnerability Analysis and Countermeasures"; IEEE Access (vol. 8, 2020); pp. 59485-59510.
Ge, Zheng et al., "YOLOX: Exceeding YOLO Series in 2021", arXiv:2107.08430v2, Aug. 6, 2021, 7 pages.
GitHub, danielwang5 / ocr2, "An Optical Character Recognition System (OCR) with Pattern Editing Functionalities", Dec. 11, 2018, 5 pages.
GitHub, omkarudawant / MICR-Retriever, "MICR-Retriever / extraction / extract-micr.py", Jun. 22, 2019, 3 pages.
Henkel, Joseph et al., "Remote Deposit Capture in the Consumer's Hands", IEEE Xplore, Jun. 10, 2010,5 pages.
Lacmanovic, Dejan et al., "Mobile Banking—Financial Services Technology", 2012 Proceedings of the 35th International Convention MIPRO, May 21-25, 2012, pp. 451-1455.
Python—OpenCV, dids-reyes, "Extracting MICR in Cheques", Jul. 2024, 7 pages.
Rosebrock, Adrian, "Bank check OCR with OpenCV and Python (Part I)", Jul. 2017, located online at: https://pyimagesearch.com/2017/07/24/bank-check-ocr-with-opencv-and-python-part-i/, 44 pages.
Rosebrock, Adrian, "Bank check OCR with OpenCV and Python (Part II)", Jul. 2017, located online at: https://pyimagesearch.com/2017/07/31/bank-check-ocr-opencv-python-part-ii/, 27 pages.
Siromer, "Contour Detection using OpenCV", Medium magazine (online), Mar. 7, 2024, 20 pages.
StackOverflow.com, "How to perform OCR for several contours", asked Apr. 27, 2022; edited Apr. 27, 2022, 4 pages.
StackOverflow.com, "Understanding and evaluating template matching methods", asked Sep. 29, 2019, edited Jul. 14, 2022, 6 pages.
U.S. Appl. No. 18/052,081, entitled "Systems and Methods for Check Fraud Detection" filed Nov. 2, 2022, Applicant U.S. Bank National Association, 37 pages.
U.S. Appl. No. 18/930,543, entitled "Detecting and Remediating Anomolies in Institutional Financial Instruments Using Image Processing" filed Oct. 29, 2024, Inventor Christopher Kallas, 55 pages.
U.S. Appl. No. 60/795,721, entitled "Cash Dispensing and Check Accepting Automated Banking Machine System" filed Apr. 28, 2006, Inventor Mark Smith et al., 100 pages.
Video, "Deposit Checks with Your Phone", located on Oct. 20, 2023 at: https://www.chase.com/digital/customer-service/helpful-tips/online-banking/mobile/chase-quickdeposit, 1:20 in duration, JP Morgan Chase Bank, with transcript, 2021, 6 pages.
Krishnamoorthi et al., "Improving Optical Character Recognition(OCR) Accuracy using Multi-Layer Perceptron(MLP)", 2023 7th International Conference on Trends in Electronics and Informatics (ICOEI), Apr. 11, 2023, pp. 1642-1647.
Yimyam et al., "Enhancing and Evaluating an Impact of OCR and Ontology on Financial Document Checking Process", 2020 15th International Joint Symposium on Artificial Intelligence and Natural Language Processing (iSAI-NLP), Nov. 18, 2020, pp. 1-6.
Spahiu, C.S., "A multimedia database server for information storage and querying", 2009 International Multiconference on Computer Science and Information Technology, Oct. 1, 2009, pp. 517-523.

* cited by examiner

300

OCR data received
from operation 318
(see FIG 3a)

Perform duplicate detection
processing
352

Perform fraud detection processing
354

To operation 320
(see FIG. 3a)

Provide notification to mobile device
regarding processing
356

Received from
operation 330
(see FIG. 3a)

Receive check images
358

Initiate deposit process
360

To operation 332
(see FIG. 3a)

Provide confirmation of deposit
process to mobile device
362

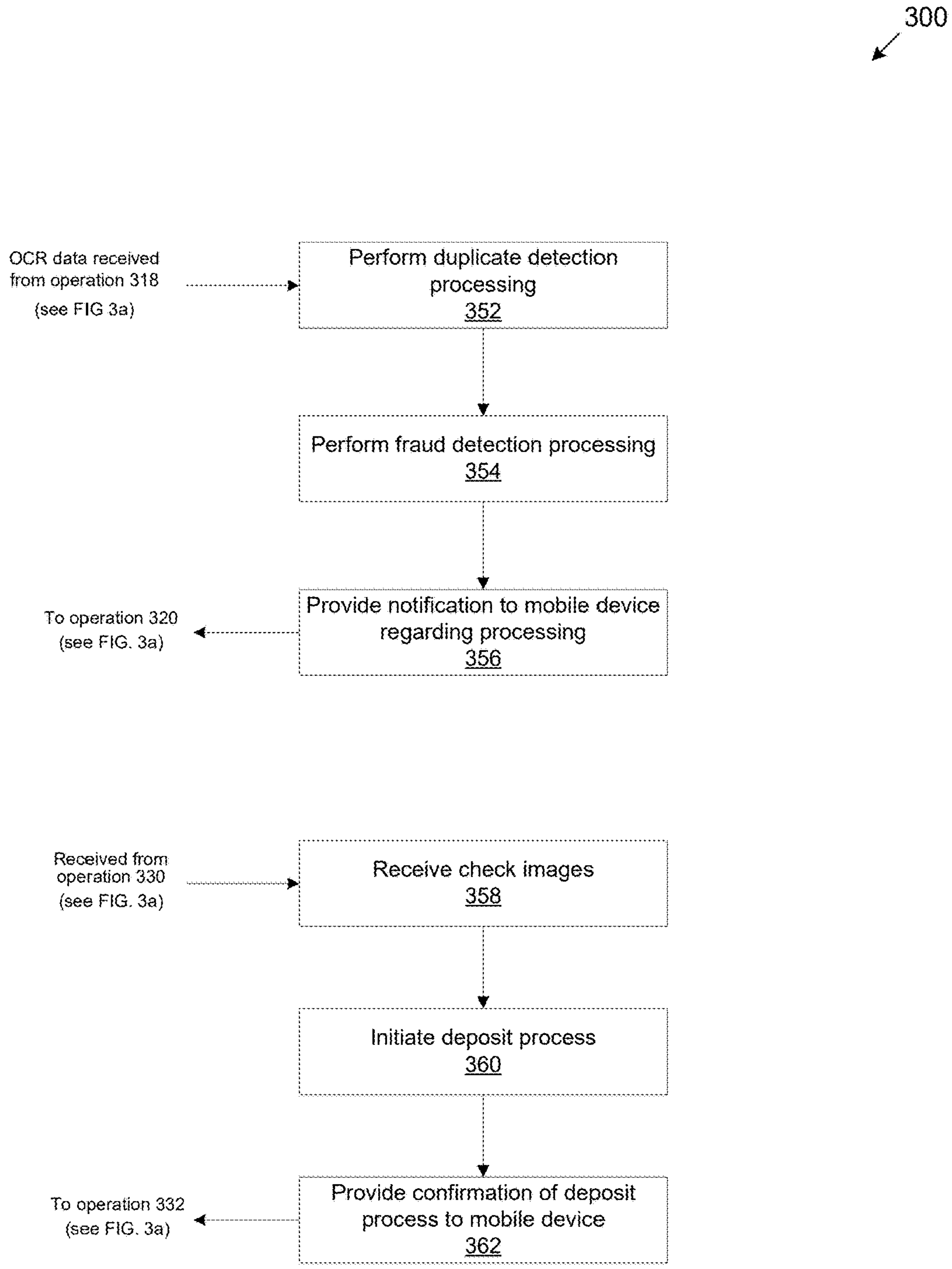

602
Receive check image captured by image capture device of mobile device in response to receiving user actuation causing image capture device to capture check image 604
Cause mobile device to perform optical character recognition (OCR) on check image to generate OCR data 606
Verify, at the mobile device, that OCR data generated from check image includes required predetermined check data to process check for remote deposit 608
Verify that a signature is present on check image 610
Provide OCR data to financial institution server for validation processing 612
Present, on user interface of mobile device, request for confirmation from user to process check for remote deposit 614
Provide check image to financial instruction server with instructions to process check for remote deposit 616
Receive, at mobile device, deposit receipt notification from financial institution server after check is deposited

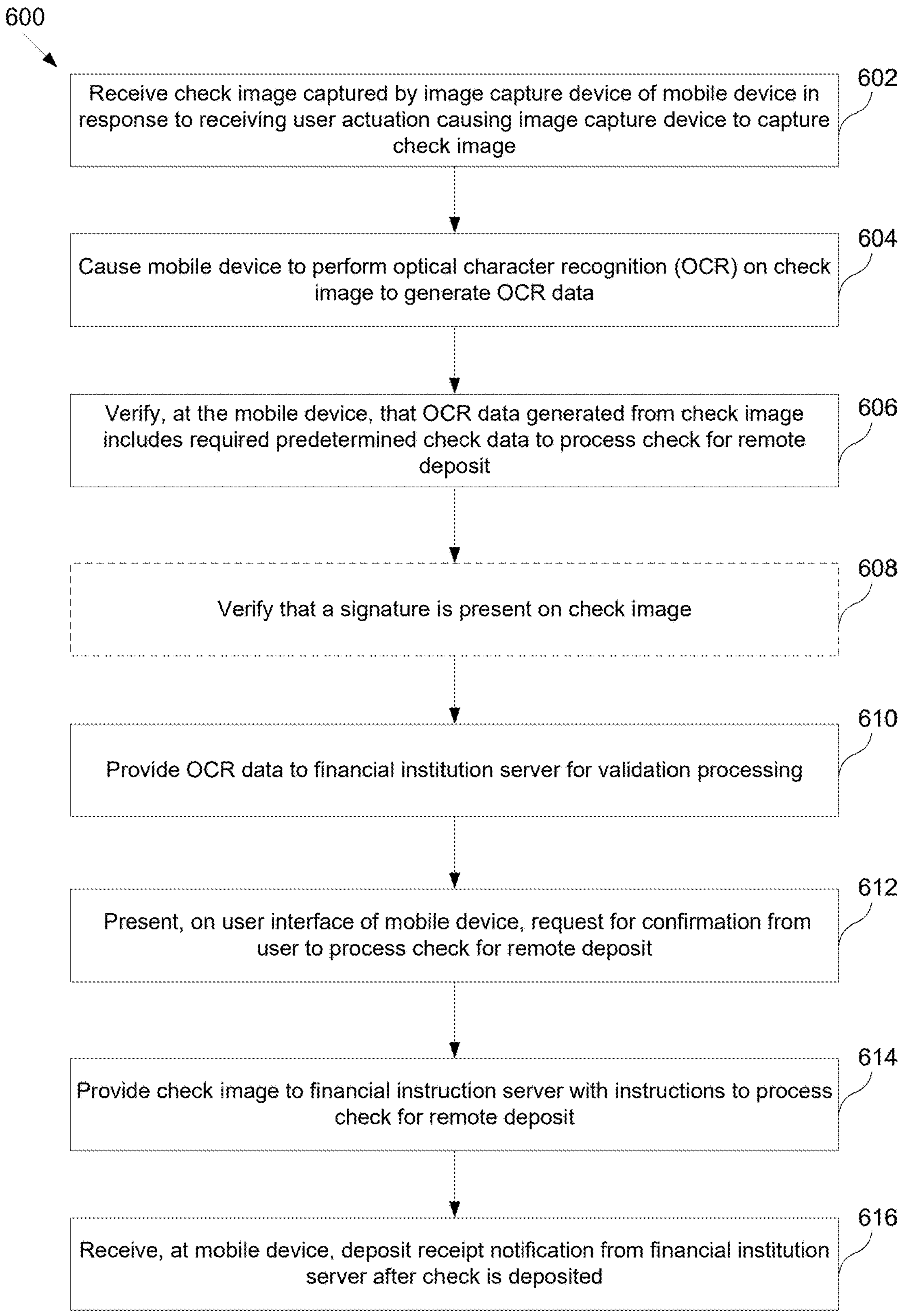

Present OCR data on user interface of mobile device

704

Determine that OCR data generated from check image does not include required predetermined check data to process check for remote deposit

706

Provide indication on user interface of a region of the check image that is missing required predetermined check data

708

Activate image capture device of mobile device with instructions to capture second check image

710

Receive user input to input the missing required predetermined check data

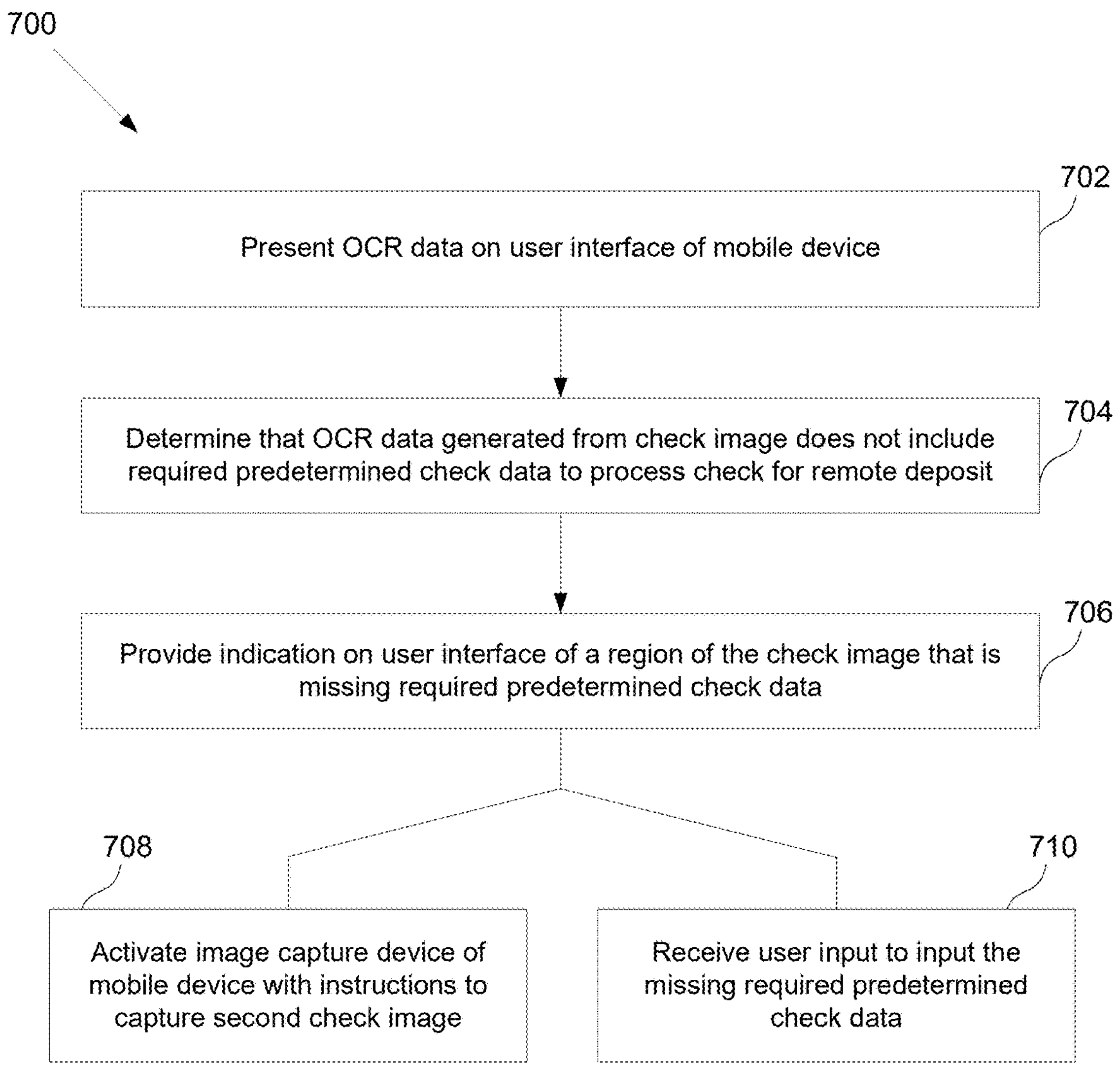

CAUSE MOBILE DEVICE TO PERFORM FIRST
OCR PROCESS ON SECOND REGION OF CHECK
IMAGE TO GENERATE BOUNDING BOXES
1802

DISCARD CHARACTERS IDENTIFIED BY FIRST OCR PROCESS
1804

GENERATE CONFORMING OUTER PERIMETER
OF RESPECTIVE CHARACTERS
1806

GENERATE CONFORMING OUTER PERIMETER
IMAGES OF RESPECTIVE CHARACTERS
1808

DETERMINE RESPECTIVE INTEGER
VALUE REPRESENTED BY EACH
RESPECTIVE CHARACTER
1810

COMPARE CONFORMING
OUTER PERIMETER
OF RESPECTIVE
CHARACTERS WITH
ONE OR MORE
TEMPLATES
1810a

DETERMINE WHICH
TEMPLATE HAS THE
BEST FIT WITH THE
CONFORMING OUTER
PERIMETER OF
RESPECTIVE CHARACTERS
1810b

EXTRACT TEXT
1812

TO OPERATION 1714
(SEE FIG. 17)

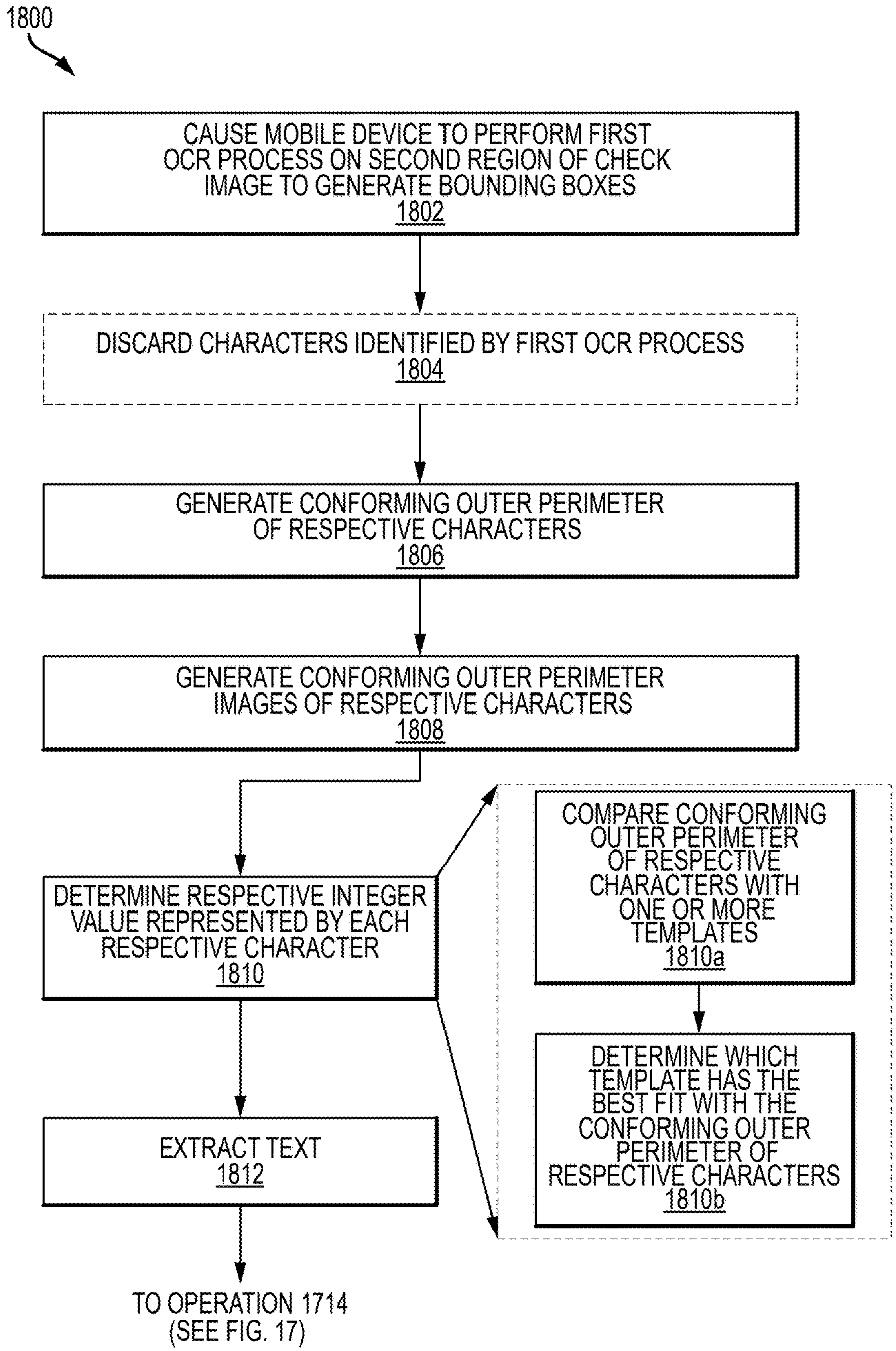

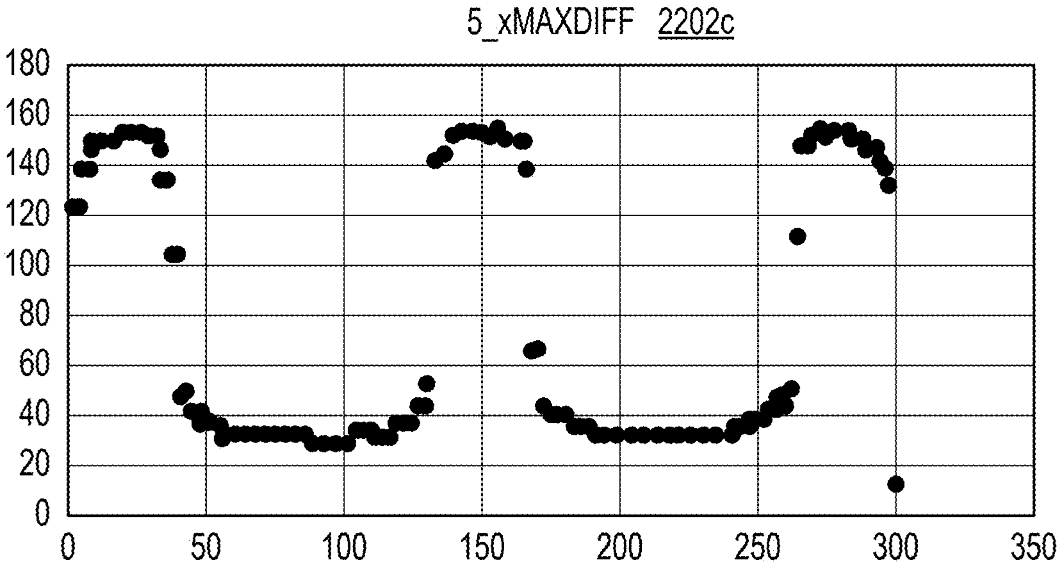
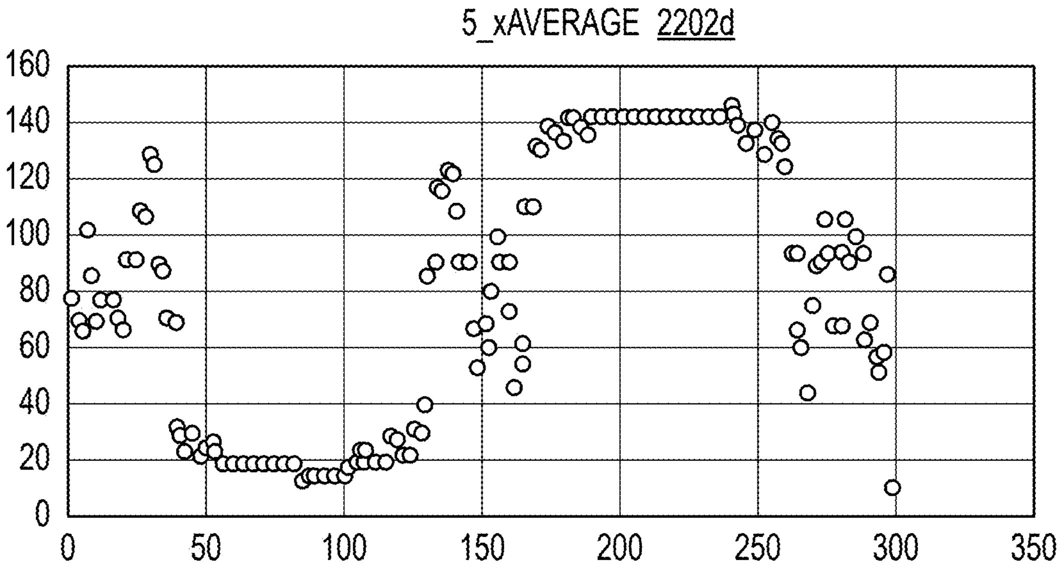
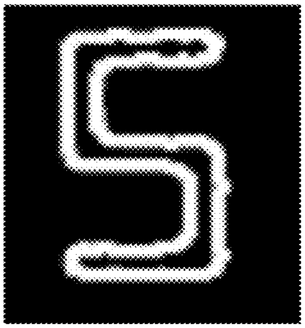
FIG.22c

FIG. 27

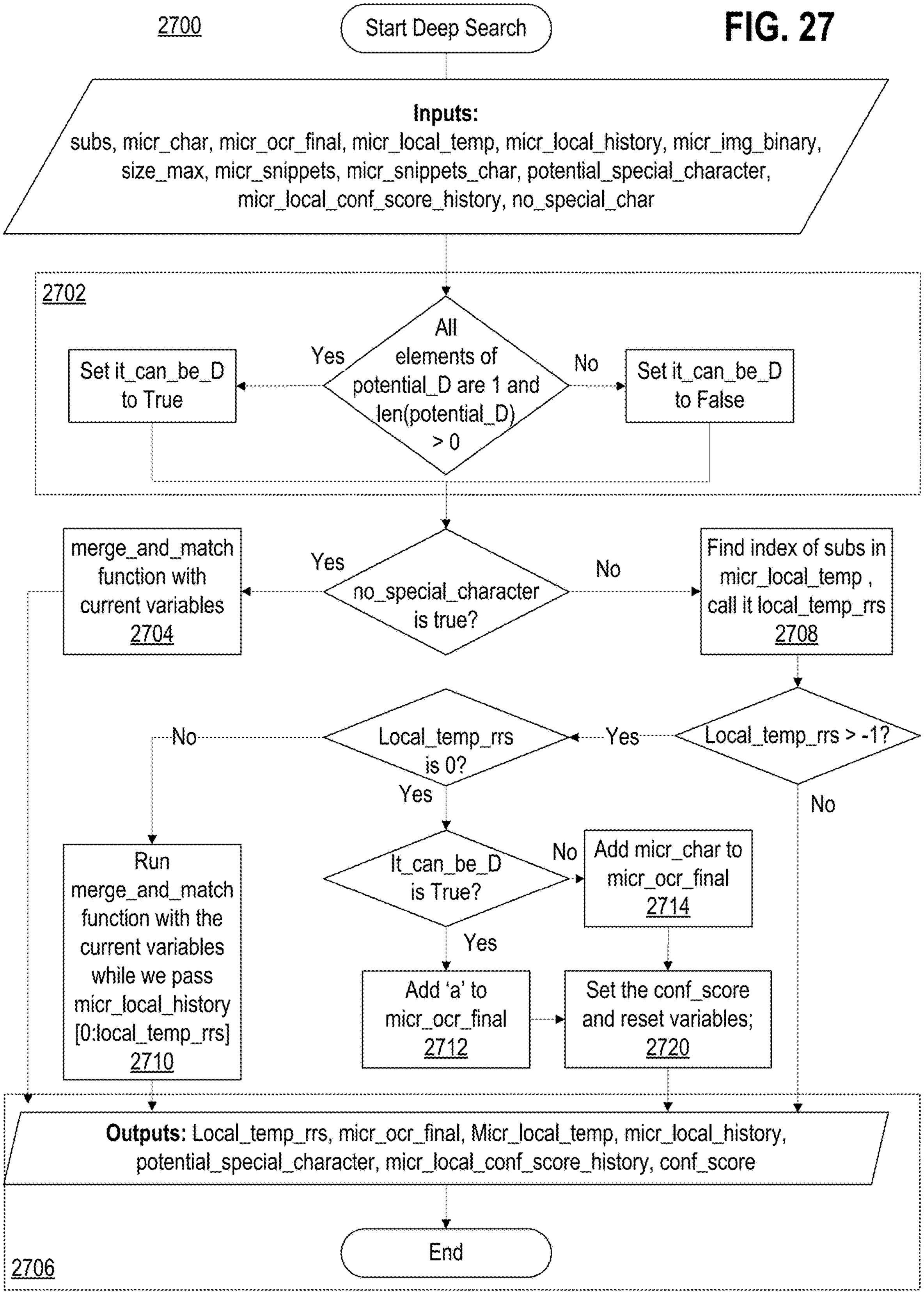

2700    Start Deep Search    FIG. 27

Inputs:
subs, micr_char, micr_ocr_final, micr_local_temp, micr_local_history, micr_img_binary, size_max, micr_snippets, micr_snippets_char, potential_special_character, micr_local_conf_score_history, no_special_char

2702

Set it_can_be_D to True ← Yes — All elements of potential_D are 1 and len(potential_D) > 0 — No → Set it_can_be_D to False merge_and_match function with current variables 2704 ← Yes — no_special_character is true? — No → Find index of subs in micr_local_temp, call it local_temp_rrs 2708

No — Local_temp_rrs is 0? ← Yes — Local_temp_rrs > -1?

Yes

Run merge_and_match function with the current variables while we pass micr_local_history [0:local_temp_rrs] 2710

It_can_be_D is True? — No → Add micr_char to micr_ocr_final 2714

Yes

Add 'a' to micr_ocr_final 2712 ⋯→ Set the conf_score and reset variables; 2720

No (from Local_temp_rrs > -1?)

Outputs: Local_temp_rrs, micr_ocr_final, Micr_local_temp, micr_local_history, potential_special_character, micr_local_conf_score_history, conf_score

2706

End

Read image data <u>3610</u>

<u>3600</u>

Process image data <u>3620</u>

Convert image to grayscale <u>3630</u>

Identify shadow mask <u>3642</u>

Refine shadow mask <u>3644</u>

Modify shadow regions <u>3646</u>

Reduce noise <u>3650</u>

Enhance Contrast <u>3660</u>

Adjust brightness or contrast <u>3670</u>

Save processed image <u>3680</u>

MOBILE CHECK DEPOSIT

CROSS REFERENCE TO RELATED APPLICATIONS

This application claims priority to and is a continuation of U.S. patent application Ser. No. 19/399,992, filed Nov. 25, 2025, which is a continuation of U.S. patent application Ser. No. 19/267,178, filed Jul. 11, 2025, which is a continuation-in-part of U.S. patent application Ser. No. 19/221,740, filed May 29, 2025, which is a continuation of U.S. patent application Ser. No. 19/221,633, filed May 29, 2025, which is a continuation-in-part of U.S. patent application Ser. No. 18/618,833, filed Mar. 27, 2024, which is a continuation of U.S. patent application Ser. No. 18/466,347, filed Sep. 13, 2023, now U.S. Pat. No. 12,039,504, issued on Jul. 15, 2024, which are hereby incorporated by reference in their entirety.

BACKGROUND

Generally, a check is a document instructing a financial institution (e.g., a bank) to pay a specified amount of money to a specified entity (e.g., a person). In the traditional process of depositing a check, individuals personally visit a financial institution, such as a bank or credit union, with the physical check in their possession to initiate the deposit procedure. However, this conventional approach often proved to be inconvenient for many individuals. To address this issue, numerous financial institutions have introduced remote check deposit systems. This method enables users to deposit checks without the need to visit a physical financial institution.

In the traditional remote check deposit process, users take pictures of both the front and back of the check, review the pictures on their device to ensure sufficient quality, and subsequently provide these reviewed captured images to their respective financial institution. Using the information visible on these check images, the financial institution facilitates the deposit process remotely. This eliminates the requirement for individuals to personally visit the financial institution for check presentation.

Despite technological advancements aimed at capturing clear and precise images, the seemingly straightforward task of photographing the front and back of checks for remote deposit can occasionally present challenges, resulting in user difficulties or frustrations.

Additionally, a typical optical character recognition (OCR) process involves scanning an image of text and using algorithms to analyze the shapes and patterns of characters to identify what characters are depicted in an image. However, there are challenges in performing OCR on resource constrained devices, such as a user's mobile device. It is with respect to these and other general considerations that embodiments have been described.

SUMMARY

In general, the present disclosure relates to methods and systems for remote check deposit using a mobile device search data pipeline. In a first aspect, example methods for remote deposit of a check include receiving a check image captured by an image capture device of a mobile device in response to receiving a user actuation causing the image capture device to capture the check image; causing the mobile device to perform optical character recognition (OCR) on the check image to generate OCR data; verifying, at the mobile device, that the OCR data generated from the check image includes required predetermined check data to process the check for remote deposit; providing the OCR data to a financial institution server for validation processing; in response to receiving a confirmation notification from the financial institution server that the OCR data has been validated: presenting, on a user interface of the mobile device, a request for confirmation from a user to process the check for remote deposit; in response to receiving a confirmation from the user to process the check for remote deposit: providing the check image to the financial instruction server with instructions to process the check for remote deposit; and receiving, at the mobile device, a deposit receipt notification from the financial institution server after the check is deposited.

In a second aspect, example systems for remote deposit of a check include a computing system operating on a mobile device including a database, a processor, and a memory communicatively coupled to the processor, the memory storing instructions executable by the processor to: receive a check image captured by an image capture device of the mobile device in response to receiving a user actuation causing the image capture device to capture the check image; cause the mobile device to perform optical character recognition (OCR) on the check image to generate OCR data; verify, at the mobile device, that the OCR data generated from the check image includes required predetermined check data to process the check for remote deposit; provide the OCR data to a financial institution server for validation processing; in response to receiving a confirmation notification from the financial institution server that the OCR data has been validated: present, on a user interface of the mobile device, a request for confirmation from a user to process the check for remote deposit; in response to receiving a confirmation from the user to process the check for remote deposit: provide the check image to the financial instruction server with instructions to process the check for remote deposit; and receive, at the mobile device, a deposit receipt notification from the financial institution server after the check is deposited.

In a third aspect, an example non-transitory computer-readable medium is described having stored thereon one or more sequences of instructions for causing one or more processors to perform: receiving a check image captured by an image capture device of a mobile device in response to receiving a user actuation causing the image capture device to capture the check image; causing the mobile device to perform optical character recognition (OCR) on the check image to generate OCR data; verifying, at the mobile device, that the OCR data generated from the check image includes required predetermined check data to process the check for remote deposit; providing the OCR data to a financial institution server for validation processing; in response to receiving a confirmation notification from the financial institution server that the OCR data has been validated: presenting, on a user interface of the mobile device, a request for confirmation from a user to process the check for remote deposit; in response to receiving a confirmation from the user to process the check for remote deposit: providing the check image to the financial instruction server with instructions to process the check for remote deposit; and receiving, at the mobile device, a deposit receipt notification from the financial institution server after the check is deposited.

In an example, a method includes obtaining an image from a camera process responsive to user actuation of a capture image user interface element. In an example, the image is not obtained automatically from the camera process. In an example, optical character recognition is performed on the mobile device. In an example, optical character recognition is performed on a third party server. In an example, the image obtained from the camera or an image derived directly therefrom is never shown to the user. In an example, the image obtained from the camera or an image derived therefrom is not shown to the user prior to sending the image to the server. In an example, a system shows a user an alternative check (e.g., illustrated or cartoon) with the OCR data in the appropriate spots. In an example, the server verifies OCR data received from the device. In an example, the server does not OCR the check. In an example, the OCR data is sent in a separate communication from the images. In an example, the OCR data is sent prior to sending the images. In an example, the OCR data is sent at least one second prior to sending the images. In an example, an account identification number is not sent from the mobile device to the server until after the user confirms the account for deposit (e.g., instead only account labels or aliases are used for account identification prior to confirming the account for deposit). In an example, initiating capture of an image occurs using a mobile device camera without specifying any parameters or settings for the camera (e.g., by using default options). In an example, if an image is not captured correctly (e.g., errors are detected), feedback is provided to the user as to what the problems are. In an example, feedback is more than simply a notification of the existence of the error and instead can take the form of superimposing feedback over an image of the actual check or a representation of a check. In an example, to protect against duplicates, the server can check images against each other to detect duplicate checks, as well as compare data extracted from check images to detect a duplicate check. In an example, to protect against duplicates (e.g., sending the same check twice), a mobile application operating on the mobile device can compare the current OCR data with prior OCR data and then not send to the server responsive to the current OCR data matching prior OCR data. In an example, defects are detected and removed from the image. In an example, separate bit planes or bit groupings are used on image data, or convolutional filters might be used. In an example, automatic edge detection is used to determine boundaries of the check or regions therein. In an example, to the extent that any visible alignment guide is presented on the screen of a mobile device, the alignment guide can remain static or adjust to the corners of a document. Background images in check images can be detected and removed. Automatic adjustment of brightness of check images can be performed, such as using a histogram used to determine a brightness correction value. Detection of a signature on the check can be performed by counting pixels in an area or using a machine learning algorithm trained on the presence or absence of signatures in a specific region of the check. In an example, template matching is used to determine the location and position of a known check template (e.g., the check template can be samples of known check design patterns) to determine which template the check follows (if none matches, then the application can infer that the image is bad). If there is a match, then the application can take known positions of check elements from the template (e.g., bounding boxes of where that data is expected to be) and then perform OCR or other recognition of the data within that region to increase accuracy of the OCR process.

In an example, auto detection of the face of the check is performed. For instance, a model is trained to identify if the face of the check that is being shown on camera view is the front of the check or back of the check. In an example, the detection can distinguish the check and provide the bounding region of the check. Based on the bounding region and face classification confidence we will be able to provide a "usability" metric of that angle of the camera at that time. In an example, usability measurements relates to how the check can be used for further processing. The usability can be a function of the angle of skew of the check object, the amount of light on the object (too dark or very bright) and quality of the check image itself. As a consequence, usable images can be captured for front processing and back processing and combine the results obtained from the plurality of frames to arrive at a final answer.

In an example, object detection and superimposed annotation display while video is in display of front objects and back objects. In addition to classification of the check a cascaded model can then perform object detection and object segmentation on the frame of the video at that time. The object detection which is (also the first step in fraud detection) can then be used to identify key aspects of the front of the check and back of the check. Further processing of the check objects is also possible; the processing could include handwriting recognition, OCR, etc. The front of the check can then reveal date, payee name, payor name and address, amount, check number, whether the check is signed, and whether the check is endorsed. In some embodiments this information can then be digitally superimposed in typed text at the correct location (for example the amount and date can be shown at appropriate location on the check). Endorse here can be digitally superimposed on the back of the check if an endorsement is missing. In other embodiments, a separate check sample can be shown to the user for confirmation of capturing the correct content.

In an example, downstream to the check image capture there are several tasks that are accomplished. These tasks can be performed with various amounts of distribution of the tasks on the mobile device or on a server or on some occasions at both places. In one extreme a captured check image could be sent to the server with no image or text processing at all. In another extreme case, all processing including object detection, face detection, de-skewing, amount and date confirmation, fraud detection can all be performed on the mobile device. In an example, there is a hybrid approach where these tasks are distributed based on the resources available on the mobile device and on the server as well as the timeliness requirement for processing. Algorithms can be scaled down to low memory and low power devices as well as devices with GPUs and other computational powers. The hybrid scheme for optimization could be based either on a policy or computed and acted on a check by check and mobile device by mobile device basis.

In an example, there is a method for remote deposit of a check. The method can include various operations, including receiving a check image captured by an image capture device of a mobile device in response to receiving a user actuation causing the image capture device to capture the check image. The method can include performing certain steps after receiving the check image and without displaying the check image to a user. The method can include, at the mobile device, causing the mobile device to perform optical character recognition (OCR) on the check image to generate first OCR data. The method can include, at the mobile device, determining that the first OCR data generated from the check image lacks required predetermined check data to process the check for remote deposit. The required predetermined check data can include an amount and MICR line data, wherein the MICR line data includes an account number and a routing number, and a check number. The method can include, at the mobile device, generating a check representation image including at least some of the first OCR data and indication provided on the check representation image at a region of the check representation image associated with lacking predetermined check data. The method can include, at the mobile device, presenting the check representation image. The method can include, at the mobile device, after presenting the check representation image, receiving a remediation. The method can include, at the mobile device, after verifying that second OCR data associated with the remediation includes the required predetermined check data, providing the second OCR data to a financial institution server for validation processing. The method can include, at the financial institution server, performing duplication detection processing using the second OCR data. The method can include, at the financial institution server, performing fraud detection processing. The method can include, at the financial institution server, after the duplication detection processing and the fraud detection processing, sending a confirmation notification that the provided second OCR data has been validated. The method can include, at the mobile device, receiving the confirmation notification from the financial institution server that the provided second OCR data has been validated. The method can include, at the mobile device, in response to receiving the confirmation notification, presenting, on a user interface of the mobile device, a request for confirmation from a user to process the check for remote deposit. The method can include, at the mobile device, receiving a user confirmation from the user in response to the request for confirmation from the user to process the check for remote deposit. The method can include, at the mobile device, in response to receiving the user confirmation from the user, providing the check image to the financial institution server with instructions to process the check for remote deposit. The method can include, at the mobile device, receiving, at the mobile device, a deposit receipt notification from the financial institution server after the check is deposited.

In an example, the remediation is user input that modifies the first OCR data to form the second OCR data. In an example, the fraud detection processing or a subsequent fraud detection processing includes a manual review responsive to the remediation being the modification of the first OCR data to form the second OCR data.

In an example, the check image is a first check image. In an example, the remediation includes receiving a second check image captured by the image capture device of the mobile device in response to receiving a user actuation causing the image capture device to capture the second check image. In an example, the remediation further includes causing the mobile device to perform OCR on the second check image to generate the second OCR data. The method can further include activating the image capture device of the mobile device. The method can further include providing instructions for the user to capture a second check image of the check.

The method can further include presenting at least a portion of the check image or an image derived from the check image to a user for a first time only after the check is deposited. Generating the check representation image can further include selecting a check representation image template and populating the template with values from the first OCR data. The method can further comprise determining whether the check image is of the front of the check. Selecting the check representation image template can include selecting a front template responsive to determining that the check image is of the front of the check. Selecting the check representation image template can include selecting the check representation image template from among a plurality of check representation image templates.

In some examples, generating the check representation image fails to preserve stylistic content from the check image. Generating the check representation image can include preserving stylistic content from the check image without directly importing stylistic elements from the check image. Preserving stylistic content without directly importing stylistic elements from the check image can include performing at least one operation selected from a set of operations consisting of: selecting a font based on handwriting in the check image; selecting a color based on an ink in the check image; selecting a scale of an element in the check representation based on a scale of a corresponding element in the check image; and selecting a position of an element in the check representation based on a scale of a corresponding element in the check image.

In an example, the portion of the check image that would contain the lacking predetermined check data is out of frame and the check representation image includes a portion that corresponds to the portion of the check image that would contain the lacking predetermined check data.

In an example, the method further includes, at the financial institution server, receiving the provided check image after the duplication detection processing and the fraud detection processing. The method can further include, at the financial institution server, causing the check to be deposited without the financial institution server performing OCR on the check image.

The method can further include sending an account identification number from the mobile device to the server only after receiving a user confirmation from the user in response to the request for confirmation from the user to process the check for remote deposit.

The method can further include, at the mobile device and prior to providing the second OCR data to a financial institution server for validation processing: determining a similarity value between the second OCR data and prior OCR data sent to the server. Providing the second OCR data to the financial institution server for validation processing can occur responsive to the similarity failing to pass a threshold.

In an example, the method further includes prohibiting a user actuation from causing the image capture device to capture the check image unless a usability metric is met. In an example, providing the check image to the financial instruction server with instructions to process the check for remote deposit includes providing both a front check image of a front of the check and a back check image of a back of the check. In an example, the check representation image includes at least one feature indicating that the check representation image is not the check image. In an example, the method further comprises presenting, on the user interface of the mobile device, the OCR data in a list or tabular format. In an example the user actuation is selection by the user of a selectable element on the user interface. In an example, the lacking predetermined check data is missing or is inaccurate. In an example, receiving a check image comprises receiving a check image of a front side of the check and a check image of a back side of the check.

In an example, there is a method for processing a check image of a check. The method can include receiving a check image of a check, the check image captured by an image capture device of a mobile device, wherein the check image includes: a first region having a first set of characters of a first font; and a second region having a second set of characters of a second font, wherein the second region corresponds to a Magnetic Ink Character Recognition (MICR) line of the check; causing the mobile device to perform a first optical character recognition (OCR) process on the first region; and causing the mobile device to perform a second OCR process on the second region to generate extracted MICR digits corresponding to the second set of characters, wherein the second OCR process includes: determining a respective integer value represented by each respective character of the second set of characters, the determining including: generating a conforming outer perimeter of the respective character; and comparing the conforming outer perimeter of the respective character with one or more templates of a set of template conforming outer perimeters for each integer zero through nine of the second font, wherein the respective integer value corresponds to the template having a best fit based on the comparing, wherein the extracted MICR digits include the respective integer values of the respective characters of the second set of characters.

In an example, the second OCR process further includes causing the mobile device to perform the first OCR process on the second region to generate a set of one or more bounding boxes for the second region; and generating conforming outer perimeter images based on the set of one or more bounding boxes, wherein the conforming outer perimeter images each include a conforming outer perimeter of a corresponding character.

In an example, the method further includes discarding characters identified by the first OCR process on the second region prior to determining the respective integer value.

In an example, the method further includes generating the conforming outer perimeter of the respective character without generating a portion corresponding to closed typographical counters formed within digits zero, six, eight, and nine.

In an example, the set of template conforming outer perimeters consists of conforming outer perimeters for each integer between zero and through nine of a single font; and the extracted MICR digits consist of the respective integers assigned to each respective conforming outer perimeter image of the conforming outer perimeter images.

In an example, the method further incudes preprocessing the check image before causing the mobile device to perform the first OCR process and the second OCR process to convert the check image into a black and white check image.

In an example, the preprocessing the check image includes detecting corner points on the check image to generate a perspective fixed check image.

In an example, the method further includes cropping the check image to generate a cropped check image including the second region, wherein the second OCR process is performed on the cropped check image.

In an example, the method further includes preprocessing the cropped check image to convert the cropped check image into a black and white cropped check image before the second OCR process is performed on the cropped check image.

In an example, the preprocessing the cropped check image includes image thresholding.

In an example, the preprocessing the cropped check image includes inverting color of the second set of characters on the black and white cropped check image.

In an example, the second OCR process further includes extracting a routing number within the second set of characters, the extracting including: detecting a conforming outer perimeter of a leading symbol preceding the routing number in the second set of characters; detecting a conforming outer perimeter of a closing symbol following the routing number in the second set of characters; and determining that the extracted MICR digits for the respective characters between the leading symbol and the closing symbol are the routing number, wherein the leading symbol and the closing symbol are non-numerical symbols.

In an example, the method further includes comparing the extracted routing number to a collection of known routing numbers to determine if the extracted routing number is a valid routing number.

In an example, the method further includes, based on the comparing, determining that the extracted routing number is not a valid routing number and presenting, on a user interface of the mobile device, a prompt for a user to recapture another image of the check.

In an example, the method further includes, based on the comparing, determining that the extracted routing number is not a valid routing number and presenting, on a user interface of the mobile device, a prompt for a user to edit the extracted routing number.

In an example, causing the mobile device to perform the first OCR process on the second region to generate a set of one or more bounding boxes for the second region includes generating a bounding box around the second set of characters; and generating a bounding box around each respective character of the second set of characters.

In an example, the second region includes marks from a signature on the check, and causing the mobile device to perform the first OCR process on the second region to generate a set of one or more bounding boxes for the second region includes eliminating the marks from the signature in the second region.

In an example, the first OCR process extracts check data from the first region, the check data comprising at least one of a payor name, a payee name, a date, a check amount, or a memo note.

In an example, the second OCR process further includes extracting a routing number, an account number, and a check number from the second set of characters.

In an example, the check image is captured in response to receiving a user actuation causing the image capture device to capture the check image.

BRIEF DESCRIPTION OF THE DRAWINGS

The following drawings are illustrative of particular embodiments of the present disclosure and therefore do not limit the scope of the present disclosure. Embodiments of the present disclosure will hereinafter be described in conjunction with the drawings, wherein like numerals denote like elements.

FIG. 3*b* illustrates an example flowchart of a method for remote check deposit using a mobile device.

FIG. 6 illustrates an example method for remote check deposit using a mobile device.

FIG. 7 illustrates an example method for remote check deposit using a mobile device.

FIG. 18 illustrates an example flowchart of a method for extracting text from a check image during remote check deposit using a mobile device.

FIG. 22*c* illustrates example graphs comparing a conforming outer perimeter of a respective character from a check image to a template conforming outer perimeter for the integer five for determining an integer value of the respective character during remote check deposit using a mobile device.

FIG. 27 illustrates a method for performing a deep search.

DETAILED DESCRIPTION

Figure 1:
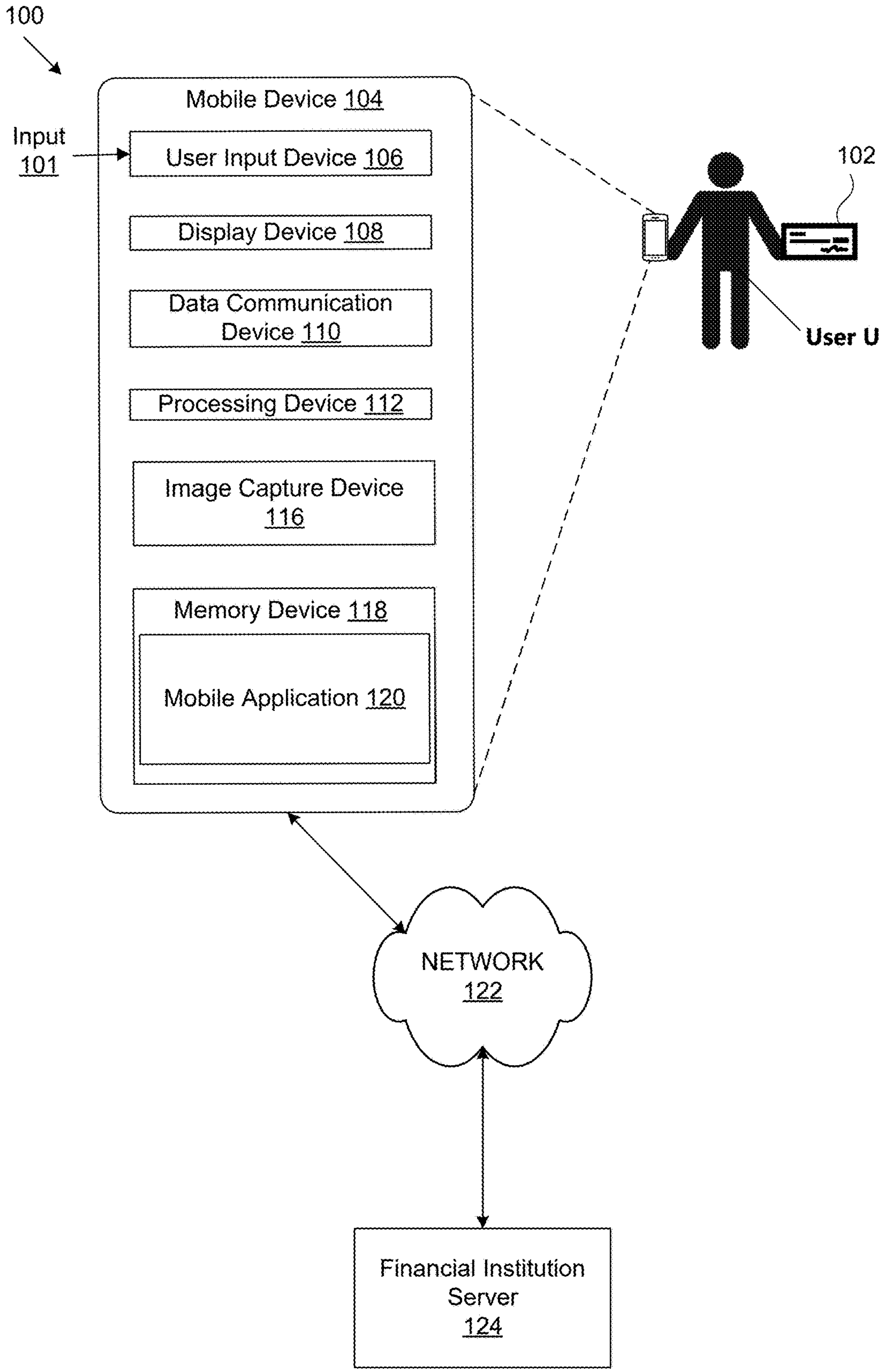
FIG. 1 illustrates a diagram of an example network environment for remote check deposit using a mobile device.

The present disclosure relates to remote check deposit using a mobile device, but a person of skill in the art will recognize how aspects described herein can be applied to other context (e.g., with documents other than checks). The mobile check deposit system and methods described herein include a mobile banking application operating on a mobile device associated with a user. The mobile device is often a personal computing device of a user, such as a smart phone or tablet. An image capture device, such as a camera, on the mobile device is configured to be activated at particular stages in the execution of the mobile banking application to capture image(s) of a check. In some embodiments, the mobile banking application, when executed by the mobile device, receives an actuation instruction from the user, which causes the image capture device to capture an image of a check. For simplicity, an image of a check is referred to herein as a check image.

When capturing the check image, in some examples, the user is required to manually actuate capturing of the image, such as by selecting a capture button presented via a graphical user interface of the mobile device or providing a voice command via another input interface of the mobile device (e.g., by uttering an image capture command), rather than using the mobile deposit application to employ automatic image capture mechanisms to automatically capture the check image. That is, rather than using an automatic image capture mechanism to automatically capture the check image when, for example, the check is properly in the frame of the camera and in focus, the embodiments described herein require manual actuation of the image capture device to capture a check image. In response to the manual user actuation, a check image is obtained from the image capture device and, in turn, processed by the mobile banking application. Aspects of the embodiments described herein can implement manual actuation to capture the check image in a manner that provides more control to the user, minimizes user frustration caused by automatic image capture techniques, improves user privacy (e.g., by placing the capture of images in user control by not having an image feed automatically processed), decreases the use of computing resources needed to automatically analyze a camera feed, and reduces disclosure of certain information that is typically communicated over networks when using automatic image capture techniques.

In some embodiments, the captured check image is not presented (e.g., displayed via a user interface of the mobile device) to the user to verify the check image meets any capture requirements. Rather, the check image is verified by the mobile banking application to determine whether the captured image is usable for completing the remote check deposit process. Verifying aspects of the check image on the mobile banking application executed by the mobile device, referred to sometimes simply as local check image verification, can have several advantages over typical check image verification mechanism. For instance, showing the user an image of the check at this stage is relatively unlikely to add additional benefit because the user already took the image thinking that it was sufficient. Further, keeping sensitive financial information, such as check images, on the mobile device until the check is locally verified reduces the risk of data exposure during transmission of an unusable check image to a remote server. This enhances user privacy and reduces the potential for unauthorized access to or exposure of sensitive data (e.g., by a malicious actor sniffing packets or otherwise intercepting content as it is sent to a server for processing). This improves security by reducing the amount of unnecessary sensitive financial information that leaves the mobile device.

In addition, processing aspects of the check image locally on the mobile device eliminates the need to send the image to a remote server, which can lead to faster processing times and decreased network resource consumption (e.g., reduced bandwidth requirements). For example, defective check images can be detected and discarded on the mobile device itself without needing to consume bandwidth and processing resources by sending defective images to a server for processing. This is especially beneficial for users in areas with limited or unstable network connectivity. Local image processing allows for some of the check deposit steps to be performed even when the mobile device is offline. Still further, processing the check image on the mobile device enables immediate feedback to users regarding the quality of the image. This feedback can guide users in capturing clearer images, reducing the likelihood of future errors and rejected deposits, and thereby improving the ability of the mobile device to interact with a user. Sending images to a remote server can consume significant network bandwidth, especially in cases of multiple users simultaneously submitting check images. Processing locally minimizes this bandwidth usage. Further still, eliminating the delay caused by transmission of the images improves responsiveness of the application by decreasing processing time (again, especially in circumstances where network connectivity is slow or spotty).

Additionally, by offloading certain image processing to the mobile device, the load on the remote server is reduced. This can contribute to improved server performance, scalability, and response times.

In some embodiments, the mobile banking application causes the mobile device to perform a check image verification process on-device. For simplicity, the check image verification process on-device is also referred to herein as an on-device check image verification process. The on-device check image verification process includes performing optical character recognition (OCR) on the check image locally at the mobile device, and determining whether required check data (e.g., MICR line data, check amount data) is usably obtainable from the check image. The on-device check image verification process further includes verifying that a signature is present on a signature line. In some embodiments, the on-device check image verification process further verifies that the check image meets requirements of the Check 21 Act. By verifying that the check image meets requirements of the Check 21 Act locally at the mobile device, a higher resolution check image is used for verification, as opposed to using a lower resolution TIFF image at a financial institution server to assess Check 21 Act requirements at the financial institution server. Thus, the accuracy and ease at which the check image's compliance with the Check 21 Act is improved by performing aspects of Check 21 verification at the mobile device with the check image rather than at the financial institution server.

In some instances, because a check includes characters in more than one font (e.g., the check amount and the MICR line are presented in different fonts), performing OCR on the check image locally at the mobile device includes performing two distinct OCR processes on the check image. For example, the mobile device can perform a first traditional OCR process on a first region of the check image having characters in a font reliably recognized by traditional OCR processes. The mobile device can also perform a second OCR processes, different than the first OCR process, to recognize characters on a second region of the check image in a font not reliably recognized by the first traditional OCR process, such as the MICR line. By performing the second OCR process in addition to a traditional first OCR process on the check image, wherein the steps of the second OCR process are different than the first traditional OCR process, more accurate check data can be extracted from the check image because the second OCR process includes steps to recognize characters in a font not reliably recognized by traditional OCR processes. Accordingly, performing the first traditional OCR process and the second OCR process on the check image in conjunction improves the overall recognition and extraction of check data from the check image, which improves the likelihood that the extracted check data can be verified, and the remote check deposit can proceed without the need to remediate lacking or invalid check data.

A traditional OCR process includes multiple sub-steps or functions to convert different types of documents—such as a check image—into editable and searchable text. Areas of the document that contain text are identified, and the text is broken down into smaller components, such as words or individual characters. Character recognition techniques, such as pattern recognition, machine learning, or neural networks, are then used to identify each individual character. During character recognition, segmented characters are compared to a database of known fonts to make a match in order to identify each character. A traditional OCR process can be performed on a first region of the check image, wherein the first region of the check image has characters in a font reliably recognized by traditional OCR processes.

A traditional OCR process may not reliably recognize certain font on a second region of the check image, such as the font used on the MICR line. Therefore, in some cases, a second OCR process different than the first traditional OCR process is performed on the second region of the check image to recognize such font. In such cases, the second OCR process is used to perform generating conforming outer perimeters of respective characters in the second region of the check image, wherein the conforming outer perimeter is an outer boundary or outer edge of a silhouette of the respective character, and determining a respective integer value represented by each respective character by comparing the conforming outer perimeter of respective characters with one or more template conforming outer perimeters for integer values zero to nine for the font on the second region of the check image. Based on the template conforming outer perimeter that best fits with each conforming outer perimeter of the respective characters, an integer value can be determined for each respective character. Accordingly, the second OCR process can more reliably recognize text from the check image in a font that cannot be reliably recognized by a traditional OCR process, such as a routing number on the MICR line. In some instances, the second OCR process extracts text from the MICR line, and the first OCR process is a traditional OCR process that extracts text from other regions on the check image.

The OCR data can be presented to a user on a user interface of the mobile device. In an example implementation, the OCR data is presented to a user by generating a check representation image and displaying the check representation image via the user interface of the mobile device. The check representation image, in some embodiments, is an illustration version of a check (e.g., cartoon-style), rather than the actual check image that was captured. Presenting an illustrated version of a check (which can be referred to as a check representation image) rather than the actual check image is beneficial in situations where the check image is defective. Where the check image is defective, the software on the mobile device may be unable to sufficiently understand the check image to provide feedback regarding the check image. For instance, portions of the check image may be out of frame or too blurry and so cannot be referenced to show lacking check data. In such situations, the user interface of the mobile device can inform the user of the problem. In some examples, feedback regarding the problem is directly shown to the user on the check image (e.g., annotations can be made on or near a displayed check image). In other examples, a check representation image, rather than the image of the check itself, can be used to show the user a clearer representation of the lacking information or the way in which the check image is defective. Further, showing the user what the check image ought to look like can be beneficial in understanding how to improve imaging.

In some instances, the OCR data is presented on the illustrated version of a check even where the software determines that the check image is sufficient. This can be useful to the user understanding how the software perceives the check image. This can give the user confidence in the system. Further, it can help the user identify problems with false negatives, such as where the software has false confidence that the check image is acceptable and its interpretation accurate.

If the check image is determined to be unacceptable, for example, because required check data is lacking (e.g., MICR line data does not include an account number), check data is inaccurate (e.g., the data fails a checksum, has too many digits, or too few digits), the check representation image includes an indicator, such as a circle or highlighting, that indicates a region of the check image that corresponds with the lacking check data that is required to deposit the check. In some embodiments, the mobile banking application, when executed by the mobile device, causes the mobile device to receive input corresponding to the lacking check data, for example, via an input interface of the mobile device, to remediate the lacking check data. In some embodiments, the mobile banking application, when executed by the mobile device, causes the mobile device to prompt a user via the user interface of the mobile device to recapture the check image to obtain a check image that includes the lacking check data.

When an acceptable check image is received by the mobile device, the OCR data is sent to a server associated with a financial institution for a first level of processing. The financial institution server completes a validation process to validate the received OCR data. In some instances, the financial institution server completes a duplication detection process and a fraud detection process. The server can perform other processes, such as validating deposit limits and presenting information back to the user. If the OCR data is validated, the financial institution server provides a notification to the mobile device indicating that the OCR data from the check image is valid to complete the remote check deposit process. In response to receiving a notification that the OCR data has been validated at the mobile device, a confirmation request is presented on the user interface for confirmation to process the check for remote deposit. Upon receiving confirmation to process the check for remote deposit, the captured check image is sent to the financial institution server to complete the remote check deposit. After the deposit is complete, the mobile device receives a deposit receipt notification.

Example Environment

FIG. 1 illustrates a diagram of an example environment 100 for remote check deposit using a mobile device 104. In some embodiments, user U has a check 102 to deposit remotely into a bank account associated with a financial institution via mobile check deposit processing using the mobile device 104. The mobile device 104 includes a user input device 106, a display device 108, a data communication device 110, a processing device 112, an image capture device 116, and a memory device 118. Aspects of the remote check deposit process are performed locally at the mobile device 104 via the mobile application 120, and aspects of the remote check deposit process are performed at the financial institution server 124. In some embodiments, the mobile application 120 executed on the mobile device 104 is in communication with the financial institution server 124 over network 122 throughout the remote check deposit process.

In some embodiments, the mobile application 120 executed on the mobile device 104 is in communication with the financial institution server 124 over network 122 at certain stages of the remote check deposit process. While the mobile device 104, network 122, and financial institution server 124 are briefly described in this section, in addition or instead they may also include aspects described below in relation to the computing system of FIG. 16.

A user input device 106 of mobile device 104 operates to receive a user input from a user for controlling the mobile device 104. The user input can include a manual input and/or a voice input. In some embodiments, the user input device 106 includes one or more buttons, keys, touch levers, switches, and/or other mechanical input devices for receiving the input 101. The user input device 106 can include a touch screen or a gesture input device. In some embodiments, the user input device 106 can detect sounds including the voice input such as a voice of a user (e.g., an utterance) for controlling aspects of a remote check deposit process via the mobile device 104.

In some embodiments, a display device 108 is provided that operates to display a graphical user interface that displays information for interacting with the mobile device 104. Examples of such information include check data information, notifications, and other information. In some embodiments, the display device 108 is configured as a touch sensitive display and includes the user input device 106 for receiving the input 101 from a selector (e.g., a finger, stylus etc.) controlled by the user U. In some embodiments, therefore, the display device 108 operates as both a display device and a user input device.

The data communication device 110 operates to enable the mobile device 104 to communicate with one or more computing devices over one or more networks, such as the network 122. For example, the data communication device 110 is configured to communicate with the financial institution server 124 and receive notifications from the financial institution server 124 at least partially via the network 122. The data communication device 110 can be a network interface of various types which connects the mobile device 104 to the network 122.

The processing device 112, in some embodiments, comprises one or more central processing units (CPU). In other embodiments, the processing device 112 additionally or alternatively includes one or more digital signal processors, graphical processing units (GPUs), field-programmable gate arrays, or other electronic circuits.

The image capture device 116, in some embodiments, is one or more cameras integrated with the mobile device 104. The image capture device 116 is configured to capture an image or images of the check 102. When the image capture device is activated, user actuation is required to capture the check image rather than permitting automatic image capture techniques that capture an image automatically without requiring any manually input by the user U. Check images captured by the image capture device 116 are stored in the memory device 118 and received by the mobile application 120 executed on the mobile device 104 for remote deposit of the check 102.

The memory device 118 typically includes at least some form of non-transitory computer-readable media. Non-transitory computer-readable media includes any available media that can be accessed by the mobile device 104, such as volatile and nonvolatile, removable and non-removable media implemented in any device configured to store information such as computer readable instructions, data structures, program modules, or other data. Memory device 118 can also include, but is not limited to, random access memory, read only memory, electrically erasable programmable read only memory, flash memory and other memory technology, compact disc read only memory, blue ray discs, digital versatile discs or other optical storage, magnetic storage devices, or any other medium that can be used to store the desired information and that can be accessed by the mobile device 104 in a non-transitory manner.

The memory device 118 operates to store data and instructions. In some embodiments, the memory device 118 stores instructions for a mobile application 120. In some embodiments, the mobile application 120 is a mobile banking application hosted by a financial institution. In some examples, one or more methods described herein can be implemented as instructions stored in one or more memory devices on one or more computers that, when executed by one or more processors, cause the processors to perform one or more operations described herein.

In some examples, as described herein, network 122 includes a computer network, an enterprise intranet, the Internet, a LAN, a Wide Area Network (WAN), wireless transmission mediums, wired transmission mediums, other networks, and combinations thereof. Although network 122 is shown as a single network in FIG. 1, this is shown as an example and the various communications described herein can occur over the same network or a number of different networks.

Figure 2:
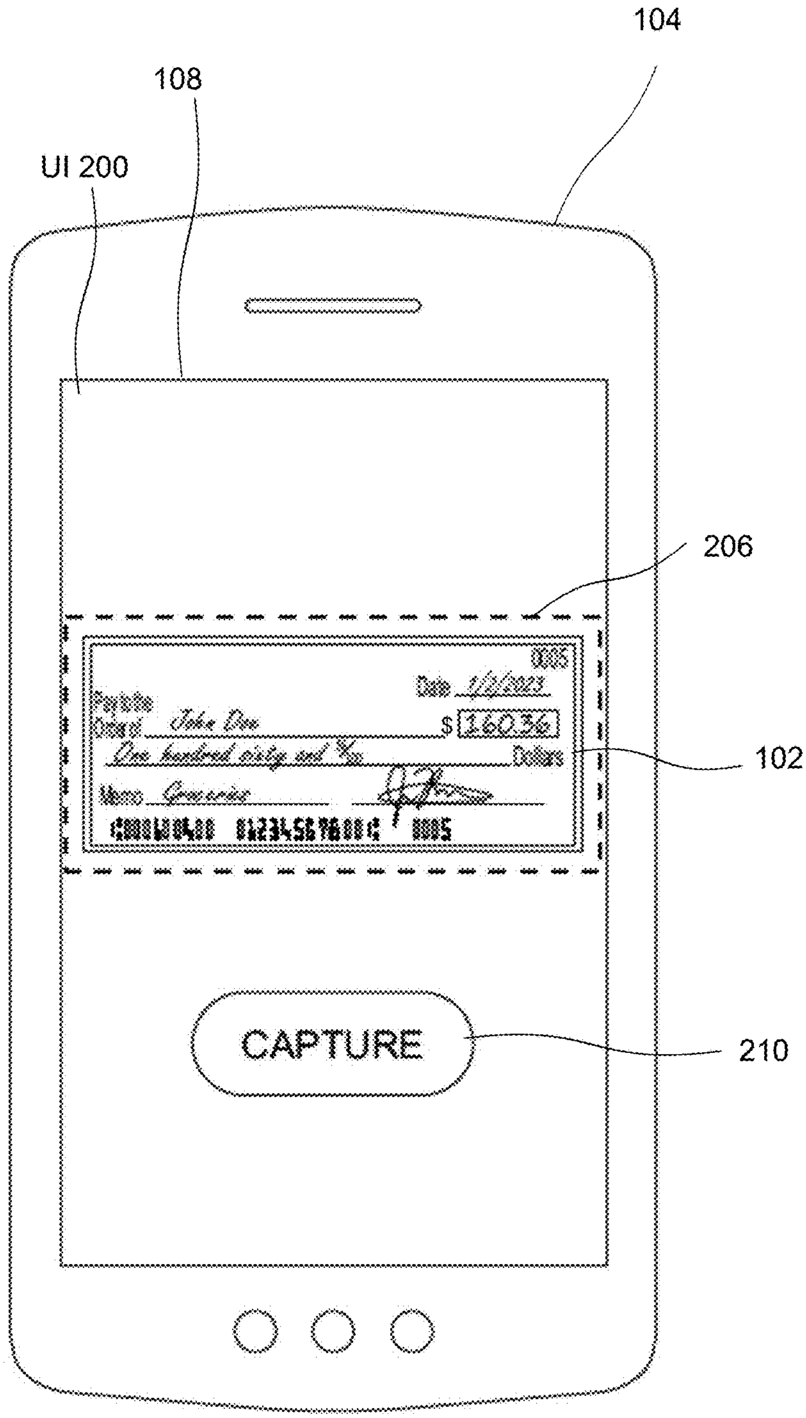
FIG. 2 illustrates an example user interface of a remote check deposit system for capturing a check image.

FIG. 2 illustrates an example user interface 200 of a remote check deposit system for capturing a check image. A display device 108 of mobile device 104 operates to display the user interface 200. One or more image capture devices operating on mobile device 104 capture one or more images of a check 102 for remote deposit.

In some embodiments, the image capture device is activated to capture a check image without specifying any camera settings for the image capture device, and default settings of the image capture device are used to capture the check image. In some embodiments, specific settings of the image capture device (e.g., brightness, zoom) are enabled when the image capture device is activated. In some embodiments, guidance is provided to aid in capturing the check image. For example, automatic edge detection techniques can be used to determine boundaries of the check or regions therein. In some embodiments, a visible alignment guide 206 is presented on the user interface 200 such that the check 102 is aligned within the visible alignment guides 206 and user actuation is received to capture the check image once the check 102 is aligned within the visible alignment guide 206. Visible alignment guides 206 can remain static or can be adjusted to the boundaries of the check as the image capture device is moved in relation to the check 102.

In some examples, the user interface 200 displays a live preview of what will be captured when the capture button is pressed but also includes annotations over the live preview. The annotations can include feedback on whether the image as-is would be acceptable (e.g., using a same or similar process described below in method 300). In some examples, in addition to classification of the check, a machine learning model can then perform object detection and object segmentation on the frame of the video or live preview. The object detection can then be used to identify aspects of the front of the check and the back of the check. Further processing of the check objects is also possible; the processing could include handwriting recognition, OCR, other processing, or combinations thereof. The front of the check can then reveal information, such as date, payee name, payor name and address, the amount, check number, financial establishment associated with the check, whether the check is signed, and whether the check is endorsed. In some embodiments this information can then be digitally superimposed in typed text at the correct location (e.g., the amount and date can be shown at appropriate location on the check). An endorsement can be digitally superimposed on the back of the check if an endorsement is lacking. In other embodiments, a separate check sample can be shown to the user for confirmation of capturing the correct content.

To capture the check image, user actuation can be required. In some examples, user actuation is the selection of a capture button 210 presented on the user interface 200 causing the image capture device to capture the check image. In other examples, user actuation is the selection of a physical button on the mobile device 104 itself causing the image capture device to capture the check image (e.g., a volume button of the mobile device 104). Check images may be captured of the front side of the check and the back side of the check. Once a check image or images are captured, the check image(s) are received by the mobile application executed on the mobile device 104 for remote deposit of the check.

In some examples, user actuation is required but actuation of the capture button 210 is prevented until a process determines that the image to be taken will be sufficiently usable. For instance, the capture button 210 is unavailable (e.g., locked or grayed out) unless a usability metric is higher than a predetermined threshold. The usability metric can be correlated with how well the check can be used for further processing. The usability metric can be determined based on the angle of skew of the check object, the amount of light on the object (e.g., too dark or very bright), the amount of contrast, the quality of the check image itself, other characteristics, or combinations thereof. In some instances, the capture button 210 is prevented from being actuated until required check data is present and detectable in the live preview.

In an example, the check image is obtained using a document mosaicking technique. Document mosaicking is a traditional technique in which multiple frames are combined to form a composite image that uses information from the multiple frames to form a more suitable image (e.g., in terms of area covered, image resolution, sharpness, or other factors) than before. Example implementations include image stitching techniques, such as those provided by the OPENCV library. In some examples, the actuation of the capture button 210 causes the mobile device 104 to take the multiple frames, apply mosaicking, and produce a final check image as a result. In other examples, while the user interface 200 is active, the camera continuously obtains and discards images until the capture button 210 is actuated and then previous x frames are retained as well as future y frames are obtained. The x and y frames can then serve as the multiple frames for use with mosaicking. In addition or instead, a frame is captured in response to the user actuating the capture button 210, and then n frames before and after the capture button being actuated are used to enhance the image captured in response to the user selecting the capture button 210.

Figure 3A:
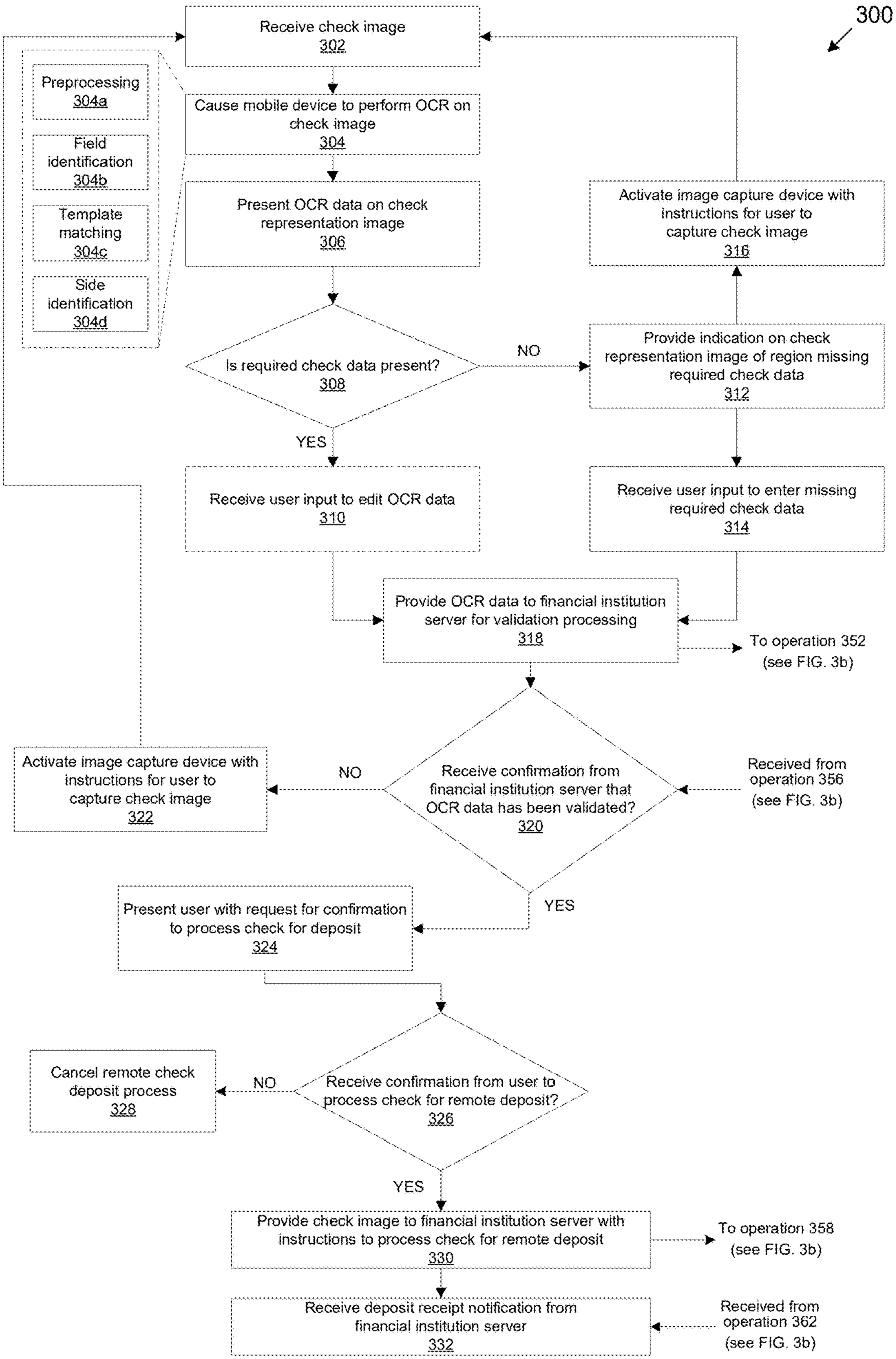
FIG. 3*a* illustrates an example flowchart of a method for remote check deposit using a mobile device.

FIGS. 3*a* and 3*b* illustrates an example flowchart of a method 300 for remote check deposit using a mobile device 104. The operations within FIG. 3*a* occur at the mobile device 104, and the operations within FIG. 3*b* occur at a financial institution server. In an example, the mobile device 104 activates a mobile application 120 for mobile check deposit in response to receiving user input. The mobile application 120 may be, for example, a dedicated application for depositing checks, a full featured banking application, another kind of application, or combinations thereof. The method 300 for remote check deposit can begin with operation 302.

Operation 302 includes a mobile application 120 operating on the mobile device 104 receiving a check image captured by an image capture device 116 of the mobile device 104. For instance, the check image can be received in response to receiving a user actuation causing the image capture device 116 to capture the check image. In some embodiments, the check image is captured in response to a user selecting a selectable element (e.g., capture button 210) presented on a user interface 200 of the mobile device 104 as described above with reference to FIG. 2. The check image can but need not be captured automatically using automatic image capture techniques. In some examples, the mobile application 120 executed on the mobile device 104 receives a check image of the front of the check 102 and a check image of the back of the check 102. In some examples, a single actuation of the capture button 210 causes multiple check images to be obtained. In some instances, the images can be obtained with different settings (e.g., from different cameras or with different aperture or shutter speed settings). The obtaining an image can include using all of these images or selecting a subset of these images that meet a selection criteria (e.g., having a usability score higher than a threshold). Many mobile devices 104 include operating systems with application programming interfaces that facilitate capturing images. For instance, on IOS and macOS, the AVCaptureSession class is used for media capture. Following operation 302, the flow of the method 300 can move to operation 304.

At operation 304, the mobile application 120 executed on the mobile device 104 causes the mobile device 104 to perform OCR on the check image. The mobile application includes an OCR engine configured to extract text from the check image and recognize characters of the extracted text to generate OCR data. The OCR engine can take any of a variety of forms. OCR and in particular handwriting recognition is a relatively popular area of research and many different people and organizations have proposed solutions. In some instances, the mobile device 104 causes OCR to be performed by a software OCR process hosted by a third party (e.g., via AMAZON TEXTRACT, GOOGLE CLOUD VISION API, MICROSOFT AZURE AI SERVICES), a manual OCR process hosted by a third party or locally (e.g., the user of the mobile device 104 is asked to manually enter all characters in the image), or using a library stored and run locally. In an example, OPENCV can be used to recognize characters. In some examples, there is a machine learning framework trained to receive an image (e.g., part or all of the check image) and provide recognized characters as output.

In an example, the OCR implementation includes one or more aspects of US 2022/0319216, which was filed as U.S. patent application Ser. No. 17/569,121 on Jan. 5, 2022, and which is hereby incorporated herein by reference in its entirety for any and all purposes. That application describes performing geometric extraction on a document (e.g., a check) by recognizing text blocks of the unstructured document, generating bounding boxes that surround and correspond to the textual blocks, determining search paths having coordinates of two endpoints and connecting at least two bounding boxes, and generating a graph representation of the at least a portion of the page, the graph representation including the plurality of textual blocks, the coordinates of the vertices of each bounding box and the coordinates of the two endpoints of each search path.

In some instances, the OCR engine is specifically configured for (e.g., trained for) use on check data. A general purpose OCR engine may be configured with a very wide vocabulary of potential words, but that may create issues for processing check data. For example, an entry in a date field could be "MAR 10", which a general purpose OCR engine may plausibly (but incorrectly) interpret as "MARIO", which would not make sense in the context of a date field on a check image. Rather, the OCR engine applied to the date field may be configured to favor outputting dates. As an example, an OCR engine may be configured to produce the n highest confidence outputs and then select the highest confidence one that is a date. As another example, there may be a separate OCR engine trained on the date fields to more accurately interpret what is written in that field. Similar configurations may be used for other fields on the check image.

As yet another example, an OCR engine may be configured to perform more than one type of OCR process, such as a first traditional OCR process and a second OCR process different from the first OCR process. In some examples, the first OCR process and the second OCR process are performed by separate OCR engines. In examples, the first OCR process is performed on a first region of the check having characters in a first font, and the second OCR process is performed on a second region of the check image having characters in a second font that is not reliably recognized by the first traditional OCR process. In some embodiments, the second region of the check image is the MICR line, and the second OCR process is performed to extract check data from the MICR line, such as a routing number, an account number, and a check number. The font used on the MICR line is a font that is not reliably recognized by traditional OCR processes, so the second OCR process is used to recognize the characters on the MICR line and extract check data from the MICR line. For example, the check amount data may be recognized and extracted using a first traditional OCR process, and the routing number may be recognized and extracted from the MICR line region using the second OCR process. The second OCR process, different from a traditional OCR process, for recognizing and extracting text from a check image is further described below with respect to FIGS. 17-22*c*.

Depending on the implementation, the operation 304 can include one or more sub-steps or functions, such as a preprocessing operation 304*a*, a field identification operation 304*b*, a template matching operation 304*c*, a side identification operation 304*d*, other steps, or combinations thereof.

In the preprocessing operation 304*a*, one or more preprocessing techniques can be applied to the check image. Such preprocessing techniques can improve the reliability, consistency, or results of the following steps.

Example preprocessing includes identifying check boundaries relative to the remainder of the check image. This can be performed using any of a variety of techniques such as edge detection (e.g., as implemented in OPENCV) and then setting the boundaries of the check within the check image to a polygon that has an expected check aspect ratio. This can be performed or enhanced by using color, contrast, brightness or other kinds of identification. For instance, a check may have different visual characteristics compared to a table on which it is resting when the picture is taken. Such visual characteristics can be used to identify the check within the image. In another example, the boundaries can be determined by identifying the corners of the check and then connecting the corners with lines to form the boundaries.

Further example preprocessing includes normalizing the check within the image. This normalization processing can include normalizing the position or proportions of the check by, for example, skewing, deskewing, rotating, scaling, stretching, moving, or applying other transformations to the check within the check image to bring the check closer to an expected or standard format on which other steps may depend. This can include cropping the image so substantially only the check is within the check image. The normalizing can be based on the check boundaries identified above. This can also include normalizing the check to have a predetermined aspect ratio. Normalizing the check within the check image can further include adjusting image quality of the check image, such as modifying brightness, contrast, levels, sharpness, or other modifications.

In still further examples, preprocessing can include removing backgrounds from the check image. If the check was placed on a table or surface by the user to capture the check image, the background containing the table or surface can be removed, blurred, filled, or otherwise modified. The brightness of the check image can also be adjusted to obtain an improved image brightness for performing OCR on the check image. Defects detected in the check image can be removed.

Preprocessing can include saving multiple versions of the check image at the mobile device 104. For instance, an original color image can be stored in addition to a bitonal TIFF (Tag Image File Format) formatted image. Thus, the mobile application can include a TIFF image generation module configured to convert the original color check image into a grayscale TIFF image. The color image can be saved in a specified format, such as TIFF, JPEG (Joint Photographic Experts Group), PNG (Portable Network Graphics), PDF (Portable Document Format), or another format.

In the field identification operation 304*b*, the OCR engine or another engine analyzes regions within the check image to identify check data fields such that the generated OCR data includes an indication of check fields and data associated with each check field. For example, the engine is configured to recognize a region of the check as an amount box, so the engine can determine that the text within that region corresponds with the check amount. In another example, expected fields can be used to determine which side of a check is depicted in the image (see preprocessing operation 304*a*, above). In a further example, whether all expected fields can be identified can be used to determine whether the required check data is present. Example front check image expected fields can include a payor information field, a payee name field, a check number field, a date field, a check amount in words field, a memo field, and a MICR line data field (e.g., including a routing number field, an account number field, and a check number field). Example back check image expected fields can include an endorsement field. These fields can be identified using various techniques including OCR. For instance, a field can be identified and a bounding box can be drawn around the field. The bounding box can then be used as a region in which OCR will be performed to determine a value associated with that field. Because identifiers or labels of these fields are often typed, they may be more reliably identified than handwritten areas of a check image. In some examples, the fields can be identified using known check templates, such as described below in template matching operation 304*c*.

In the template matching operation 304*c*, known check templates are used to determine regions on a check image where check data is be expected. For instance, because many checks may have similar formats (e.g., the relative positioning of fields and other content) that can be predetermined and labeled (e.g., manually or with an automated process), identifying that the check image contains an image of a check having a predetermined pattern can be used to identify or know that expected fields are present (e.g., because otherwise the template would not match). The check image can be compared to the known check templates to determine a format that the check follows. When a match is found between a known check template and the check image, the matching known check template can be used during the OCR process to correlate the extracted text with the corresponding check field based on the location of the extracted text on the check. This improves the accuracy of the OCR process to generate OCR check data. If there is no known check template that matches the check image, this might be used as an indication that the check image is defective and there is a problem with the check image. If there is no known check template that matches the check image, in some embodiments, the image capture device is activated with instructions for the user to capture another check image. In an example implementation, a template matching function can be used (e.g., the cv.matchTemplate( ) function from OPENCV) to determine the location and position of a known check template (e.g., the check template can be samples of known check design patterns) within the check image to determine which template the check follows. If none matches, then the application can infer that the image is bad). If there is a match, then the application can take known positions of check elements from the template (e.g., bounding boxes of where that data is expected to be) and then perform OCR or other recognition of the data within that region to increase accuracy of the OCR process.

In the side identification operation 304*d*, the check image can be analyzed to determine whether the check image depicts the front or the back of the check. In some examples, the output of prior steps can be used for this determination, such as whether the image include fields associated with the front or back or whether the image matches a template of a front of a check or a back of a check (e.g., if the check image contains an endorsement field, then it is considered the back of the check and if the check image contains a memo field, then it is considered the front of the check). In one example implementation, a machine learning model is trained to determine whether an image is of a front of a check or a back of the check.

Following operation 304, the flow of the method 300 can move to operation 306.

At operation 306, OCR data generated from the check image is presented on the user interface of the mobile device 104. In some embodiments, the presented OCR data includes one or more of a check amount, a date, a payee name, an account number, a routing number, and a check number. In some embodiments, the OCR data is presented on a check representation image, wherein the check representation image is an illustration representing the check image (e.g., cartoon-style) and not the check image itself. The check representation image can include standard check fields (e.g., payee line, date field, amount box, MICR line), and the OCR data is displayed in the appropriate corresponding location on the check representation image. For example, if the OCR data includes a check amount of $100.00, then "100.00" is displayed in the amount box on the check representation image. Presenting the OCR data on the check representation image (operation 306) is described in more detail below with respect to FIG. 4*a*.

Continuing operation 306, in examples, the OCR data is presented on the user interface of the mobile device 104 in a tabular or list format in addition or instead of the check representation image. An example tabular or list format is described in more detail with respect to FIG. 5*a* and FIG. 5*b*, below.

Following operation 306, the flow of the method 300 can move to operation 308.

At operation 308, on-device check image verification processing occurs at the mobile device 104. For example, the check image verification processing can verify that the OCR data generated from the check includes required check data needed to process the check for remote deposit (operation 308). In order to process a check for deposit, certain information must be obtained from the check so that a financial institution can determine, for example, where the funds for deposit are coming from and an amount of funds to deposit. The verification operation 308 can verify whether the OCR data generated from the check image includes required check data to process the check for remote deposit. This can include comparing the generated OCR data to predetermined required check data fields. In some examples, required check data comprises an amount and MICR line data, wherein the MICR line data includes an account number and a routing number, and a check number. In some examples, the verification operation 308 includes determining whether any value is present in one of the fields. For instance, if there is OCR data corresponding to the date field, then it can be determined that the required data for that field is present. In some examples, the operation can include determining not only that such data is present but also determining whether that data is believable. For instance, the mobile application 120 can determine whether the data in those fields contains the correct amount or kind of data (e.g., correct number of digits in a routing number or a plausible date is in the date field). For instance, if the check image is slightly blurry, then the OCR engine may produce OCR data for a field, but the OCR data may not make sense in context or at all (e.g., alphabet characters in the numeric amount field). In addition or instead, the mobile application 120 can determine whether the numeric amount and the written-out amount match. In some embodiments, other required check data can include a payee name and a date. In some embodiments, the verification operation 308 further includes verifying that the check image complies with Check 21 standards based on the generated OCR data.

In some examples, the verification operation 308 on the mobile device 104 includes duplicate detection. For example, at the mobile device and prior to providing the OCR data to the financial institution server 124 for validation processing, the mobile application 120 can determine a similarity value between the second data and prior data sent to the financial institution server 124. For instance, the mobile application 120 can store OCR data of all checks that have been sent to the financial institution server 124. If the mobile application 120 determines that the OCR data is sufficiently similar to previously submitted OCR, then the mobile application 120 can alert the user that this may be a duplicate check. In some examples, the OCR data is only provided to the financial institution server 124 for validation processing responsive to the similarity failing to pass a threshold (e.g., it is not too similar to prior checks so is unlikely to be a duplicate check).

In some examples, the verification operation 308 can be performed using a trained machine learning model. For instance, the machine learning model can be trained to verify a check as having proper data or parts thereof for processing. The check image or portions thereof can be provided to the machine learning model and the output of which can be used for verification. The machine learning model can be local to or remote from the mobile device 104.

In some embodiments, at operation 308, the mobile device 104 performs additional on-device check image verification processing. For example, the mobile device 104 can use visual recognition techniques to determine whether a signature or endorsement is present on the check image. A signature can be detected if a pixel count is above a predetermined threshold in a region of the check image where a signature line is located. In some examples, machine learning is used to identify the presence or absence of a signature in a specific region of the check image. In some embodiments, an additional verification operation is performed by the mobile device 104 to detect whether an endorsement signature is present on a check image of the back side of the check, In further examples, the mobile device 104 performs processing to determine whether the endorsement contains any restrictions. In some embodiments, the restrictions prevent the deposit. For example, the endorsement may be for mobile deposit only, but the mobile device 104 is a device of a teller at a bank. As another example, a restrictive endorsement may permit deposit only by a certain person, a particular bank, or in a particular account. Such restrictions can be detected using an optical character recognition process and can be used to affect processing (e.g., by determining that the check is or is not valid for processing based on any restrictions).

If the required check data is not present on the check image, then the method 300 can take the "NO" branch from operation 308 to operation 312.

At operation 312, an indication is presented on the check representation image of a region of the check image that is lacking required check data. For example, if the OCR processing could not determine OCR data for the check amount (e.g., because the check image was blurry around the check amount), so no check amount is included in the generated OCR data, then the check amount box is circled or highlighted on the check representation image. This provides an indication to the user as to why the check image is not useable to process for remote check deposit. By providing an indication on the user interface of the precise region or regions of the check image that are problematic or lacking required data, the user receives informative feedback to enable remediation of issues with the check image.

In the example user interface 400*a* shown in FIG. 4*a* and described below, the OCR data is lacking the check amount in the check amount box 426*a*. Thus, the mobile application executed on the mobile device 104 determines that the required check data is not present and takes the "NO" branch from operation 308 to operation 312. An indication is then provided on the check representation image of the region lacking the required check data, as described in more detail below with respect to FIGS. 4*b*-4*e*.

After an indication is provided on the user interface identifying a region of the check image that is lacking required data at operation 312, the problem with the check image can be remediated. In examples, the problem is remediated by receiving a new check image captured by the image capture device. Thus, following operation 312 the flow of the method can move to operation 316.

At operation 316, the image capture device is activated with instructions for the user to capture another check image. Knowing the problematic region of the original check image, the user can proceed to capture a second check image used to generate OCR data including the required check data that was lacking from the first captured check image.

In some implementations, the flow of the method 300 moves from operation 312 to operation 314.

At operation 314, user input is received that remediates the problem with the check image. In an example, user input is received that edits the OCR data to input the lacking required check data. For example, if an indication was provided on the check representation image that a check amount could not be determined from the check image so the OCR data is lacking the check amount, input can be received via the user interface to input the check amount. In some embodiments, after the lacking required check data has been received, the mobile device 104 repeats the verification operation to verify that the OCR data generated from the check includes required check data needed to process the check for remote deposit (operation 308).

If the required check data is present on the check image, the flow of the method 300 can take the "YES" branch from operation 308 to operation 310.

At operation 310, input may be received via the user interface to edit the OCR data. In some examples, input to edit the OCR data is received to correct a mistake in the OCR data that nonetheless passes the test for whether the required check data is present.

At operation 318, the OCR data is provided to a financial institution server 124 for a first level of validation processing. This can be performed after the OCR data is verified at the mobile device 104 as including required check data. Following operation 318, the flow of the method 300 can move to operation 352, as shown in FIG. 3*b*, which occurs at the financial institution server 124.

In some embodiments, during the first level of validation processing by the financial institution server 124, the financial institution server 124 does not have the check image at this stage. In some embodiments the financial institution server 124 only has the OCR data. The financial institution server 124 may also include additional metadata regarding the check, such as whether and to what extent the OCR data has been edited by the user (e.g., either to correct the OCR data or to enter missing required check data). The OCR data provided to the financial institution server 124 can be processed along with instructions for manual review of the OCR data if needed. During the first level of validation processing by the financial institution server 124, the authenticity and legitimacy of the check is validated by analyzing the OCR data. For example, the OCR data generated from the MICR line on the check image is validated for accuracy and authenticity to ensure the check is legitimate and corresponds with a legitimate account number and routing number.

At operation 352, shown in FIG. 3*b*, the financial institution server 124 receives the OCR data and performs processing. In an example, this operation includes performing duplicate detection processing. This can include comparing the OCR data with previously submitted OCR data or the information of previously deposited checks to determine whether the same or substantially the same check has already been deposited. If so, then the process may end (e.g., with an error message being sent to the user) or may continue under modified conditions (e.g., with a flag indicating manual review is necessary before depositing). Before, during, or after operation 352, the method 300 can include operation 354.

At operation 354, shown in FIG. 3*b*, fraud detection processing can be performed using the OCR data. For instance, the OCR data may be analyzed to determine a confidence that the OCR data is associated with fraud. In some examples, the operation 354 can include providing the OCR data to a machine learning model trained to detect fraud from OCR data. In some examples, fraud detection can determine whether the OCR data is in line or out of line from prior checks from that payee or payor. It can also include determining whether other data about the check indicates a level of fraud. For instance, in addition to the OCR data, the financial institution server 124 may receive other data regarding the check, such as whether and to what extent a check matches a template of a check. This can include what background the check had, what font the check had, other features, or combinations thereof. In some examples, the OCR data includes a vector representation of some data of the check, such as handwriting or signatures. Such data can be compared (e.g., by measuring a distance in vector space) to known true data to determine whether fraud may be present.

In some examples, the fraud detection can include one or more steps or operations described in U.S. patent application Ser. No. 18/052,081, filed Nov. 2, 2022, which is hereby incorporated herein by reference in its entirety for any and all purposes.

In operation 356, shown in FIG. 3*b*, following the duplicate detection and fraud detection processing the financial institution server 124 sends a notification back to the mobile device 104 regarding the processing. The notification can include information regarding the relative success or failure of the processing. In some examples, prior to sending the notification, other processing can be performed by the financial institution server 124. Such processing can include determining whether processing the check would violate rules or protocols, such as whether depositing the check would result in violating deposit limits.

Returning to FIG. 3*a*, if the financial institution server 124 is not able to validate the OCR data to confirm the accuracy and authenticity of the OCR data (e.g., taking the "NO" branch from operation 320 to operation 322), this is indicative of a problem with the OCR data, which, in examples, is caused by a problem with the check image. Thus, in examples, the image capture device on the mobile device 104 is activated with instructions for the user to capture another check image (operation 322).

If the financial institution server 124 is able to validate the OCR data to confirm the accuracy and authenticity of the OCR data, a confirmation is received by the mobile device 104 from the financial institution confirming that the OCR data has been validated. If a confirmation is received that the OCR data has been validated by the financial institution server 124, then the "YES" branch can be taken from operation 320 to operation 324.

In operation 324, a request for confirmation to process the check for deposit is presented on the user interface of the mobile device 104. In some embodiments, the request for confirmation presented on the user interface includes presenting a selectable element on the user interface that, if selected by the user, indicates that a confirmation has been received from the user to process the check for deposit. Following operation 324, the flow of the method 300 can move to operation 326.

If no confirmation from the user is received by the mobile device 104 to process the check for remote deposit or there is an explicit cancelation by the user, then the flow of the method 300 can take the "NO" branch from operation 326 to operation 328.

In operation 328, in some embodiments, the remote check deposit is canceled. In some instances, this can include sending a notification to the financial institution server 124 that the remote deposit is canceled.

If confirmation is received by the mobile device 104 to process the check for remote deposit, then the flow of the method 300 can take the "YES" branch from operation 326 to operation 330.

In operation 330, the mobile device 104 sends the check image to the financial institution server 124 with instructions to process the check for remote deposit. In some implementations, prior to operation 330, the financial institution server 124 has not received the check image. Thus, in some embodiments, the check image is sent from the mobile device 104 to the financial institution server 124 in a separate communication file from the file that sent the OCR data to the financial institution server 124. Following operation 330, the flow of the method can move to operation 358, as shown in FIG. 3*b*, which occurs at the financial institution server 124.

At operation 358, shown in FIG. 3*b*, the financial institution server 124 receives the check images from the mobile device 104. The flow of the method 300 can move from operation 358 to operation 360. In examples, before receiving confirmation at the mobile device 104 to process the check for remote deposit, an account identification number associated with the check is not provided to the financial institution server 124. Rather, account labels or aliases are used, in some examples, for account identification prior to receiving confirmation from the user to process the check for remote deposit.

At operation 360, shown in FIG. 3*b*, the financial institution server 124 initiates the deposit process, such as by performing a traditional mobile check deposit process. In some examples, this operation can include performing additional verification on the check image and the OCR data, such as additional fraud detection verification. This additional processing can include analyzing handwriting, ink color, date style, signature, endorsement signature, etc. to detect if the check was modified after it was drafted by the payor. After additional verification of the check image and OCR data by the financial institution server 124, a memo is posted on the user's account showing the check deposit amount. The financial institution server 124 then writes a log record of the check to capture the details of check being processed for remote check deposit. The flow of the method 300 can move to operation 362.

At operation 362, shown in FIG. 3*b*, the financial institution server 124 sends a notification to the mobile device 104 confirming the deposit process. This confirmation can be a confirmation that the deposit process has started or is completed. Following operation 362 the flow of the method can return to the mobile device 104 as operation 332, as shown in FIG. 3*a*.

Returning to FIG. 3*a*, at operation 332, the mobile device 104 receives the confirmation from the financial institution server 124. In an example, the financial institution server 124 has completed the remote check deposit process and the confirmation indicates as much. In some embodiments, the deposit receipt notification is a push notification presented on the user interface of the mobile device 104. Upon completion of the remote check deposit process, funds will appear in the user's account. Funds may not appear in the user's account immediately, and may take a few days to become available to the user.

Figure 4A:
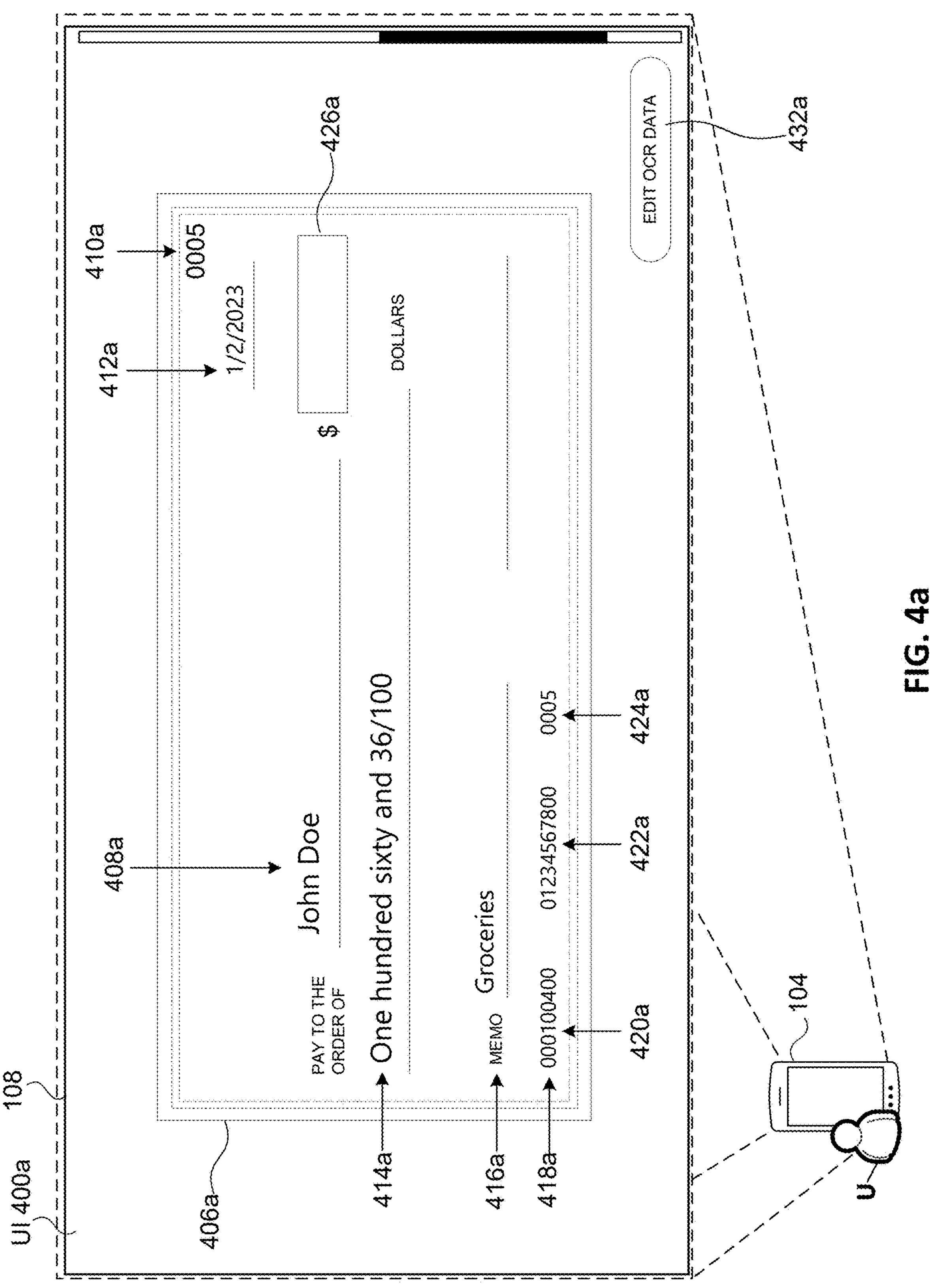
FIG. 4*a* illustrates an example user interface of a remote check deposit system for presenting check data.

FIG. 4*a* illustrates an example user interface 400*a* of a remote check deposit system for presenting check data. The user interface 400*a* is an example of the user interface on which the OCR data is presented in operation 306 of method 300 described above with reference to FIG. 3*a*. User interface 400*a* is presented on a display device 108 of a mobile device 104 associated with a user U. In some examples, after a captured check image has been received and the mobile application has caused the mobile device 104 to perform OCR on the check image, the OCR data is presented on a check representation image 406*a* and presented on the user interface 400*a*.

The check representation image 406*a* is not the actual check image or directly derived from the check image (e.g., arrived at by modifying pixels of the check image until the check representation image 406*a* is achieved), rather, the check representation image 406*a* can be an illustration or "cartoon-style" representation of a check. In some examples, the check representation image 406*a* is a photograph of another check (i.e., not the check 102). The representation image 406 can be ersatz or a simulacrum of the check 102. For instance, the check representation image 406*a* can violate one or more standards of check appearance (e.g., ANSI standards for checks), such as by having a non-standard aspect ratio or by replacing MICR fonts with non-MICR fonts. One or more MICR symbols (e.g., transit, on-us, amount, and dash symbols) can be omitted or replaced with non-MICR symbols. The check representation image 406*a* can include watermarks, words, or other features that convey that the check representation image 406*a* is not a real check. The check representation image 406*a* can include one or more watermarks, words, or other features that convey that the check representation image 406*a* is not a receipt, is not the check image, it not an indication that the check 102 was successfully deposited, and is not meant as a substitute for the check 102 for any purpose other than facilitating the mobile check deposit workflow. While the above has been described in the context of such indications being displayed on the check representation image 406*a*, they may instead or in addition be provided elsewhere on the user interface displaying the check representation image 406*a*.

In some instances, the check representation image 406*a* can be selected from among multiple different check representation images 406*a* or templates for creating the check representation image 406*a*. For instance, a check representation image 406*a* can be selected from among multiple check representation templates, such as to increase or decrease a similarity between the check representation image 406*a* and the check image. In certain instances, the check representation image 406*a* can be made to appear very different from or very similar to the check image (e.g., different layout, color, symbols, formatting, etc.) depending on user or system preferences. In some examples, the differences from the check image can be increased or decreased depending on how much information is correctly available (e.g., how close the check image is to meeting requirements). For instance, the check representation image 406*a* can be in black and white or grayscale if one or more requirements are not met and then in color once all requirements are met. In some examples, an average or other representative color can be determined from the check image (e.g., the entire image or the check portion thereof) and then used as a background or primary color of the representation image. In another example, an opposite or contrasting color can be used.

In some instances, the check representation image 406*a* can be created by compositing the check image with a check representation template. For instance, one or more regions (e.g., the date region) of the check image can be extracted from then check image and superimposed over the template. Such superimposition can be such that the composite image is representative of not only what the content was on the check image but also how the content in the check image appeared (e.g., as influenced by handwriting, font, ink color, number formatting, date formatting, position, other contributors to appearance, or combinations thereof).

In other instances, the check representation image 406*a* lacks stylistic content from the check image. Such a check representation image 406*a* can be representative of what the substantive content was on the check image but not how the content in the check image appeared. In other words, given a check representation image 406*a* that lacks stylistic content from the check, one would be expected to pick the original check image from images of checks having the same substantive content (e.g., date, amount, memo, etc.) but written by different people (e.g., thereby having different stylistic content such as handwriting and other factors contributing to appearance) at a rate no better than random chance.

In still other instances, the check representation image 406*a* can preserve stylistic content without directly importing stylistic elements from the check image. For instance, elements created for the check representation image 406*a* can be constructed with stylistic elements (e.g., font, color, scaling, position, etc.) selected based on a similarity to stylistic elements of the check image. As described in more detail below, such techniques can include selecting a font based on handwriting in the check image, selecting a color based on ink in the check image, selecting element scale/position based, other techniques, or combinations thereof.

Preserving stylistic content without directly importing stylistic elements from the check image can include selecting a font based on handwriting within the check image. For instance, at least some of the OCR data (e.g., a date) can be rendered in several different fonts and then one font can be selected that is most similar to the handwriting in the check image. A machine learning algorithm can be used to determine similarity (e.g., a machine learning model trained to determine similarities between fonts). In addition or instead, similarity can be determined by overlaying each of the rendered fonts over the original and selecting the one that has the most pixels in common. In addition or instead, the renderings and the handwriting can be embedded into a vector space and the rendered font that has the least distance from the handwriting can be selected.

Preserving stylistic content without directly importing stylistic elements from the check image can include selecting a color based on an ink in the check image. For instance, the color can be an average color within a region or at a point believed to be within a handwritten ink line. In addition to or instead of ink color used in handwriting the check, the ink color can be the color of ink used to print the background, text, or other features on the check.

Preserving stylistic content without directly importing stylistic elements from the check image can include selecting a scale and/or position of an element in the check representation based on a scale of a corresponding element in the check image. In an example, scale and position can be determined by identifying locations of regions of handwritten content and then scaling and/or positioning the generated content to approximate the regions. For instance, bounding boxes can be created to encompass a field in the check image and corresponding content in the representation image template can be scaled and positioned (including rotated) to more closely align with the bounding box identified in the check image.

For instance, where the check has cursive handwriting in blue ink, stylistic elements can be selected to mimic that handwriting, such as by selecting a specific script font from among multiple font choices based on a similarity to the handwriting or selecting a font color configured to match the ink color of the pen used in the check.

The OCR data generated from the check image is superimposed on or integrated with the check representation image 406*a* in the appropriate check field location (e.g., OCR data for a check amount is presented in a check amount box on the check representation image). For instance, the content can be placed within a bounding box of a corresponding field (e.g., date content is put in a date bounding box located relative to the date field). In some embodiments, the OCR data includes a payee name 408*a*, a check number 410*a*, a date 412*a*, a check amount in words 414*a*, a memo 416*a*, MICR line data 418*a* including a routing number 420*a*, an account number 422*a*, and a check number 424*a*, and a check amount in a check amount box 426*a*.

In some embodiments, the user interface 400*a* further includes a selectable element 432*a* configured to receive user input to edit the OCR data. In examples, the user interface 400*a* is configured such that the display device 108 is a touch screen and if user U selects (e.g., taps, touches) OCR data displayed on the user interface 400*a*, the user U is able to edit the OCR data. For example, if user U reviews the OCR data displayed on the user interface 400*a* and sees that the OCR data includes a mistake (e.g., OCR data does not match text on check), in some embodiments, input will be received via the user interface to edit the OCR data. Edits to the OCR data, in some examples, can include edits to the spelling of the payee's name or editing the check amount if the OCR data does not match what was written on the check. The edits can appear live on the check representation image.

In some instances, the user input can be compared with the OCR data and determine a relative similarity or difference. For instance, the difference can be determined based on a string metric (e.g., Levenshtein distance or another string metric). If the difference is larger than a threshold, then the system may provide an alert indicating that the correction is meant for correcting OCR errors rather than errors in writing the actual check (in other words errors in the system understanding what is written on the check rather than correcting what should be written on the check instead). In another example, the OCR process can provide an output of the most likely correct answers and it can be determined whether the proposed correction is a top N most likely correct answer. If so, then the correction may be permitted otherwise the correction may be flagged or prohibited.

In some instances, the user input is prohibited from being received when information is lacking. For example, if the OCR data lacks date data, then it may be because the check image was inadequate (e.g., the date field was cut off), rather than from an error in the OCR process. So to solve the problem, the user may be required to recapture the check image rather than manually specify the information. In certain examples, the system may permit the receipt of input even if the data lacking for certain fields, such as the memo field or endorsement field.

In some instances, the mobile application 120 requests user input to resolve conflicts or uncertainties. For instance, the mobile application 120 can compare the OCR data for the written out dollar amount and the numerical dollar amount and determine that the two amounts are different (and they should be the same). The mobile application 120 can then present the two OCR data values and ask the user to choose which one is correct. In addition or instead, the mobile application 120 can have the user specify the correct amount.

Figure 4B:
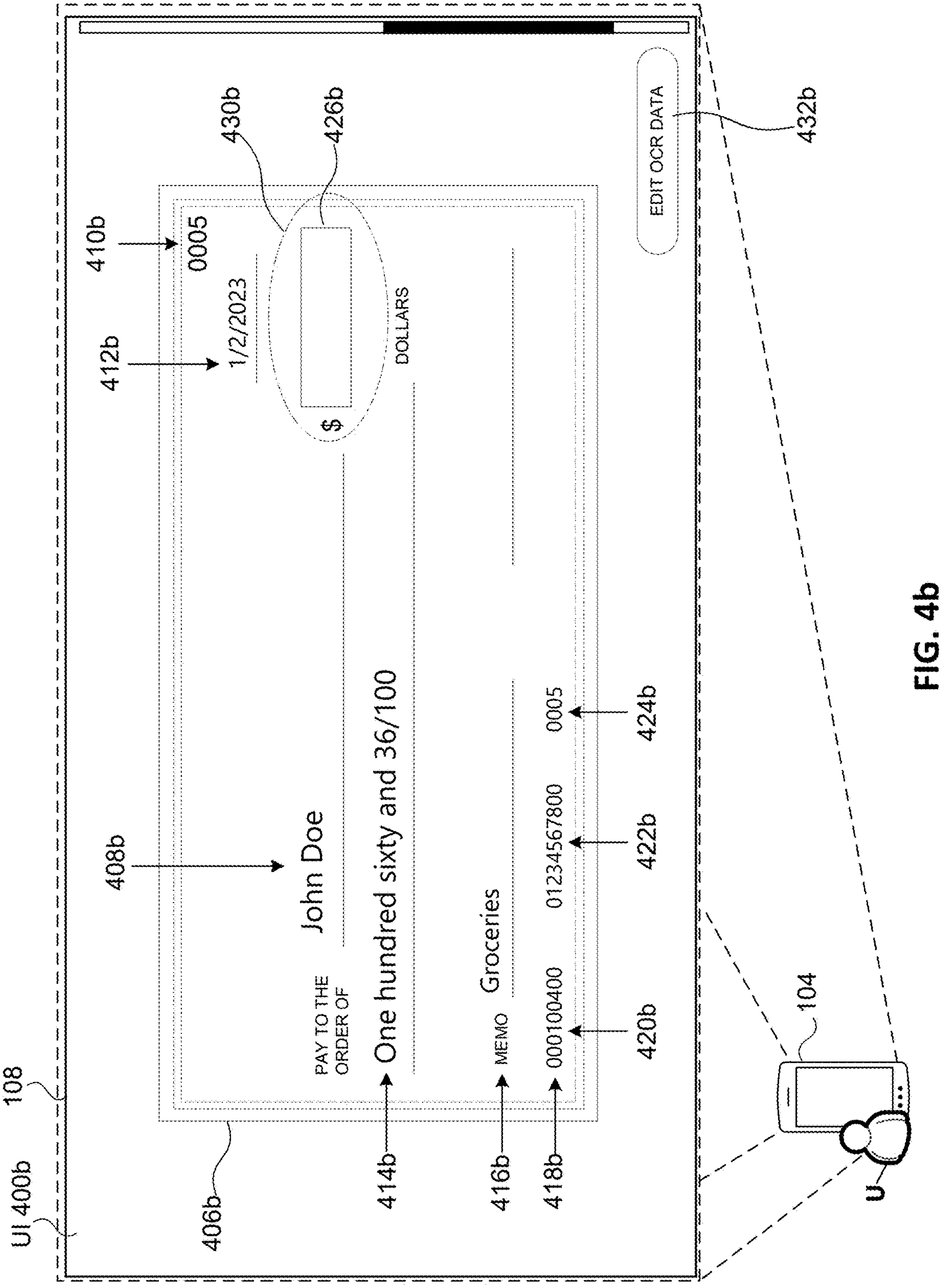
FIG. 4*b* illustrates an example user interface of a remote check deposit system for presenting check data.

FIG. 4*b* illustrates an example user interface 400*b* of a remote check deposit system for presenting check data. The user interface 400*b* is presented on a display device 108 of a mobile device 104 operated by a user U. The user interface 400*b* presents a check representation image 406*b* including OCR data generated (e.g., payee name 408*b*, check number 410*b*, date 412*b*, check amount in words 414*b*, memo 416*b*, MICR line data 418*b* including a routing number 420*b*, account number 422*b*, and check number 424*b*.

As mentioned briefly above with respect to FIG. 4*a*, the check representation image 406*a*, 406*b* is lacking the check amount in the check amount box 426*a*, 426*b*. In examples, the lacking check data is a result of the check image being of poor quality such that the OCR processing could not extract the text from the image. An indication 430*b* is provided on the check representation image 406*b* of the region lacking the required check data. In the illustrated example, the indication 430*b* shown on user interface 400*b* is an oval around the check amount box 426*b*, which is lacking required check data. In other examples, the indication of the check region lacking required check data can take the form of highlighting, or another type of visual cue provided on the user interface to draw attention to the check region lacking required check data. This indication on the user interface 400*b* provides feedback to user U regarding a problematic region of the check image. By providing specific feedback to user U regarding the lacking required check data, the problem with the check image can be remediated more easily and the lacking required check data can be obtained more quickly than if no feedback or less specific feedback regarding the problem was provided.

In examples, the lacking required check data is remediated by receiving another picture of the check image. Thus, the image capture device can be activated, and instructions presented to the user U on the user interface 400*b* to capture a second check image of the check that includes the lacking required check data. In some embodiments, the lacking required check data is remediated by receiving input to edit the OCR data to add the lacking required check data. Thus, in some embodiments, a selectable element 432*b* is presented on the user interface 400*b*, and when a selection of the selectable element 432*b* is received, the OCR data presented on the check representation image 406*b* can be edited. In some embodiments, the user interface 400*b* is configured to receive a selection of the OCR data or of the check region where check data is lacking, and the selection enables OCR data to be edited or added. For example, if the payee name presented on the check representation image does not match the name on the check itself, a selection can be received in response to a user tapping on payee name 408*b*, which in this example use case is "John Doe", and an option to edit the OCR data is provided. To add lacking check amount data, a selection can be received in response to a user tapping on the check amount box 426*b* and an option to edit the OCR data to add the check amount written on the check is provided.

In some examples, the system only permits edits to be made to pre-filled amounts on an enter details screen rather than any other fields. In some examples, the system only permits edits to a memo field or a numerical amount field. In some instances, the OCR data is used to determine the quality of the check image, so if the OCR data is not correct, then that may be used as an indication that the check image quality is not sufficiently high. However, there may be instances where the check image is quality is sufficiently high for processing, but the OCR data is nonetheless incorrect. For example, the handwriting may be poor such that the OCR produces an output that is incorrect. If the OCR data does not match the check image, then the check image may be flagged for manual processing.

Figure 4C:
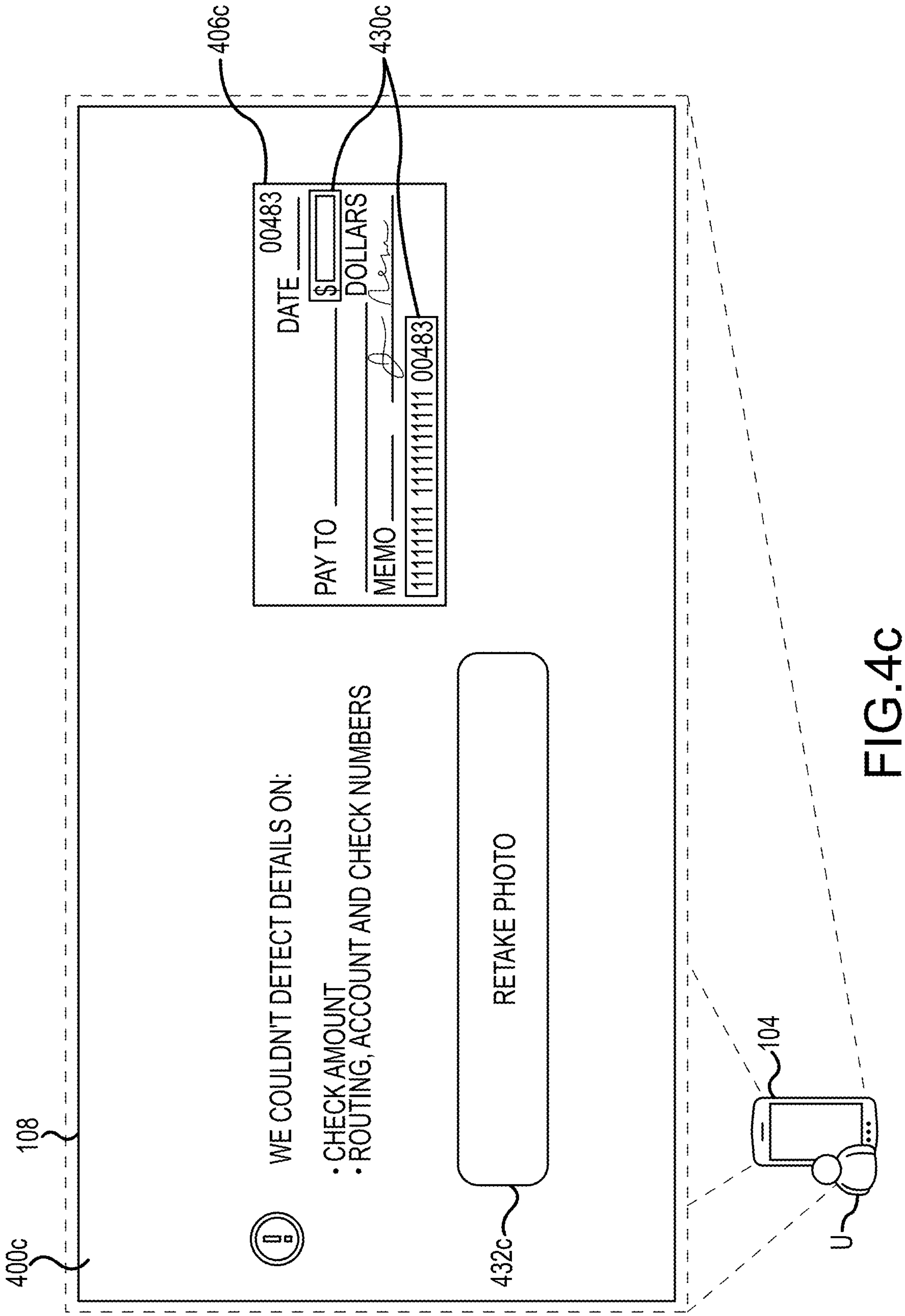
FIG. 4*c* illustrates an example user interface of a remote check deposit system for presenting check data.

FIG. 4*c* illustrates another example user interface 400*c* of a remote check deposit system for presenting check data. The user interface 400*c* is presented on a display device 108 of a mobile device 104 operated by a user U. The user interface 400*c* presents a check representation image 406*c* in the form of a check illustration having some OCR data filled in relevant locations. The user interface 400*c* further indicates that certain OCR data is lacking: check amount, routing number, account number, and check number. Those elements are identified on the check representation image 406*c* with indications 430*c*. In the illustrated example, the routing number, account number, and check number are filled in with dummy data (e.g., numbers that do not correspond to areal routing or accounting numbers), which can be beneficial in giving a user a sense of what the information to capture looks like. By contrast the check amount is not filled in in the check representation image. Because the user of the system may have a strong reaction to the actual check amount they see on the real check differing from the amount shown in the check representation image, it may be beneficial to leave the check amount empty rather than filled with dummy data. In an alternative example, the numeric check amount may be filled with data from the textual check amount, if such can be detected. In this illustrated example, a selectable element 432*c* is provided that, upon actuation discards the previously obtained check image and permits the user U to take another image.

Figure 4D:
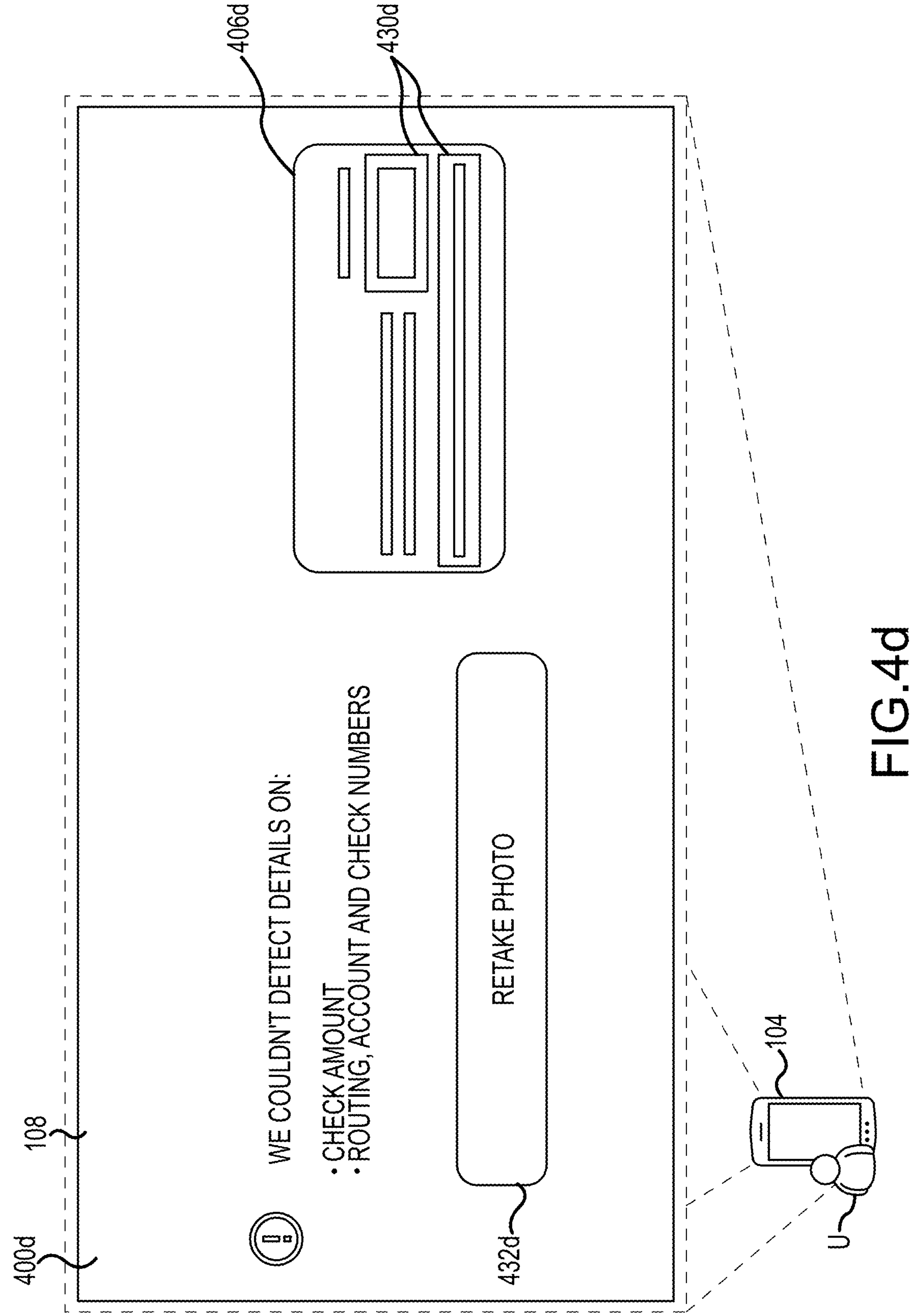
FIG. 4*d* illustrates an example user interface of a remote check deposit system for presenting check data.

FIG. 4*d* illustrates a further example user interface 400*d* of a remote check deposit system for presenting check data. The user interface 400*d* is presented on a display device 108 of a mobile device 104 operated by a user U. The user interface 400*d* presents a check representation image 406*d* in the form of a check illustration having no OCR data filled in. Rather, fields are represented as illustrated blocks or other shapes lacking alphanumeric symbols. The user interface 400*d* further indicates that certain OCR data is lacking: check amount, routing number, account number, and check number. Those elements are identified on the check representation image 406*d* with indications 430*d* in the form of boxes drawn around the blocks corresponding to the fields lacking data. In other instances, the blocks corresponding to the fields lacking data can be highlighted with color or content indicating that the block is lacking detectable data. In this illustrated example, a selectable element 432*d* is provided that, upon actuation discards the previously obtained check image and permits the user U to take another image.

Figure 4E:
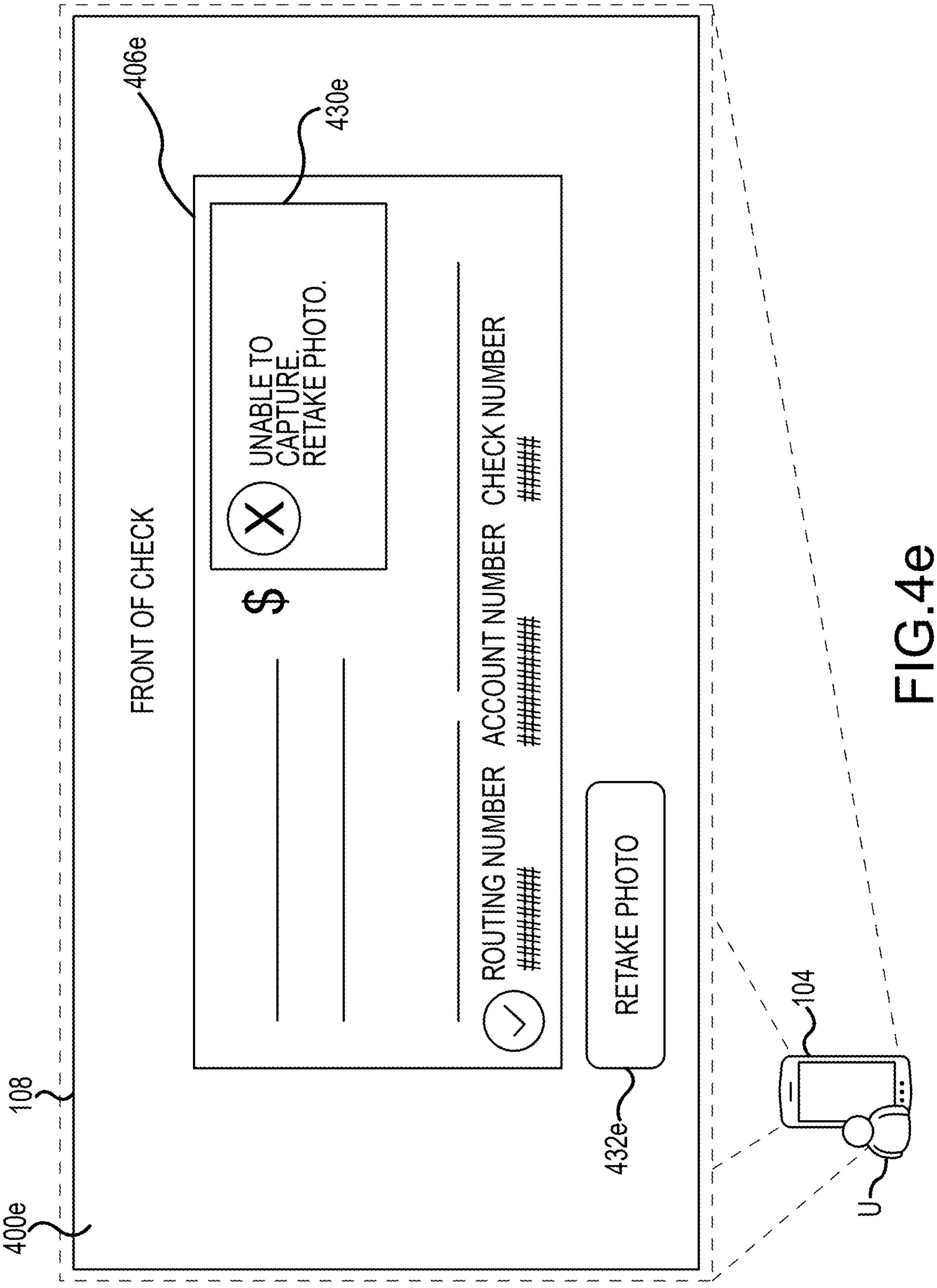
FIG. 4*e* illustrates an example user interface of a remote check deposit system for presenting check data.

FIG. 4*e* illustrates a further example user interface 400*e* of a remote check deposit system for presenting check data. The user interface 400*e* is presented on a display device 108 of a mobile device 104 operated by a user U. The user interface 400*e* presents a check representation image 406*e* in the form of a check illustration having no OCR data filled in. The user interface 400*e* further indicates that certain OCR data is lacking by placing an indication directly over and covering those portions of the check that are not usefully detectable. In this illustrated example, a selectable element 432*e* is provided that, upon actuation discards the previously obtained check image and permits the user U to take another image.

Figure 5A:
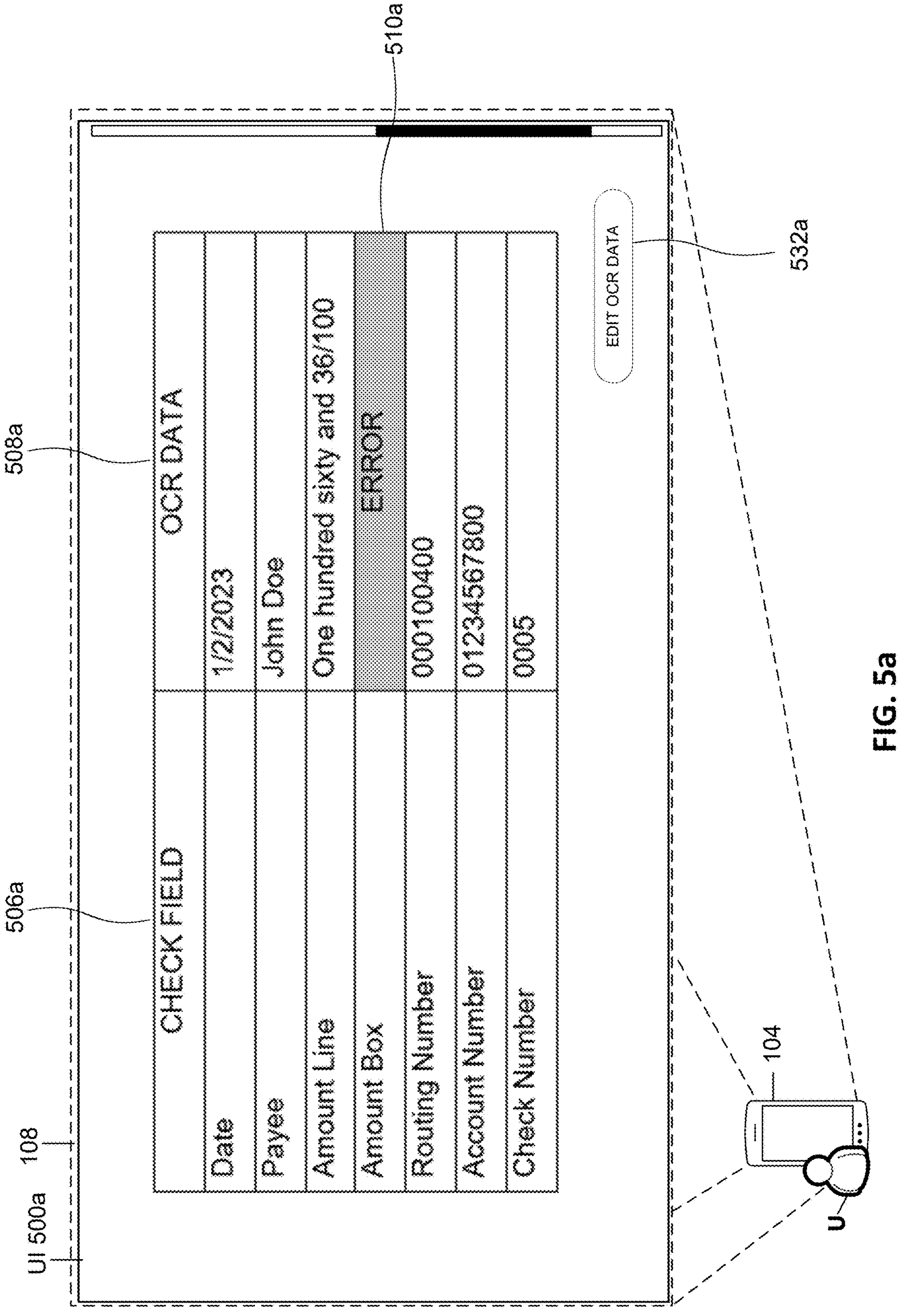
FIG. 5*a* illustrates an example user interface of a remote check deposit system for presenting check data.

FIG. 5*a* illustrates an example user interface 500*a* of a remote check deposit system for presenting check data. The user interface 500*a* is presented on a display device 108 of a mobile device 104 operated by a user U. In examples, the OCR data generated from the check image is presented on the user interface 500*a* in a list format. The list format includes a listing of check fields 506*a*, such as a listing of required check fields needed to process a check for remote deposit, along with the OCR data 508*a* for each check field. If any required check data is lacking, an indication of the lacking data is presented on the user interface 500*a*. For example, if the check amount could not be read from the check image during OCR processing, there will be no OCR data corresponding to the check amount. Thus, this field in the list format 510*a* presenting the OCR data can highlighted, an error message can be presented, or some other type of indication is presented indicating that required check data is lacking.

In some embodiments, the user interface 500*a* further includes a selectable element 532*a* configured to receive user input to edit the OCR data. In some embodiments, the OCR data displayed on the user interface 500*a* is configured to be selected, such that the user U can select OCR data to edit by tapping on the OCR data. The OCR data can be edited to correct a mistake in the OCR data or to add lacking required check data. In examples, both a check representation image and a listing of the OCR data are displayed on a user interface.

Figure 5B:
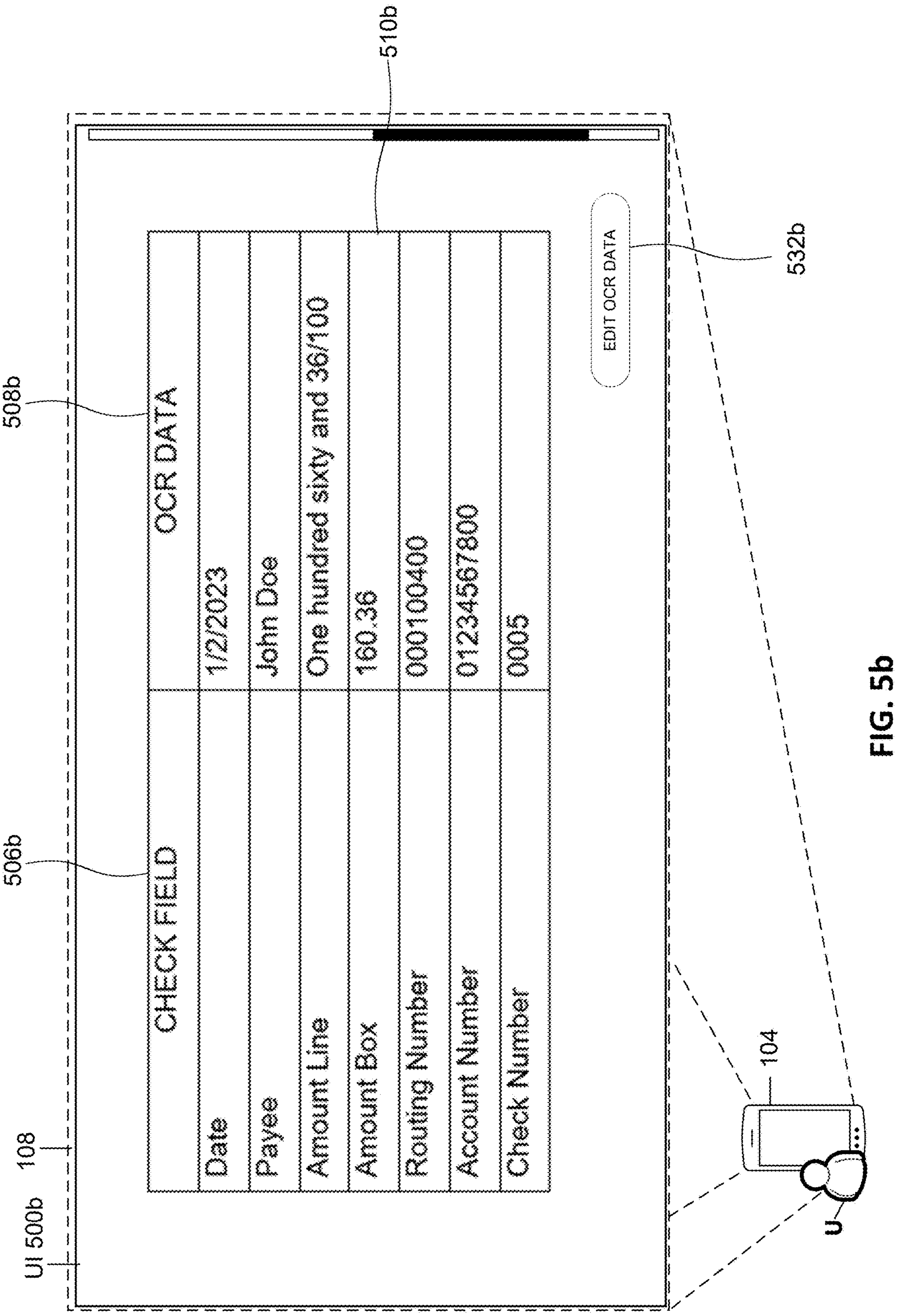
FIG. 5*b* illustrates an example user interface of a remote check deposit system for presenting check data.

FIG. 5*b* illustrates an example user interface 500*b* of a remote check deposit system for presenting check data. The user interface 500*b* is presented on a display device 108 of a mobile device 104 operated by a user U. In examples, the OCR data generated from the check image is presented on the user interface 500*b* in a list format, wherein the list format includes check fields 506*b* and the OCR data 508*b* corresponding to the check fields. Example user interface 500*b* illustrates user interface 500*a* discussed with reference to FIG. 5*a* after user U has edited the OCR data to add lacking check amount data 510*b*.

FIG. 6 illustrates an example method 600 for remote check deposit using a mobile device 104. In some embodiments, the method 600 is performed by a mobile banking application executed on a mobile device 104, such as mobile device 104 and mobile application 120 described above with reference to FIG. 1. The method 600 begins by receiving, at the mobile application executed on the mobile device 104, a check image captured by an image capture device of the mobile device 104 in response to receiving a user actuation causing the image capture device to capture the check image at operation 602. In examples, receiving a check image in operation 602 includes receiving a check image of a front side of the check and a check image of the back side of the check. The capturing of a check image is described in more detail above with respect to FIG. 2.

At operation 604, the mobile application causes the mobile device 104 to perform OCR on the received check image to generate OCR data, such as is described above in operation 304.

At operation 606, the OCR data is verified locally at the mobile device 104 during on-device check image verification processing. The on-device check image verification processing confirms that the OCR data generated from the check image includes required check data necessary for processing the check for remote deposit. This can be performed in a manner at least similar to that described above in relation to operation 308.

At operation 608, in addition to verification of the OCR data, the mobile application executed on the mobile device 104 can verify that a signature is present on the check image, such as is described above in relation to operation 308.

At operation 610, the OCR data is provided to a financial institution server 124 for validation processing at operation 610. The OCR data is provided to the financial institution server 124 at operation 610 without providing the check image to the financial institution server 124. The validation processing at operation 610 is a first level of validation processing by the financial institution server 124 based only the received OCR data. If the OCR data has been edited by the user, either to correct the OCR data or to enter missing required check data, the OCR data is provided to the financial institution server 124 at operation 610 along with instructions for manual review of the OCR data. The providing the data and the verification processing can be as described above.

In response to receiving a confirmation notification from the financial institution server 124 at the mobile device 104 that the OCR data has been validated, a request for confirmation is presented on the user interface of the mobile device 104 at operation 612. The request for confirmation requests that a user either confirm or cancel the remote check deposit process. If no confirmation is received confirming that the check should continue to be processed for remote deposit (e.g., input is received via the user interface to cancel the remote deposit), then the remote deposit process will be canceled, and the check will not be remotely deposited. If confirmation is received confirming that that check should be processed for remote deposit (e.g., input is received via the user interface to confirm remote deposit), then the check will be processed for remote deposit.

At operation 614, in response to receiving a confirmation via the user interface to process the check for remote deposit, the check image is provided to the financial institution server 124 with instructions to process the check for remote deposit. In some embodiments, the check image is provided to the financial institution server 124 at operation 614 in a different transmission file than the OCR data that was provided to the financial institution server 124 at operation 610.

The financial institution server 124 then continues processing the check for deposit using the check image. The financial institution performs additional verification on the check image, such as additional fraud detection verification, which can include analyzing handwriting, ink color, date style, signature, endorsement signature, etc. to detect if the check has been modified after it was drafted by the payor. After additional verification of the check image and OCR data by the financial institution server 124, a memo is posted on the user's bank account showing the check deposit amount. The financial institution server 124 then writes a log record of the check to capture the details of check being processed for remote check deposit.

When the financial institution server 124 has completed the remote check deposit process, the mobile device 104 receives a deposit receipt notification from the financial institution server 124 at operation 616. In some embodiments, the deposit receipt notification is a push notification presented on the user interface of the mobile device 104. In addition or instead, an email or instant message notification can be sent as well as posted transaction appears in activity history FIG. 7 illustrates an example method 700 for remote check deposit using a mobile device 104. The method 700 is performed by a mobile application executing on a mobile device 104, such as mobile device 104 and mobile application 120 described above with reference to FIG. 1. In examples during remote check deposit, after a check image has been received and OCR has been performed on the check image, the OCR data is presented on the user interface of the mobile device 702. In some embodiments, the OCR data is presented on a check representation image, wherein the check representation image is an illustration representing the check image and not the check image itself. Example user interfaces presenting OCR data on a check representation image are described in greater detail with respect to FIGS. 4*a*-4*e*. In some embodiments, the OCR data is presented in a list format. In some examples, the OCR data is not user editable. In other examples, the OCR data is editable. Example user interfaces presenting OCR data in a list format are described in greater detail with respect to FIG. 5*a* and FIG. 5*b*.

During on-device check image verification processing, when verifying that the OCR data generated from the check image includes required check data to process the check for remote deposit, in some embodiments, the mobile application executed on the mobile device determines that the OCR data generated from the check image does not include the required check data to process the check for remote deposit at operation 704. This determination is made by comparing the generated OCR data to predetermined required check data fields (e.g., check amount, account number, routing number). For example, if a check amount is a required check data field but no check amount data is included in the OCR data generated from the check image, then the mobile application determines at operation 704 that the OCR data does not include all the required check data to process the check for remote deposit.

At operation, 706, based on the determination that the OCR data generated from the check image does not include the required predetermined check data to process the check for remote deposit at operation 704, an indication is provided on the user interface of a region of the check image or a check field that is lacking the required check data to process the check for remote deposit. For example, a region on a check representation image lacking required check data can be circled or highlighted, or a listing of OCR data can show an error where a check field is lacking data. Example user interfaces displaying an indication of a region or check field lacking required check data are shown in FIGS. 4*b*-4*e* and FIG. 5*b*.

In some embodiments, the lacking check data is remediated by receiving another check image that includes the lacking data, or by receiving edits to the OCR to input the lacking data. At operation 708, the image capture device of the mobile device 104 is activated with instructions to capture second check image of check, wherein the second image includes the lacking data. At operation 710, user input is received to input the lacking required check data. For example, if the check amount is lacking from the data, input is received caused by the user manually entering in the check amount written on the check. If user input is received to enter the lacking required check data at operation 710, the mobile device 104 repeats the verification step (operation 606) described with reference to FIG. 6 to verify that the OCR data includes the required check data to process the check for remote deposit. If the OCR data is verified, the remote check deposit process can continue with providing the OCR data to a financial institution server 124 for validation processing, presenting a request for confirmation from a user to process the check for remote deposit, providing the check image to the financial institution server 124 with instructions to process the check for remote deposit, and receiving, at the mobile device 104, a deposit receipt notification from the financial institution server 124 after the check is deposited.

Example User Interface Workflow

FIGS. 8-16 illustrate example user interfaces on a mobile device 104 running an example implementation of the mobile application 120 that implements a modified version of method 300.

Figure 8:
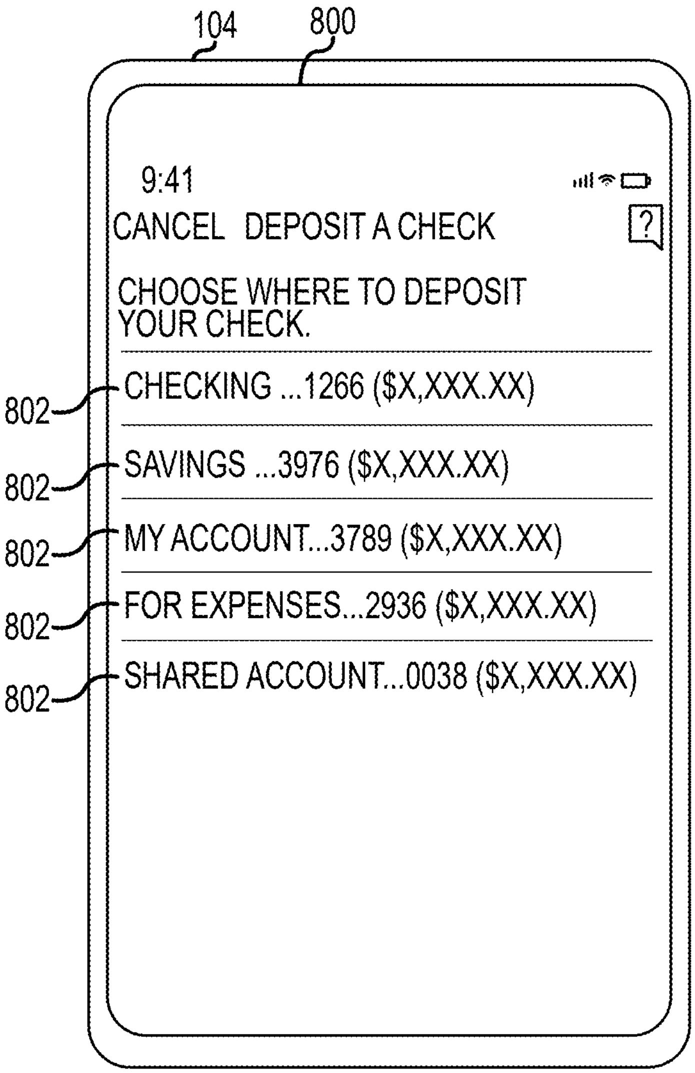
FIG. 8 illustrates a mobile device running an example implementation of a mobile application showing a first user interface.

FIG. 8 illustrates a mobile device 104 running an example implementation of the mobile application 120 showing a first user interface 800. The first user interface 800 is arrived at after receiving an indication that the user wants to deposit a check. The first user interface 800 asks the user to select where the user wants to deposit a check. The first user interface 800 includes a set of user-actuatable user interface elements 802 that correspond to accounts of the user. Following actuation of one of the user-actuatable user interface elements 802, the mobile device 104 can display the second user interface 900 as shown in FIG. 9.

Figure 9:
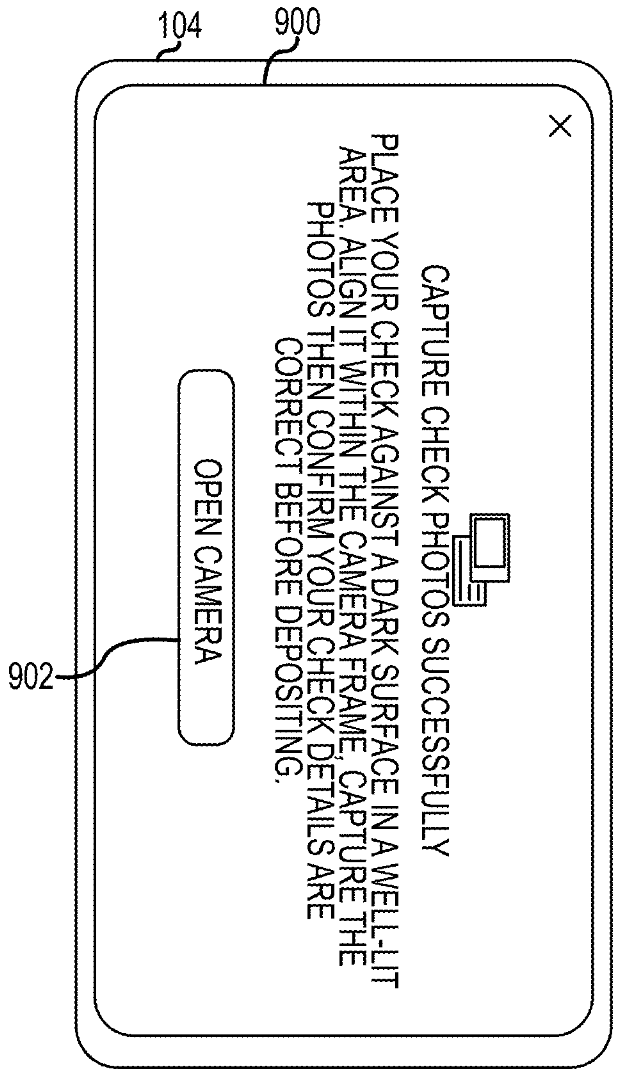
FIG. 9 illustrates a mobile device running an example implementation of a mobile application showing a second user interface.

FIG. 9 illustrates the mobile device 104 running the example implementation of the mobile application 120 showing a second user interface 900. The second user interface 900 includes advice to the user for capturing a check image and has user actuatable button 902 to open a camera of the mobile device 104 for obtaining the check image. In some examples, user consent to access the camera of the mobile device 104 is obtained. Following actuation of the user actuatable button 902, the mobile device 104 displays the third user interface 1000 as shown in FIG. 10.

Figure 10:
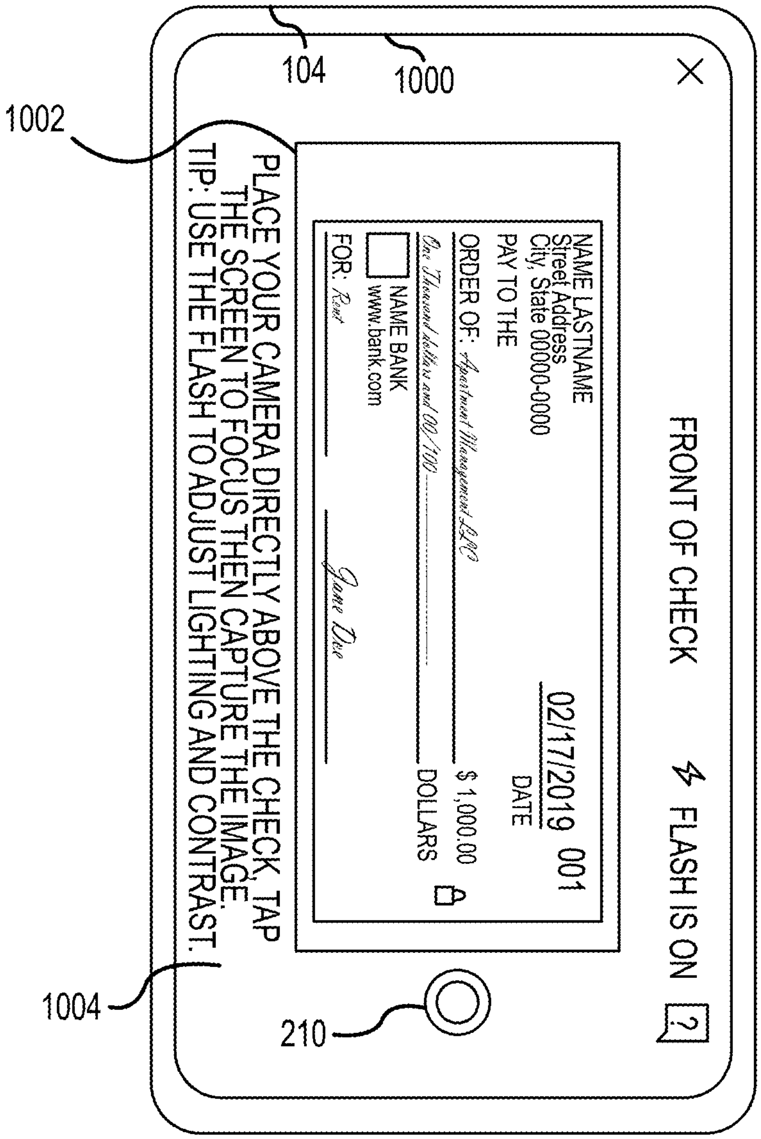
FIG. 10 illustrates a mobile device running an example implementation of a mobile application showing a third user interface.

FIG. 10 illustrates the mobile device 104 running the example implementation of the mobile application 120 showing a third user interface 1000. The third user interface 1000 includes a live preview 1002 of the camera viewfinder, a capture button 210, and instructions 1004 to the user to take a picture of a front of the check 102. advice to the user for capturing a check image and has user actuatable button to open a camera of the mobile device 104 for obtaining the check image. Following actuation of the capture button 210, the mobile device 104 may execute operations 302 and 304 as described above. Following actuation of the capture button 210, the mobile device 104 displays the fourth user interface 1100 as shown in FIG. 11.

Figure 11:
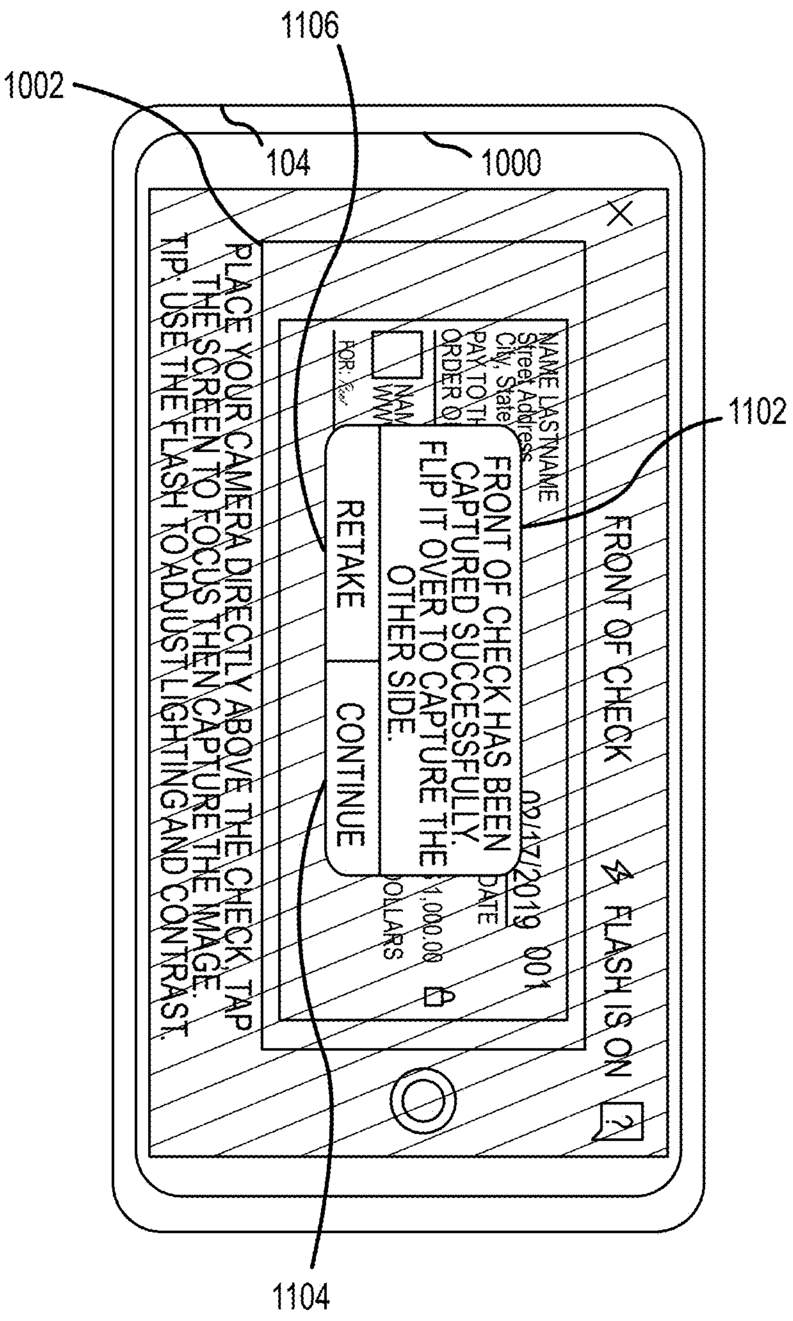
FIG. 11 illustrates a mobile device running an example implementation of a mobile application showing a fourth user interface.

FIG. 11 illustrates the mobile device 104 running the example implementation of the mobile application 120 showing a fourth user interface 1100. The fourth user interface 1100 includes a prompt 1102 indicating that the check image of the front of the check 102 was successfully obtained. The user may choose a continue button 1104 or a retake button 1106. Behind the prompt, the live preview 1002 of the camera viewfinder continues. In other implementations, the live preview 1002 may be paused or absent until the user presses the continue button 1104.

In this instance, the check image of the front of the check was successfully obtained. For instance, as described above, the required check data may be determined to be present (see operation 308, above). Further, in this instance, the OCR data was not presented on a check representation image. In other instances, notwithstanding the successful obtaining of the check image, the mobile application 120 may provide the check representation image with the correct data (e.g., a check representation as shown in FIG. 4*a* but with all required data present) or a tabular representation with the correct data as shown in FIG. 5*b*. The mobile application 120 may provide the user with an opportunity to edit such data. In other scenarios, however, the image might not have been successfully obtained. For instance, the flow of the method 300 may follow the "NO" path from operation 308 to operation 312 and proceed accordingly.

Figure 12:
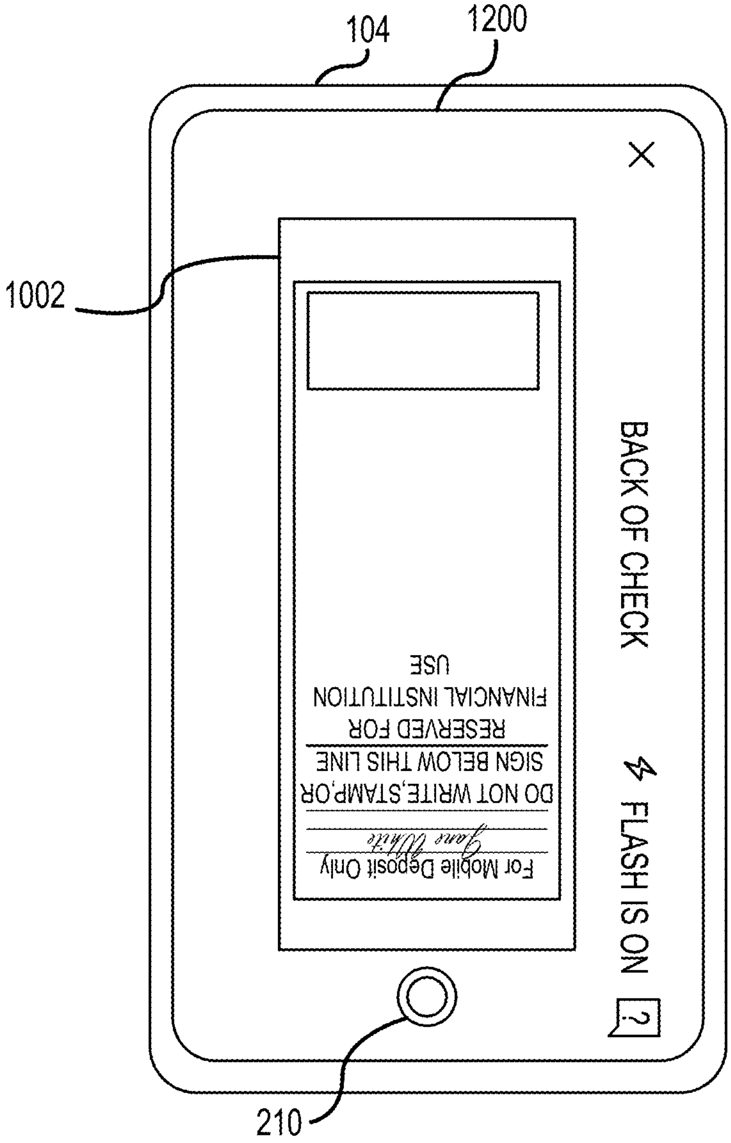
FIG. 12 illustrates a mobile device running an example implementation of a mobile application showing a fifth user interface.

In response to the user actuating the continue button 1104, the mobile application 120 causes the mobile device 104 to display the fifth user interface 1200 as shown in FIG. 12.

Figure 13:
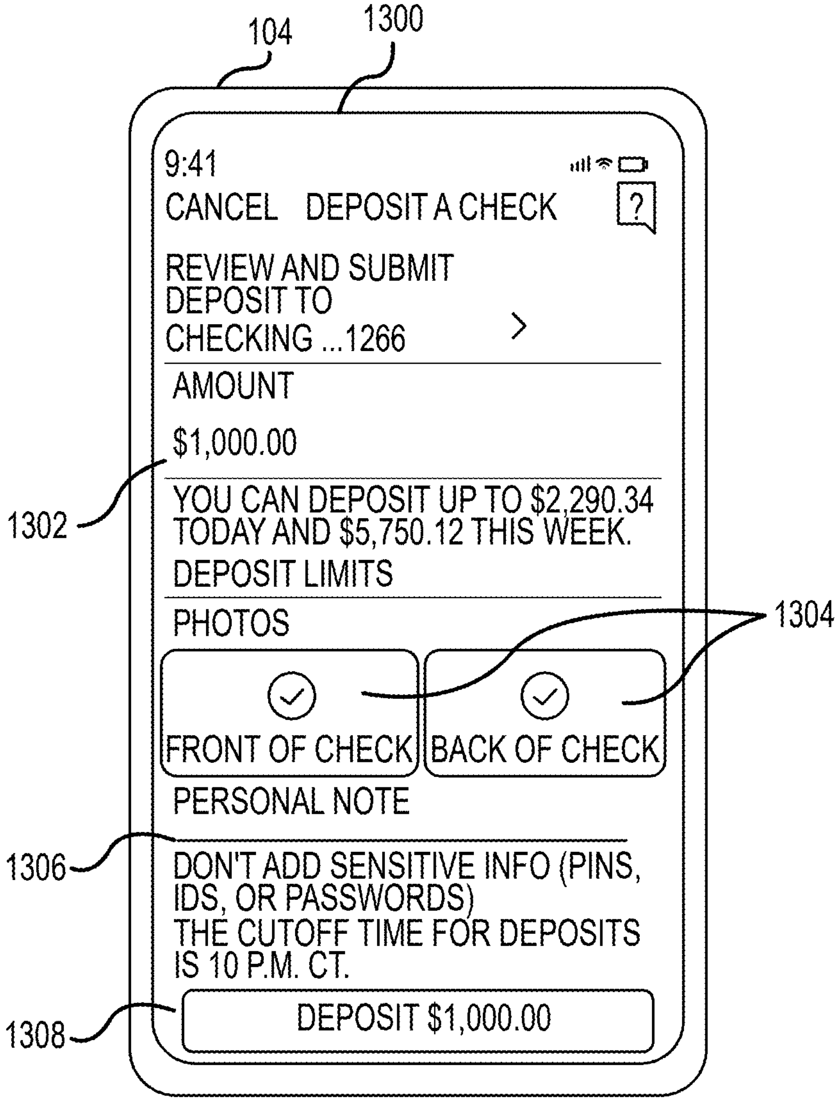
FIG. 13 illustrates a mobile device running an example implementation of a mobile application showing a sixth user interface.

FIG. 12 illustrates the mobile device 104 running the example implementation of the mobile application 120 showing a fifth user interface 1200. The fifth user interface 1200 includes a live preview 1002 of the camera viewfinder, a capture button 210, and instructions to the user to take a picture of a back of the check 102. Following actuation of the capture button 210, the mobile device 104 may execute operations 302 and 304 as described above. If the application determines that the resulting check image does not include the required data, then the flow of the method 300 can move to operation 312 and proceed accordingly. If the mobile application 120 determines that resulting check image includes required data, then the mobile device 104 displays the sixth user interface 1300 as shown in FIG. 13. In some instances, prior to moving to the sixth user interface as shown in FIG. 13, a confirmation screen similar to that shown in FIG. 11 can be shown.

FIG. 13 illustrates the mobile device 104 running the example implementation of the mobile application 120 showing a sixth user interface 1300. The sixth user interface 1300 includes a field 1302 indicating the amount of the check 102 (e.g., as determined from the OCR data) and having a deposit button actuatable to initiate deposit of the check. Further, the sixth user interface 1300 includes indications 1304 that photos of the front of the check and the back of the check were successfully obtained (e.g., with a green check mark), but lacks a preview of the images and lacks a way for a user to view the images. The sixth user interface 1300 further includes a field 1306 in which the user can specify a personal note regarding the check 102. The user may actuate the deposit button 1308 to cause the mobile application 120 to perform operation 318 as described above to provide OCR data to the financial institution server for validation processing. Responsive to receiving confirmation that the server validated the OCR data (operation 320), the mobile device 104 displays the seventh user interface 1400 as shown in FIG. 14.

Figure 14:
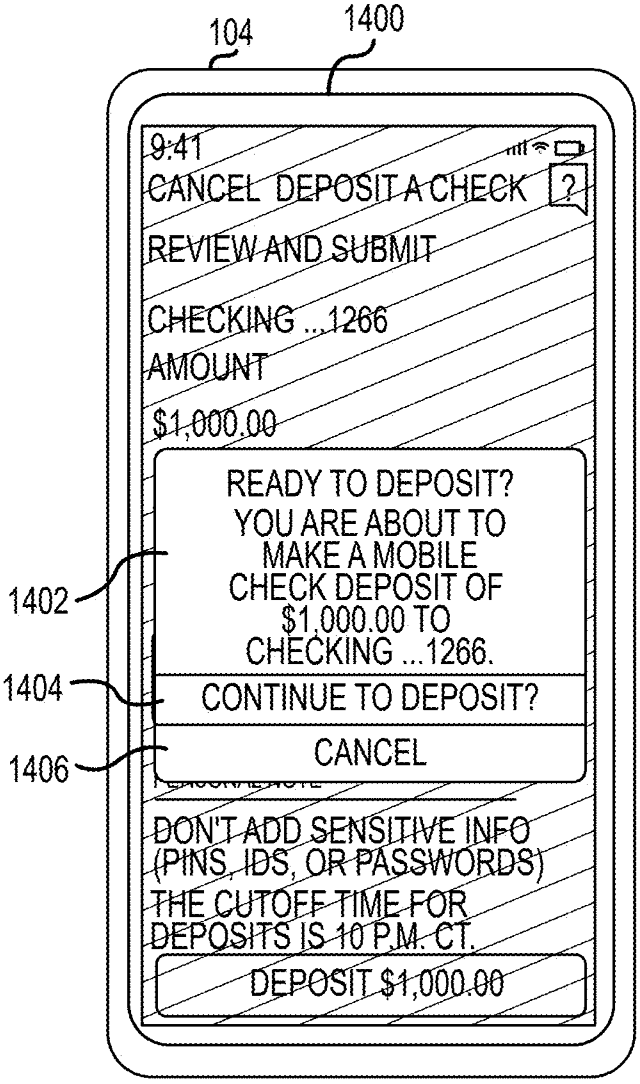
FIG. 14 illustrates a mobile device running an example implementation of a mobile application showing a seventh user interface.

FIG. 14 illustrates the mobile device 104 running the example implementation of the mobile application 120 showing a seventh user interface 1400. The seventh user interface 1400 includes a prompt 1402 to confirm whether the user is ready to deposit by hitting a confirm deposit button 1404 or wants to cancel by pressing a cancel button 1406. This can correspond to operation 324 as described above and responsive to failing to receive the confirmation, the flow of the method can move to operation 328 and responsive to receiving the confirmation via the confirm deposit button 1404, the flow can move to operations 330 and 332 as shown in the eighth user interface 1500 as shown in FIG. 15.

Figure 15:
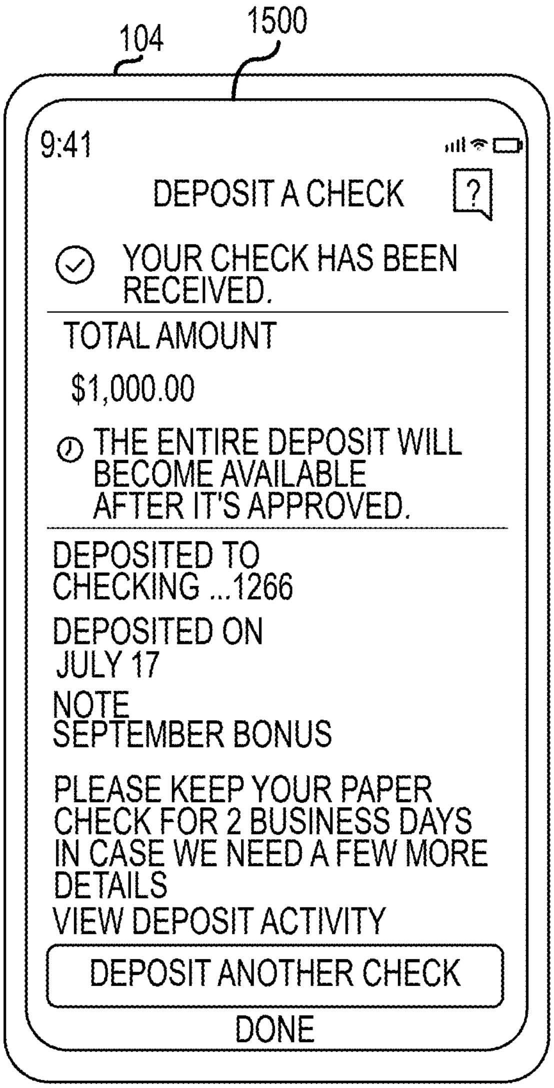
FIG. 15 illustrates a mobile device running an example implementation of a mobile application showing an eighth user interface.

FIG. 15 illustrates the mobile device 104 running the example implementation of the mobile application 120 showing an eighth user interface 1500. The eighth user interface 1500 includes an indication that the check has been received by the server. The eighth user interface 1500 further indicates that although the check has been received, the deposit will not be fully available until after it is approved.

Computing System

Figure 16:
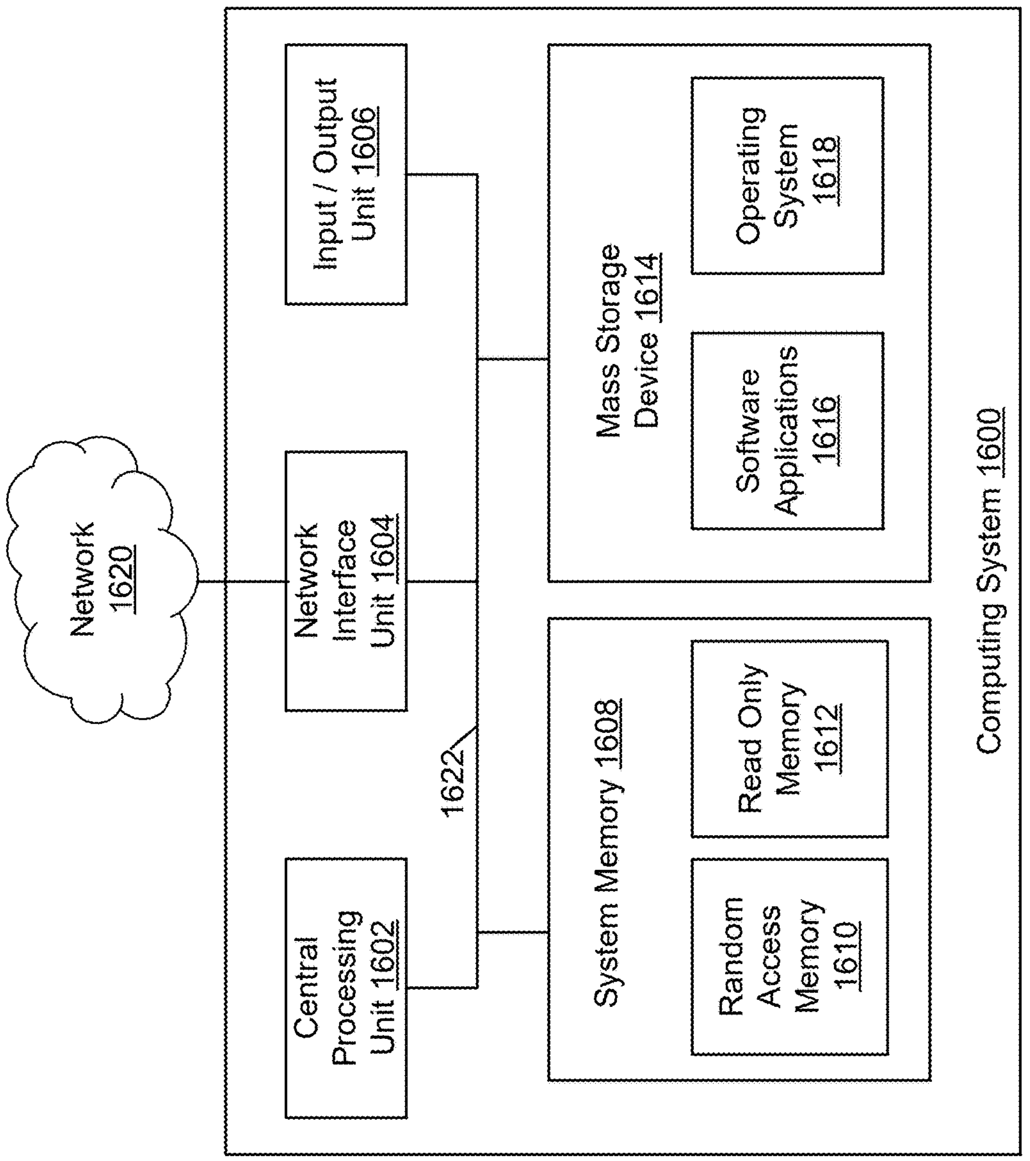
FIG. 16 illustrates an example block diagram of a virtual or physical computing system usable to implement aspects of the present disclosure.

FIG. 16 illustrates an example block diagram of a virtual or physical computing system 1600. One or more aspects of the computing system 1600 can be used to implement remote check deposit systems described herein.

In the embodiment shown, the computing system 1600 includes one or more processors 1602, a system memory 1608, and a system bus 1622 that couples the system memory 1608 to the one or more processors 1602.

The one or more processors 1602 are components that execute instructions, such as instructions that obtain data, process the data, and provide output based on the processing. The one or more processors 1602 often obtain instructions and data stored in the memory 1608. The one or more processors 1602 can take any of a variety of forms, such as central processing units, graphics processing units, coprocessors, tensor processing units, artificial intelligence accelerators, microcontrollers, microprocessors, application-specific integrated circuits, field programmable gate arrays, other processors, or combinations thereof. Example providers processors 1602 include INTEL, AMD, QUALCOMM, TEXAS INSTRUMENTS, and APPLE.

The system memory 1608 includes RAM (Random Access Memory) 1610 and ROM (Read-Only Memory) 1612. The computing system 1600 further includes a mass storage device 1614. The mass storage device 1614 is able to store software instructions and data, such as those that, when executed by the one or more processors 1602 cause the one or more processors to perform operations described herein.

The mass storage device 1614 is connected to the one or more processors 1602 through a mass storage controller (not shown) connected to the system bus 1622. The mass storage device 1614 and its associated computer-readable data storage media provide non-volatile, non-transitory storage for the computing system 1600. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, DVD (Digital Versatile Discs), other optical storage media, magnetic cassettes, magnetic tape, magnetic disk storage or other magnetic storage devices, or any other medium which can be used to store the desired information and which can be accessed by the computing system 1600.

According to various embodiments described herein, the computing system 1600 operates in a networked environment using logical connections to remote network devices through the network 1620. The network 1620 is a computer network, such as an enterprise intranet and/or the Internet. The network 1620 can include a LAN, a Wide Area Network (WAN), the Internet, wireless transmission mediums, wired transmission mediums, other networks, and combinations thereof. In some embodiments, the computing system 1600 connects to the network 1620 through a network interface unit 1604 connected to the system bus 1622. It should be appreciated that the network interface unit 1604 can also be utilized to connect to other types of networks and remote computing systems.

The computing system 1600 also includes an input/output controller 1606 for receiving and processing input from a number of other devices, including a touch user interface display screen, or another type of input device. Similarly, in some embodiments, the input/output controller 1606 provides output to a touch user interface display screen or other type of output device. Examples of interfaces that the input/output controller 1606 can facilitate interaction with include components that facilitate receiving input from and providing output to something external to the computing system 1600, such as visual output components (e.g., displays or lights), audio output components (e.g., speakers), haptic output components (e.g., vibratory components), visual input components (e.g., cameras), auditory input components (e.g., microphones), haptic input components (e.g., touch or vibration sensitive components), motion input components (e.g., mice, gesture controllers, finger trackers, eye trackers, or movement sensors), buttons (e.g., keyboards or mouse buttons), position sensors (e.g., terrestrial or satellite-based position sensors such as those using the Global Positioning System), other input components, or combinations thereof (e.g., a touch sensitive display).

As mentioned briefly above, the mass storage device 1614 and the RAM 1610 of the computing system 1600 can store software instructions and data. The software instructions can include an operating system 1618 suitable for controlling the operation of the computing system 1600. In addition, the memory 1608 or mass storage device 1614 can include a basic input/output system that contains the basic routines that help to transfer information between elements within the computing system 1600, such as during startup. The mass storage device 1614 and/or the RAM 1610 also store software instructions, that when executed by the one or more processors 1602, cause one or more of the systems, devices, or components described herein to provide functionality described herein. For example, the mass storage device 1614 and/or the RAM 1610 can store software instructions that, when executed by the one or more processors 1602, cause the computing system 1600 to receive and execute managing network access control and build system processes.

The computing system 1600 can include any of a variety of other components to facilitate performance of operations described herein. Example components include one or more power units (e.g., batteries, capacitors, power harvesters, or power supplies) that provide operational power, one or more busses to provide intra-device communication, one or more cases or housings to encase one or more components, other components, or combinations thereof.

Specialized Optical Character Recognition Techniques

As discussed above, there are benefits (e.g., to data security and in reducing overall computing resource consumption) to performing Optical Character Recognition (OCR) and other tasks on a user's local device, rather than sending images off device for processing. However, there are challenges to doing so effectively.

Some documents are written using fonts that cannot be extracted accurately using traditional OCR processes. Accordingly, recognizing and extracting text, such as from a check image containing such fonts, using traditional OCR processes can present challenges that may result in extracting inaccurate data, such as an invalid routing number. For example, extracting text from the MICR (Magnetic Ink Character Recognition) line can lead to such issues. For instance, when attempting to process MICR fonts using traditional OCR processes built into a device's operating system or using standard libraries (e.g., a mobile operating system running on a user's smartphone or tablet), the specialized nature of OCR characters can lead to traditional techniques producing errors. Further, it is difficult to fine-tune or otherwise configure traditional OCR techniques to operate efficiently on a mobile device. Mobile devices often run off batteries and have limited local storage space. The use of traditional OCR techniques can result in unwanted excess battery consumption and excess local storage consumption. Further, many mobile devices operate using cellular data connections, which presents challenges in updating applications and models on the device. Even if a mobile device had significant storage capacity, bandwidth constraints could limit the ability to download or update the application running the OCR model or the model itself.

Thus, although local processing provides benefits, it also introduces challenges. However, as discussed below there are techniques for addressing these challenges while providing a capable and accurate OCR process. In addition, although many examples herein are discussed in the context of performing OCR on images of checks by mobile devices, the techniques described herein can be applied to other contexts and on other devices.

First Example OCR Workflow

Figure 17:
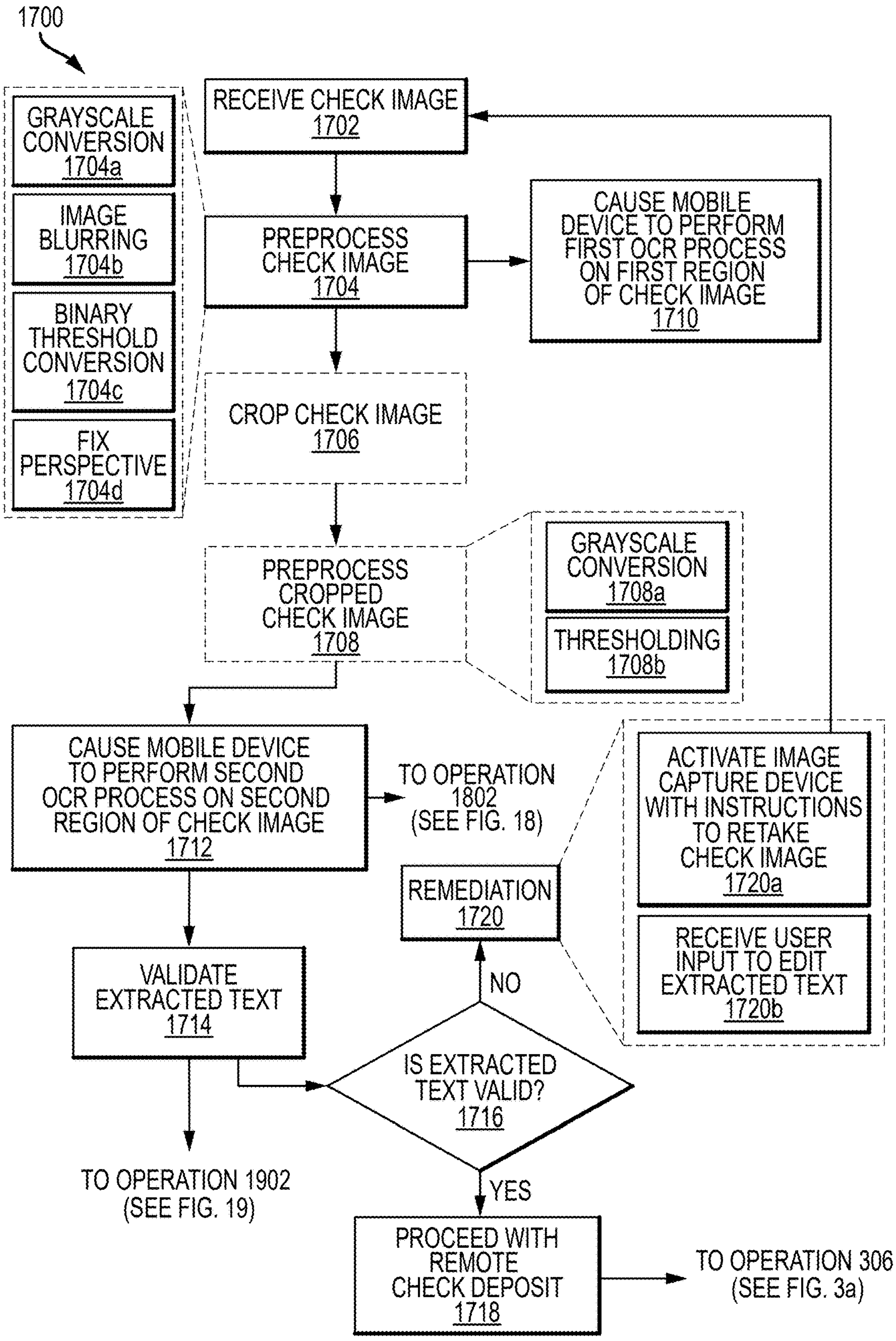
FIG. 17 illustrates an example flowchart of a method for extracting text from a check image during remote check deposit using a mobile device.

FIG. 17 illustrates an example flowchart of a method 1700 for extracting text from a check image during remote check deposit using a mobile device 104. In examples, the method 1700 is executed during operation 304 as described above with reference to FIG. 3. The operations within FIG. 17 are executed by the mobile device 104. The method 1700 for extracting text from a check image can begin with operation 1702.

At operation 1702, a check image is received. Operation 1702 is performed by a mobile application 120 operating on the mobile device 104 receiving a check image captured by an image capture device 116 of the mobile device 104. Operation 1702 may be the same or similar to receiving a check image at operation 302 as described above with reference to FIG. 3. For example, the check image can be received in response to receiving a user actuation causing the image capture device 116 to capture the check image or a process automatically determining that a check is properly in view. The check image includes check data, such as a check amount, payee name, payor name, date, and MICR line data, including a routing number, an account number, and a check number.

In examples, for purposes of recognizing text on the check image using OCR processes, the check image may be segmented into more than one region, wherein, for example, certain check fields on the check image are in a first region, and other check fields are on a second region of the check image. Various techniques can be used for segmenting. In an example, templates having identified regions are compared against the captured image to determine which template most closely matches. When one is found, the locations in the template are applied to the captured image and used to extract the data contained therein. In some examples, techniques can be used that are described in U.S. patent application Ser. No. 17/569,121, which was filed on Jan. 5, 2022, and which is incorporated herein by reference in its entirety for any and all purposes. For instance, that application describes techniques for identifying and extracting content from regions of a document, such as a check. In another example, techniques can be used that are described in U.S. patent application Ser. No. 18/052,081, which was filed Nov. 2, 2022, which is incorporated herein by reference in its entirety for any and all purposes. For example, FIG. 2 of that application describes techniques for detecting objects of interest within an image, generating bounding boxes, and extracting associated information. Although image segmentation is described in relation to this step, it may be performed in other steps (e.g., after one or more preprocessing steps).

Additionally, in some embodiments, the font of the characters in the first region of the check image is different than the font of the characters in the second region of the check image. For example, the font of characters in a first region, such the check amount field, may be different than the font of characters in a second region, such as the region including the MICR line.

Following operation 1702, the method 1700 can proceed to operation 1704.

At operation 1704, the check image is preprocessed. The check image may contain variations in color, contrast, or lighting conditions, or it may contain artifacts, noise, or unwanted elements, such as patterns from the check background, that can hinder OCR processes and cause difficulties recognizing and extracting accurate check data from the check image. Additionally, the check image may be skewed or rotated if the check is not properly aligned with the image capture device when the check image is captured. Thus, preprocessing techniques may be performed on the check image to improve the quality of the check image to enhance the performance of OCR systems.

As discussed in more detail below, depending on the implementation, the operation 1704 can include one or more sub-steps or functions to preprocess the check image, such as grayscale conversion at operation 1704*a*, image blurring at operation 1704*b*, binary threshold conversion at operation 1704*c*, fixing the perspective of the check image at operation 1704*d*, other preprocessing steps, or combinations thereof. In examples, the preprocessing operation 1704 may include preprocessing techniques discussed above with reference to FIG. 3*a* at preprocessing operation 304*a*.

In some embodiments, at preprocessing operation 1704*a*, grayscale conversion is performed on the check image received at operation 1702. At operation 1704*a*, the check image is reduced to shades of gray, thereby removing color information while preserving the intensity variations in the check image. Grayscale conversion can improve the contrast and focus on the text on the check image, such as the MICR line text and other check data. Additionally, grayscale conversation may reduce the size of the check image file, thereby facilitating quicker processing and transmission (e.g., uploading to a server) of the check image during remote check deposit on a mobile device 104.

In some embodiments, at preprocessing operation 1704*b*, image blurring is performed on the check image. In examples, the image blurring performed at operation 1704*b* implements Gaussian blur. At operation 1704*b*, a smoothing filter or blurring algorithm is applied to the check image that softens (e.g., by reducing high-frequency components of) the check image by averaging pixel values, such as based on a Gaussian distribution, resulting in the reduction of fine details and the removal of high frequency noise. The application of image blurring, such as Gaussian blur, reduces image artifacts, attenuates (e.g., smooths out) background noise, and improves the focus on key features of the check image, such as the text. Image blurring is applied to the check image at operation 1704*b* in a way that preserves important check features and check data (e.g., sufficiently preserves them to for future processing), while reducing noise.

In some embodiments, at preprocessing operation 1704*c*, binary threshold conversion is performed on the check image. At operation 1704*c*, binary threshold conversion transforms the check image to binary form, such as black and white form. The check image is thresholded to binary form based on a specific threshold value, where pixels with intensity values at or above the threshold are assigned one color (e.g., white), and pixels with intensity values below the threshold are assigned a second color (e.g., black). In examples, operation 1704*c* results in a black and white check image, wherein the text on the check image is black. Like the grayscale conversation process, this binarization process reduces the size of the check image file, thereby facilitating quicker processing and transmission (e.g., uploading to a server) of the check image during remote check deposit on a mobile device 104. Further, future processes involving the check image (e.g., submitting for processing) may require the image to be a black-and-white binarized image anyway, so there is little need to transmit details that would be stripped out anyway.

Figure 20A:
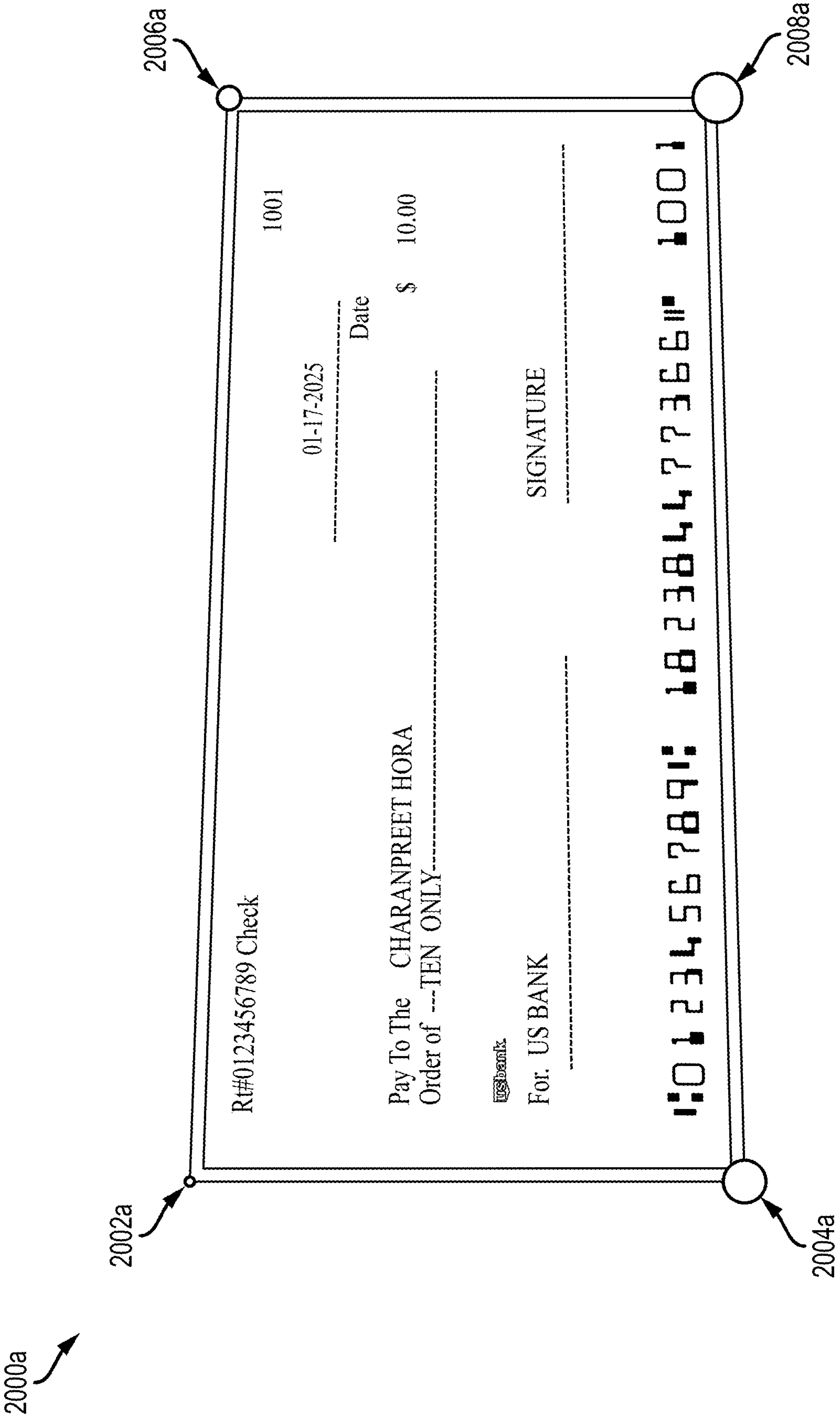
FIG. 20*a* illustrates an example preprocessing of a check image during remote check deposit using a mobile device.
Figure 20B:
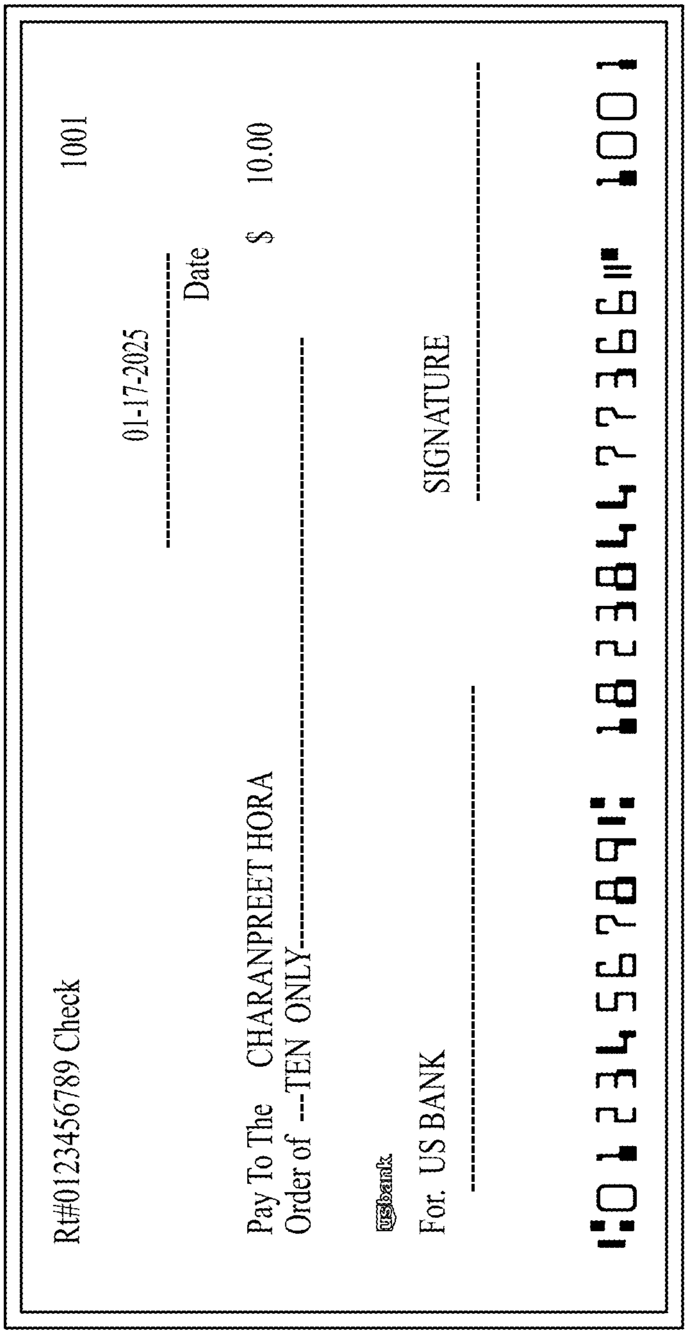
FIG. 20*b* illustrates an example preprocessing of a check image during remote check deposit using a mobile device.

In some embodiments, at preprocessing operation 1704*d*, the perspective of the check image is fixed to correct the alignment of the check image. At operation 1704*d*, corner points are detected on the check image. Corner points on the check image may be detected using edge detection to detect the check edges and subsequently identify the corner points at the intersections of the edges, a corner detection algorithm, or other image processing techniques. Once corner points are detected, a perspective transformation is applied to correct the perspective of the check image and align it properly. To fix the check image perspective at operation 1704*d*, destination points are defined at ideal coordinates where the corner points of the check image should be located in the perspective-fixed image. In some embodiments, the destination points are defined to form a perfect rectangle. A homography matrix can then be computed using the detected corner points in the original check image and the corresponding destination points at the ideal corner points. The homography matrix is then applied to the original check image to adjust the pixel positions in order to correct a skewed perspective and align the check image to an undistorted rectangle. An example check image having corner points detected is illustrated in FIG. 20*a*, and an example check image with a fixed perspective after operation 1704*d* is illustrated in FIG. 20*b*.

Returning to FIG. 17, following preprocessing the check image at operation 1704, method 1700 proceeds to execute operation 1706 and operation 1710.

At operation 1710, the mobile application 120 executed on the mobile device 104 causes the mobile device 104 to perform a first OCR process on the check image, wherein the first OCR process is performed on a first region of the check image. In examples, the first region may include the check amount, the payor name and address, payee name, the memo line, other check regions, or combinations thereof. The characters in the first region are of a first font or fonts that are reliably recognized by traditional OCR processes, and the first OCR process is a traditional OCR process. In examples, the first OCR process includes the steps of identifying areas of the first region of the check image that contain text, breaking down the text into smaller components, and using character recognition techniques, such as pattern recognition, machine learning, or neural networks, to identify each individual character. During character recognition, segmented characters are compared to a database of known fonts, including the font on the first region of the check image, to make a match in order to identify each character.

The first OCR process at operation 1710 is performed by an OCR engine of the mobile application 120 configured to extract text from the check image and recognize characters of the extracted text to generate OCR data for the first region. For example, the first OCR process may extract the date, the payee name, the check amount, other check data, or combinations thereof from the first region of the check image. The OCR engine is discussed in more detail above with respect to FIG. 3*a* at operation 304. In some examples, this first OCR process is performed with a standard OCR process built into the operating system of the device or as part of a readily accessible library.

Figure 21:
FIG. 21 illustrates an example flow for processing a check image to extract text from a check image during remote check deposit using a mobile device.

In some embodiments, the check image is cropped at operation 1706. This can include creating a new image or modifying an existing image via the cropping operation. At operation 1706, the check image is cropped to include a second region of the check image. For instance, at operation 1706, the check image may be cropped to include only a bottom portion of the check image containing the MICR line, wherein the MICR line region is the second region of the check image. In examples, cropping the check image to include the MICR line can include cropping the bottom 25% of the check image, the bottom 20% of the check image, the bottom 15% of the check image, or another percentage of the check image. In some embodiments, cropping the check image at operation 1706 may occur before preprocessing the check image at operation 1704. In other embodiments, cropping the check image at operation 1706 occurs after preprocessing the check image at operation 1704. An example check image having been cropped at operation 1706 is shown in FIG. 21 at 2102. In some embodiments, the preprocessed check image is not cropped at operation 1706, and following preprocessing the check image at operation 1704, the method 1700 can proceed directly to operation 1712.

In some embodiments, where the check image is cropped at operation 1706, the cropped check image is preprocessed at operation 1708. Preprocessing techniques may be performed on the cropped check image to improve the quality of the cropped check image in order to enhance the performance of OCR systems. Depending on the implementation, the operation 1708 can include one or more sub-steps or functions to preprocess the cropped check image, such as grayscale conversion at operation 1708*a*, thresholding at operation 1708*b*, other preprocessing steps, or combinations thereof. In examples, the preprocessing operation 1708 may include preprocessing techniques discussed above with reference to operation 1704.

In some embodiments, at preprocessing operation 1708*a*, grayscale conversion is performed on the cropped check image. At operation 1708*a*, the cropped check image is reduced to shades of gray, thereby removing color information while preserving the intensity variations in the image. The grayscale conversion process applied to the cropped check image at operation 1708*a* may be the same or similar to the grayscale conversion process applied to the check image at operation 1704*a*.

In some embodiments, at preprocessing operation 1708*b*, thresholding is performed on the cropped check image. At operation 1708*b*, the grayscale check image generated at operation 1708*a* is converted into a binary image, such as a black and white image using thresholding. During a thresholding process, a predefined threshold value is applied to the grayscale check image, and every pixel in the grayscale check image is compared to the threshold value. In examples, pixels above the threshold are set to one color (e.g., white), and pixels below the threshold are set to a second color (e.g., black). This results in a binary image. For example, in the binary image generated at operation 1708*a*, check data, such as the characters in the MICR line, are presented in black, while the background and other noise areas become white. The thresholding at operation 1708*b* may include global thresholding, wherein a single threshold value is applied to the entire grayscale check image, adaptive thresholding, wherein different thresholds are calculated for different regions of the check image based on local pixel intensity values, Otsu's thresholding, another thresholding technique, or combinations thereof. An example binary cropped image following operation 1708*b* is shown in FIG. 20 at 2102.

Following preprocessing the cropped check image at operation 1708, the method 1700 proceeds to execute operation 1712. In some instances, the check image is not cropped, and the method 1700 advances from operation 1704 to operation 1712.

At operation 1712, the mobile application 120 executed on the mobile device 104 causes the mobile device 104 to perform a second OCR process on the check image, wherein the second OCR process is performed on a second region of the check image and is different from the first OCR process performed at operation 1710. In some instances, the check image is cropped at operation 1706 to include the second region of the check image and not the first region of the check image. In some embodiments, the second region is the MICR line region of the check image. In some embodiments, the characters in the second region are of a font different than the font or fonts in the first region of the check image, and the font of the characters in the second region is a font that is not reliably recognized by traditional OCR processes such as the first OCR process performed at operation 1710. For example, the font traditionally used for characters on the MICR line of a check is not reliably recognized by traditional OCR processes, so the second OCR process can be performed on the MICR line to recognize characters on the MICR line and extract check data from the MICR line. The second OCR process is different than the first OCR process described above at operation 1710, and the second OCR process recognizes font, such as MICR line font, that may not be reliably recognized by a first traditional OCR process. The steps of the second OCR process performed on the second region of the check image is described in more detail below with respect to FIG. 18.

Continuing with respect to method 1700, following causing the mobile device to perform a second OCR process on a second region of the check image at operation 1712, the method 1700 proceeds to operation 1714.

At operation 1714, check data extracted from the check image using the second OCR process is validated. For example, where the second OCR process extracts a routing number from a MICR line, the extracted routing number is validated at operation 1714. For instance, the extracted information is compared to known valid data templates. For instance, if valid routing numbers contain a specific number of characters, then it can be determined whether the extracted data contains that specific number of characters. If so, the routing number can be considered valid. In addition or instead, the values are compared to known valid values (e.g., a known list of valid routing numbers). Further, there may be one or more checksum bits or values and it can be determined whether the extracted data has correct checksum bits or values.

Other techniques may be used. An example method for determining whether extracted text is valid, wherein the extracted text is a routing number extracted from a MICR line, is described in more detail below with respect to FIG. 19. In examples, if check data other than the routing number is extracted from the check image using the second OCR process, that extracted check data may be validated using another validation process or a validation process similar to the method 1900 for validating an extracted routing number.

In some examples, the validation can include determining whether an otherwise valid check can be processed for remote deposit. In some examples, institutions have policies against a person depositing their own checks into their own accounts or sufficiently affiliated accounts. This validation operation 1714 detects an attempt to do so based on comparing the OCR data with known (e.g., stored or retrieved) information about the accounts of the user. If there is a match, then it can be determined that the extracted text is not valid for mobile check deposit.

In a further example, the validation includes determining whether the check for which deposit is being attempted is void. In some embodiments, this involves determining whether the OCR data includes the word "VOID" or the like. If so, it can be determined that the check is not valid for deposit.

At operation 1716, the flow of the method 1700 moves to operation 1718 along the "YES" path if the extracted text was determined to be valid. At operation 1716, the flow of the method 1700 moves to operation 1720 along the "NO" path if the extracted text was determined to not be valid.

If the text extracted from the second OCR process is determined to be valid at operation 1716, then method 1700 can proceed to operation 1718. At operation 1718, the remote check deposit continues, for example, at operation 306 as described above with reference to FIG. 3*a*.

At operation 1720, which is reached if the text was not validated, remediation occurs to attempt to obtain check data from the check image that can be validated. Depending on the implementation, the operation 1720 can include one or more sub-steps or functions.

In some embodiments, remediation at operation 1720 includes, at operation 1720*a*, activating an image capture device 116 on a mobile phone 104 with instructions to retake another check image of the check. In some instances, the text extracted from the second OCR process may be invalid because the quality of the check image is poor, so the second OCR process is unable to accurately recognize the text, and a character or multiple characters are wrongly identified (e.g., the character "8" is incorrectly identified as a "6" because the check image is blurry). Accordingly, a new check image of better quality may be received so that the second OCR process can be repeated on a new check image, and the text extracted from the new check image can be validated. Example user interfaces presenting instructions to retake the check image is shown in FIG. 4*c*, FIG. 4*d*, and FIG. 4*e*, wherein an indication of what OCR data could not be validated is also provided on the user interface to assist with remediation and improve the likelihood that the check data that could not be validated is captured in the new check image. For example, the user interface can indicate that the routing number could not be validated in order to prompt a user U operating the image capture device 116 to retake a new check image that clearly captures the MICR line on the check.

In some embodiments, remediation at operation 1720 includes, at operation 1720*b*, receiving input to edit the extracted text that could not be validated. For example, if the extracted routing number could not be validated, user input may be received to edit the OCR data and correct the routing number.

FIG. 18 illustrates an example flowchart of a method 1800 for extracting text from a check image during remote check deposit using a mobile device 104. The method 1800 is the second OCR process performed on the second region of the check image described above with reference to FIG. 17 at operation 1712. The steps of method 1800 are executed locally at the mobile device 104 via the mobile application 120. The method 1800 for extracting text from the check image using the second OCR process can begin with operation 1802.

At operation 1802, the mobile application 120 executed by the mobile device 104 causes the mobile device 104 to perform a first OCR process on the second region of the check image. In some instances, the first OCR process performed at operation 1802 implements the same first OCR process performed at operation 1710 as described above with reference to FIG. 17. In an example, the first OCR process produces not only a string corresponding to the characters that the OCR process believes is present but also the first OCR process at operation 1802 may generate a set of one or more bounding boxes for the second region of the check image. In some embodiments, operation 1802 first generates a single bounding box around all the characters in the second region of the check image. For example, where the second region of the check image is the MICR line, operation 1802 generates a single bounding box around all the characters of the MICR line. An example check image including a bounding box around the characters of the MICR line is illustrated in FIG. 21 at 2104. The bounding boxes may be defined by specifying two or more pixels or image locations corresponding to the corners of a rectangle bounding the region.

The first OCR process at operation 1802 can generate a single bounding box around the characters of the second region of the check image by detecting where the characters are located on the check image. In examples, characters are located on the second region of the check image during the first OCR process using an edge detection algorithm (e.g., Canny edge detection or Sobel operators), connected components analysis, deep learning models, other techniques for text detection, or combinations thereof.

After detecting where characters are located on the second region of the check image, the check image can be segmented into a smaller region based on where the characters have been identified. During segmentation of the check image, a bounding box can be generated around the region where the characters have been identified. For example, where the second region of the check image is the MICR line, a bounding box can be generated around the characters making up the entire MICR line. An example bounding box around a MICR line is illustrated in FIG. 21 and is pointed to by reference numeral 2104. The first OCR process generates the bounding box by calculating the coordinates of the bounding box around the characters on the second region of the check image. In examples, the bounding box is defined by the coordinates of its top-left and bottom-right corners, and the bounding box is then generated around the detected characters using the defined coordinates.

In some embodiments, at operation 1802, the first OCR process generates bounding boxes at the character-level around each respective character in the second region of the check image. In some embodiments, the first OCR process first generates a single bounding box around all the characters in the second region of the check image, and can generates another set of bounding boxes around each respective character in the second region of the check image. In other embodiments, the first OCR process only generates a set of bounding boxes around each respective character in the second region of the check image, without first generating a single bounding box around all the characters in the second region of the check image. In even other embodiments, a single bounding box may be generated around only a subset of characters in the second region of the check image. In even other embodiments, the first OCR process can generate a set of bounding boxes around a subset of respective characters in the second region of the check image. For example, a set of bounding boxes may be generated around each respective character making up the routing number on the MICR line, but no bounding boxes are generated around the remaining characters on the MICR line (e.g., no bounding box is generated around the characters making up the account number on the MICR line).

In some examples, during operation 1802, pixels within the second region that are not from the characters (e.g., marks from a signature line, borders from the check edge against a background) can be filtered out. Accordingly, following operation 1802, the area within the bounding box includes the second characters, but other noise is removed. For example, with reference to FIG. 21, the cropped check image 2102 includes check edge lines 2103 along the sides and bottom portion of the cropped check image caused by the check being against a background when the check image was captured. However, after operation 1802, a bounding box has been generated around the characters, and the noise from the check edges has been eliminated, as can been seen from the lack of the check edge lines 2103 in the cropped check image 2104.

In some implementations, the second region with the MICR line has text object detection run on it to return a MICR bounding box. The MICR bounding box can be extracted and processed to prepare the image for contour detection. The resulting list of contours may include noise and other mark on the check we filter them by area and check the contour's vertical center's proximity to the vertical center of the MICR line bounding box.

In addition to or instead of using the OCR process to create or define the set of bounding boxes, another technique (e.g., one or more of the segmentation techniques described above) can be used to create the bounding boxes.

In some embodiments, after the first OCR process generates a set of one or more bounding boxes for the second region at operation 1802, operation 1804 is performed.

In operation 1804, the characters identified are removed before determining their respective alpha or numeric integer value at operation 1804. In some embodiments, the first OCR process performed at operation 1802 is executed to identify the presence of characters in the second region of the check image, and not for the purpose of determining the respective alpha or numeric integer value of each character. Accordingly, in some instances, at operation 1804, the characters identified are removed before determining their respective alpha or numeric integer value. In some examples, the characters are actively discarded. In some examples, the characters are stored in a variable that is not referenced again in the process. In some examples, the specific character string produced by the first OCR process at operation 1802 is not used in a way that influences the characters generated by method 1800. Subsequent steps of method 1800, including operation 1806, 1808, 1808, and 1810, can then be performed to determine the respective alpha or numeric integer value for the respective characters during the second OCR process.

After operation 1804, the method 1800 can proceed to operation 1806.

At operation 1806, conforming outer perimeters of respective characters in the second region of the check are generated. A conforming outer perimeter can be the outer boundary or outer edge of a silhouette of the respective character. At operation 1806, an outer boundary of each respective character is detected, and an outline of each connected component is traced. In some embodiments, connected component labeling is used to identify connected regions of pixels in the binary check image, which correspond to characters or parts of characters. Once connected components are identified, contour detection can be used to trace the outer boundary or outer edge of each component in each respective character, which involves identifying the outermost points of the connected component. By tracing the outer edge of a silhouette of each respective character at operation 1806, a conforming outer perimeter can be generated for each respective character to reflect the outer edge of each respective character. In an example, the conforming outer perimeter is defined by a set of points that can be joined to form an independent, non overlapping shape. In an example, a conforming outer perimeter is defined based on identifying locations in the image where there is a change from a black pixel to a white pixel (or vice versa). Such transition points can be grouped and used as a set of points to form the conforming outer perimeter.

In some embodiments, the conforming outer perimeter of the respective characters are generated without generating a portion corresponding to closed typographical counters formed within digits zero, six, eight, and nine. Thus, only the outer perimeter of digits zero, six, eight, and nine may be generated. An example of conforming outer perimeters generated around respective characters of a MICR line is illustrated in FIG. 21 at reference numeral 2108. After operation 1806, the method 1800 can proceed to operation 1808.

At operation 1808, conforming outer perimeter images are generated. Conforming outer perimeter images are generated based on the set of one or more bounding boxes generated at operation 1802. In some embodiments, a set of bounding boxes is generated around each respective character in the second region of the check image at operation 1802, and at operation 1808, a separate conforming outer perimeter image is generated based on each bounding box. Thus, each conforming outer perimeter images includes a conforming outer perimeter of a corresponding character in the second region of the check image. In some embodiments, a separate conforming outer perimeter image is generated for each respective character in the second region of the check image. In some embodiments, a separate conforming outer perimeter image is generated for only a subset of respective characters in the second region of the check image. For example, a separate conforming outer perimeter image can be generated for only the respective characters making up the routing number on the MICR line, wherein conforming outer perimeter images are not generated for the remaining characters on the MICR line. An example of conforming outer perimeter images generated for respective characters of a routing number on a MICR line is illustrated in FIG. 21 at 2112.

In an example, for a bitonal image or a subregion of an image containing the character, a conforming outer perimeter for a character is generated by first obtaining a bounding box around the character. Then, starting from edges of the image or bounding box, march or flood inwards until a change in pixel value is detected. In an example, a value of 0 is black and a value of 1 is white, and the character is white, and the background is black. Starting from each pixel of the outer perimeter of the image, move toward the center of the image until making such a move would require moving from a 0 to a 1. This results in knowledge of the locations of an outer boundary of the character that conforms to the outer shape of the character. Notably, generating the conforming outer perimeter in this way results in merely an outer perimeter without generating a portion corresponding to closed typographical counters formed within digits zero, six, eight, and nine. Other algorithms or techniques may be used.

A conforming outer perimeter conforms to the character in a way that mere bounding boxes do not. For instance, whereas a bounding box around the character may be rectangular (and therefore have four orthogonal straight sides), the conforming outer perimeter would likely have more than four sides, have non-orthogonal sides, or no straight sides because the conforming outer perimeter follows the flow of the shape of the character. As a result, a conforming outer perimeter may have one or more concavities that a bounding box rectangle around the character would lack. In some instances, the perimeter length of a conforming outer perimeter is longer than a perimeter length of a bounding box for the same shape, such as for the characters two, there, and five in the MICR font.

After operation 1808, the method 1800 can proceed to operation 1810.

At operation 1810, the respective integer value represented by each respective character is determined. Determining the respective integer value for each respective conforming outer perimeter of each respective character can include a number of sub-steps or functions, including operations 1810*a* and 1810*b*.

First, at operation 1810*a*, for each conforming outer perimeter image having a conforming outer perimeter of a respective character, the conforming outer perimeter is compared with one or more templates of a set of template conforming outer perimeters. In some embodiments, the set of template conforming outer perimeters is a template conforming outer perimeter for each integer zero through nine for a particular font (e.g., the font used for the characters in the second region of the check image). Thus, for each integer zero through nine, there can be a template conforming outer perimeter that includes the outer perimeter of that integer for a particular font. In some embodiments, each conforming outer perimeter from each conforming outer perimeter image is compared to the template conforming outer perimeters for each integer zero through nine. In some examples, a simple XOR technique is performed such that differences between the template and the conforming outer perimeter are identified. A template resulting in the fewest number of differences can be considered to be the best fit. Additional techniques for comparing the conforming outer perimeter to template conforming outer perimeters is described below in more detail with reference to FIG. 22*a*, FIG. 22*b*, and FIG. 22*c*.

At operation 1810*b*, for each conforming outer perimeter image (or other data structure), based on the comparing at operation 1810, the template conforming outer perimeter within the set of template conforming outer perimeters that best fits the conforming outer perimeter in each respective conforming outer perimeter image is identified. Based on the template conforming outer perimeter that best fits the conforming outer perimeter for each conforming outer perimeter image, an integer value represented by each respective character in the conforming outer perimeter images is determined. For example, a conforming outer perimeter image is compared to template conforming outer perimeters for each integer zero through nine, and whichever template conforming outer perimeter fits best with the conforming outer perimeter in the conforming outer perimeter image determines the respective integer value of the respective character. For example, if a conforming outer perimeter of a respective character best fits with the template conforming outer perimeter for the integer three, then the respective integer value represented by that character will be identified as three. In some examples, for a template to be a "best fit", it may need to be not merely the closest match of available options, but the degree of match or correlation may need to exceed a threshold. In some examples, the template library includes one or more null templates such that if a conforming outer perimeter matches best with a null template, an error is thrown because the best fit was with an invalid character. A null template may take a variety of forms, such as noise, alphabetical characters (e.g., where valid results contain only numbers), non-character shapes, a template that is the combination one or more characters superimposed on each other (e.g., by performing an OR operation on the templates for one or more characters) on the other forms, or combinations thereof.

After operation 1810, the method 1800 can proceed to operation 1812.

At operation 1812, check data is extracted based on the respective integer values determined for each respective character at operation 1810. In some embodiments, wherein the second region of the check image is the MICR line, the numbers in the MICR line are extracted at operation 1812.

In some embodiments, at operation 1812, text (including check data) is extracted. In some embodiments, the extracted text is a routing number extracted from the MICR line. In some embodiments, unique characters or symbols on the MICR line surround the routing number, so identifying those unique characters or symbols can be used to locate and extract the routing number from the rest of the characters on the MICR line. In examples, the routing number on the MICR line is preceded by and followed by a routing number symbol represented by a separator bar ("|") and a colon (":"). The conforming outer perimeter of the components of the routing number symbol are generated at operation 1806, and a bounding box can be generated around each component of the routing number symbol. Identification techniques can then be used to detect the colon in the routing number symbol by identifying two bounding boxes at the same x-coordinate with different y-coordinates. In examples, a single bounding box is then generated around the entire routing number symbol. Once the routing number symbols preceding and following the routing number are identified, the characters between those routing number symbols can be identified as the routing number. In other examples, the routing number on the MICR line is surrounded by a different symbol or character as determined by the financial institution issuing the check. Similar identification techniques can be used to identify other check data, including other check data from the MICR line, such as the account number or the check number.

After operation 1812, the extracted check data can be validated as described with reference to FIG. 17 at operation 1714. In examples where the text extracted at operation 1812 is a routing number, the routing number can be validated beginning with operation 1902 as described below with reference to FIG. 19.

Figure 19:
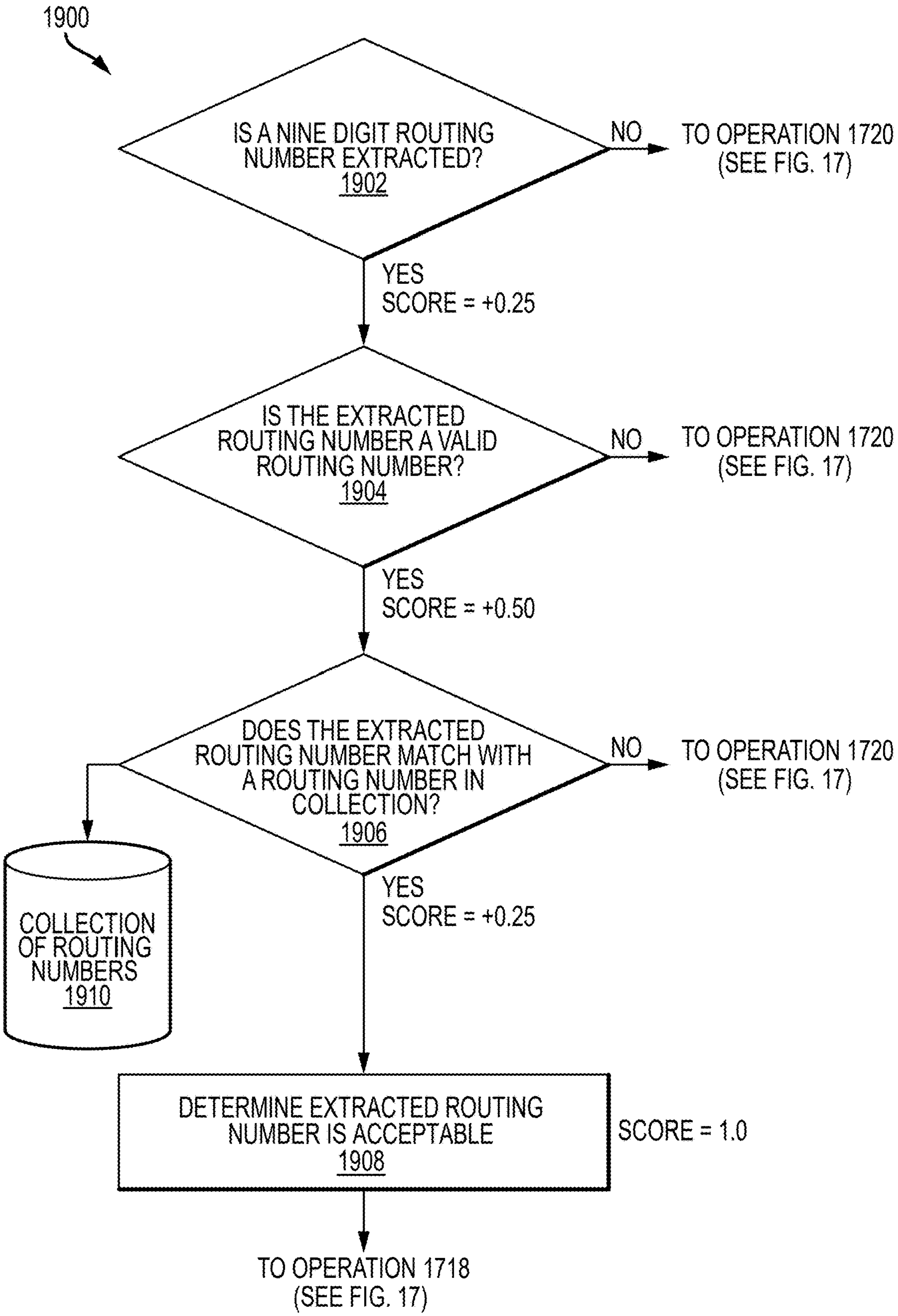
FIG. 19 illustrates an example flowchart of a method for validating an extracted routing number from a check image during remote check deposit using a mobile device.

FIG. 19 illustrates an example flowchart of a method 1900 for validating an extracted routing number from a check image during remote check deposit using a mobile device 104. The operations within FIG. 19 occur at the mobile device 104. The method 1900 for validating an extracted routing number can begin with operation 1902.

Operation 1902 includes determining whether a correct number of characters was extracted from the image. For instance, where the extracted characters were from an area of the check where U.S. bank routing numbers were expected, the process can expect nine digits because all bank routing numbers in the United States are currently nine digits in length, wherein the first four digits represent the federal reserve district and the bank identifier, the next four digits identify the bank or financial institution, and the ninth digit is used to validate the routing number. If there are too many or too few extracted characters (e.g., for nine digit routing numbers, if it is seven digits, eight digits, or ten digits), the extracted routing number is determined to be an invalid routing number. In examples, the extracted routing number may be fewer or more than nine digits if the quality of the check image was poor, such that the characters on the MICR line making up the routing number could not be extracted during the second OCR process. If the correct number of characters were not extracted, then the method 1900 can take the "NO" branch from operation 1902 to operation 1720 as shown in FIG. 17, where remediation occurs in order to attempt to extract valid characters, such as by receiving a new image or receiving user input manually entering the information (e.g., routing number), so that the process can proceed.

If the correct number of characters is detected at operation 1902, a confidence score (e.g., +0.25) can be assigned based thereon.

Following operation 1902, the method 1900 can proceed to operation 1904.

Operation 1904 includes determining whether the extracted characters are valid using a validation formula. For instance, where a routing number is extracted, a weighted sum formula (e.g., Modulus 10 or Checksum) involving the first eight digits of the extracted routing number can be performed. In an example, the first, fourth, and seventh digits are multiplied by three; the second, fifth, and eighth digits are multiplied by seven; the third, sixth, and ninth digits are multiplied by one; and those three products are summed together. If the total sum is divisible by 10, then the routing number is determined to be valid. If the sum total is not divisible by 10, then the routing number is invalid. Other weighted sum formulas may be used at operation 1904 to determine if the extracted data is valid. At operation 1904, if the extracted routing number is determined to be invalid, then the method 1900 can take the "NO" branch from operation 1904 to operation 1720 as shown in FIG. 17, where remediation occurs.

If the extracted characters are deemed valid, then the confidence score can be modified (e.g., 0.5 is added to the confidence score, bringing the total confidence score to +0.75 when the previous example is continued).

Following operation 1904, the flow of the method 1900 can proceed to operation 1906.

At operation 1906, the extracted data (e.g., routing number) is compared to known extant data patterns. For instance, there may be certain extant routing numbers be certain extinct routing numbers that do not correspond to a working routing numbers a collection of routing numbers 1910 (e.g., they may be unused or unusable despite otherwise appearing valid). In some embodiments, the routing numbers in the collection of routing numbers 1910 are a collection of known routing numbers for certain banks and financial institutions. At operation 1906, if the extracted routing number does not match a routing number in the collection of routing numbers 1910, then the method 1900 can take the "NO" branch from operation 1906 to operation 1720 as shown in FIG. 17, where remediation occurs.

If the extracted data matches known working data in a collection of data (e.g., routing numbers 1910) at operation 1906, the confidence score can be modified. For instance, 0.25 can be added to the routing number, which would bring the total confidence score to 1.0.

Following operation 1906, the method 1900 can proceed to operation 1908.

At operation 1908, based on the total confidence score being 1.0, the routing number is determined to be valid. If the extracted routing number is determined to be acceptable, the method 1900 can proceed to operation 1718 as shown in FIG. 17, where the remote check deposit process continues. In an example, a routing number database can be used to determine the acceptability of a routing number. The routing number database may contain, for example, all routing numbers registered under a specific banking system (e.g., a U.S. Federal banking system). The extracted routing number can be treated as a possible routing number until determined to be acceptable. Operations 1902 and 1904 can be performed and the output thereof can be used to determine the acceptability of the routing number (e.g., if any one of them fails, the check is rejected). Operation 1906 may be mandatory or optionally used to boost an overall confidence of possible routing number (e.g., but its failure alone may not result in rejecting a check).

FIG. 20*a* illustrates an example preprocessing of a check image 2000*a* during remote check deposit using a mobile device 104. The check image 2000*a* is skewed as a result of the image capture device not perfectly aligning the check before capturing the image, so the check image is not a perfect rectangle. Accordingly, the check image is preprocessed (at operation 1704*d* as described with reference to FIG. 17) to fix the perspective of the check image. In some embodiments, to fix the perspective of the check image 2000*a*, corner points 2002*a*, 2004*a*, 2006*a*, 2008*a* are detected. Once corner points 2002*a*, 2004*a*, 2006*a*, 2008*a* are detected, a perspective transformation is applied to correct the perspective of the check image 2000*a* and align it properly, as described above at operation 1704*d* with reference to FIG. 17, to generate a perspective fixed check image. An example perspective fixed check image is shown in FIG. 20*b*.

FIG. 20*b* illustrates an example preprocessing of a check image 2000*b* during remote check deposit using a mobile device 104. The check image 2000*b* is the same check image 2000*a* shown in FIG. 20*a* after check image 2000*a* has undergone a perspective transformation as described above at operation 1704*d* with reference to FIG. 17. Check image 2000*b* is a perfect or substantially perfect rectangle. Preprocessing a check image, such as by correcting the perspective to obtain a perfectly rectangular check image, improves the quality of the check image and enables check data to be extracted more easily and more accurately during remote check deposit using a mobile device 104.

FIG. 21 illustrates an example flow 2100 for processing a check image to extract text from a check image during remote check deposit using a mobile device 104. The process 2100 begins with a cropped check image 2102. The cropped check image 2102 can be generated by cropping a check image, as described above with reference to FIG. 17 at operation 1706. The cropped check image includes the second region of the check image, wherein the second OCR process (as described with reference to FIG. 18) is performed on the second region of the check image. In the example cropped check image 2102, the check image is cropped to include a bottom portion of the check image including the MICR line. In some embodiments, the cropped check image 2102 has also undergone preprocessing techniques, including but not limited to grayscale conversion, image blurring, and binary threshold conversion, other preprocessing techniques, or combinations thereof. Preprocessing the cropped check image is described above with reference to FIG. 17 at operation 1708. In examples, the cropped check image 2102 includes check edge lines 2103 on the sides and bottom portion of the cropped check image 2102 caused by the check being against a background when the check image was captured, and resulting in check edge lines 2103 appearing on the check image along the check edges where the check meets the background.

In some embodiments, the mobile device 104 performs the first OCR process on the cropped check image 2102 to generate a bounding box around the characters in the second region of the check image, as shown at 2104 of the process 2100. In the process 2100, a bounding box is generated around the characters of the MICR line at 2104. Generation of a bounding box is described in more detail above with reference to FIG. 18 at operation 1802. As illustrated at 2104 of flow 2100, after the first OCR process and generation of the bounding box, the check edge lines 2103 are eliminated.

In some embodiments, after generation of a bounding box around the characters in the second region of the check image, the color of the characters in the bounding box are inverted. Inverting a color generally involves swapping the color values of the foreground and background. In some embodiments, inverting is performed by changing the colors of the pixels within the bounding box, such that black pixels become white and white pixels become black.

In an example implementation, preprocessing the check image and/or preprocessing the cropped check image, as described above with reference to FIG. 17 at operations 1704 and 1708, respectively, results in a binary check image having black text on a white background. Accordingly, in examples where the characters in the bounding box are black and the background of the bounding box is white, the color is inverted so that the characters are white and the background of the bounding box is black, as illustrated at 2106 of the process 2100. In some examples, the color is inverted to improve the detection and generation of conforming outer perimeters of respective characters in the second region of the check image.

In some embodiments, after the color of the characters is inverted, conforming outer perimeters of respective characters are generated. The generation of conforming outer perimeters of respective characters is described above with reference to FIG. 18 at operation 1806. Example conforming outer perimeters generated for respective characters on a MICR line are illustrated at 2108 of the process 2100.

In some embodiments, after conforming outer perimeters of respective characters are generated, check data is located and extracted. For example, where the second region of the check image is the MICR line, after confirming outer perimeters of respective characters of the MICR line are generated, as shown at 2108 of the process 2100, the routing number can be located and extracted from the other characters of the MICR line, including the account number and the check number. The method for identifying the characters of the routing number on the MICR line is described above with reference to FIG. 18 at operation 1812. In examples, by detecting the routing number symbols preceding and following the characters of the routing number, the routing number can be located and extracted. The process 2100 illustrates a routing number located and extracted from the other characters on the MICR line at 2110.

The process 2100, in turn, executes generating conforming outer perimeter images for each character in the routing number to generate a separate conforming outer perimeter image for each respective character in the routing number, as shown at 2112 of the process 2100. The generation of conforming outer perimeter images of respective characters is described above with reference to FIG. 18 at operation 1808.

Once conforming outer perimeter images of respective characters are generated, as shown at 2112 of the process 2100, the process 2100 can continue to determining the respective integer value represented by each respective character on each conforming outer perimeter image. The determination of respective integer values of each respective character is described above with reference to FIG. 18 at operation 1810. For example, each of the ten conforming outer perimeter images shown at 2112 can be compared to template conforming outer perimeters for each integer zero through nine to determine the integer value for each respective character, wherein the template conforming outer perimeters are specific to the font used on the second region of the check image, such as, for example, the font used on the MICR line.

In some examples, the template that the character is compared to is based on one or both of the x-axis maximum difference and x-axis average calculations for a conforming outer perimeter of a template. In some examples, a best-fit line or algorithm is generated for the template for the given calculation. The template conforming outer perimeter for the integer value is specific to the font of the respective character.

In an example, maxDiff and xAverage are calculated for standard contours (e.g., for known reference or template characters). These results can be stored (e.g., in a JSON file) and used later as character references when identifying unknown characters. Then maxDiff and xAverage can be calculated for unknown characters (e.g., during the OCR process). Then the maxDiff and xAverage values from the unknown characters are compared to those values from those calculated for standard contours to find best match (e.g., the highest match or a highest match that satisfies a matching threshold.

In an example, the maxDiff calculation is performed after a contour is normalized and established as a closed list of points into a matrix. Contour points can be indicated in a binary fashion (e.g. black for background, white for contour point or vice versa) to form a binary contour image. maxDiff can be calculated as the largest distance between contour points for a given row. Moving down from the top for each row, maxDiff is calculated. This can result in calculating the width of a character at any given row.

In an example, the xAverage calculation is performed to facilitate differentiation of characters that have the same xDiffs even though they look different (e.g., digits 2, 3, 5 in some MICR fonts appear). xAverage can be used as an indicator as to where in the image (front or back) is the contour lies at any given point as we travel down the y-axis. This can be performed by getting an average of the x value of each contour point in that row.

In some examples, a variance is calculated. The variance can be the differences between corresponding points of the respective character's conforming outer perimeter and the template's conforming outer perimeter. The variance can be determined by performing a point-wise comparison between the corresponding points on the respective character's conforming outer perimeter (sometimes referred to as the target shape) and the template's conforming outer perimeter. In addition or instead, the variance can be determined based on differences between the respective character's xMaxDiff and xAverage and those same values for the reference or template character. In examples, a point-wise comparison can be done using a distance metric between corresponding points. Following a point-wise comparison, the difference can be calculated and used as the variance. Variance distance measurements can be used, such as Euclidean distance.

Figure 22A:
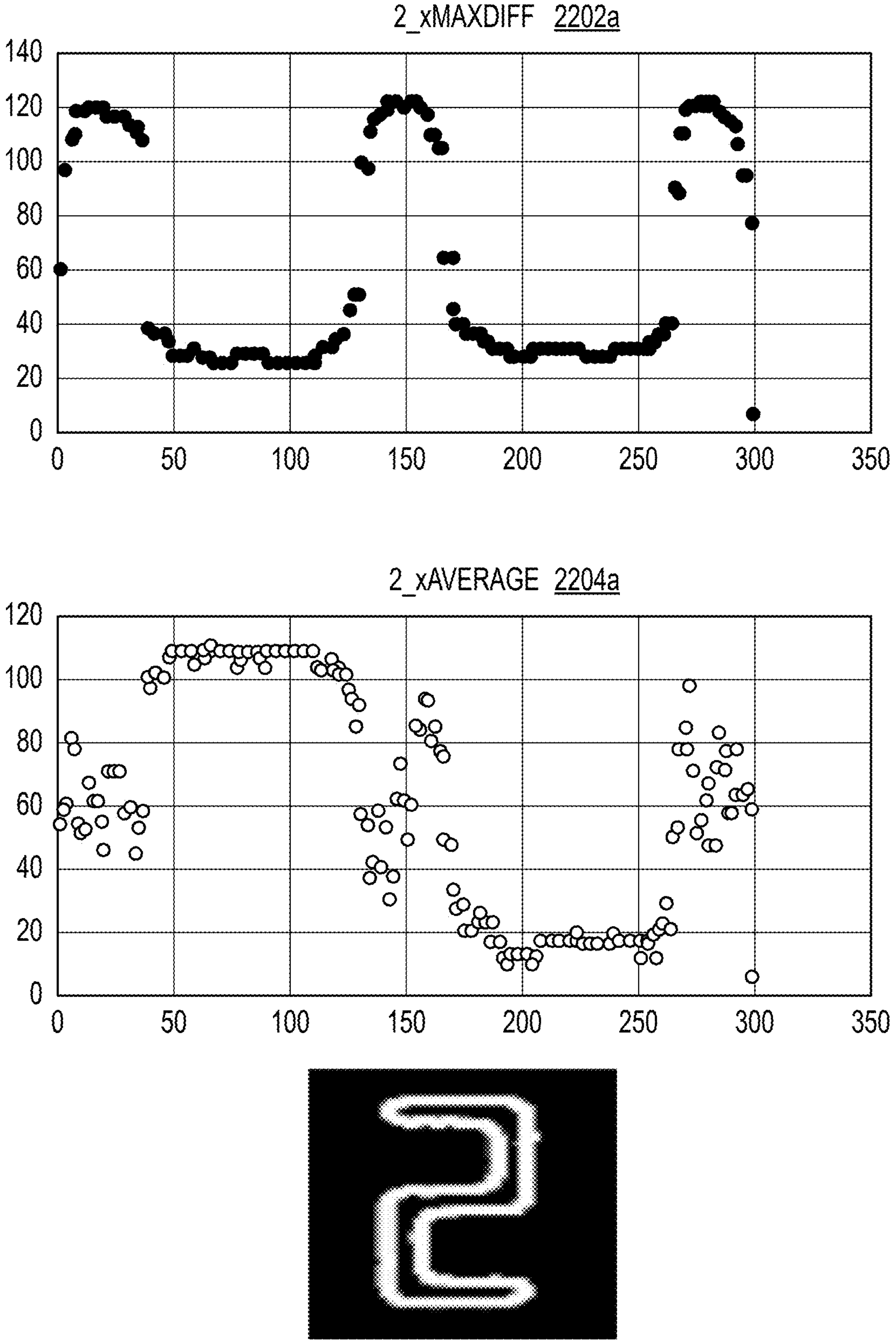
FIG. 22*a* illustrates example graphs comparing a conforming outer perimeter of a respective character from a check image to a template conforming outer perimeter for the integer two for determining an integer value of the respective character during remote check deposit using a mobile device.
Figure 22B:
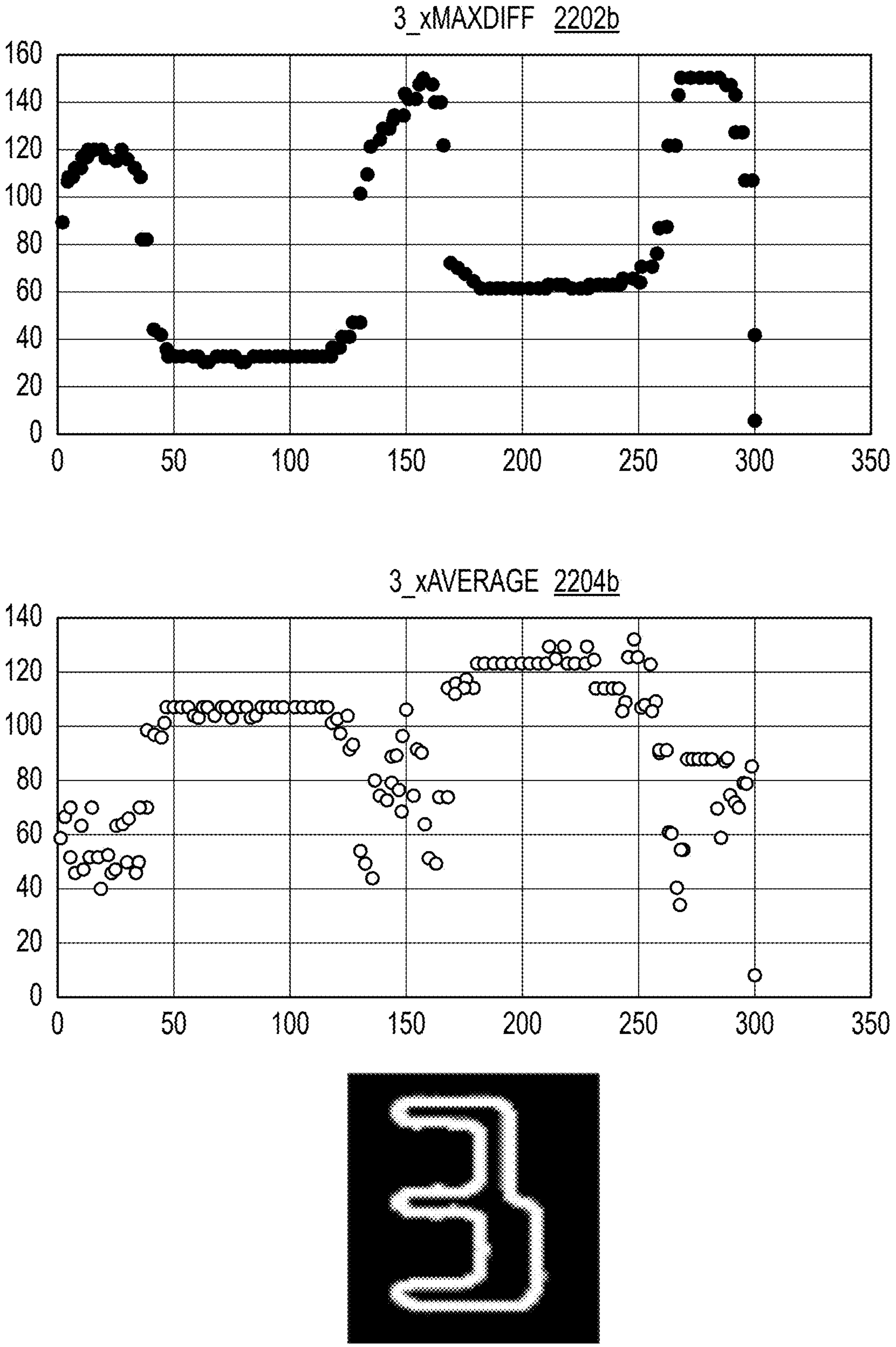
FIG. 22*b* illustrates example graphs comparing a conforming outer perimeter of a respective character from a check image to a template conforming outer perimeter for the integer three for determining an integer value of the respective character during remote check deposit using a mobile device.

FIG. 22, which is broken up into FIGS. 22*a-c*, illustrate example results of calculations for xMaxDiff and xAverage for various images of MICR characters. In particular, FIG. 22*a* illustrates an example xMaxdiff graph 2202*a* and xAverage graph 2204*a* for the conforming outer perimeter of the digit '2' in a MICR font. FIG. 22*b* illustrates an example xMaxdiff graph 2202*b* and xAverage graph 2204*b* for the conforming outer perimeter of the digit '3' in a MICR font. FIG. 22*c* illustrates an example xMaxdiff graph 2202*c* and xAverage graph 2204*c* for the conforming outer perimeter of the digit '5' in a MICR font.

In some embodiments, the conforming outer perimeter of each respective characters is compared to the template conforming outer perimeters for each integer value zero through nine for the particular font of the respective characters, and maximum difference graphs and average difference graphs can be generated for each integer value zero through nine. Based on the template conforming outer perimeter that best fits each respective character's conforming outer perimeter, as determined by assessing maximum difference and average difference graphs, the respective integer value represented by each respective character is determined (operation 1810 of FIG. 18). Accordingly, integer values can be determined for each respective character on the second region of the check image. In examples where the second region of the check image is the MICR line, integer values can be determined for each character on the MICR line, and check data from the MICR line can be extracted, such as the routing number, the account number, and the check number. Once check data is extracted, in some embodiments, the check data is presented on a check representation image (operation 306 of FIG. 3*a*), and method 300 for remote check deposit using a mobile device 104 continues.

Figure 23:
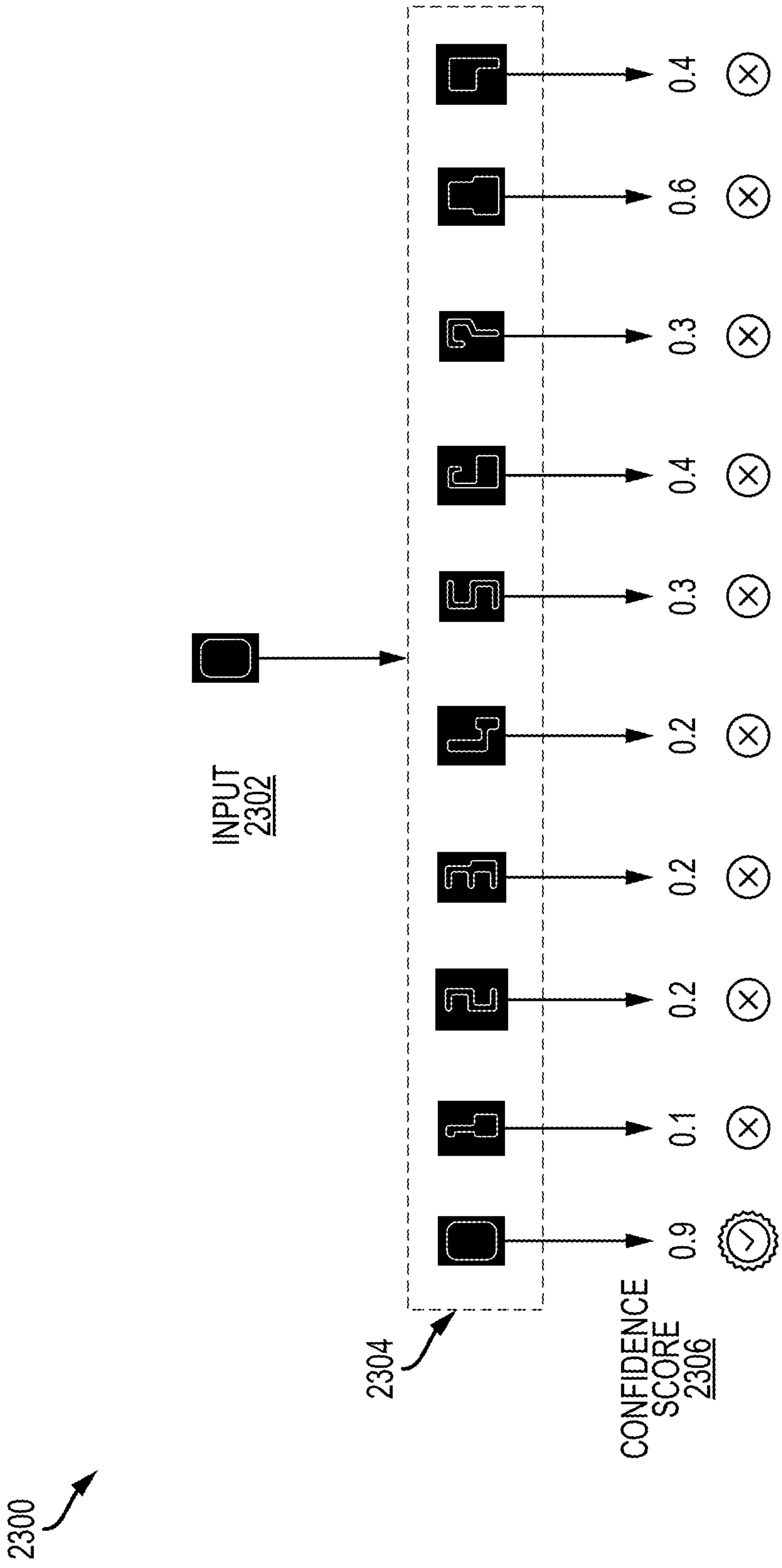
FIG. 23 illustrates an example process for comparing a conforming outer perimeter of a respective character from a check image to a set of template conforming outer perimeters to determine an integer value of the respective character during remote check deposit using a mobile device.

FIG. 23 illustrates an example process 2300 for comparing a conforming outer perimeter of a respective character 2302 from a check image to a set of template conforming outer perimeters 2304 to determine an integer value of the respective character during remote check deposit using a mobile device 104. In the example process 2300, a conforming outer perimeter of a respective character 2302 is input to compare with a set of template conforming outer perimeters 2304 for integer values zero through nine of a particular font. The conforming outer perimeter of the respective character 2302 is generated according to operation 1806 as described above with reference to FIG. 18. The conforming outer perimeter of the respective character 2302 is compared to each template conforming outer perimeter in the set of template conforming outer perimeters 2304.

Based on comparing the conforming outer perimeter to each template conforming outer perimeter in the set of template conforming outer perimeters 2304, a confidence score 2306 is assigned for each comparison. The confidence score 2306 reflects how closely the conforming outer perimeter of the respective character 2302 matches the template conforming outer perimeter, wherein a perfect match between the conforming outer perimeter of the respective character 2302 and a template conforming outer perimeter would result in a confidence score of 1.0. The template conforming outer perimeter that best fits with the conforming outer perimeter of the respective character 2302 is identified based on the highest confidence score. An integer value is identified for the respective character based on the highest confidence score. For example, as shown in FIG. 23, the confidence score is highest for the template conforming outer perimeter for the integer value zero, meaning that the conforming outer perimeter 2302 best fit with the template conforming outer perimeter for the integer value zero. Accordingly, in this example, the integer value for the respective character is determined to be zero.

Process 2300 can be executed iteratively for each respective character identified on the second region of the check image to determine an integer value for reach respective character. In some embodiments, the second region of the check image is the MICR line, and process 2300 is executed iteratively for each respective character on the MICR line to determine integer values, and therefore to determine check data on the MICR line such as the routing number.

In some embodiments process 2300 is executed iteratively for each respective character making up the routing number on the MICR line in order to extract the routing number from the check image. In such cases, each respective character is assigned an integer value, and each assigned integer value has a confidence score based on how well the conforming outer perimeter of each respective character matches with the template conforming outer perimeter for the assigned integer value. The result is a ten-digit routing number, wherein each digit in the routing number has a confidence score. In some embodiments, an average of the confidence scores for each respective character making up the ten-digit routing number is calculated to determine an overall routing number confidence score reflecting the overall confidence in the extracted routing number.

In some embodiments, the overall routing number confidence score is used in a subsequent confidence calculation to determine a final confidence score for the extracted routing number. In such cases, the overall routing number confidence score is used along with other verification processes to determine a final confidence score for the extracted routing number to verify that the extracted routing number is valid before proceeding with remote check deposit. The overall routing number confidence score and the result of each other verification process is weighted to calculate the final confidence score. For example, the overall routing number confidence score may be 40% of the determination of the final confidence score, a validation formula may be 40% of the determination of the final confidence score, and the presence of the extracted routing number in a database of known routing numbers may be 20% of the determination of the final confidence score. For example, if the overall routing number confidence score is 0.85, assigning a weight of 40% leads to a score of +0.34. Next, a validation formula, such as Checksum, can be used to determine whether the extracted routing number is valid. Use of a validation formula is described in more detail above at operation 1904 with reference to FIG. 19. If the extracted routing number is determined to be valid based on the validation formula, a score of +0.4 is assigned. Next, the extracted routing number may be compared to routing numbers in a collection of known routing numbers. Comparison of an extracted routing number to routing numbers in a collection of known routing numbers is described above at operation 1906 with reference to FIG. 19. If the extracted routing number matches with a routing number in the collection of known routing numbers, a score of +0.2 is assigned. In this example, the sum of +0.34, +0.4, and +0.2 is taken to calculate a final confidence score of +0.94.

In some embodiments, a threshold final confidence score may be utilized, wherein a final confidence score below the threshold indicates that the extracted routing number is likely invalid, and a final confidence score above the threshold indicates that the extracted routing number is likely valid. In some embodiments, the calculation of a final confidence score in this manner may be used to validate the extracted routing number instead of performing method 1900 for validating an extracted routing number from a check image during remote check deposit. In other embodiments, the calculation of a final confidence score in this manner may be used in addition to performing method 1900 for validating an extracted routing number from a check image in order to quantify the likelihood that the extracted routing number is valid with a final confidence score.

In examples where the extracted routing number is determined to be valid based on the final confidence score, the routing number can be presented (e.g., displayed) on a check representation image (operation 306 of FIG. 3*a*), and method 300 for remote check deposit using a mobile device 104 continues.

Second Example OCR Workflow

Figure 24:
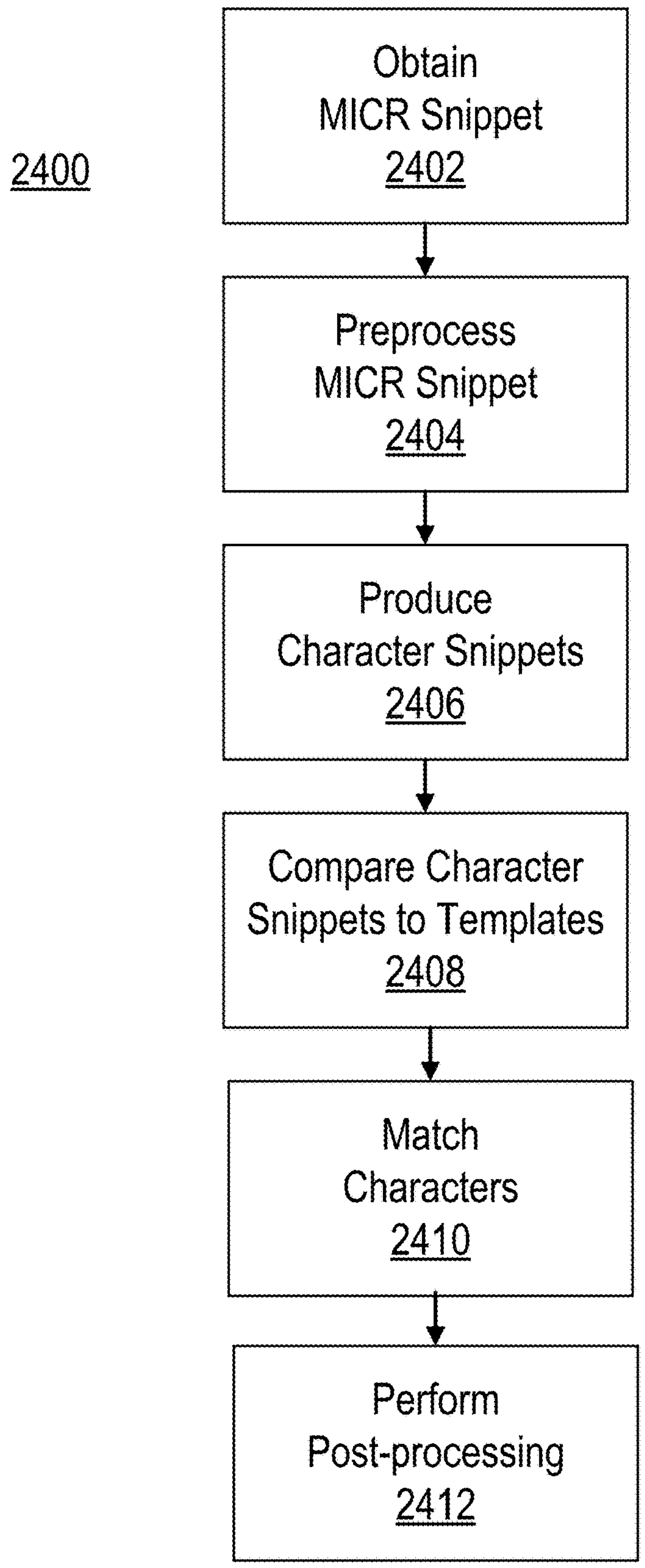
FIG. 24 illustrates an example flowchart of a second method for extracting text from a check image during remote check deposit using a mobile device.

FIG. 24 illustrates an example flowchart of a second method 2400 for extracting text from a check image during remote check deposit using a mobile device 104. In examples, the method 2400 is executed during operation 304 as described above with reference to FIG. 3. The operations within FIG. 24 can be executed by the mobile device 104. The method 2400 for extracting text from a check image can begin with operation 2402.

Operation 2402 includes obtaining a MICR snippet. The MICR snippet is an image that includes the MICR line of a check and substantially no other portions of the check. For example, the MICR snippet can correspond to references 2102, 2104, or 2106 of FIG. 21. In examples, obtaining the MICR snippet can include following one or more of the operations discussed above, such as receiving a check image 1702, preprocessing the check image 1704, crop the check image 1706, and preprocessing the cropped check image 1708, among others. The resulting processed and cropped image can be the MICR snippet.

In some examples, a check image is obtained using a camera of the mobile device 104. The check image is preprocessed and passed to an object detection process to detect the MICR line, the amount, and the endorsements on the check, among other components and combinations thereof. An amount object can be detected as an amount printed value and an amount handwritten value. The endorsement value can be an endorsement signed value, an endorsement printed, or an endorsement written value. The MICR object detected from front of check image can be used as the MICR snippet using processes described herein.

Following operation 2402, the flow of the method can move to operation 2404.

Operation 2404 includes preprocessing the MICR snippet. In some examples, the MICR snippet is already preprocessed by techniques applied to the entire check image (e.g., because the MICR snippet is part of the check image, processing applied to the entire image would also be applied to the MICR snippet). In some examples, it is beneficial to apply different preprocessing techniques to different regions of the check image. In some examples, the MICR snippet is preprocessed, such as by converting it to a black-and-white image, cleaning up the snippet, applying filters, other processes, or combinations thereof.

One example technique is applied to a grayscale image of the MICR snippet to simplify image processing. A binary or adaptive thresholding technique is used to isolate the characters from the background of the grayscale image. In a specific example, the MICR snippet is converted into black-and-white to facilitate distinguishing the characters from the background. Next, vertical and horizontal projections are used to locate the boundaries of the MICR characters. Vertical and horizontal projections can be determined by summing pixel intensities along the columns and rows of the image. Beneficially, the use of projections can remove or mitigate the effects of unwanted noise like lines (e.g., errant pen strokes that pass through the MICR line) near the MICR characters by cropping or filtering the noise out of the image efficiently.

A horizontal projection can be calculated by summing pixel intensities along rows of the image (e.g., by running the function numpy.sum (binary_image, axis=1)). Vertical projection can be calculated in a similar manner by summing the pixel intensities along columns (e.g., by running the function numpy.sum (binary_image, axis=0)) of the image. Next, the process can compute the horizontal and vertical threshold values. In an example, the threshold is determined by calculating as x % of the maximum sum in each respective direction (e.g., 10% of the maximum determined vertical projection). Horizontal and vertical masks can be created by comparing the projections (e.g., horizontal or vertical sums) to the calculated thresholds. Pixels in the mask can be set to True (e.g., 1) if the corresponding row in the thresholded image satisfies the threshold (e.g., if the row contains at least x % of the maximum pixel intensity), and False (e.g., 0) otherwise. Likewise, a vertical mask is created by comparing the vertical sums to the vertical threshold. Pixels in the mask can be set to True if the corresponding column in the thresholded image contains at least 10% of the maximum pixel intensity, and False otherwise. A copy of the thresholded image is created and the pixels in the cleaned image are set to 0 where the horizontal or vertical mask is False. This helps in eliminating horizontal and vertical lines that contain less than x % of the maximum pixel intensity in the respective direction. Applying a vertical mask can include, for each respective summed intensity for a respective column, masking off that respective column (e.g., clearing any values in that column) responsive to the respective summed intensity failing to satisfy a vertical masking threshold. Applying a horizontal mask can include, for each respective summed intensity for a respective row, masking off that respective row responsive to the respective summed intensity failing to satisfy a horizontal masking threshold.

This masking process can eliminate areas with little to no useful data and can crop the image further. Further, the masking process can reduce an amount of noise, thereby improving processing accuracy and efficiency. Thresholds for horizonal and vertical projections can be adjusted based on the amount of noise in the MICR images. In some examples, the x % calculation described above is sufficient. In addition or instead, the amount of noise in the MICR image or the overall check image can be estimated using another technique and that estimate can be used to determine the thresholds for masking. The noise can be estimated in any of a variety of ways, such as based on analyzing local maxima and minima sums. For example, there may be a first relatively high local maxima and minima section corresponding to characters in the MICR line and then a second local maxima and minima section corresponding to areas within the MICR line that do not correspond to characters. Those second values could correspond primarily to noise and thus relatively high values in such a region could correspond to relatively high amounts of noise. Experiments can be conducted with multiple values to fine tune the noise removal.

Figure 25:
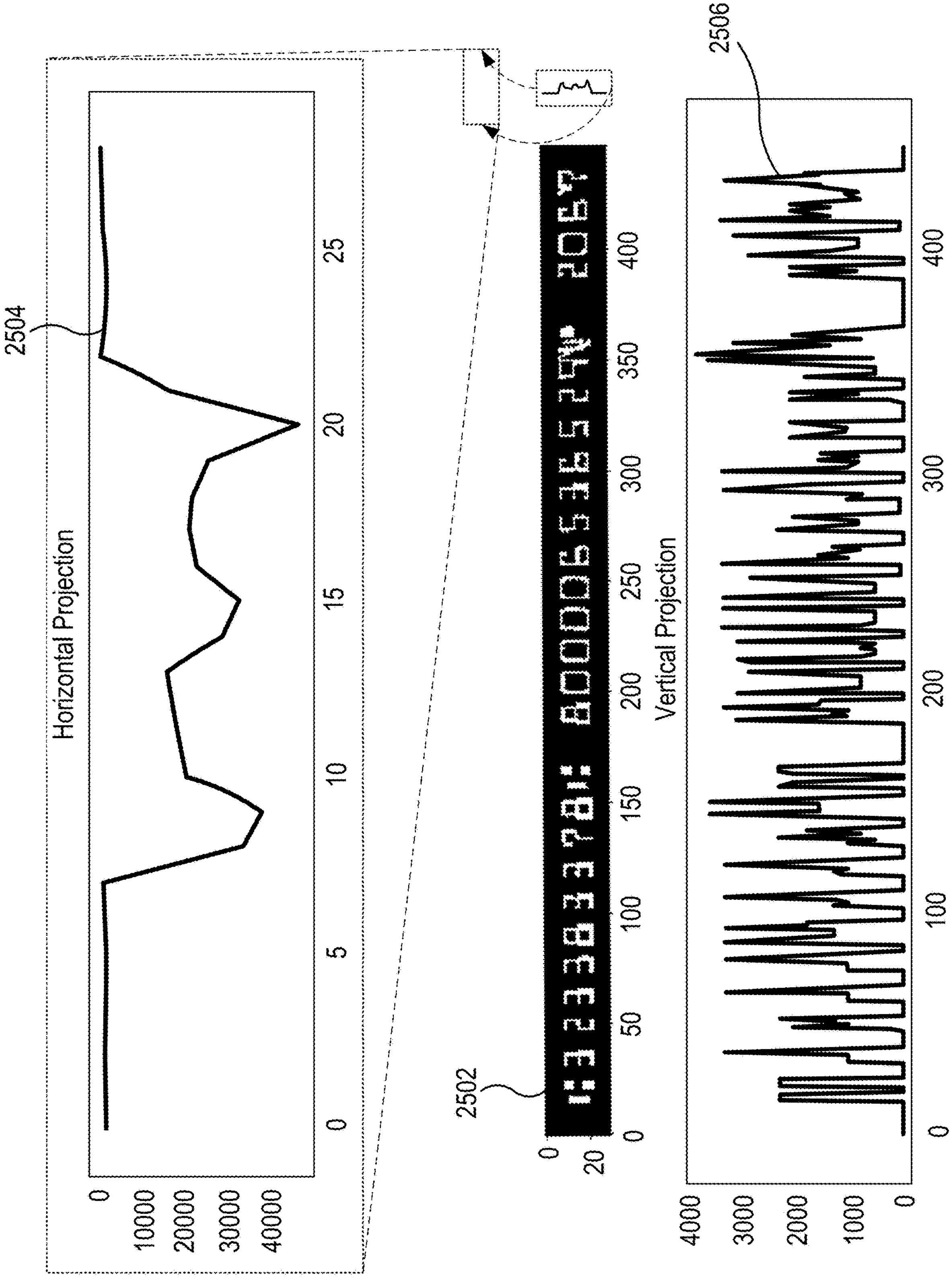
FIG. 25 illustrates an example MICR snippet with an associated horizontal projection and an associated vertical projection.

FIG. 25 illustrates an example MICR snippet 2502 with an associated horizontal projection 2504 and an associated vertical projection 2506.

Returning to FIG. 24, in some examples, there are one or more post-projection processing steps. For example, one or more morphological operations can be applied, such as erosion, dilation on top of projection results to further clean up noise. In some examples, the above-described projection or other techniques may result in uneven contrasts across different areas of the image, the results can be normalized by scaling the intensities or adjusting the dynamic range. In addition, histogram equalization can be used to enhance the contrast of the images when projection results have uneven intensity distributions.

Following operation 2404, the flow of the method 2400 can move to operation 2406.

Operation 2406 includes processing the MICR snippet to produce character snippets. For example, bounding boxes are drawn around characters of the MICR line and the character images are extracted using the bounding boxes to produce character snippets. In some examples, the MICR snippet is processed to identify or produce character snippets. The character snippets can be obtained using any of a variety of approaches. For instance, a projection technique (e.g., as discussed above) can be used as part of the process to produce the character snippets. In an example, the character snippets can be produced by using bounding box contouring processes provided by OPENCV (e.g., connected components contouring or grid search contouring, bounding box equalization, sliding window, other processes, or combinations thereof). In some examples, vertical projections are used to identify spaces between characters (e.g., areas with sums below a threshold) and used to identify boundaries of characters for cropping to form snippets.

Following operation 2406, the flow of the method 2400 can move to operation 2408.

Operation 2408 includes comparing character snippets to templates. This can include loading templates of known MICR characters. Then each template within a library of templates is compared with a respective character snippet (e.g., by performing a logical XOR or another comparison process) to determine level of match or similarity.

Following operation 2408, the flow can move to operation 2410.

Operation 2410 includes selecting a character based on the results of the comparison in operation 2408. This can include selecting the template with which a respective character snippet had the highest match (e.g., lowest difference as determined by summing the results of the XOR operation) and then determining that the character snippet shows the character that corresponds to the matched template.

Following operation 2410, the flow of the method can move to operation 2412.

Operation 2412 can include performing post processing on the characters. This post-processing can include performing one or more validation procedures, such as are described above in relation to FIG. 17 (e.g., operations 1714 and 1716).

The resulting characters can be used for any useful process, such as proceeding with a remote check deposit (see operation 1718). For example, the one or more resulting characters can be returned to calling function.

Figure 26:
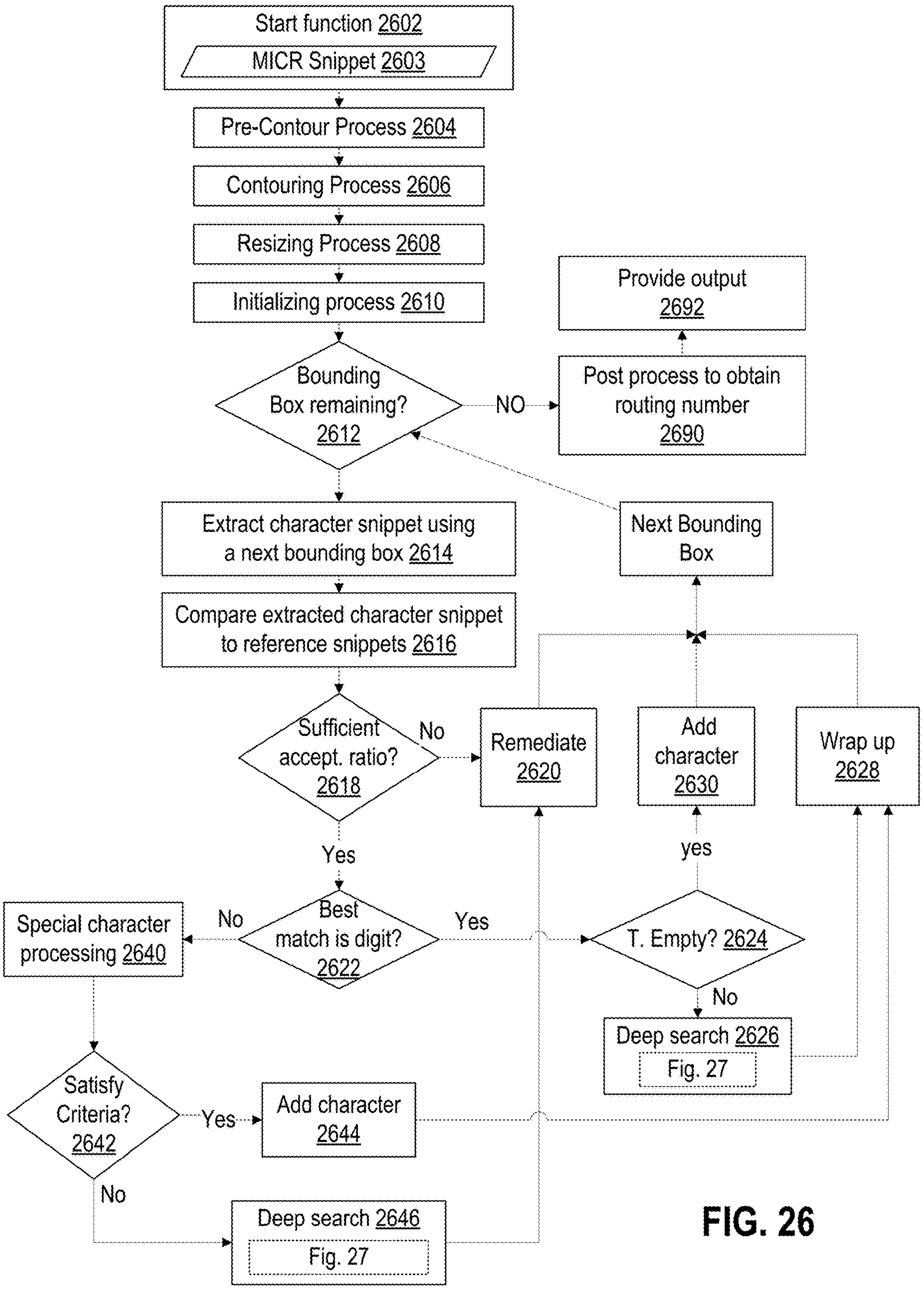
FIG. 26 illustrates an example specific implementation of a MICR OCR method.

FIG. 26 illustrates an example specific implementation of a MICR OCR method 2600. As an initial matter, this method 2600 is described with respect to various variables for ease of understanding. While these and other variables can be used in a variety of ways to achieve the techniques described herein, an example explanation of the variables is included in the table below:

| Variable Name | Data Type | Description |
|---|---|---|
| MICR_height | Integer | Stores the height of the MICR snippet |
| MICR_width | Integer | Stores the width of the MICR snippet |
| micr_ocr_final | String | Stores the result of performing optical character recognition on the MICR snippet. |
| micr_local_temp | String | A temporary string that saves special characters nickname and will be use in deep search function. |
| micr_local_history | List | Stores the coordinates and sizes of characters |
| micr_local_conf_score_history | List | Stores determined confidence scores |
| potential_special_character | Integer | Stores information about whether an associated character is potentially the "transit" special character. |
| curr_special_char_nickname | String | A nickname is assigned to each piece of a special character, such as either "r" for "rectangle" or "s" for "square". |

In addition to the above variables, reference will also be made to certain special MICR characters and their representations. Those include:

| Special Character | Name | Delimiter for | Represented as |
|---|---|---|---|
| ⑆ | Transit | Routing transit number | 'd' |
| ⑈ | On-us | Account number or serial number | 'c' |
| ⑇ | Amount | Check amount (when present) | 'b' |
| ⑉ | Dash | Routing numbers or account number parts | 'a' |

The method 2600 can begin with operation 2602.

At operation 2602, the MICR OCR process starts, such as by a calling program (e.g., a mobile banking application) executing a MICR OCR function and directly or indirectly providing a MICR snippet 2603. The MICR snippet 2603 can be an image or a data structure (e.g., array) produced based on an image or a portion thereof. The MICR snippet 2603 is provided in or converted into greyscale or pure black-and-white. Following operation 2602, the flow of the method 2600 can move to operation 2604.

Operation 2604 includes performing one or more pre-contouring operations. For example, the MICR snippet 2603 is scaled to a height of 250 pixels (or another height) while maintaining the aspect ratio of the MICR snippet 2603. Next, a median blur is applied to the MICR snippet 2603 (e.g., by calling the medial blur function of OPENCV 2 ("cv2") and then a dilation operation is performed on the blurred snippet (e.g., by calling cv2.dilate). Following operation 2604, the flow of the method 2600 can move to operation 2606.

Operation 2606 includes performing a contouring process. The contouring process includes splitting the MICR snippet 2603 into n pieces horizontally. Each piece is then converted into binary (e.g., using cv2.threshold function). Then the n pieces are merged back together in order, thereby recreating the MICR snippet 2603 but thresholded. Then a contouring function is applied (e.g., cv2.findContours) to obtain contours in the MICR snippet 2603. Then, a bounding box is determined for each contour. The bounding boxes are then filtered to remove bounding boxes that are merely noise (e.g., based on the dimensions or area of the bounding boxes). Then the remaining bounding boxes be stored in a data structure (e.g., a list) sorted according to their x coordinates.

Following operation 2606, the flow of the method moves to operation 2608.

In operation 2608, the MICR snippet is resized to an acceptable aspect ratio. For example, this process can include calculating the αth percentile of the height and width of the bounding boxes of the contours, where α is an integer, such as 75. Then it is determined whether the aspect ratio of that percentile of boxes is within an acceptable rage. As an example, the aspect ratio can be calculated as height divided by width, and the acceptable range is a ratio that is greater than 1.26 and less than 1.76, but other values can be predetermined and used. If the aspect ratio falls within this acceptable range or if the MICR snippet has already been resized as part of this operation, then the maximum size is set to the maximum of the heights and widths of the bounding boxes and the flow moves to operation 2610. Otherwise, if the aspect ratio is outside of the acceptable range, then the MICR snippet is resized by fixing either the height or the width and scaling the other dimension of the MICR snippet. For instance, width is fixed and the height is set according to the equation:

$$\operatorname{int}\left(\frac{1.41}{(MICR_{height}/MICR_{width})}\right)$$

Where int( ) is a function that converts a value (e.g., a floating point value) to an integer value, 1.41 is a predetermined value, MICR_height is the height of the MICR snippet and MICR_width is the width of the MICR snippet. After resizing the MICR snippet, the flow can return operation 2606.

Operation 2610 includes an initializing process. For example, one or more variables used for following operations are initialized. Example variables include micr_ocr_final, micr_local_temp, and micr_local_history, among others or variations thereof. This can also include adding the bounding boxes or representations thereof to a list or other data structure. Following operation 2610, the flow moves to operation 2612.

Operation 2612 includes determining whether there are any remaining, unprocessed bounding boxes. If not, the flow of the method mover to operation 2690.

Operation 2690 includes performing one or more post-processing operations to identify a routing number. For example, these can include one or more operations described elsewhere herein, including in relation to operation 2412. Following operation 2690, the flow of the method can move to operation 2692.

Operation 2692 includes providing output from this process. The output can include the routing number. The output can further include useful metadata, such as a confidence score associated with that routing number.

Returning to operation 2612, which includes determining whether there are any remaining, unprocessed bounding boxes, if there are remaining unprocessed bounding boxes, the flow of the method can move to operation 2614.

Operation 2614 includes extracting a character snippet using a next bounding box. This can include cropping the MICR snippet using the next bounding box to form the character snippet. For instance, values in the MICR snippet corresponding a region within the next bounding box can be copied or otherwise used to form the character snippet. In some instances, a duplication and cropping process is applied, such as by duplicating the MICR snippet and then cropping that duplicated image down to the desired character. In at least some implementations, the extracted character snippet is centered on a square canvas and then scaled to a predetermined size (e.g., 64 pixels by 64 pixels) as a finishing step to form the extracted character snippet. Following operation 2614, the flow of the method can move to operation 2616.

Operation 2616 includes comparing the extracted character snippet to reference snippets in a library. In an example, reference snippets in the library are the same predetermined size as the character snippet and are also black-and-white. The reference library can include digits 0-9 as well as special characters used in MICR lines.

In some examples, the library is created using MICR snippets (or character snippets thereof) that a prior MICR reading technique failed on. For example, there may be an offline process for building a snippet library that involves, for an existing MICR OCR process, selecting one or more checks where existing MICR reading fails. The characters thereof that were not read appropriately (or were read appropriately but for which there was a sufficiently low confidence) are snipped to form character snippets. A variety of snipping techniques can be used, even for example manual snipping. The benefit of that new character snip on MICR reading is evaluated by using that snippet in testing snippet library used on a test check population. If the snippet results in an improvement for the test check population then it can be added to the library used. The library can be pruned based on image similarity measure and library size.

The comparing can take any of a variety of forms. In an example, all reference templates in the library are compared to the extracted character snippet by calculating an exclusive-or (XOR) operation between them and summing the values (e.g., counting how many 1s are in the result of the XOR). As a result of this process, the closer the match, the lower the sum will be. Then an acceptance ratio is calculated, such as by dividing the sum of values resulting from the XOR by a sum of black pixels (e.g., the character pixels) or white pixels (e.g., the background pixels) in the character snippet.

In an example, for each respective character snippet of the one or more character snippets, for each respective template of the one or more templates: an exclusive- or operation between the respective character snippet and the respective template is calculated. The resulting values are summed to form a difference score. A character-template pair having the lowest difference score is identified, where the character-template pair comprises the respective character snippet and one of the one or more templates. This score can be used later to assign to the respective character snippet a character associated with the template of the character-template pair.

Following operation 2616, the flow of the method can move to operation 2618.

In operation 2618, it is determined whether the acceptance ratio satisfies a threshold. If not, the flow moves to operation 2620.

In operation 2620, remediation occurs. In some instances, this includes creating a modified character snippet, pushing it into the data structure and returning to operation 2612. In Some examples, the remediation includes adding an indication that a character is unknown to the micr_ocr_final variable. In some examples, this is performed if the length of the micr_local_temp variable is greater than or equal to a value, such as six.

Returning to operation 2618, if it is determined that the acceptance ratio does satisfy the threshold, then the flow of the method 2600 moves to operation 2622.

Operation 2622 includes determining whether the best match is a digit. For example, if the reference template that had the minimum sum (e.g., highest correspondence) corresponds to a digit (e.g., a number 0-9), then the best match is considered a digit. If the best match is a digit, then the flow moves to operation 2624.

Operation 2624 includes determining whether the variable micr_local_temp is empty. For instance, micr_local_temp may be an empty string. If not, then the flow of the method moves to operation 2626.

Operation 2626 includes performing a deep search process. An example deep search process is described in more detail in FIG. 27. Performing the deep search process can include starting the deep search process with the following inputs:

| Input Variable | Value |
|---|---|
| subs | ‘ ’ |
| micr_char | ‘ ’ |
| no_specal_char | True |

As a result of the deep search process, a confidence score is received. This can be appended to a global confidence scores list. The result of the process can be added to micr_ocr_final. In some examples, an identifying unique character can be added (e.g. “?d?”) to micr_ocr_final if micr_local_temp is ‘ss’, or ‘?c?’ is added if micr_local_temp is ‘rr’. Here, “?d?” or “?c?” means a potential character d. Later on, the process can convert it to an actual “d” special character or not, such as based on some regex condition in the post processing. In some examples, if micr_local_temp is still empty after the deep search, then the process can check the conditions and assign special characters based on the value of micr_local_temp as described in the text. Following operation 2626, the flow of the method 2600 can move to operation 2628.

Operation 2628 is a wrap-up operation. One or more wrap up steps can be performed. For instance, a mean of the micr_local_conf_score_history is added to global confidence scores list. In addition one or more temporary variables are reset or allowed to be reused as though they have been reset. The variables can include micr_local_temp, micr_local_history, potential_special_character, and micr_local_conf_score_history, other variables, or combinations thereof. Following this operation, the flow of the method 2600 can move to operation 2612 for processing of a next bounding box.

Returning to operation 2624, if micr_local_temp is empty, then the flow of the method 2600 moves to operation 2630.

Operation 2630 includes adding the character to a variable storing the characters in the MICR line (e.g., micr_ocr_final). Then a global confidence score variable can be updated based on the acceptance ratio associated with this character determination. Then the next bounding box is selected and the flow of the method 2600 moves to operation 2612.

Returning to operation 2622, if the best match is a not digit, then the flow moves to operation 2640 for special character processing.

Operation 2640 includes various operations. In an example, operation 2640 includes setting curr_special_char_nickname to a nickname corresponding to this piece of the special character. The nicknames are not "rss" or "sss" or "ssr". Rather, special characters are composed of three pieces and nicknames can be assigned to each piece. For example, if the first piece looks like a rectangle, the nickname will be "r". If it is a square, then the nickname will be "s". Now if the processing finds a snippet that looks like a rectangle, "r" is added to the micr_local_temp. If the next snippet is a square, then "s" is added to the micr_local_temp and so on. If the micr_local_temp becomes "rss", this indicates special character "d". It is used in deep search. This is how the process recognizes special characters.

The nickname is then added to the micr_local_temp variable. Then [x,y,w,h] of this character box is appended to micr_local_history list. Then a confidence score is calculated based on the acceptance_ratio and append it to micr_local_conf_score_history list.

If the length of the variable micr_local_history is greater than one, then the slope of a line that connects the centroid of the last two items in the micr_local_history is calculated. If the calculated slope is less than a predetermined slope threshold (e.g., 0.05), then one is added to potential_special_character (or if it is a Boolean, then it can be set to TRUE), otherwise nothing is added. Is this because certain special characters may not be symmetrical about the middle of the MICR line (e.g., thereby having a particular slope). Here, the potential special character can be A (e.g., potential_A) because "rrr" corresponds to three rectangles in one horizontal line that indicates special character a.

Following operation 2640, the flow of the method 2600 moves to operation 2642.

In operation 2642, it is determined whether criteria are satisfied. In an example, the criteria is all of (1)-(3) being true: (1) micr_local_temp is equal to any values selected from the group consisting of: "rrr", "rss", "sss", "ssr", "ss", and "sr"; (2) the length of the variable potential_special_character is greater than zero; and (3) all items of potential_special_character are 1.

If the criteria are satisfied, then the flow of the method 2600 moves to operation 2644.

Operation 2644 includes adding a character to micr_ocr_final. In some examples, that character is 'a', which corresponds to a special character. Following operation 2644, the flow of the method 2600 can move to operation 2628.

Returning to operation 2642, if the criteria are not satisfied, then the flow can move to operation 2646.

Operation 2646 includes looping through a dictionary data structure and performing a deep search. As discussed above, an example deep search process is described in more detail in FIG. 27. The dictionary data structure can include the values {'rrs': 'c', 'rrrr': 'c', 'rss': 'd', 'ssr': 'a', 'sss': 'a', 'rrr': 'b'}. Here, the keys represent the combination of rectangles and squares for each special character, and the values of the dictionary represent the special characters to be added to micr_ocr_final. Performing the deep search process in this operation can include starting the deep search process with the following inputs:

| Input Variable | Value |
|---|---|
| subs | Key |
| micr_char | Value (e.g., determined based on the results of the dictionary above) |
| no_specal_char | False |

where key corresponds to the current key in the dictionary and value corresponds to the value associated with the key in the data structure. Other input parameters are set to their current values.

As a result of the deep search process, a confidence score is received. This can be appended to a global confidence scores list. The result of the process can be added to micr_ocr_final. In some examples, '?d?' can be added to micr_ocr_final if micr_local_temp is 'ss' or '?c?' is added of micr_local_temp is 'rr'. Following operation 2646, the flow of the method 2600 can move to operation 2620.

FIG. 27 illustrates a method 2700 for performing a deep search. When the method begins, there can be various inputs. In some examples, the inputs include one or more of Subs, micr_char, micr_ocr_final, Micr_local_temp, Micr_local_history, Micr_img_binary, Size_max, Micr_snippets, Micr_snippets_char, Potential_special_character, Micr_local_conf_score_history, No_special_char, other variables, or combinations thereof.

While these and other variables can be used in a variety of ways to achieve the techniques described herein, an example explanation of the variables is included in the table below:

| Variable Name | Data Type | Description |
|---|---|---|
| subs | String | A predefined string of rectangles and squares, representing either a broken digits or special characters. |
| micr_char | String or char | Special character name (a, b, c, or d) |
| micr_ocr_final | String | When the process completes, this will store the result of the optical character recognition process (the recognized characters) |

-continued

| Variable Name | Data Type | Description |
|---|---|---|
| micr_local_temp | String | A temporary string that saves special characters nickname and will be use in deep search function. |
| micr_local_history | List | Stores the coordinates and sizes of characters |
| micr_img_binary | various | Stores a representation of the binary (black or white pixel) MICR snippet. This could be, for example, an array (e.g., NUMPY array) of integers or Booleans representing the pixel values. |
| size_max | Integer | The maximum length of one side of the square of the character snippet for comparison |
| micr_snippets | List of arrays | Character snippets library in array format (e.g., NUMPY array format) |
| micr_snippets_char | List | List of MICR character names in the library |
| potential_special_character | List | List of zeros and ones indicating if two consecutive bounding box have similar centroid y coordinate. |
| micr_local_conf_score_history | List | List of confidence scores for all the previous pieces that has not recognized yet. |
| no_special_char | Boolean | If it is True, that means the process does not expect any special character in the pieces that have not recognized yet. |

The method can begin with operation 2702.

Operation 2702 includes setting it_can_be_D to True if all elements of potential_special_character are 1 and the length of potential D is greater than zero. Otherwise, it_can_be_D is set to False.

Following operation 2702, the flow of the method 2700 moves to operation 2704 if no_special_character is true and operation 2708 otherwise.

Figure 28:
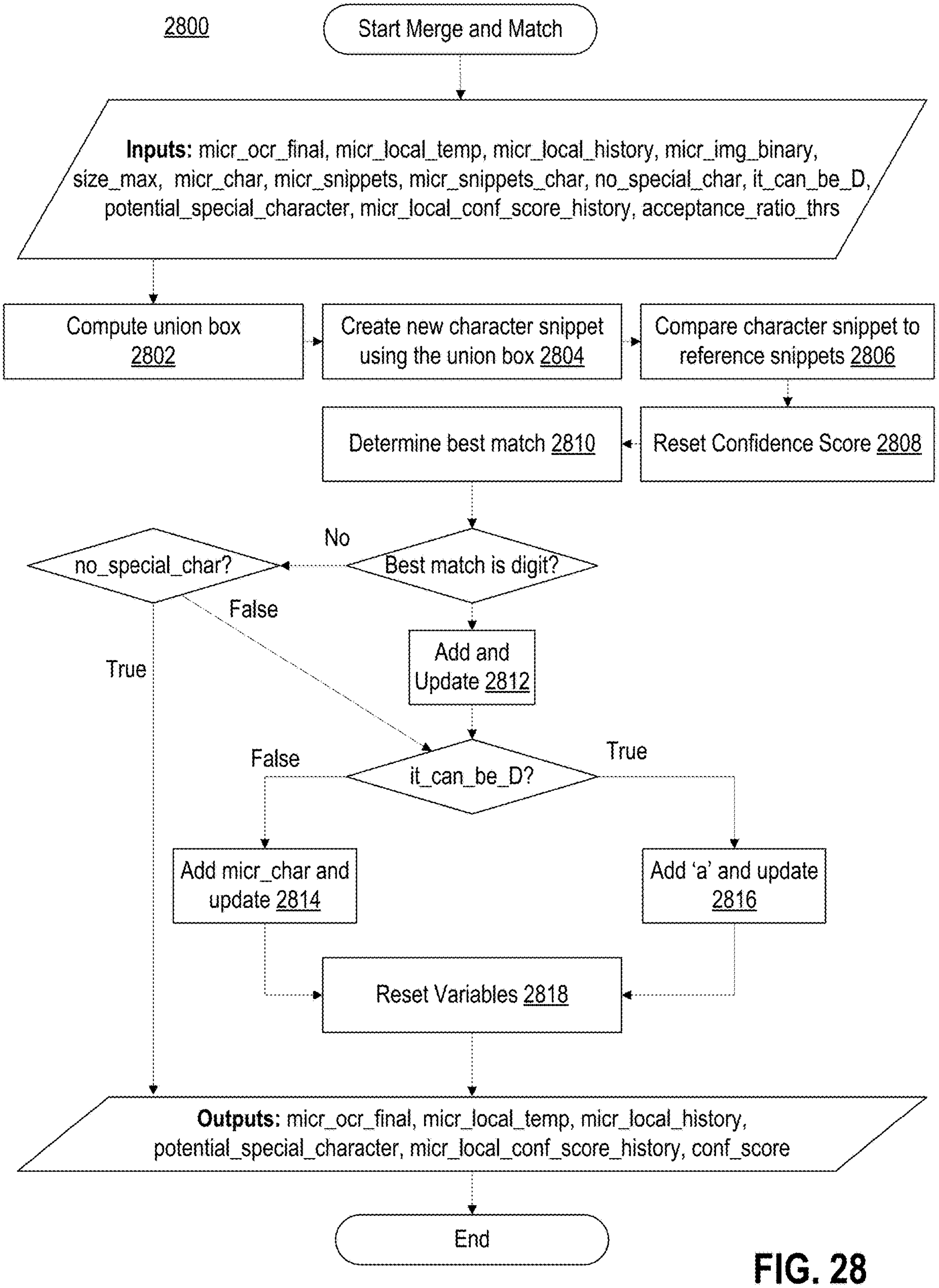
FIG. 28 illustrates a method for performing a merge and match process.

Operation 2704 includes executing a merge and match function, such as is described in relation to FIG. 28. Following performing the merge and match, the method 2700 can move to operation 2706.

Operation 2706 includes ending the deep search function. This can include returning or setting one or more output variables. These can include one or more of: Local_temp_rrs, micr_ocr_final, Micr_local_temp, micr_local_history, potential_special_character, micr_local_conf_score_history, conf_score, other variables, or combinations thereof. Then a process flow can move to a calling function (e.g., operations 2626 or 2646 of FIG. 26, above).

Operation 2708 includes finding the index of subs in micr_local_temp and call it local_temp_rrs. This can include finding the index of subs defined above within the micr_local_temp and storing in local_temp_rrs.

Following operation 2708, if local_temp_rrs is greater than −1 and is not 0, then the flow of the method 2700 moves to operation 2710.

Operation 2710 Operation 2710 includes merging and matching the first local_temp_rrs characters of micr_local_history as described in relation to FIG. 28. Following operation 2710, the flow can move to operation 2706.

Following operation 2708, if local_temp_rrs is 0 and it_can_be_D is True, then the flow of the method 2700 moves to operation 2712.

Operation 2712 includes adding 'a' to micr_ocr_final. Following operation 2712, the flow of the method can move to operation 2720.

Following operation 2708, if local_temp_rrs is greater than −1 and is False, then the flow of the method 2700 moves to operation 2714.

Operation 2714 includes adding micr_char to micr_ocr_final. After this step, the flow of the method moves to operation 2720.

Operation 2720 includes setting the conf_score and resetting certain variables. In some examples, the conf_score is set to the mean of micr_local_conf_score_history. In some examples, the variables being reset (e.g., to zero or None) are micr_local_temp, micr_local_history, and potential_special_character. Following operation 2720, the flow of the method can move to operation FIG. 28 illustrates a method 2800 for performing a merge and match process. When the method begins, there can be various inputs. In some examples, the inputs include one or more of micr_ocr_final, Micr_local_temp, Micr_local_history, Micr_img_binary, Size_max, Micr_char, Micr_snippets, Micr_snippets_char, Nospecial_char it_can_be_D, Potential_special_character, Micr_local_conf_score_history, acceptance_ratio_thrs, other variables, or combinations thereof.

While these and other variables can be used in a variety of ways to achieve the techniques described herein, an example explanation of the variables is included in the table below:

| Variable Name | Example Data Type | Description |
|---|---|---|
| micr_ocr_final | String | Stores the result of performing optical character recognition on the MICR snippet. |
| micr_local_temp | String | A temporary string that saves special characters nickname and will be use in deep search function. |
| micr_local_history | List | Stores the coordinates and sizes of characters |
| micr_img_binary | Array of Integers | Stores a representation of the binary (black or white pixel) MICR snippet. This could be, for example, an array (e.g., NUMPY array) of integers or Booleans representing the pixel values. |
| size_max | Integer | The maximum of height and width of all bounding boxes from contours |
| micr_char | String | If a good match is found, add micr_char to the micr_ocr_final string. |
| micr_snippets | List of arrays | Character snippets library in numpy array format |
| micr_snippets_char | List | List of MICR character names in the library |
| no_special_char | Boolean | If it is True, that means that the process should not expect any special character in the pieces that have not recognized yet. |
| it_can_be_D | Boolean | Stores whether the character at issue can be D |

-continued

| Variable Name | Example Data Type | Description |
|---|---|---|
| potential_special_character | Integer | Stores information about whether an associated character is potentially a special character. |
| Micr_local_conf_score_history | List | List of confidence scores for all the previous pieces that the process has not recognized yet. |
| acceptance_ratio_thrs | Float | Acceptance ratio threshold. If the acceptance_ratio is smaller than the threshold, it is called a good match. |

Potential_special_character can be a list of integers and the average of those tells if it is true or not.

The method 2800 can begin with operation 2802.

Operation 2802 includes computing a union box. The union box can be a bounding box created based on one or more existing bounding boxes for the MICR snipet. For example, the union box can be calculated given the variable micr_local_history. Following operation 2802 the flow of the method can move to operation 2804.

Operation 2804 can include creating a new character snippet using the union box of operation 2802. In an example, the creating of the new character snippet can include one or more steps discussed above. In an example, the operation includes extracting data from the MICR snippet (e.g., stored in the micr_img_binary variable) using the bounds defined in the union box. A square, white canvas is created having a size being the greater of size_max, the width of the union box, and the height of the union box. Then the extracted data from the MICR snippet using the union box is centered in the canvas. The resulting snippet is then resized to a predetermined size, such as is stored in the size_max variable or other variable. Following operation 2804, the flow of the method 2800 can move to operation 2806.

Operation 2806 includes comparing the new character snippet to reference snippets. This can be similar to one or more techniques discussed above. In some examples, the operation can include one or more of the following steps. The method can loop through images in a library of reference characters. For each reference character image in the library, the method calculates the XOR between the new character snippet created above with the reference character image. Then the XOR values for that pair are summed and stored in an array or other data structure. After this has been completed for some or all of the reference images in the library, the minimum of the summed XOR values is found and an acceptance score is calculated. For instance, the acceptance score can be a ratio of minimum XOR over the sum of black pixels in the new character snippet. Following operation 2806, the flow of the method 2800 can move to operation 2808.

Operation 2808 can include resetting a confidence score. For instance, this operation can include setting a conf_score variable to an empty list. This can be a local list that will be passed as output to the calling function. Following operation 2808, the flow of the method 2800 can move to operation 2810.

Operation 2810 includes determining a best match. This can include selecting the character corresponding to the reference character having the minimum XOR. In some examples, if the best match is not sufficiently close (e.g., does not satisfy a threshold), an error can be thrown. Following operation 2810, the flow of the method can move to operation 2812 if the best match is a digit. Otherwise, the flow of the method 2800 can output and end if the variable no_special_character is True. If no_special_charcter is false, then the flow of the method 2800 can move to operation 2814 if it_can_be_D is False or operation 2816 if it_can_be_D is True.

Operation 2812 includes adding the recognized character to the micr_ocr_final variable and updating the global conf_score list using the acceptance_ratio. Following operation 2812, the flow of the method can move to operation 2814 if it_can_be_D is false and operation 2816 otherwise.

Operation 2814 includes adding micr_char to micr_ocr_final and updating the global conf_score list using the mean of micr_local_conf_score_history. Following operation 2814, the flow of the method 2800 can move to operation 2818.

Operation 2816 includes adding 'a' to micr_ocr_final and updating the global conf_score list using the mean of micr_local_conf_score_history. Following operation 2816, the flow of the method can move to operation 2818.

Operation 2818 includes resetting (e.g., emptying or setting to null) certain variables. These can include micr_local_conf_history, micr_local_temp, micr_local_history, potential_special_character. Following operation 2818, the method 2800 can return to the calling function. This can include returning or setting certain variables. These can include micr_ocr_final, micr_local_temp, micr_local_history, potential_special_character, micr_local_conf_score_history, and conf_score.

Confidence Score Techniques

Various techniques have been described herein relating to confidence scores. In an example implementation, confidence scores can be determined based on the following equation:

$$micr_{confidence} = \begin{cases} microbj_{confidence} \times charactermatch_{score} & \text{if } \mathrm{routing}_{checksum} \text{ is valid} \\ microbj_{confidence} \times \varepsilon \times charactermatch_{score} & \text{if } \mathrm{routing}_{chesum} \text{ not valid} \end{cases}$$

where e=0.01 to indicate routing number checksum failed and e=1.0 to indicate the routing number checksum is valid.

If a valid routing number is found then: $conf_{score}=OD_{conf}\times$ mean (conf_score_list)

If a valid routing number is not found, then: $conf_{score}=OD_{conf}\times$mean (conf_score_list). But in some instances, even without finding a valid routing number, a function can still return the detected characters (e.g., the micr_ocr).

Sliding Window on Spline to Find Missed MICR Characters

Due to warping or other issues in the captured check image or underlying check, it can be difficult to accurately and reliably identify individual MICR characters using traditional techniques. While the above techniques provide improvements, there is room for further improvement. One way to improve the accurate identification of individual characters in a MICR line is through a sliding window approach, such as is described in relation to FIG. 29.

Figure 29:
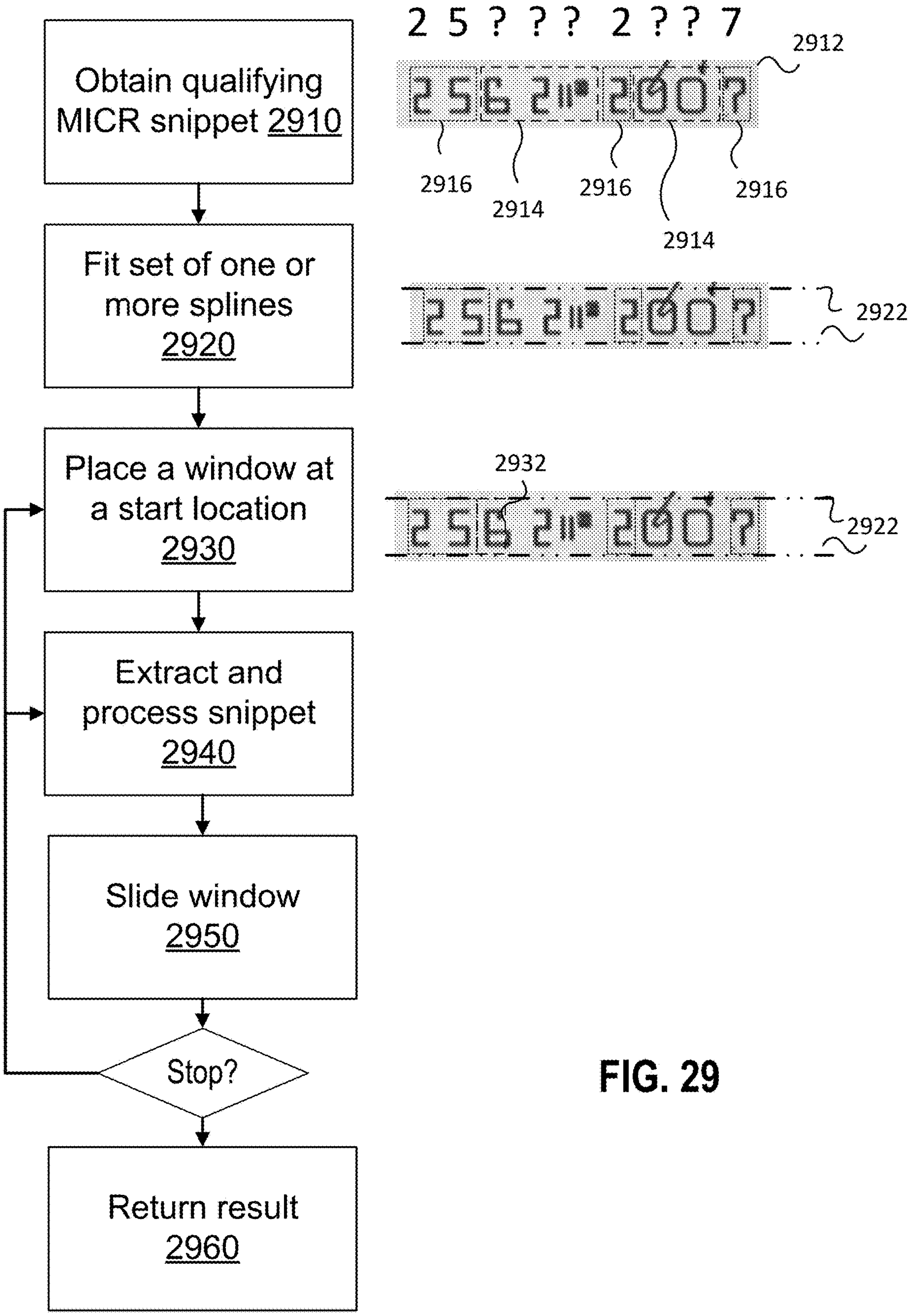
FIG. 29 illustrates a method for applying a sliding window approach to identify characters in a MICR line.

FIG. 29 illustrates a method for applying a sliding window approach to identify characters in a MICR line. In some examples, the method is applied in situations where traditional techniques or the techniques described above result in identifying characters with a gap between them having a size greater than a threshold (e.g., corresponding to the width of one MICR character). The method can begin with operation 2910.

Operation 2910 includes obtaining a MICR snippet 2912 that qualifies for enhanced processing. In some examples, the size of the MICR snippet 2912 is artificially increased to capture additional image data that may include missing characters. In some embodiments, artificially increasing the size can include increasing the size of an initial bounding box around the MICR by a fixed percent (e.g., 33%). In some embodiments, artificially increasing the size can include dynamically determining an increased size (e.g., based on a current amount of the check image that the MICR snippet 2912 takes up). Enhanced processing can include determining that the MICR snippet 2912 includes gaps or missing characters. For example, enhanced processing can include determining that fewer than an expected number of characters were detected. As another example, enhanced processing can include obtaining a MICR snippet 2912 that has one or more gaps 2914 between two or more detected sets 2916 of characters, where the one or more gaps 2914 have a width greater than a threshold. Following operation 2910, the flow of the method can move to operation 2920.

Operation 2920 includes fitting a set of one or more splines 2922 to the MICR snippet. This can include the splines 2922 to the top and bottom of a detected character window. For example, a top spline 2922 can be fit such that the top spline 2922 contacts the tops of at least two detected characters (e.g., the two top most vertices of each character's bounding box). Likewise, the bottom spline 2922 can be fit such that the bottom spline 2922 contacts the bottom of the at least two detected characters (e.g., the bottommost vertices of each of the character's bounding box). In some examples, the splines 2922 may be straight. In other examples, the splines 2922 may be curved. In some examples, there is a single spline 2922 that passes through a centroid or other middle point of each of the characters rather than being disposed at the top or bottom.

In an example, to define the splines 2922, first support characters are found. For example, a first set of bounding boxes are created for the characters in the MICR snippet. Then statistical outliers are identified within the first set of bounding boxes (e.g., bounding boxes having one or more characteristics more than a threshold amount different from the other characters). Then one or more boxes having the largest total heights or having a highest point and lowest point of the remaining boxes are determined. In certain embodiments, support boxes are defined as bounding boxes selected from an initial set of bounding boxes after removal of outliers.

In an example, to define the splines 2922, support characters are first identified. A first set of bounding boxes is generated for the characters in the MICR snippet. Statistical outliers are then removed from the first set. For example, a bounding box may be identified as an outlier if one or more of its characteristics differ from the corresponding characteristics of other boxes by more than a threshold amount.

From the remaining bounding boxes, a subset is selected to serve as support boxes. In certain embodiments, support boxes are defined as bounding boxes selected from the initial set after outlier removal, based on one of at least two selection criteria.

In one embodiment, the support boxes are selected based on having the largest total heights among the remaining bounding boxes. For example, a subset of bounding boxes with the greatest vertical spans may be identified and designated as support boxes.

In another embodiment, the support boxes are selected based on having the highest top point and the lowest bottom point among the remaining bounding boxes. For example, one bounding box may be selected for having the highest vertical position among top edges, and another for having the lowest vertical position among bottom edges.

The highest point of one or more of the support boxes may be used to define the vertical position of an upper spline 2922, and the lowest point of one or more of the support boxes may be used to define the vertical position of a lower spline 2922.

Following operation 2920, the flow of the method can move to operation 2930.

Operation 2930 placing a window 2932 at a start location along the set of one or more splines 2922. This can include starting the window at a detected character. This can include starting the window such that a left side of the window contacts a right side of the last detected character prior to a given gap. The size of the window can be set to a particular size, such as the width of a detected zero, five, or eight character. Following operation 2930, the flow of the method can move to operation 2940.

Operation 2940 extracting the contents of the window as a character snippet and processing the snippet. The processing can be performed using any of the one or more techniques described above for detecting a character present in a snippet, such as using the XOR technique. Following operation 2940, the flow of the method can move to operation 2950.

Operation 2950 includes sliding the window 2932 along the splines to the right (e.g., a positive x direction depending on how axes are set up). This can involve not only moving the window 2932 so that its centroid is further right than it was before but also moving the window up or down to accommodate a change in the spine that it is following. For example, the top of the window may follow the top spline and the bottom of the window may follow the bottom spline. In addition or instead, a centroid of the window may follow a centroid spline.

Following operation 2950, the flow of the method can move to operation 2960 if a stopping criteria is met, otherwise, the flow of the method can return to operation 2940 or 2930. In some examples, the stopping criteria is whether the window has traversed a current gap. This can be determined based on one or more of a variety of factors, such as whether the window hits or overlaps with a detected character, has traversed a number of pixels corresponding to the gap, other factors, or combinations thereof. The flow can return to operation 2930 if there is at least one additional gap remaining to be analyzed after the current gap, and in that operation 2930 the window can be placed at a start location of that additional gap. The flow can return to operation 2940 if the gap that is currently being analyzed has not been fully traversed.

Operation 2960 can include returning a result. This can include returning one or more detected characters that are an acceptable match.

Search Regions to Find Missed MICR Characters

In another example technique for finding missing MICR characters, search windows can be identified and used to identify MICR characters. An example method 3100 for performing this technique is shown and described in FIG. 31, which is made up of FIG. 31*a* and FIG. 31*b*. The method 3100 can begin with operation 2910.

Operation 2910 can include obtaining a MICR snippet 2912. Operation 2910 of FIG. 31*a* can be the same as or similar to operation 2910 described above in relation to FIG. 29. Operation 2910 can involve obtaining an image containing characters. Following operation 2910, the flow of the method 3100 can move to operation 3110.

Operation 3110 includes determining bounding boxes 31012 around characters within the MICR snippet 2912. The creation of bounding boxes 31012 can be performed in any of a variety of ways. In some examples, an OCR process is applied to generate bounding boxes (and the detected characters can be discarded). In some embodiments, object detection algorithms are applied to determine bounding boxes 31012. In some embodiments, template matching can be employed, where portions of the image are compared to a library of character templates to identify matches and create bounding boxes around them. In some embodiments, machine learning models, such as trained neural networks, can also be utilized to predict bounding box locations based on patterns learned from character recognition tasks. Additionally, in some embodiments, edge detection algorithms can identify contours within the image that correspond to character boundaries, facilitating bounding box creation. In some embodiments, color segmentation techniques may isolate areas of the image that match character shapes, allowing for bounding box generation. In some embodiments, connected component analysis can group pixels forming distinct characters, which can then be enclosed in bounding boxes. In some instances, the detection process may fail to properly detect one or more characters of the MICR snippet 2910. Such instances may result in the operation determining bounding boxes for a first subset of the characters within the MICR snippet 2912, but a second subset of the characters are not associated with a respective bounding box of the bounding boxes. Following operation 3110, the flow of the method can move to operation 2920.

Operation 2920 includes fitting a set of one or more splines. Operation 2920 of FIG. 31*a* can include one or more aspects of the fitting of splines described above in relation to FIG. 29. Following operation 2920, the flow of the method can move to operation 3130.

Operation 3130 includes defining search regions 31032 which make up a set of search regions. Each search region 31032 of the set of search regions can be defined as a region (e.g., boxes) within the MICR snippet 2912 that are outside of existing bounding boxes 31012 and which may contain one or more undetected characters. For example, the search regions 31032 can be defined by identifying discrete regions (e.g., based on corner points) bounded at the top and bottom by respective top and bottom splines and bounded on the left and right by respective left and right bounding boxes (or edges of the MICR snippet 2912). In an example, each respective search region of the set of search regions is bounded by (1) the top spline or a top of the snippet, (2) the bottom spline 'or a bottom of the snippet, (3) a right side of a bounding box to the left of the respective search region or a left side of the snippet, and (4) a left side of a bounding box to the right of the respective search region or a right side of the snippet. This results in a set of zero or more search regions 31032.

In some embodiments, the search region definition process involves systematic analysis of spatial relationships between the first set of bounding boxes 31012 to identify areas that may contain undetected characters. The mobile device 104 calculates the distances between adjacent bounding boxes 31012 and compares these distances to predetermined thresholds based on expected character spacing for the particular font being processed. When the distance between two adjacent bounding boxes 31012 exceeds the average character width plus a margin factor (e.g., 1.5 times the average character width), the intervening space is designated as a candidate search region 31032.

In an example implementation, each search region 31032 is geometrically defined by calculating boundary coordinates based on the positions of surrounding bounding boxes 31012 and any fitted splines 2922. The search region boundaries are established through coordinate calculations that determine: (1) a top boundary defined by the upper spline 2922 or the topmost edge of the image snippet 2912, (2) a bottom boundary defined by the lower spline 2922 or the bottommost edge of the image snippet 2912, (3) a left boundary defined by the right edge of the nearest bounding box 31012 to the left or the left edge of the image snippet 2912, and (4) a right boundary defined by the left edge of the nearest bounding box 31012 to the right or the right edge of the image snippet 2912. This geometric definition ensures that search regions 31032 encompass all areas within the image snippet 2912 that are not already covered by existing bounding boxes 31012.

The filtering process for search regions 31032, in some embodiments, includes dimensional analysis and pixel density evaluation to eliminate regions unlikely to contain meaningful character data. A search region 31032 is removed from the set if its width or height dimensions are less than a threshold percentage (e.g., 30%) of the average dimensions of the detected bounding boxes 31012 in the first set. This dimensional filtering prevents the processing of regions that are too small to contain complete characters. Additionally, the mobile device counts the number of "hot" pixels within each search region 31032, where hot pixels are those having intensity values indicative of character content (e.g., black pixels in a binary image where characters appear as black on white background). Search regions 31032 containing fewer than a threshold number of hot pixels (e.g., less than 50 pixels) are discarded as likely containing only noise, background artifacts, or insufficient character content.

The search region splitting process enables the identification of multiple characters within a single search region 31032 that may be large enough to encompass more than one character. The mobile device performs column-wise pixel value summation by iterating through each vertical column of pixels within the search region 31032 and calculating the sum of pixel intensity values for that column. This process generates a one-dimensional array of sums corresponding to the horizontal position across the search region 31032, creating a projection profile that reveals the distribution of character content across the width of the search region 31032.

To identify character boundaries within the search region 31032, the mobile device 104 analyzes the array of column sums to detect local maxima and minima that indicate character positions and inter-character spaces. In embodiments where characters appear as dark pixels on a light background, local maxima in the sum array indicate columns with high concentrations of character pixels, while local minima indicate spaces between characters. The threshold for identifying significant local maxima or minima is determined through statistical analysis of the sum values, such as calculating the mean and standard deviation of the sums and setting the threshold at one standard deviation above or below the mean, ensuring that only statistically significant features are used for boundary detection.

Upon identifying local maxima or minima that satisfy the threshold criteria, the mobile device determines character boundaries by locating the positions of these statistical features within the search region 31032. The boundary positions are used to subdivide the original search region 31032 into multiple sub-search regions 31042, each likely to contain a single character. For example, if two local maxima are detected within a search region 31032 with a local minimum between them, the mobile device creates a boundary at the local minimum position, resulting in two sub-search regions 31042. The original parent search region 31041 is then replaced in the set of search regions with the newly created sub-search regions 31042, effectively increasing the granularity of character detection.

The mobile device 104 validates each sub-search region 31042 before adding it to the final set by ensuring that the sub-search region 31042 dimensions are sufficient to contain a character and that the sub-search region 31042 contains an adequate number of hot pixels. Sub-search regions 31042 that fail these validation criteria are discarded to prevent processing of regions unlikely to contain meaningful character data. This validation process maintains processing efficiency by focusing computational resources on regions with the highest probability of containing detectable characters.

In some embodiments, the resulting search regions 31032 can be used as-is. In some embodiments, the resulting search regions 31032 can be filtered to improve processing efficiency. In an example implementation, filtering can include determining whether each respective search region could contain a MICR character. This can include determining whether the dimensions of the search region are large enough to encompass a MICR character (this can include comparing the dimensions to the dimensions of the bounding boxes detected in operation 3110 and throwing a search region out if it is less than a threshold percentage of a size of the detected bounding boxes). In addition or instead, a search region can be discarded if it contains less than a threshold number of "hot" pixels (e.g., pixels that may make up a character, which may be black pixels if the characters are black on a white background or white if the characters are white on a black background in the MICR snippet 2910).

The remaining search regions 31032 can be used for further processing. The flow of the method 3100 can move to operation 3140.

Figure 31A:
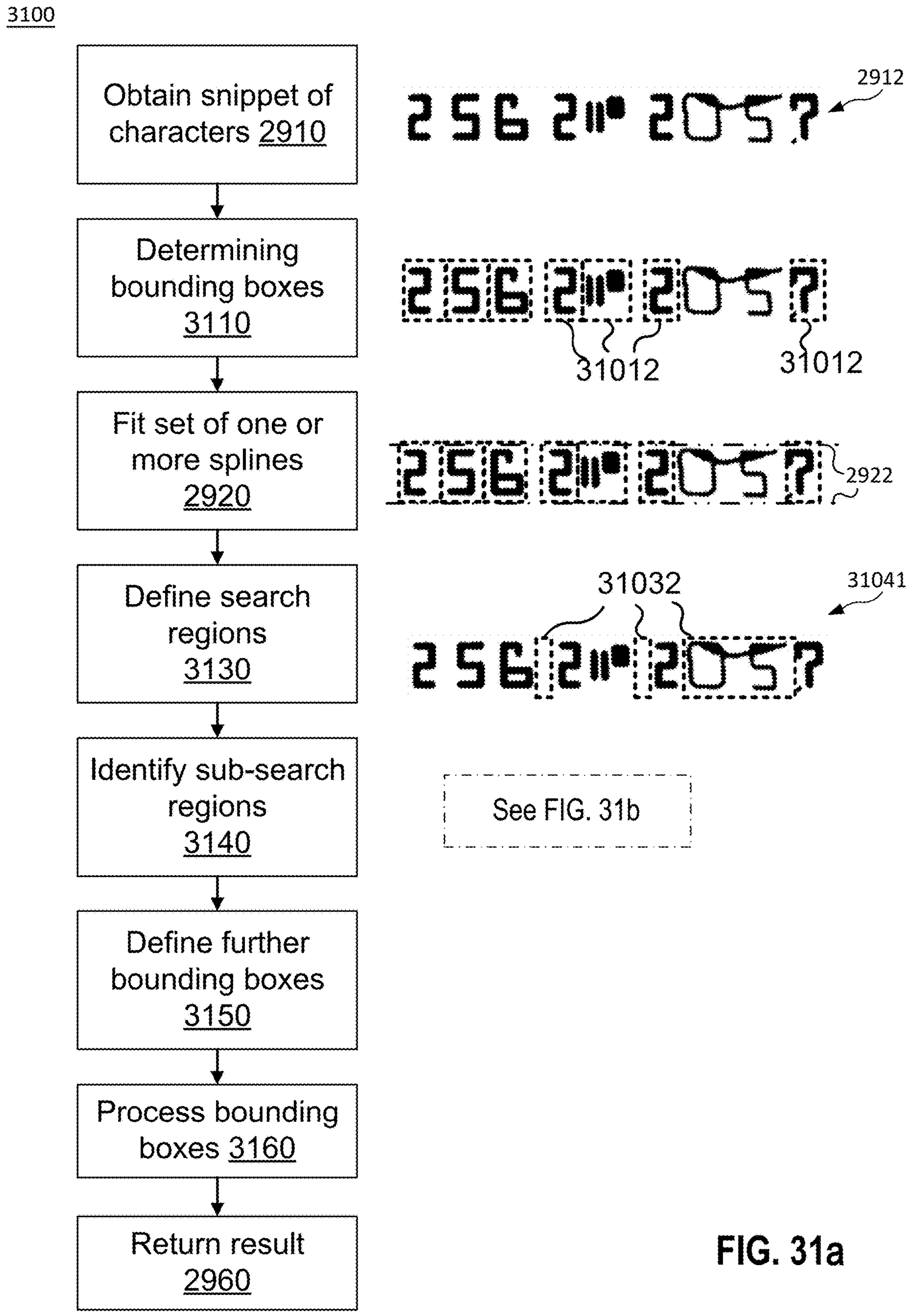
FIG. 31*a* illustrates a portion of an example technique for finding missing characters.
Figure 31B:
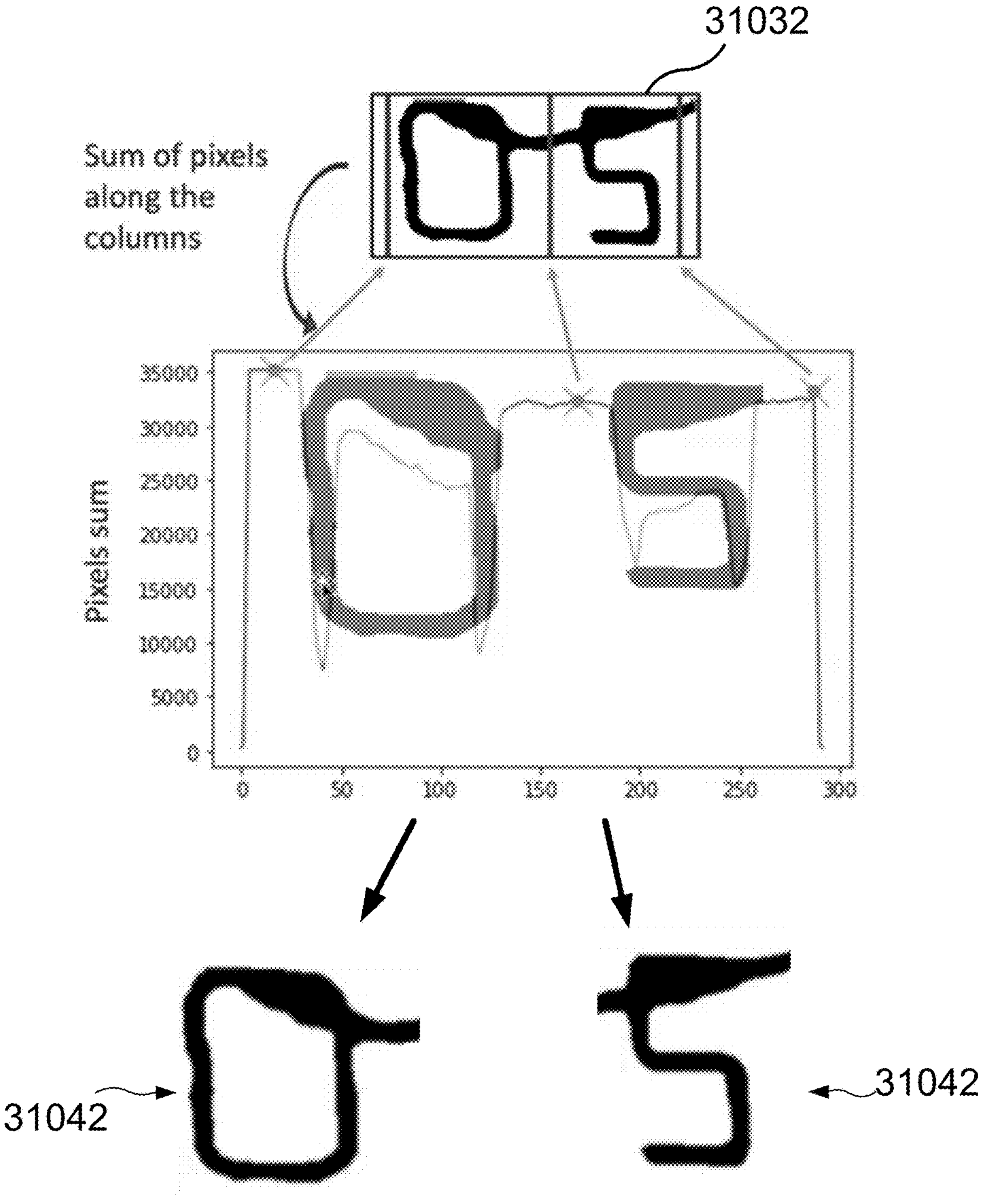
FIG. 31*b* illustrates a portion of an example technique for finding missing characters.

Referring to FIG. 31*a* and FIG. 31*b*, operation 3140 includes identifying sub-search regions 31042 within the search regions 31032. For example, one or more of the search regions 31032 may be large enough to encompass multiple characters. Operation 3140 can include breaking up such search regions 31032 into sub-search regions 31042 likely to contain one character each. This can include using search windows such as is described in operations 2930 and 2940 described above in connection with FIG. 29. In another example, sums of pixels can be used, which is described in more detail in connection with FIG. 31*b*.

FIG. 31*b* illustrates a technique that involves summing the pixel values in columns of the search region. This results in a set of sums (visualized in a line graph for ease of understanding). Local maxima (or minima depending on how the pixel values are set) that passes a threshold (e.g., set based on a statistical analysis of the sums) can be identified as boundaries between potential characters within the search region 31032. Then the search region 31032 can be broken into one or more sub-search regions 31042 at the identified boundaries. A search region 31032 that contains sub-search regions is referred to herein as a parent search region 31041. Sub-search regions 31042 can then replace the parent search region 31041. In other words, a parent search region 31041 may be split into search regions 31032. The flow can then move to operation 3150.

Operation 3150 includes defining further bounding boxes, such as based on the search regions 31032. For example, the boundaries of the search region 31032 can be used as the boundaries of a bounding box. The bounding box can then be added to the set of bounding boxes.

Operation 3160 includes processing the set of bounding boxes. This processing can take any of a variety of useful forms depending on the context in which the process 3100 is being performed. In many examples, the processing involves performing optical character recognition on an image defined by each respective bounding box. This can include performing one or processes described elsewhere herein, such as in relation to operations 2408, 2410, 2940, other operations, or combinations thereof. Following operation 3160, the flow can move to operation 2960.

Operation 2960 includes returning the result of the processing. In some examples, this may include one or more of the processes described above in connection with operation 2960 and FIG. 29.

Image Processing

Figure 32:
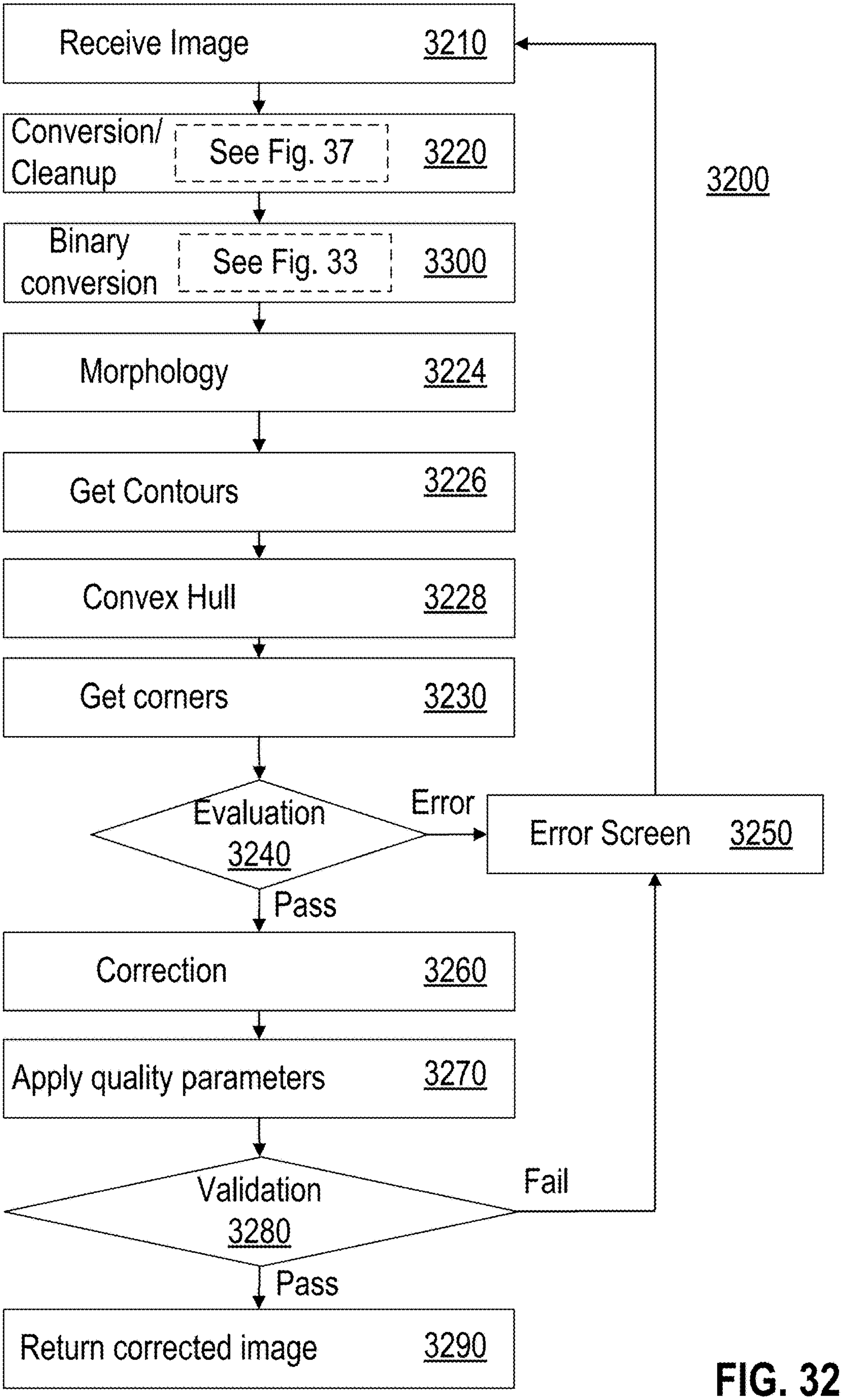
FIG. 32 illustrates an image processing method.

FIG. 32 illustrates another image processing method 3200. The method 3200 can begin with operation 3210.

Operation 3210 includes receiving an image of a check. This can be performed using one or more techniques described elsewhere herein. In many instances, the image includes not only the check but also a background against which the check is captured. Following operation 3210, the flow can move to operation 3220.

Operation 3220 includes performing one or more image conversion and cleanup steps. This can include converting the image to grayscale. In some examples, the image conversion and cleanup steps can be based on the background of the image, such as using the process described in more detail in relation to FIG. 37. Following operation 3220, the flow of the method can move to operation 3300.

Operation 3300 includes performing a binary conversion on the image to create a binarized image (which may also be referred to as a "thresholded" image). Binary conversion has been discussed elsewhere herein, such as in relation to operation 1704*c* (FIG. 17). Binary conversion typically includes applying binary threshold conversion on the check image, which involves transforming the check image to binary form, such as black and white form based on a specific threshold value, where pixels with intensity values at or above the threshold are assigned one color (e.g., white), and pixels with intensity values below the threshold are assigned a second color (e.g., black). This process typically results in a black and white check image, wherein the text on the check image is black. However, traditional thresholding techniques have drawbacks. These drawbacks and solutions thereto are described in more detail in relation to FIG. 33. Following operation 3300, the flow of the method 3200 can move to operation 3224.

Operation 3224 includes applying one or more morphology modifications to the binary image produced by method 3300. Example morphology modifications include applying light erosion, heavy erosion, inversion with light erosion, inversion with heavy erosion, dilation, other modifications, or combinations thereof. In some examples, each technique is applied, resulting in multiple different images being produced. In some examples, each image is sent through the following processing operations and the one that is the most successful (e.g., that passes the various stages) is used.

Operation 3226 includes obtaining contours for the thresholded image. This can include applying one or more different contouring techniques. For example, a contouring technique of an image processing library can be used (e.g., the drawContours function of the OpenCV 2 library). This results in a set of contours of the image. A goal of this process is to produce a contour of the boundary of the region of interest (e.g., check) within the image. In some examples, particularly complex check background designs or other issues can result in erroneous convex contours within the check. To address these issues, a convex hull process can be applied in operation 3228.

Operation 3228 includes obtaining a convex hull from the contours produced in operation 3226. The convex hull operation can be applied. In an example, the convex hull operation is a convex hull function provided by an image processing library (e.g., the convexHull of OpenCV 2). The convex hull operation can be used to remove concavities that may result from certain check background patterns. Following operation 3228 the flow of the method 3200 can move to operation 3230.

Operation 3230 includes obtaining corners from the contours. This can be performed using a corner detection process. Various corner detection processes can be used, such as the Moravec corner detection process, the Harris Corner Detection process (e.g., via the cornerHarris function in OpenCV 2), Förstner corner detection, Wang and Brady corner detection, other techniques or combinations thereof. Following operation 3230, the flow of the method can move to operation 3240.

Operation 3240 includes performing contour and corner evaluation. This operation 3240 can include evaluating the contours and corners generated above. In some examples, this operation 3240 includes one or more of the operations described in relation to method 3400 of FIG. 34. If the contour evaluation indicates an error, then the flow can move to operation 3250, otherwise, the flow can move to operation 3260.

Operation 3250 includes providing an error screen. In some examples, the error screen can provide feedback to a user regarding why the captured image did not pass the evaluation. In some examples, the error screen can provide suggestions regarding how to improve the next captured image. Following the display of the error screen, the flow of the method can return to operation 3210.

Operation 3260 includes applying correction. The correction can take any of a variety of useful forms to improve a region of interest within the captured image. For example, the correction can include normalizing the position or proportions of the region of interest (e.g., a check within the image) by, for example, skewing, deskewing, rotating, scaling, stretching, moving, or applying other transformations to the region within the image to bring the check closer to an expected or standard format on which other steps may depend. In some examples, this can include cropping the image so substantially only the check is within the check image. The normalizing can be based on boundaries or corners identified in other operations. This can also include normalizing the region to have a predetermined aspect ratio. Normalizing the region within the check image can further include adjusting image quality of the image, such as modifying brightness, contrast, levels, sharpness, or other modifications.

In some examples, the correction is applied to a modified version of the received image (e.g., as modified in operations 3220, 3300, 3224, 3226, 3228, and 3230). In some examples, the correction is applied to the originally received image or one that includes fewer than all of the corrections applied. For example, one or more processes can be applied to an image to produce a version of the image that is beneficial for, say, contour or corner detection but which may result in unbeneficial corrections to the underlying image for future processing. As a result, one or more of the processes can lead up to the obtaining of the corners and contours, which are then used to correct the original image.

Operation 3270 includes applying one or more quality parameters. For example, the operation 3270 can include applying one or more operations selected from the group consisting of: noise detection, minimal background validation, brightness validation, contrast validation, text contrast validation, image focus validation, glare detection, other operations, or combinations thereof. These can be applied to the original image as modified by the correction operation 3260.

Noise detection can include comparing an original version of the image to a blurred version of the image to identify noise. A variance of pixel intensities can be used to measure a noise level in the original image. An image can be flagged as noisy if the variance is below a predetermined threshold (e.g., 500). Otherwise, the image can be accepted.

Minimal background validation can include detecting a main rectangle in the image (e.g., the check) using a vision framework or using previously detected points. The image can be flagged if the background area ratio exceeds a maximum threshold (e.g., 0.7).

Brightness and contrast validation can include converting the image to grayscale and analyzing pixel intensity values to assess brightness and contrast. The average brightness and contrast can be calculated and then compared to respective thresholds. An image can be flagged if the calculated brightness is not within an acceptable brightness range (e.g., between 0.4 and 0.9). The image can be flagged if the contrast is not within an acceptable contrast range.

Text contrast validation can be performed in any of a variety of ways. In some examples, text regions and non-text regions are detected (e.g., using object detection algorithms). The average pixel intensity is calculated for both and then compared to form a contrast ratio. The image can be determined to be insufficient if the contrast ratio does not satisfy a threshold (e.g., the threshold is satisfied if the ratio is above zero).

Image focus validation can be performed by applying a filter (e.g., a Laplacian filter) to a grayscale version of the image. Then a variance is measured to assess focus. High variance indicates that the image is sharp and in focus, while a low variance suggests blurriness. An image can be flagged as being not in focus if the variance fails to satisfy a threshold (e.g., 550).

Glare detection can include analyzing the image in grayscale to detect and measure bright regions that may indicate glare. For example, the area of regions having significant brightness (e.g., brightness above a certain threshold that is predetermined or statistically determined based on the image) can be determined. That area can then be compared to a total image area to determine a ratio. If the ratio fails to fall within acceptable values (e.g., between 0.5 and 4500.0), then the image can be flagged as having too much glare.

Operation 3280 includes applying validation. Applying validation can include determining with the evaluation of operation 3270 passes or fails. If the validation fails, the flow of the method can move to operation 3250, otherwise the flow can move to operation 3290.

Operation 3290 includes returning the corrected image. This can include returning the corrected image to a calling process for further evaluation or use. For example, following operation 3290, the flow can move to operation 304 in which an OCR process is applied.

Binary Conversion

Figure 33A:
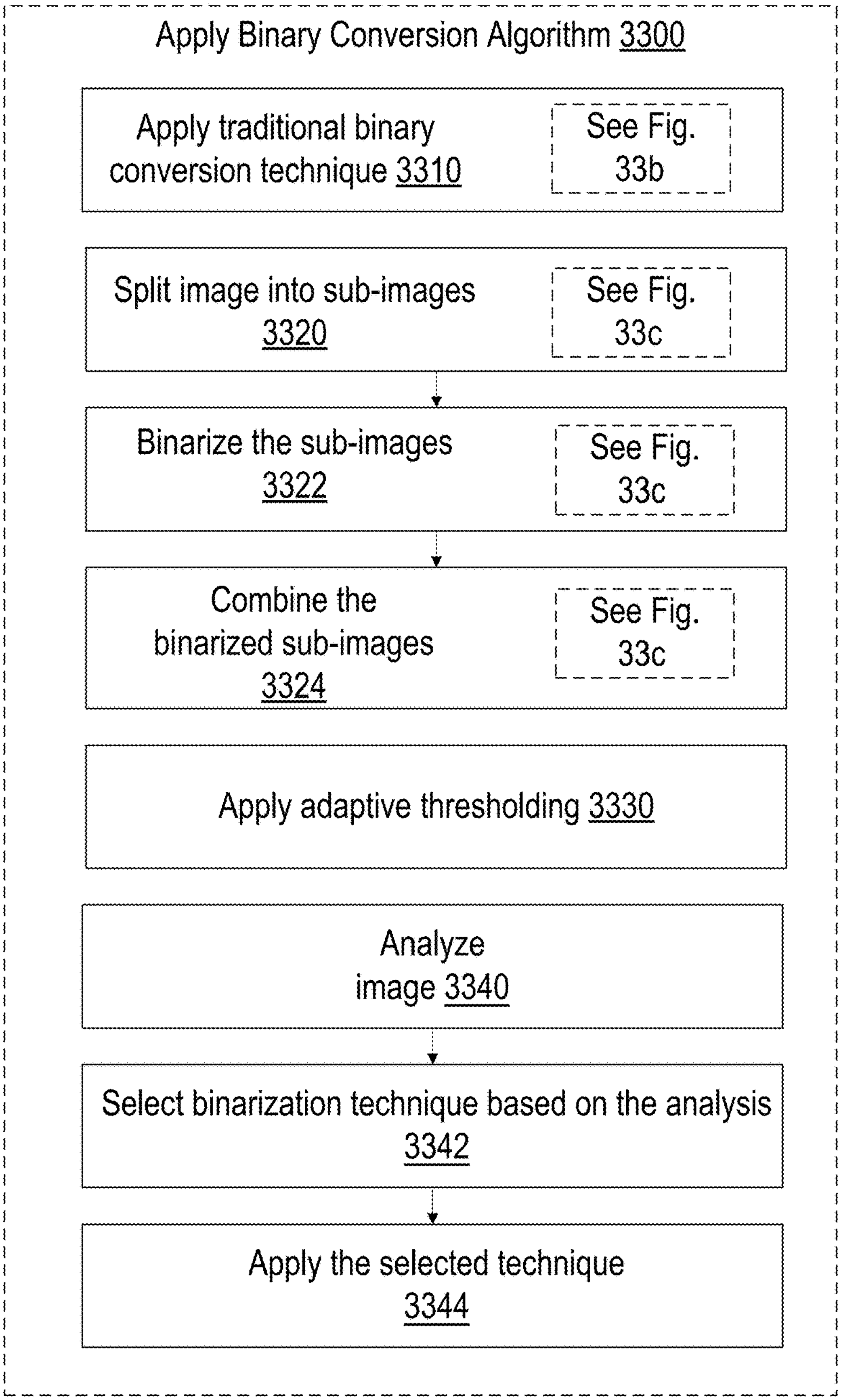
FIG. 33*a* illustrates a binary conversion process that can be applied to an image, according to an example embodiment.
Figure 33B:
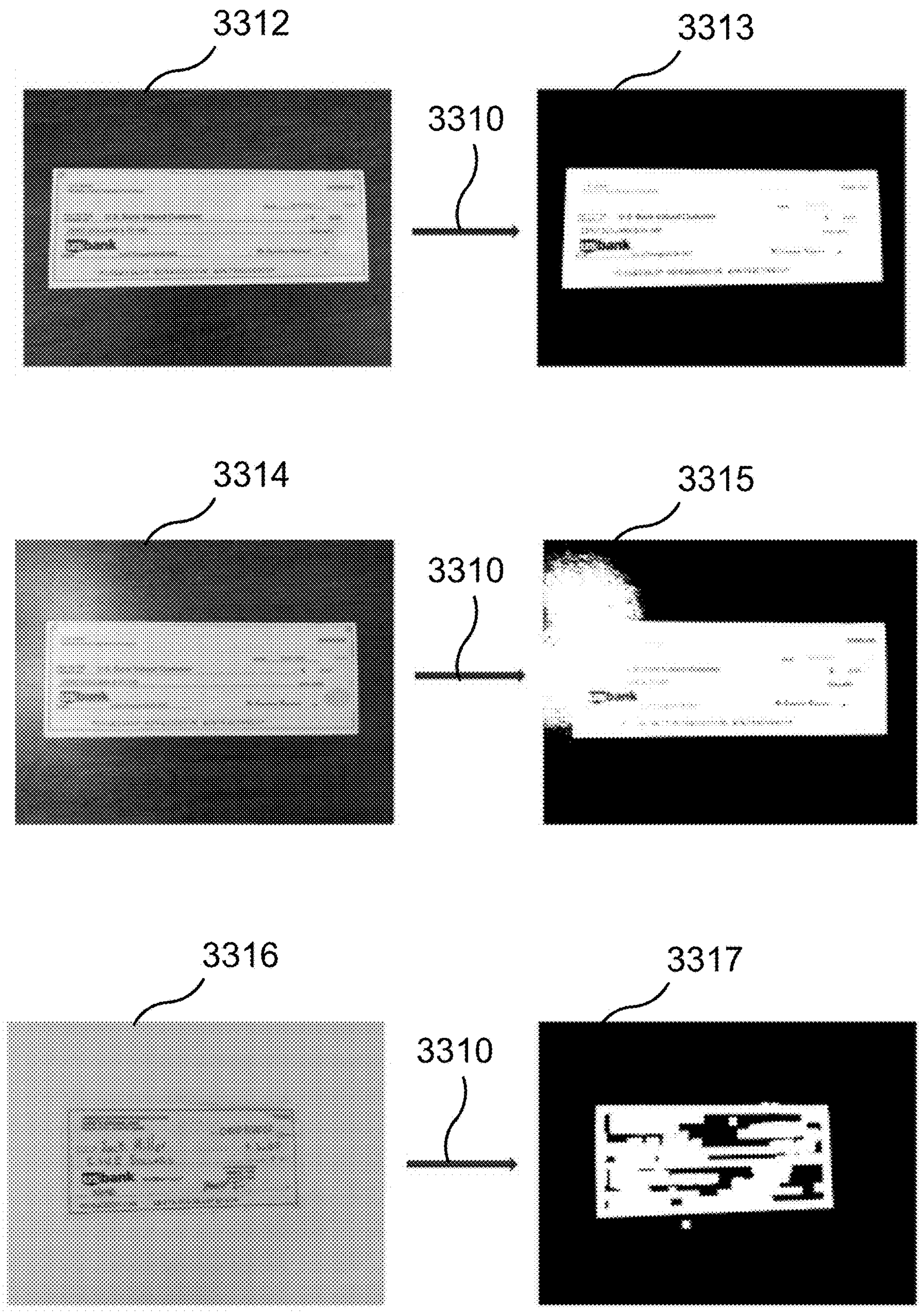
FIG. 33*b* illustrates a binary conversion process that can be applied to an image, according to an example embodiment.
Figure 33C:
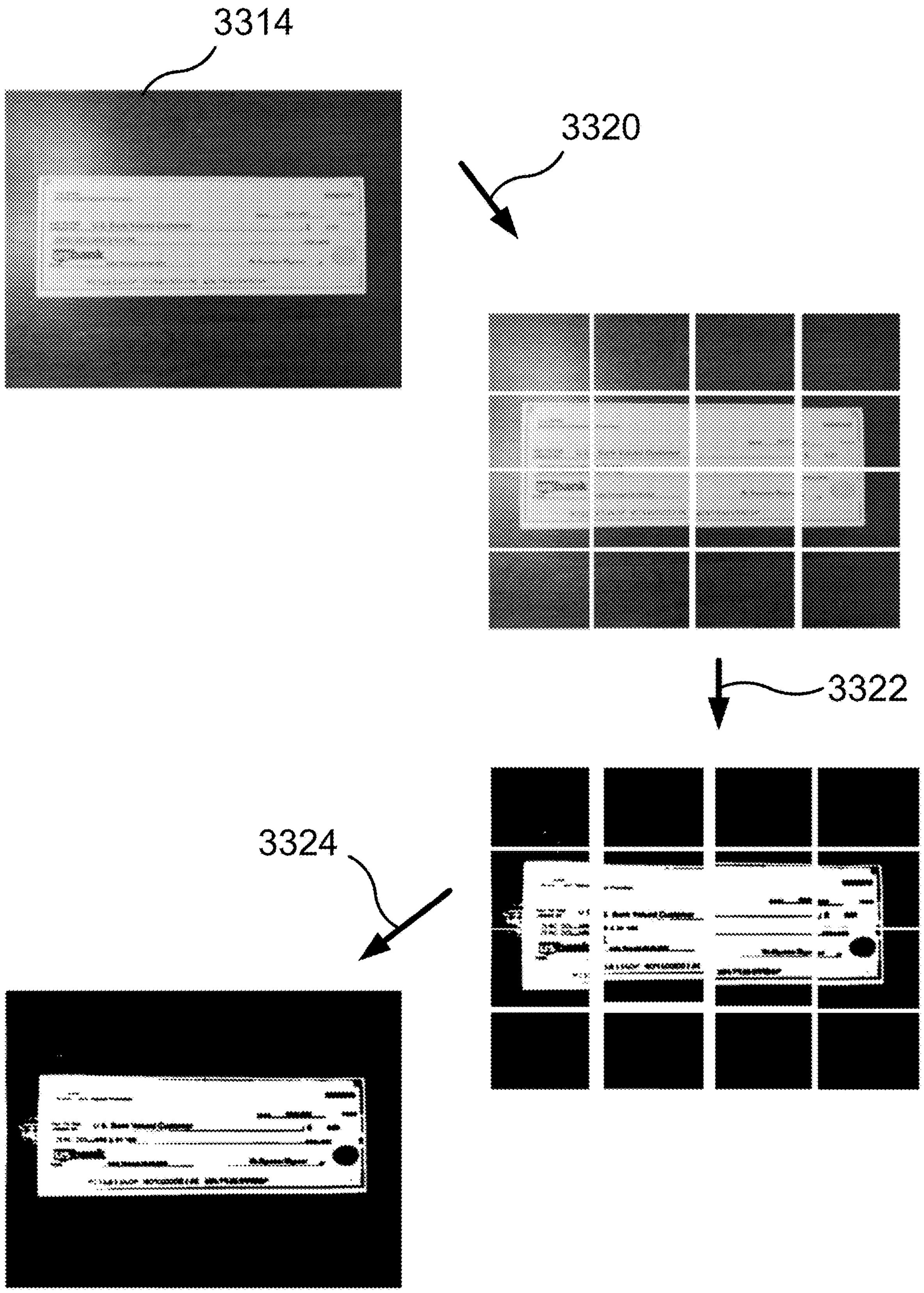
FIG. 33*c* illustrates a binary conversion process that can be applied to an image, according to an example embodiment.

FIGS. 33*a*, 33*b* and 33*c* (collectively referred to as FIG. 33), illustrate binary conversion processes that can be applied to an image to address one or more issues with traditional binary conversion techniques.

Example applications of a traditional binary conversion technique 3310 are shown in FIG. 33*b*. Particularly, FIG. 33*b* illustrates a first example of converting a first check image 3312 having even lighting on a dark background that results in a first binary image 3313 that is acceptable, a second example of converting a second check image 3314 having uneven lighting on a dark background that results in a second binary image 3315 that is unacceptable due to the uneven lighting causing details to be blown out, and a third example of converting a third check image 3316 having even lighting on a light background that results in a third binary image 3317 that is unacceptable. The method 3300 can include operations 3310. One or more of these issues can be addressed using the method 3300.

Referring to FIG. 33*a* and FIG. 33*c*, the method 3300 can include operation 3320.

Operations 3320, 3322, and 3324 describe operations relating to splitting, thresholding, and then combining. Operation 3320 includes splitting the check image into multiple sub-images. This can be performed in any of a variety of ways, including by breaking the image into strips (e.g., horizontal or vertical strips) or squares based on predetermined values (e.g., a predetermined number of pixels or a predetermined percentage of the overall image). In addition or instead, the size of the components can be dynamically adjusted based on the contents of regions. For instance, an initial binarization process can be applied, the results of which are then used to split the image (e.g., boundaries of contiguous areas are used as boundaries on which splits are determined where possible). Following operation 3320, the flow of the method moves to operation 3322.

Operation 3322 includes applying a binary conversion algorithm to each respective sub-image of the sub-images. This can be performed using any of a variety of techniques, such as any of a variety of algorithms that convert the image into pure black or pure white pixels (or binary values, such as 1 or 0 or True or False). Some simple techniques involve comparing each pixel's intensity to a predetermined threshold, and setting the value of the pixel based on whether the threshold is satisfied. There are other, more complicated algorithms, such as Otsu's thresholding technique, adaptive thresholding (e.g., adaptive mean or gaussian thresholding, which base thresholding decisions on values of nearby pixels as well as the pixel being thresholded), Niblack thresholding, other techniques, or combinations thereof. Following operation 3322, the flow of the method 3300 can move to operation 3324.

Operation 3324 includes merging the sub-images into a final binary image. This can include stitching the sub-images together to form the combined image.

The method 3300 can include operation 3330.

Operation 3330 includes applying an adaptive thresholding approach to the check image. In an example, the adaptive thresholding approach includes determining a threshold for a pixel based on a small region around the pixel. Beneficially, this technique is more robust to varying lighting conditions in the environment from which the image was obtained. However, there still can be instances where adaptive thresholding can have issues, such as when there is a light-colored check against a light background. Further, adaptive thresholding techniques can produce noisy images that may complicate downstream processing. Following operation 3330, the flow of the method can move to operation 3340.

Operation 3340 includes choosing from among a plurality of thresholding techniques based on an analysis of the original image. For instance, lighting of the image can be analyzed and use to select an appropriate thresholding technique.

In some embodiments, a binary selection operation 3342 performs selecting a binarization technique based on the analysis of operation 3340. In turn, operation 3344 applies the selected binarization technique.

Following method 3300, a binary processed image is produced as output.

Contour and Corner Evaluation

Figure 34:
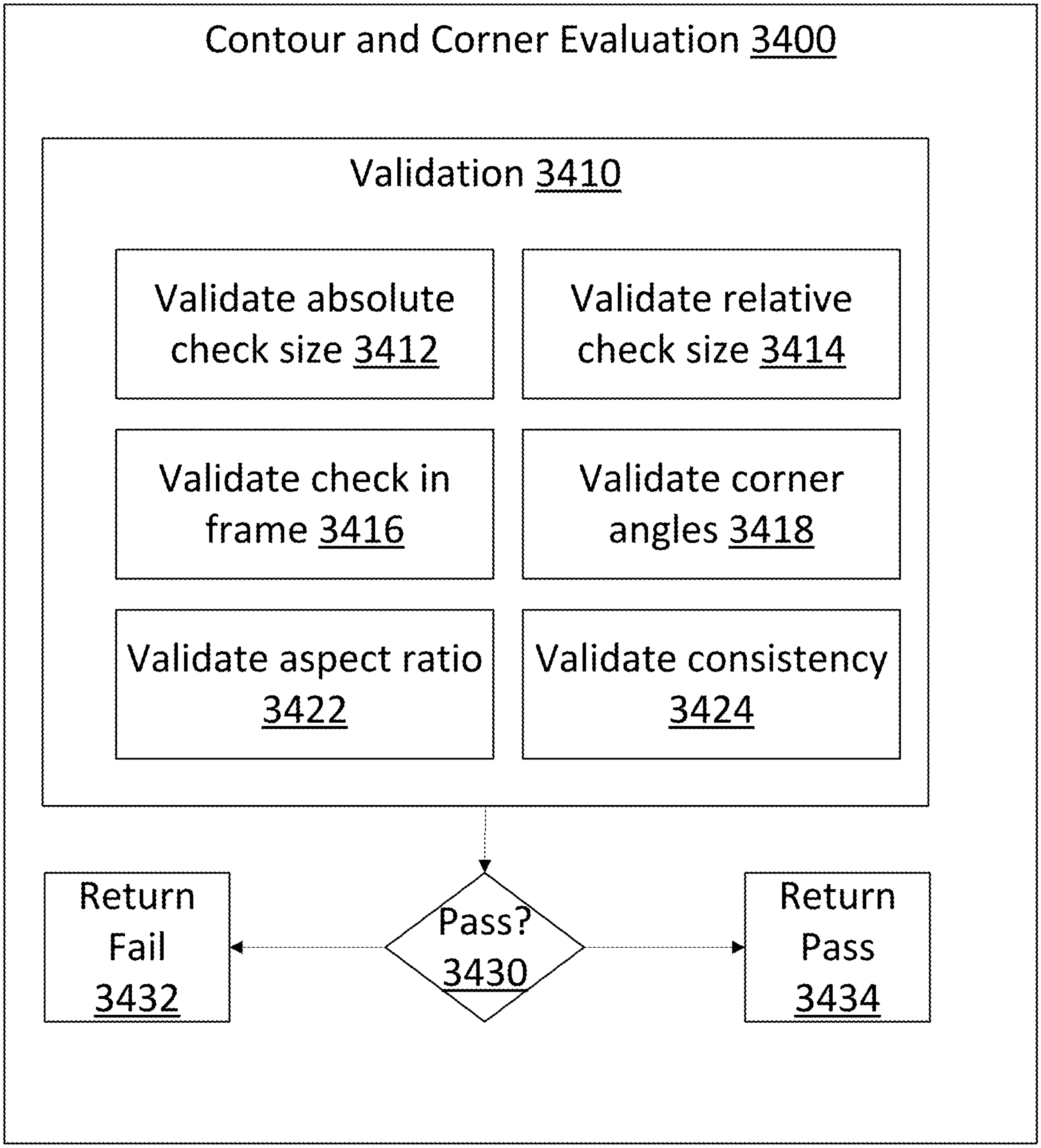
FIG. 34 illustrates a method, which includes techniques for performing contour and corner evaluation, such as on the contours and corners produced by operations.

FIG. 34 illustrates a method 3400, which includes techniques for performing contour and corner evaluation, such as on the contours and corners produced by operations 3228 and 3230. In an example, method 3400 includes a validation operation 3410, which includes sub-validation operations, such as operations 3412, 3414, 3416, 3418, 3422, and 3424. Whether the validation operation 3410 passes can depend on the output of the various sub-validation operations. The operations themselves may return their own pass or fail states or return a score based on a spectrum between unacceptability and acceptability. In some implementations, the validation operation fails if any of the sub-validation operations fail. In some implementations there may be sub-validation operations that are more important than others, and if any of the high-importance sub-validation operations fail, then the validation operation 3410 fails, but the validation 3410 may pass if the high-importance sub-validation operations pass and less than a threshold amount of less important sub-validation operations fail. In still further implementations, scores from the sub-validation operations are combined (e.g., by summing them) and the result is compared against a threshold that, if satisfies, results in the validation passing 3410. In some implementations, the scores are weighted and individual scores are compared against an initial threshold that prevents a sufficient number of "good" scores from causing a single abysmal score from being fully appreciated. Other validation schemes are also possible. For ease of understanding and concision, the below sections often refer to various aspects of a "check" rather than an object believed to be or inferred to be a check. Of course, one purpose of the validation is to attempt to determine whether the object in question (e.g., object or objects defined by the contours and corners) really is a check based on various validations (in addition to other purposes, such as determining whether the image of the check is acceptable for further processing operations), so there may be instances where the operations are performed on an object that is not actually a check.

Operation 3412 includes validating the absolute size of the check within the image. In an example, this is inferred by one or both of the determined contours and corners. In an example, a minimum check height is determined (e.g., based on a smallest height derived from the corners of the check) and a minimum check length is determined (e.g., based on a smallest length derived from the corners of the check. These minimum widths and lengths are compared to respective thresholds, and based thereon it is determined whether this sub-validation operation is satisfied.

Operation 3414 includes validating the relative size of the check to the overall image. In an example, this is inferred by the determined contours. In another example, this is inferred by the determined corners. In yet another example, this is inferred by one or both of the determined contours and corners. In some embodiments, operation 3414 can include calculating an area of the image bounded by the contours (or within the corners) relative the overall size of the image. If the resulting ratio satisfies a threshold ratio, then the sub-validation operation is satisfied. Otherwise, it fails.

Operation 3416 includes validating the check in the frame. This includes performing one or more validation operations indicative of whether the check is fully in the frame or not. For instance, this can include determining that four corners were detected. Further, this can include determining whether the corners lie on or within a threshold distance away (e.g., 30 pixels) from an edge of the image. Further still, there can be an operation that determines whether lines formed by adjacent edges of a check are predicted to intersect within the image or outside of the image. For instance, if a portion of the check is outside of frame, the edges would converge outside of the frame. If this operation 3416 determines that the check is in the frame, the operation 3416 can return pass or otherwise indicate that the sub-validation of the check being in frame is satisfied.

Operation 3418 includes validating corner angles. This can include determining whether the angles of corners fall within an acceptable range, such as being greater than 60-degrees and less than 120-degrees or greater than 75-degrees and less than 105-degrees. If the angles of each corner fall within an acceptable range, then this corner angles sub-validation passes, otherwise it fails.

Operation 3422 includes validating the aspect ratio of the check. This can include determining an aspect ratio of the check (e.g., by measuring a distance between adjacent corners or measuring a length of contours). In an example, this aspect ratio sub-validation passes if the aspect ratio of the check (e.g., measured length divided by measured height), is between 0.95 and 4.0. Based on the aspect ratio, this aspect ratio sub-validation can pass or fail.

Operation 3424 includes validating consistency. This can include validating the consistency of one or more of the height, length, and diagonals of the check. For instance, checking height consistency can include that the height of the left and right sides of the check are within a certain threshold amount of each other (e.g., within 20% of each other). In addition, checking height consistency can include checking the height along the length of the check to ensure that there are not significant deviations that may indicate an inaccurate reading. For instance, checking length consistency can include that the length between of the bottom and top sides are within a certain threshold distance of each other (e.g., within 20% of each other). In addition, checking height consistency can include checking the length along the height of the check to ensure that there are not significant deviations that may indicate an inaccurate reading. For instance, diagonal consistency can include validating that both diagonal lengths (e.g., from top left to bottom right and from top right to bottom left corners of the check) are within a threshold distance of each other (e.g., within 10% of each other). Based on the height, length, and/or diagonal consistent, this consistency sub-validation can pass or fail.

Following operation 3410, the flow moves to operation 3430

Operation 3430 includes determining whether the validation passes or fails. If the validation fails, then the flow of the method 3400 moves to operation 3432 in which a failure is returned. If the validation passes, then the flow moves to operation 3434 in which a pass is returned.

Image Scaling Techniques

Traditional, non-mobile check deposit processes involve using physical scanners to image checks. Using such techniques, there is a 1-to-1 relationship between the check image and the check based on the Dots Per Inch (DPI) of the scan. For instance, the scanner may be set such that a scan of one inch of the check corresponds to 200 pixels, thus achieving 200 DPI. This is based on various factors, including there being a fixed distance between the check being scanned and the scanner and the scanner is configured to provide a set DPI. Standards developed around minimum required DPI of the image of the check, and such scanners can be configured to relatively easily meet or exceed such standards.

However, mobile check deposit processes inherently lack consistent DPI because the DPI of the check in the image can vary depending on how far away the check is from the camera, the amount of the field of view taken up by the check, the resolution of the camera sensor, other factors, and combinations thereof. These inconsistencies can lead to the accidental production of check images that fail to meet DPI standards. For instance, institutions can rely on consistent DPI of images to extract regions of the check image based on pixel counts. If an image does not conform to the standards or does not accurately reflect the check, the image can be rejected or excess processing resources are used to attempt to remediate the problems. In addition or instead, when an image fails to meet such standards, an image of a check sent for processing may be denied, which results in the wasting of computing resources expended to obtain, process, and transmit that image.

As such, a mobile check deposit process that enhances the consistency of the DPI of the images produced is improved relative to a mobile check deposit process that lacks such an enhancement at least by being better able to reliably represent the physical dimensions of the check.

In one example, a bounding area of the MICR line of the check is used along with the extracted MICR line to determine scaling factor for the mobile captured check image. MICR detection and recognition techniques described herein can beneficially permit the assumption that the determined MICR bounding area sufficiently tightly corresponds to the actual MICR line and sufficiently accurately identifies the number of characters that the scaling can be determined based on the number of characters in the MICR line. Further, techniques can permit the adding of spaces within the bounding area in the MICR. There exist technical challenges in being able to perform this process on relatively resource constrained mobile devices (e.g., compared to servers).

Figure 30:
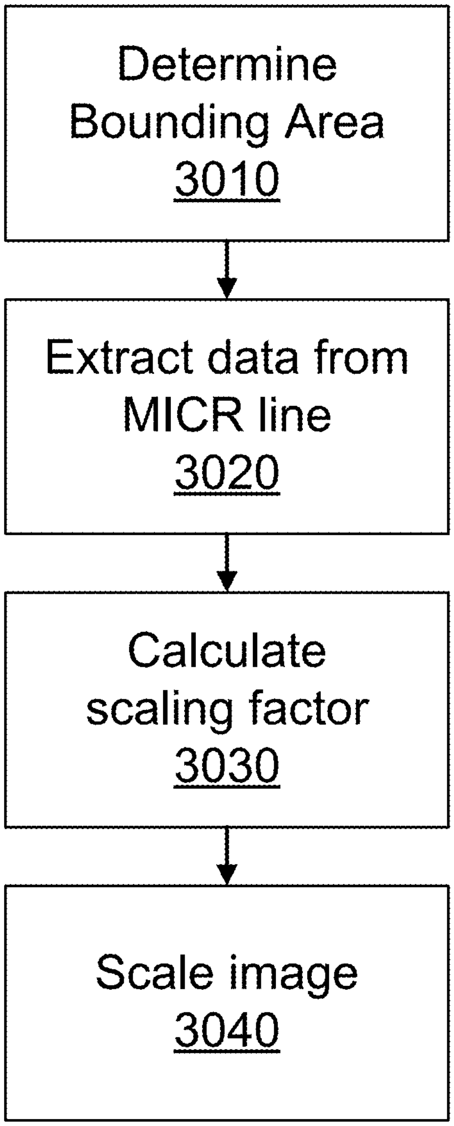
FIG. 30 illustrates an example scaling process, which can begin with operation.

FIG. 30 illustrates an example scaling process 3000, which can begin with operation 3010.

Operation 3010 includes determining a bounding area around the MICR line. This can include determine the location of the MICR on the check and then determining the bounding area. Following operation 3010, the flow of the method 3000 can move to operation 3020.

Operation 3020 includes extracting data from the MICR line. This can include determining how many characters make up the MICR line. In some examples, one or more artificial characters are added to the total character count to account for a buffer around the MICR line or other factors. Thus, the total number of characters used may be inaccurate relative to the actual check but counterintuitively permit enhanced accuracy when calculating a scaling factor of the check. Following operation 3020, the flow of the method 3000 can move to operation 3030.

Operation 3030 using the number of the recognized MICR characters in the bounding area along with the pixel length of the MICR bounding to calculate a scaling factor for the cropped check image.

As a specific example, there may be a check having thirty-one characters in the MICR line. The total number of characters is artificially increased by one to account for a buffer around a bounding box. It may be known that a standard MICR line has eight characters per inch. Thus, by calculating thirty-two characters divided by eight characters-per-inch results in a determination that the MICR line in the check is four inches long.

Continuing the specific example, it can be determined how many pixels long the MICR line is and how many pixels long the check is. The length of the bounding box around the MICR line can be used as the measure of how many pixels long the MICR line is. Likewise, the length of a bounding box around the check can be used to determine how many pixels long the check is. A predetermined desired measure of dots (pixels) per inch of two-hundred DPI is then multiplied by the number of inches that the MICR line is, which results in two-hundred dots-per-inch times four inches, which results in a desired number of pixels in length for the MICR line of eight-hundred. Next, the total length of the check can be expressed in MICR lines. For instance, the check can be determined to be two MICR lines long, which means that the total desired length of the check is eight-hundred pixels-per-MICR line times two MICR-lines-per-check for a total desired length of sixteen-hundred pixels for the check. The total size of the check image can then be scaled to that length while maintaining the aspect ratio of the check to ensure that the height is correct.

In another example, given:

| | |
|---|---|
| Known MICR Length (CPI) | 8 characters per 1 inch |
| Desired DPI | 200 pixels per 1 inch |
| Actual MICR length (characters) | 31 characters |
| MICR Buffer size (characters) | 1 character |
| Measured MICR length (pixels) | 1200 pixels |

Calculate:

| | |
|---|---|
| Working MICR Length (Characters) | actual MICR Length + MICR buffer size = (31 + 1) char. = 32 characters |
| MICR Length (inches) | $\frac{\text{Working } MICR \text{ Length}}{\text{Known } MICR \text{ Length } (CPI)} = \frac{32 \text{ characters}}{8\ CPI} = 4 \text{ inches}$ |
| Desired MICR Length (pixels) | MICR length (inches) × Desired DPI = 4 inches × 200 dpi = 800 pixels |
| Scaling factor | $\frac{\text{Desired } MICR \text{ Length (pixels)}}{\text{Actual } MICR \text{ Length (pixels)}} = \frac{800 \text{ pixels}}{1200 \text{ pixels}} = \frac{2}{3}$ |

Mixed Local and Remote Processing

While some examples herein describe performing optical character recognition (OCR) techniques on a local device, sending OCR data to a server for validation, and then sending the original image to a processing sever for further processing, there are also benefits to a mixed approach whereby some processing is done locally, some processing of certain portions of the image is done elsewhere, the results are validated and then the image is sent for processing. Beneficially, this can maintain security and network resource benefits of waiting to send the entire image until a threshold amount of processing is complete (e.g., verifying the OCR data) while permitting some portions to be processed at more efficient secondary processing locations (e.g., a remote server). For instance, where the image is of a check, a first portion (e.g., the MICR line) is processed locally while a second portion (e.g., a handwritten amount) is processed at a dedicated OCR server (e.g., because of the relatively higher amount of computing resources needed to process handwriting compared to processing a MICR line). The results are then validated and then, after processing, the entire original image is sent for further processing. An example of this technique is described in the process shown in FIG. 35.

Figure 35:
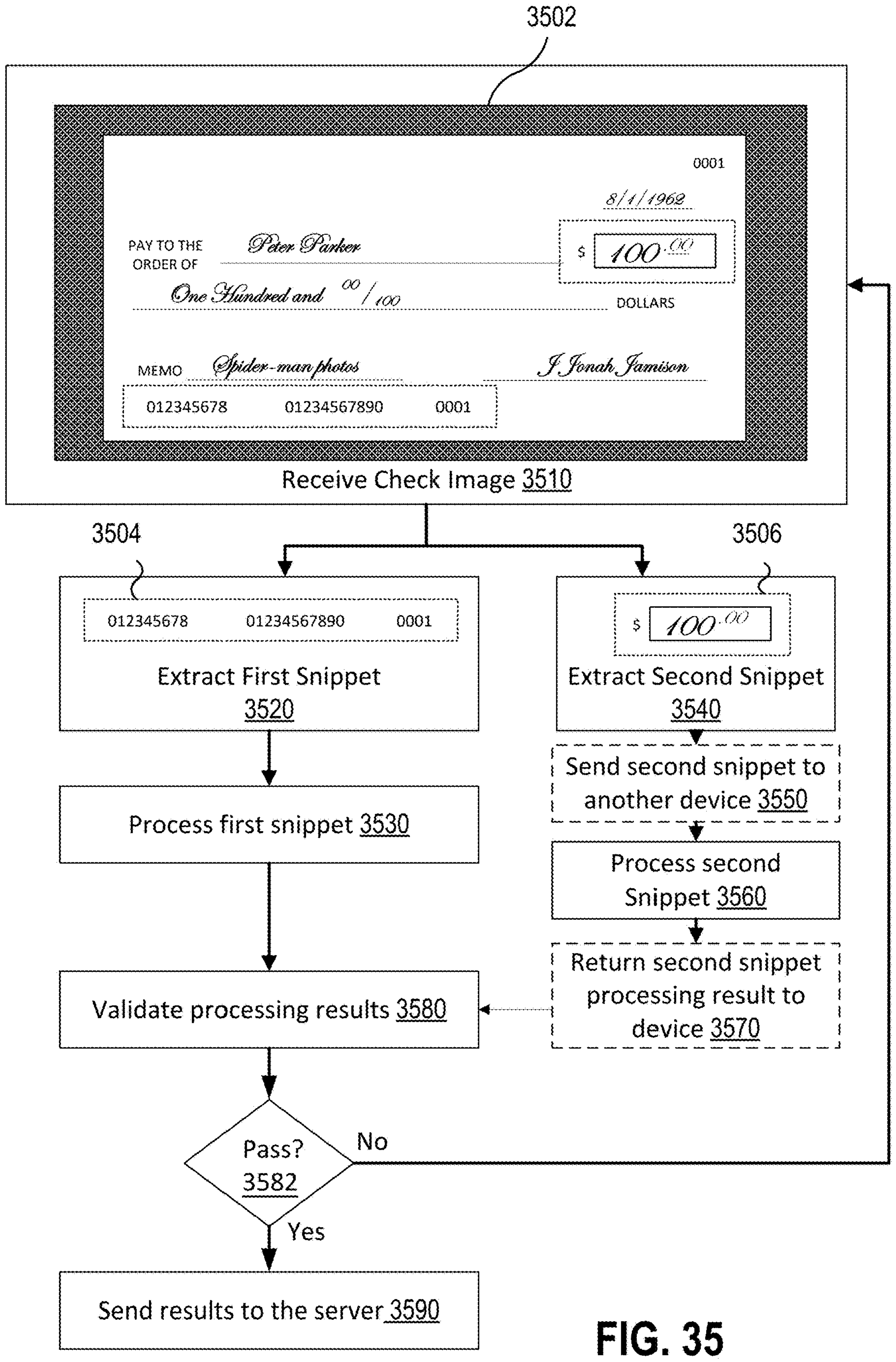
FIG. 35 illustrates an example method for performing an OCR process on an image.

FIG. 35 illustrates an example method 3500 for performing an OCR process on an image 3502. The method 3500 can begin with operation 3510.

Operation 3510 includes receiving the check image 3502. This can be done using any of a variety of techniques, including those described herein in relation to operations 302, 602, and 1702 described herein. Following operation 3510, the flow of the method can move to operation 3520.

Operation 3520 includes extracting a first snippet 3504 associated with a first region of interest. This can be performed using any of a variety of processes, including those elsewhere herein such as in relation to operation 1706. In some examples, an object detection process is applied to the check image 3502 to identify regions of interest, which are then cropped to extract the first snippet 3504. In some examples, the first snippet 3504 is a region of interest to be processed locally, such as because it has (or is predicted to have) a higher level of sensitivity or security risk than a second snippet 3506 (e.g., by containing a MICR line). In addition or instead, the first snippet 3504 can be a region predicted to require a first level of computing resources to adequately process, where the first level of computing resources is able to be reasonably provided by a local device.

Example object detection processes are described in US 2022/0319216, which is incorporated by reference in its entirety. Further example object detection techniques include YOLOX by Ge et al (see YOLOX: Exceeding YOLO Series in 2021, arXiv: 2107.08430v2 (2021)). Object detection models can be fine-tuned to produce more accurate or useful results for certain kinds of objects. Referring to FIG. **4*b*, where the object is a check, an object detection model can be fine-tuned to perform better when detecting areas such as payee name 408*b*, check number 410*b*, date 412*b*, check amount in words 414*b*, memo 416*b*, MICR line data 418*b* including a routing number 420*b*, account number 422*b*, check number 424*b*, and check amount box 426*a*. In an example, an identifier of a first region of interest is provided as input to the model and an output of the model can include a bounding box or other designator of a region of the image containing the first region of interest. In addition or instead, an output of the model contains a set of identified regions from which the region of interest is selected and the associated information is used to extract the first snippet 3504**.

Following operation 3520, the flow can move to operation 3530.

Operation 3530 includes processing the first snippet 3504. This processing can be performed in any of a variety of ways, including those described elsewhere herein at operations 304, 604, 1712, other operations, or combinations thereof. This processing can be performed entirely locally on a user's device (e.g., on the mobile device 104). In some examples, the output of the processing is a result of an OCR process that recognizes content within the first snippet 3504, such as characters of a MICR line contained within the first snippet 3504. Following operation 3530, the flow can move to operation 3580, which involves the validation of additional processing results relating to a second snippet 3506 that is obtained in operation 3540.

Operation 3540 includes extracting a second snippet 3506. This operation be performed concurrently, consecutively, or with other temporal relation to the operations 3520 and 3530. Operation 3540 includes extracting a second snippet 3506 associated with a second region of interest. This can be performed using any of a variety of processes, including those elsewhere herein such as in relation to operation 3520. In some examples, the second snippet 3506 is a second region of interest to be processed remotely, such as because it has (or is predicted to have) a lower level of sensitivity or security risk than the first snippet 3504 (e.g., by containing an amount). In addition or instead, the second snippet 3506 can be a region predicted to require a second level of computing resources to adequately process, where the second level of computing resources is not able to be reasonably provided by a local device. Following operation 3540, the flow of the method can move to operation 3550.

Operation 3550 includes sending the second snippet 3506 to another device. For instance, the other device may be a server located remote from the device that captured the check image 3502. That server may be configured to perform processing on the second snippet 3506. In some examples, the server may be the same server (or part of a same server backend) to which the entire check image or results will later be sent (e.g., financial institution server 124 and see operation 3590).

Operation 3560 includes processing the second snippet 3506. This processing can be performed in any of a variety of ways, including those described elsewhere herein at operations 3530, 304, 604, 1712, other operations, or combinations thereof. This processing can be performed entirely remotely from the user's device (e.g., the mobile device 104). In some examples, the output of the processing is a result of an OCR process that recognizes content within the second snippet 3506, such as handwritten characters of an amount region contained within the second snippet 3506. Following operation 3560, the flow can move to operation 3570.

Operation 3570 includes sending the results of the processing back to the original device. This can include the sending recognized characters that were produced as a result of operation 3560. In some examples, other data can be included such as a confidence level in the results.

In some examples, the results of processing the second snippet are not sent back to the original device and are instead sent to a different server for later processing, such as the financial institution server 124. In such instances, an additional identifier may be present, such as one that facilitates the association of the results for the second snippet with the results of the first snippet for further processing by a server (see 35090).

Following operation 3570, the flow of the method can move to operation 3580.

Operation 3580 includes validating results. This can be performed in any of a variety of ways, such as is described in operations 308, 606, 608, 1714, and 1716, other operations, or combinations thereof. In some examples, different validation levels are performed on the results from the first snippet and the second snippet. In some instances, validation is only performed on one and not the other.

If a determination at operation 3582 determines the validation passes, then the flow of the method moves to operation 3590, otherwise the flow of the method returns to operation 3510 or a remediation operation.

Operation 3590 includes sending results to a server. This can be performed in any of a variety of ways, including those described in operations 318 and 610. In some examples, only the results of processing the first snippet are sent or the results of processing the second snippet.

Following operation 3590, a variety of techniques can be performed, such as further steps of a mobile check deposit process (e.g., operations 320-362 described in connection with FIG. 3*a*, 3*b*).

Image Enhancement

An otherwise acceptable image may nonetheless contain issues, such as deep shadows, amplified noise, and contrast shifts. It can be beneficial to address these issues (where possible) with image enhancement techniques rather than requiring the consumption of additional processing resources in obtaining a new image. An example image enhancement process is described in FIG. 36.

Figure 36:
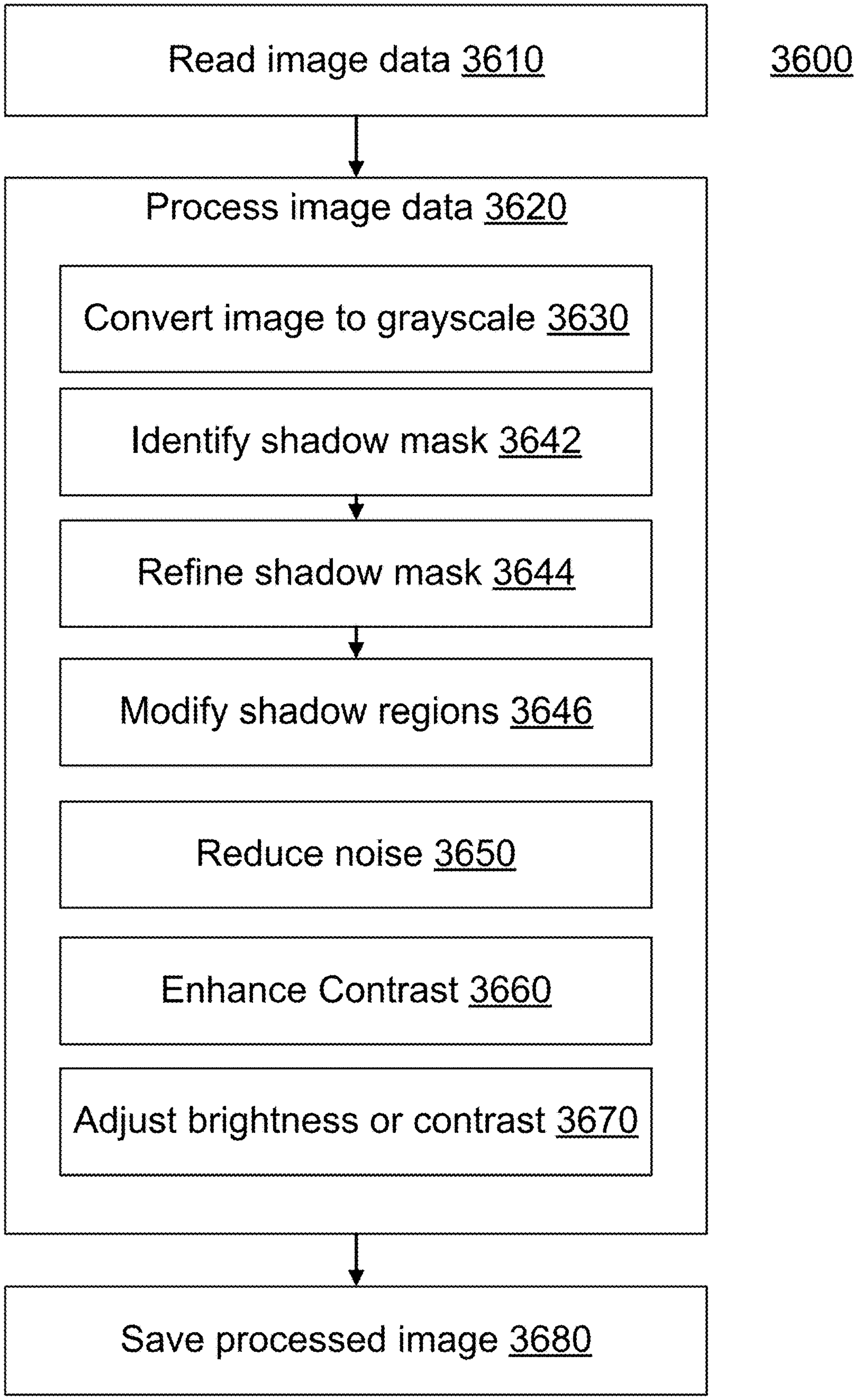
FIG. 36 illustrates an image enhancement method.

FIG. 36 illustrates an image enhancement method 3600. The method 3600 can begin with operation 3610.

Operation 3610 includes reading image data. Reading the image data can include loading the image data without altering bit depth or color channels of the image data. Beneficially, ensuring a relative lack of preprocessing can preserve raw data for accurate processing by later steps. In an example implementation using OPENCV, the function imread can be used with a flag indicating that the image should be unchanged (e.g., cv2.IMREAD_UNCHANGED). After reading the image data, the flow of the process 3600 can move to operation 3620.

Operation 3620 includes processing the image data. Operation 3620 can include various sub-steps or operations, including operations 3630, 3642, 3644, 3646, 3650, 3660, and 3670.

Operation 3630 includes converting the image data to grayscale image data. Beneficially, this operation can simplify the image data by reducing it to a single intensity channel. This is beneficial for accurate performance of operations like thresholding and morphological processing, which rely on intensity values. Continuing the OPENCV example, an example function call can include cv2.cvtColor (image, cv2.COLOR_BGR2GRAY).

Operation 3642 includes identifying a shadow mask. Identifying the shadow mask can include applying an inverse binary threshold to the image data such that pixels below a certain intensity are white in the mask and others are black in the mask. This operation can identify potential shadows by detecting dark regions via an inverse binary threshold where pixels below a certain intensity are marked as shadow (white in the mask), others as background (black). Continuing the example implemented using OPENCV, an example function call can be: cv2.threshold (gray, threshold_value, max_value, cv2. THRESH_BINARY_INV). The threshold_value and max_value variables can be predetermined or set on the basis of calculating aspects of the image data. In some examples, other thresholding techniques can be used including those described elsewhere herein.

In some implementations there may be difficulties with shadow detection accuracy. For example, simple intensity thresholding may misclassify dark objects as shadows or miss soft shadows. To address this, more advanced shadow detection techniques can be used, such as color-based segmentation, edge detection, or machine learning models trained to detect shadows.

Operation 3644 includes refining the shadow mask. Refining the shadow mask can include filling in small holes in the mask by applying a dilation morphological operation. After performing the dilation morphological operation, an erosion morphological operation can be applied. These operations can clean up the mask and improve accuracy of shadow detection. Continuing the OPENCV example, applicable function calls can include cv2.dilate (mask, kernel, iterations) and cv2.erode (mask, kernel, iterations).

In some implementations, overuse of dilation or erosion can distort the shape of the shadow mask, leading to unnatural inpainting results. To address this challenge, the kernel size and iteration count can be fine-tuned. In addition or instead, use conditional morphological operations can be applied.

Operation 3646 includes modifying shadow regions. Modifying the shadow regions can include filling in at least a portion of the shadow regions using nearby pixel information. Beneficially, this can be used to fill in the shadow regions to help remove shadows without introducing unnecessary artifacts. An example function call can include cv2.inpaint (image, mask, inpaintRadius, method).

In many implementations, inpainting works best on small or narrow regions. Large shadow areas may result in visible artifacts or texture mismatches. To address this challenge, patch-based inpainting (e.g., Telea or Navier-Stokes) can be applied selectively. In addition or instead, deep learning-based inpainting can be used for complex images.

Operation 3650 includes reducing noise. An example function call can include cv2.bilateralFilter (image, d, sigmaColor, sigmaSpace). Bilateral filters can be beneficial because they reduces noise while preserving edges (e.g., unlike Gaussian blur). However, bilateral filtering is computationally expensive and may not scale well for high-resolution images. In some examples, optimized implementations can be applied or alternatives like non-local means denoising or fast bilateral filtering are applied.

Operation 3660 includes enhancing contrast. Enhancing the contrast in the image data can include applying Contrast Limited Adaptive Histogram Equalization (CLAHE). Beneficially, contrast limited adaptive histogram equalization can enhance local contrast in small regions (e.g., tiles) of the image, while resisting over-amplification of noise and improving visibility in low-contrast areas. An example function call can include cv2.createCLAHE (clipLimit, tileGridSize). apply (channel). In some implementations, CLAHE can introduce noise or halo effects in uniform regions if the clip limit or tile size is not well-tuned. Different parameters can be selected to reduce the hao effect. In addition or instead, CLAHE can be applied selectively to regions that need contrast enhancement. This can include first detecting such regions and then applying CLAHE to only those regions.

Operation 3670 includes adjusting brightness or contrast. An example function call can include cv2.convertScaleAbs (image, alpha, beta) where alpha controls contrast (e.g., a scaling factor) and beta controls brightness (e.g., offset). This step can fine-tune the image appearance after the prior enhancements. However, global adjustments may not suit all regions of the image, leading to overexposure or loss of detail. To address this challenge, adaptive methods can be used. In addition or instead, adjustments can be applied based on local image statistics.

As a result of some processing techniques involving converting between color spaces (e.g., BGR to LAB to BGR) can introduce subtle color shifts. To address this challenge, color fidelity can be validated.

Operation 3680 includes saving processed image data. Saving the processed image data can include saving the processed image in a TIFF format using lossless compression. An example function call includes cv2.imwrite ('output.tiff', image, [cv2.IMWRITE_TIFF_COMPRESSION, 1]).

Following operation 3680 (or at any stage of the process 3600), various other useful operations can be performed using the image data. For example, optical character recognition processes can be applied (e.g., using any of a variety of techniques described elsewhere herein).

Background Based Processing

The background against which an object is photographed can have a significant affect on the ability to accurately detect and process the object. Light colored objects (like many checks are) can be more difficult to separate from light colored backgrounds than from dark colored backgrounds. In order to improve the versatility and accuracy of the system's ability to process images regardless of background, different processing techniques can be applied depending on the background.

Figure 37:
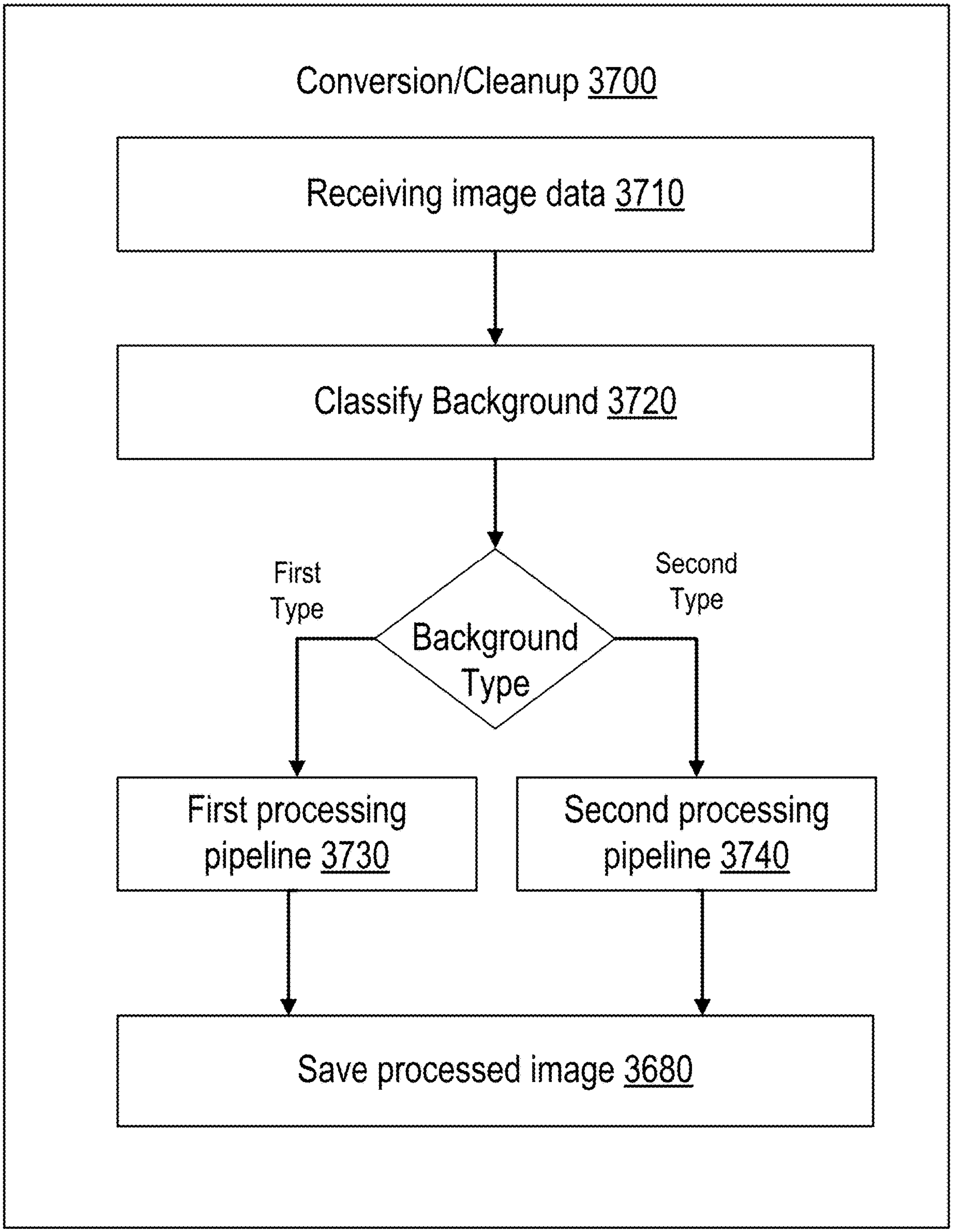
FIG. 37 illustrates an example background-based image processing technique.

FIG. 37 illustrates an example method 3700 for converting and/or cleaning up image data (e.g., which may be performed as part of method 3200. Operation 3700 can begin with operation 3710.

Operation 3710 includes receiving image data. The image data can be received in any of a variety of ways from any of a variety of sources, including as part of one or more techniques or operations described elsewhere herein. Following operation 3710, the flow of the method can move to operation 3720.

Operation 3720 includes classifying a background of the image as being of a first type or a second type. In some examples, the first type is a light background and the second type is a dark background. The classifying can take any of a variety of forms. In an example, the classifying includes applying an area average core image filter that calculates the mean color of a given image. In an example, the result is a single pixel that contains the average color. The average brightness can be calculated by reading values at three indexes of the pixel (e.g., red, green, and blue) and taking an average of them. If the brightness level is less than 0.5, then the background is dark, otherwise it is light. In other examples, other operations can be used. Following operation 3720, the flow of the method can move to operation 3730 if the background is classified as a first type and operation 3740 if the background is classified as a second type.

Operation 3730 includes performing a first processing pipeline on the image data. In an example, the first processing pipeline includes inverting the image data (e.g., inverting the colors) and applying an edge enhancement process to the image data. In an example, the first processing pipeline does not include any of: converting the image data to grayscale, applying a blur process to the image, and applying adaptive thresholding.

Operation 3740 includes performing a second processing pipeline on the image data. In an example, the second image processing stack includes converting the image data into grayscale image data, applying a blur (e.g., gaussian blur) to the image data, and applying adaptive thresholding to the image data. In an example, the second image processing stack does not include any operations selected from the group consisting of a color inversion operation and an edge enhancement operation.

Following operations 3730 or 3740, the flow of the method can move to operation 3680 in which the processed image is saved (e.g., to non-transitory memory or transitory memory). The image can then be used for further processing, such as using techniques described elsewhere herein.

Processing of Other Documents and Objects

Although many examples herein are directed to processing checks or other payment instruments, the techniques described herein can be applied to other contexts and documents. For instance, the techniques herein can be applied to paper forms and identity documents (e.g., drivers' licenses, student IDs, passports, birth certificates, and government or institutionally issued identity cards or documents). For instance, when a person is attempting to prove their identity, they may be asked to provide images of their driver's license. As another example, techniques herein may be applied to imaging other documents (e.g., invoices, bank statements, or other documents), business cards (e.g., for contact extraction), utility bill scanning (e.g., for know-your-customer validation or address verification), handwriting detection, other documents, or combinations thereof. However, many of the same challenges described herein with respect to processing checks also relate to taking images of drivers licenses, other identity documents, and other documents in general. Techniques described herein can be used to process the images locally (e.g., performing optical character recognition and verifying data) and provide them to a server for further verification or processing.

Processing by Other Devices

Although many examples herein are directed to processing documents with mobile devices, techniques may be used in other contexts, such as with fixed devices or desktop devices. For instance, one or more aspects of the technology described herein can be integrated into an Automated Teller Machine (ATM) for use in an ATM-based check deposit process. As another example, techniques described herein can be used with desktop check scanners, such as may be used by tellers in a bank branch. One or more modifications may be made to tailor the techniques to the specific circumstances. For instance, the nature of ATM or desktop scanners for checks may increase image quality and permit simplified applications of techniques.

Figure 38:
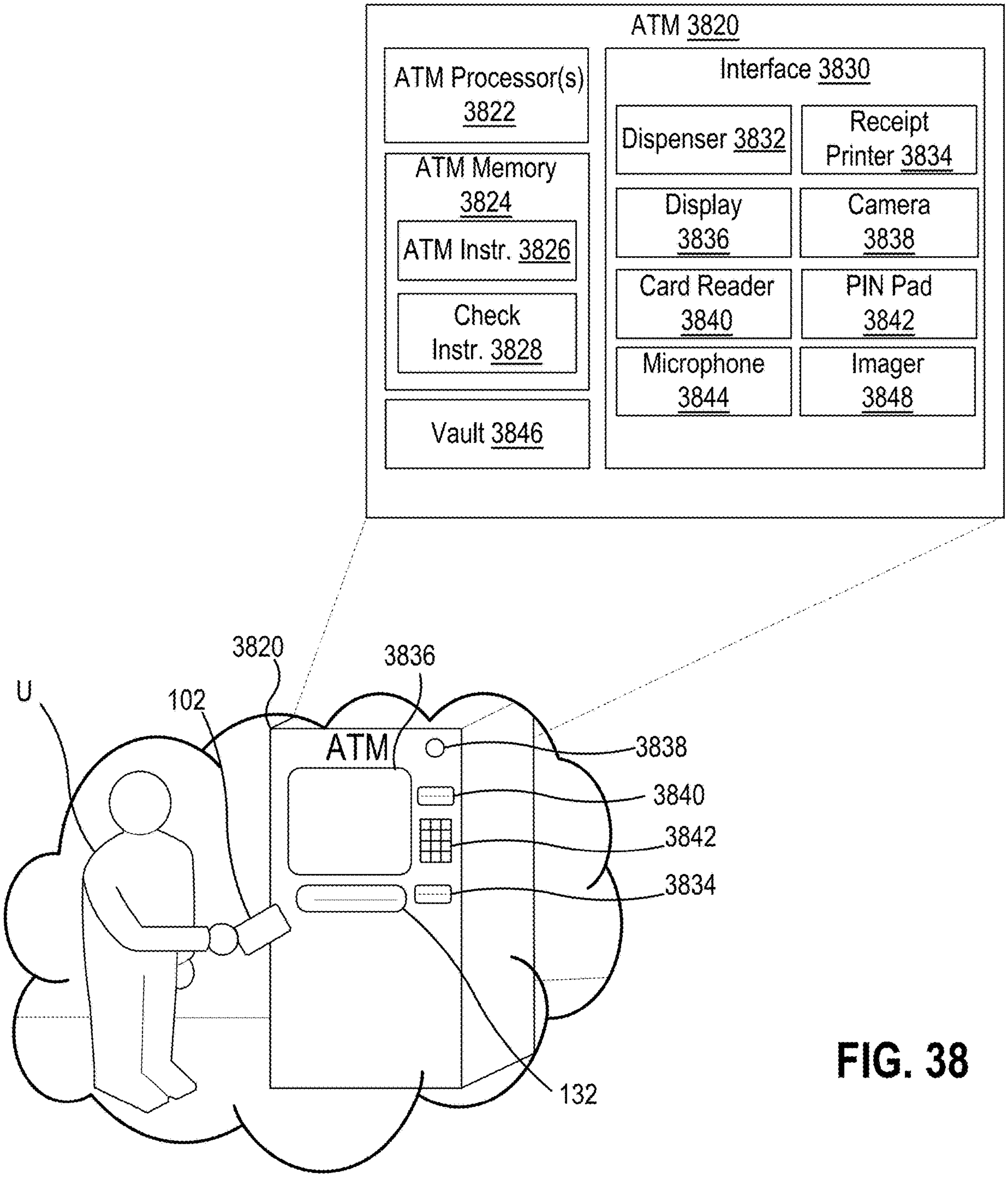
FIG. 38 illustrates an example system including an ATM.

FIG. 38 illustrates an example system including an ATM 3820.

The ATM 3820 is an automated teller machine. An automated teller machine is a special purpose, self-service machine that accepts or dispenses cash directly to users. ATMs typically also permit users to engage in financial transactions, such as inquiring about a balance or transferring funds between accounts. In the illustrated example, the ATM 3820 includes one or more ATM processors 3822, ATM memory 3824, an interface 3830 and a vault 3846.

The one or more ATM processors 3822 are one or more components of the ATM 3820 that execute instructions, such as instructions that obtain data, process the data, and provide output based on the processing. The one or more ATM processors 3822 can include one or more aspects described below in relation to the one or more processors 1602 of FIG. 16.

The ATM memory 124 is a collection of one or more components of the ATM 120 configured to store instructions and data for later retrieval and use. The ATM memory 3820 can include one or more aspects described below in relation to the memory 1614 of FIG. 16. The ATM memory 3820 can store ATM instructions 3826 and check instructions 3828.

The ATM instructions 3826 are instructions that, when executed by the one or more processors 3822, cause the one or more processors 3822 to provide functionality related to the ATM.

The check instructions 3828 are instructions that, when executed by the one or more processors 3822, cause the one or more processors 3822 to perform one or more operations described herein, including related to depositing or processing a check or other document.

The one or more ATM interfaces 3830 are one or more components of the ATM 3820 that facilitate receiving input from and providing output to something external to the ATM 3820. The one or more ATM interfaces 3830 can include one or more aspects described below in relation to the one or more interfaces 1604, 1606 of FIG. 16. In the illustrated example, the interface 3830 includes components such as a dispenser 3832, a receipt printer 3834, a display 3836, a camera 3838, a card reader 3840, a PIN pad 3842, and an imager 3848.

The dispenser 3832 is a component of the ATM 3820 that is configured to dispense cash to a user of the ATM 3820. In an example, the one or more ATM processors 3822 execute instructions that cause the dispenser 3832 to obtain or receive a selected amount of cash from the vault 3846 and provide the selected amount of cash to the user.

The receipt printer 3834 is a component of the ATM 3820 that is configured to print a receipt and provide the receipt to the user. For example, the one or more ATM processors 3822 execute instructions that cause the receipt printer 3834 to print information on the receipt.

The display 3836 is a component configured to provide visual output to a user. In some examples, the display 3836 is touch sensitive and capable of receiving input from a user.

The camera 3838 is a component configured to produce data based on a visual environment of interest. In many implementations, the data encodes images or a series of images forming video representative of the visual environment. In examples herein, the camera 3838 can be a security camera disposed to monitor activity associated with the ATM, such as activity in an area associated with a person using the ATM.

The card reader 3840 is a component configured to read data from a card usably disposed proximate the card reader 3840. In some examples, the card reader 3840 physically receives a card and reads a magnetic strip, chip, or another component of the card. The data produced by the card reader 3840 can be provided to the one or more ATM processors 3822 for usage in performing operations of the ATM (e.g., accessing a financial account associated with the card). In some examples, the card reader 3840 reads the card using wireless technology, such as using near field communication.

The PIN pad 3842 is a component configured to receive a PIN from a user and associated input. The PIN pad 3842 can take any of a variety of forms depending on how the ATM 3820 is configured. In many examples, a PIN pad 3842 includes not only a number pad but also buttons corresponding to other values or features, such as cancel, accept, and clear input. In some examples, the PIN pad 3842 includes security features configured to protect information received from the user via the PIN pad 3842.

The microphone 3844 is a component configured to produce data based on an audio environment of interest. In many implementations.

The vault 3846 is a compartment within the ATM 3820 that stores cash and, optionally, other items benefitting from high security (e.g., deposited checks). The vault may be made from reinforced materials and be configured to resist higher amounts of tampering than other components of the ATM 3820. The vault 3846 can be configured such that cash can leave the vault and be sent to the dispenser 3832.

The imager 3848 is a component configured to obtain images of a check deposited in the ATM 3820. In an example, the imager 3848 is a scanner. In another example, the imager 3848 is a camera.

In some examples, the ATM 3820 includes fasteners durably securing the ATM 3820 in place, such as by being bolted to a floor on which the ATM 3820 sits.

Figure 39:
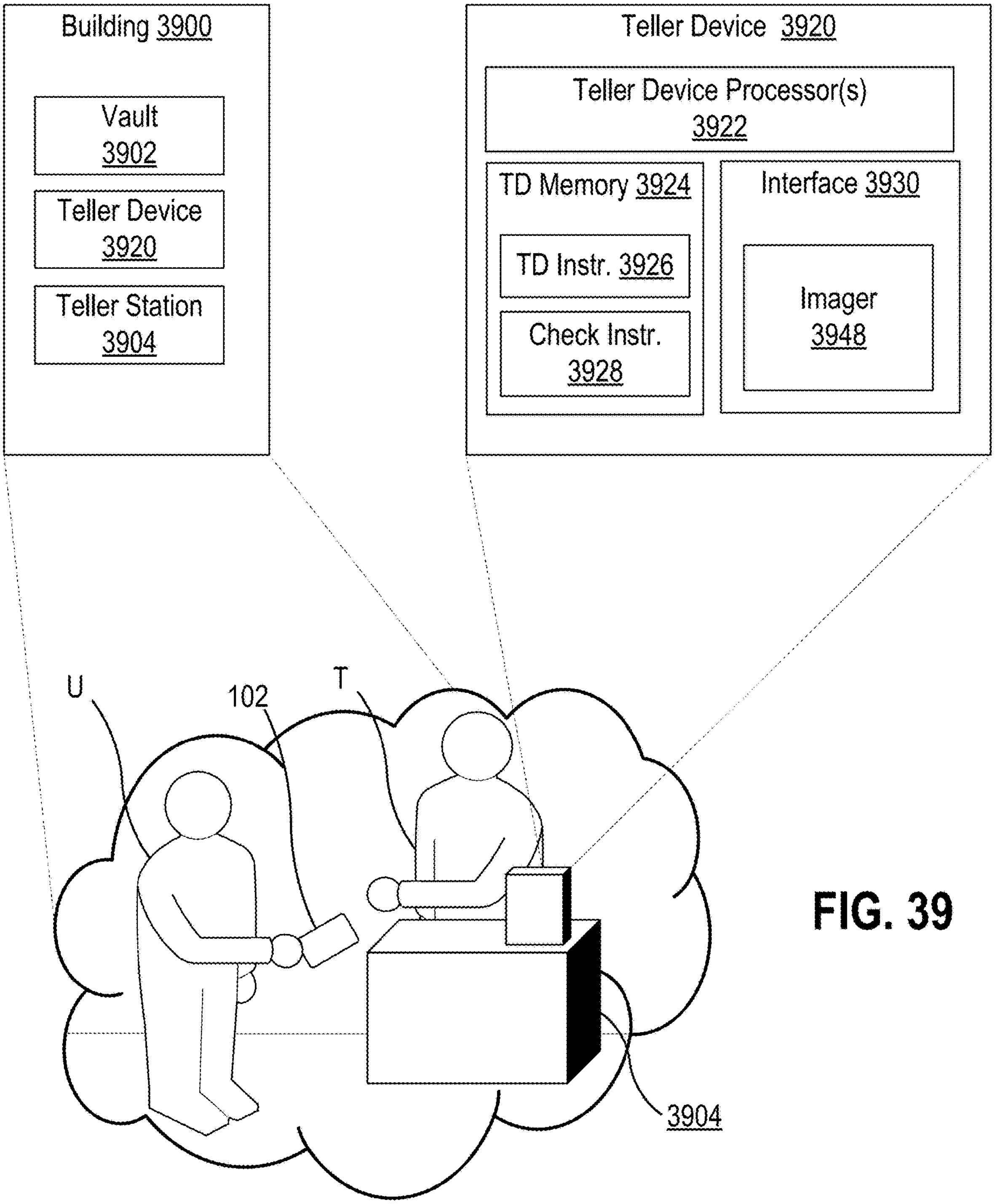
FIG. 39 illustrates an example system including a teller device.

FIG. 39 illustrates an example system including a teller device 3920 of a teller T. The teller device 3920 can be at a teller station 3904 (e.g., a desk or booth associated with a teller) within a building 3900 (e.g., a bank). The building 3900 can include a vault 3902. The vault 3902 can be a secure location for the storage of valuable materials (e.g., cash or safe deposit boxes).

The teller device 3920 can be a device used by the teller to fulfill one or more requests from customers. In some examples, the teller device 3920 is a general-purpose computer (e.g., a desktop or laptop computer), a special purpose computer (e.g., having integrated or external special-purpose hardware for scanning checks, receiving currency, dispensing currency, other components or combinations thereof). In the illustrated example, the teller device 3920 can include one or more teller device processors 3922, a set of teller device memory 3924, and one or more interfaces 3930.

The one or more teller device processors 3922 are one or more components of the teller device 3920 that execute instructions, such as instructions that obtain data, process the data, and provide output based on the processing. The one or more teller device processors 3922 can include one or more aspects described below in relation to the one or more processors 1602 of FIG. 16.

The set of teller device memory 3924 is a collection of one or more components of the teller device 3920 configured to store instructions and data for later retrieval and use. The teller device memory 3924 can include one or more aspects described below in relation to the memory 1614 of FIG. 16. The teller device memory 3924 can store teller device instructions 3926 and check instructions 3928.

The teller device instructions 3926 are instructions that, when executed by the one or more processors 3922, cause the one or more processors 3922 to provide functionality related to the teller device 3920, such as obtaining client account information, updating account information, performing transactions, other operations, or combinations thereof.

The check instructions 3928 are instructions that, when executed by the one or more processors 3922, cause the one or more processors 3922 to perform one or more operations described herein, including related to depositing or processing a check or other document.

The one or more teller device interfaces 3930 are one or more components of the teller device 3920 that facilitate receiving input from and providing output to something external to the teller device 3920. The one or more teller device interfaces 3930 can include one or more aspects described below in relation to the one or more interfaces 1604, 1606 of FIG. 16. In the some examples, the interface 3930 can include components such as a cash dispenser (or register drawer), a printer, a display, a card reader, other components, or combinations thereof. In the illustrated example, the interface 3930 includes an imager 3948. The imager 3948 is a component configured to produce an image (e.g., data representative) of a physical object. In some examples, the imager 3948 is a scanner, camera, or other device.

Although this figure is discussed within the context of a teller, a bank, and a customer, the same or similar technology can be applied in other contexts where documents are processed. For example, an attendant at an airport, border crossing, or other secured area may obtain, scan, and process a person's identity documentation with a device similar to that of the teller device using similar processing techniques described above in the context of mobile check deposit (e.g., performing OCR on one or more portions of a document for processing).

Additional Local Processing

In addition to performing optical character recognition locally on a user's mobile device, other techniques can be performed. For example, there may be one or more fraud detection processes that can be performed on the user's device. For example, techniques for detecting fraud and performing other processing on institutional checks is described in U.S. patent application Ser. No. 18/930,543, which is titled "DETECTING AND REMEDIATING ANOMALIES IN INSTITUTIONAL FINANCIAL INSTRUMENTS USING IMAGE PROCESSING", which was filed on Oct. 29, 2024, and which is incorporated herein by reference in its entirety for any and all purposes. One example technique described therein is an example method that performing a text extraction process on a check image to obtain check textual information, and decoding an intelligent mail barcode (IMB) in the check image to obtain a character code. The method further includes utilizing the character code to extract encoded check information including a payee ZIP code from the IMB. The method also includes performing a fraud detection process on the check image based on at least one of (1) scores generated during the text extraction process, or (2) inconsistency between the check textual information and the encoded check information. Such techniques may be used in conjunction with techniques described herein.

In some instances, there are enhanced features that can be activated based on a potential fraud threshold. If a likelihood that a check image being processed is fraudulent exceeds a threshold, then one or more steps can be taken based thereon. For instance, such techniques may bypass one or more of the processing techniques and result in sending a high-quality image of the check for additional (e.g., manual) processing. Further, the device may take an additional image (e.g., by prompting the user to take such an image) of the check having one or more camera parameters modified to enhance the detection of fraud in the resulting image.

A person of skill in the art, having benefit of this disclosure, may recognize various ways for implementing technology described herein, such as by using any of a variety of programming languages (e.g., a C-family programming language, PYTHON, JAVA, RUST, HASKELL, other languages, or combinations thereof), libraries (e.g., libraries that provide functions for obtaining, processing, and presenting data), compilers, and interpreters to implement aspects described herein. Example libraries include NLTK (Natural Language Toolkit) by Team NLTK (providing natural language functionality), PYTORCH by META (providing machine learning functionality), NUMPY by the NUMPY Developers (providing mathematical functions), and BOOST by the Boost Community (providing various data structures and functions) among others. Operating systems (e.g., WINDOWS, LINUX, MACOS, IOS, and ANDROID) may provide their own libraries or application programming interfaces useful for implementing aspects described herein, including user interfaces and interacting with hardware or software components. Web applications can also be used, such as those implemented using JAVASCRIPT or another language. A person of skill in the art, with the benefit of the disclosure herein, can use programming tools to assist in the creation of software or hardware to achieve techniques described herein. Such tools can include intelligent code completion tools (e.g., INTELLISENSE) and artificial intelligence tools (e.g., GITHUB COPILOT or CODE LLAMA by META).

In some examples, large language models can be used to understand natural language, generate natural language, or perform other tasks. Examples of such large language models include CHATGPT or other flagship models (GPT-4o, o3, o4, 4.5, or others as released) by OPENAI, a LLAMA model by META, a CLAUDE model by ANTHROPIC, a GEMINI model by GOOGLE, others, or combinations thereof. Such models can be fine-tuned on relevant data using any of a variety of techniques to improve the accuracy and usefulness of the answers. The models can be run locally on server or client devices or accessed via an application programming interface. Some of those models or services provided by entities responsible for the models may include other features, such as speech-to-text features, text-to-speech, image analysis, research features, and other features, which may also be used as applicable.

One or more techniques described herein can benefit from or be implemented using a machine learning framework. A machine learning framework is a collection of software and data that implements artificial intelligence trained to provide output based on input. Examples of artificial intelligence that can be implemented in a trainable way include neural networks (including recurrent neural networks), language models (including so-called "large language models"), generative models, natural language processing models, adversarial networks, decision trees, Markov models, support vector machines, genetic algorithms, others, or combinations thereof. Machine learning frameworks or components thereof are often built or refined from existing frameworks, such as TENSORFLOW by GOOGLE, INC. or PYTORCH by the PYTORCH community. The machine learning framework 3000 can include one or more models that are the structured representation of learning and an interface that supports use of the model.

The model can take any of a variety of forms. In many examples, the model includes representations of nodes (e.g., neural network nodes, decision tree nodes, Markov model nodes, other nodes, or combinations thereof) and connections between nodes (e.g., weighted or unweighted unidirectional or bidirectional connections). In certain implementations, the model 3002 can include a representation of memory (e.g., providing long short-term memory functionality). Where the set includes more than one model, the models can be linked, cooperate, or compete to provide output.

The interface can include software procedures (e.g., defined in a library) that facilitate the use of the model, such as by providing a way to interact with the model (e.g., receive and prepare input, processing the input with the model and provide output). The interface can define a vector embedding technique for creating a representation of data usable as input into the model. Example embedding techniques include Word2Vec and BERT. The software can further provide the ability to create, customize, fine tune, and train the model.

In an example implementation, interface can provide a training method that includes initializing a model, obtaining training data, providing a portion of the training data to the model to produce an actual output, comparing the expected output with the actual output, updating the model based on the result of the comparison (e.g., updating weights of the model, such as using backpropagation), continuing providing training data and updating the model until a stopping criterion has been reached, and deploying the trained model for use in production.

While particular uses of the technology have been illustrated and discussed above, the disclosed technology can be used with a variety of data structures and processes in accordance with many examples of the technology. The above discussion is not meant to suggest that the disclosed technology is only suitable for implementation with the data structures shown and described above.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., operations, memory arrangements, etc.) described with respect to the figures herein are not intended to limit the technology to the particular aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

This application incorporates certain other applications by reference. To the extent that there is a conflict between the material in this specification and the material that is incorporated by reference, the subject matter of this specification (as opposed to the incorporated one) controls for the purposes of resolving that conflict.

Various embodiments are described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Whenever appropriate, terms used in the singular also will include the plural and vice versa. The use of "a" herein means "one or more" unless stated otherwise or where the use of "one or more" is clearly inappropriate. The use of "or" means "and/or" unless stated otherwise. The use of "comprise," "comprises," "comprising," "include," "includes," and "including" are interchangeable and not intended to be limiting. The term "such as" also is not intended to be limiting. For example, the term "including" shall mean "including, but not limited to."

The following are clauses relative to the present disclosure, which could be combined and/or otherwise integrated with any of the embodiments described above or listed in the claims below.

Search Regions to Find Missing Characters

Clause 1. A method comprising:
- obtaining an image snippet containing characters;
- determining a first set of bounding boxes for a first subset of the characters, wherein a second subset of the characters are not associated with a respective bounding box of the first set of bounding boxes;
- defining a set of search regions within the image snippet, wherein each respective search region of the set of search regions is an area within the image snippet that is not contained within one of the determined bounding boxes of the first set of bounding boxes;
- defining additional bounding boxes based on the set of search regions, thereby defining a second set of bounding boxes that includes the first set of bounding boxes for the first subset of the characters and one or more additional bounding boxes associated with the second subset of characters;
- processing each respective bounding box of the second set of bounding boxes; and
- returning a result of the processing.

Clause 2. The method of clause 1, further comprising:
- fitting at least one spline with respect to the image snippet,
- wherein identifying the set of search regions includes identifying at least one region with respect to the at least one spline.

Clause 3. The method of clause 2,
- wherein the at least one spline includes a top spline and a bottom spline; and
- wherein each respective search region of the set of search regions is bounded by (1) the top spline or a top of the snippet, (2) the bottom spline 'or a bottom of the snippet, (3) a right side of a bounding box to the left of the respective search region or a left side of the snippet, and (4) a left side of a bounding box to the right of the respective search region or a right side of the snippet.

Clause 4. The method of clause 1, further comprising filtering the search regions by removing at least one search region from the set of search regions.

Clause 5. The method of clause 4, wherein the filtering includes:
- for each respective search region of the search regions:
  - removing the respective search region from the set responsive to dimensions of the respective search region being too small to encompass a MICR character; or
  - removing the respective search region from the set responsive to the search region containing less than a threshold number of pixels that may make up a character.

Clause 6. The method of clause 5, wherein a respective search region is too small if the dimensions of the respective search region are less than a threshold percentage of a size of a bounding box of the first set of bounding boxes.

Clause 7. The method of clause 1, wherein the image snippet is a subset of a larger image of a check and the characters include MICR characters.

Clause 8. The method of clause 1, further comprising:
- for at least one original search region in the set of search regions, splitting the at least one original search region into at least two new search regions; and
- adding the at least two new search regions to the set of search regions.

Clause 9. The method of clause 1, further comprising:
- summing the pixel values in columns of a specific search region of the set of search regions to form a set of sums;
- identifying a local maxima or minima within the set of sums that satisfies a threshold;
- determining a boundary within the specific search region using the local maxima or minima;
- breaking the specific search region into at least two new search regions using the boundary.

Clause 10. The method of clause 9, further comprising:
- replacing the specific search region of the set of search regions with the at least two new search regions.

Clause 11. The method of clause 9, further comprising determining the threshold based on a statistical analysis of the sums.

Clause 12. The method of clause 1, wherein processing each respective bounding box of the second set of bounding boxes includes:
- for each respective bounding box of the second set of bounding boxes, determining a character represented by a character snippet within a region of the image snippet defined by the respective bounding box.

Clause 13. The method of clause 12,
- wherein the processing results in a string of characters; and
- wherein the method further comprises returning the string of characters to a calling function.

Clause 14. The method of clause 12, wherein the determining the character represented by the respective character snippet includes comparing each of the one or more character snippets to one or more templates.

Clause 15. The method of clause 14, wherein comparing each of the one or more character snippets to one or more templates includes:
- for each respective character snippet of the one or more character snippets:
  - for each respective template of the one or more templates:
    - calculating an exclusive- or operation between the respective character snippet and the respective template; and
    - summing the resulting values to form a difference score;
  - identifying a character-template pair having the lowest difference score, wherein the character-template pair comprises the respective character snippet and one of the one or more templates;

assigning to the respective character snippet a character associated with the template of the character-template pair.

Clause 16. The method of clause 15, further comprising:

calculating an acceptance ratio based on a dividing the difference score associated with the character-template pair by a sum of values in the character snippet of the character-template pair, wherein determining the character represented by each of the one or more character snippets includes determining an acceptance ratio.

Clause 17. The method of clause 14, wherein comparing each of the one or more character snippets to one or more templates includes:

generating a conforming outer perimeter of a respective character within a respective character snippet; and comparing the conforming outer perimeter of the respective character with one or more templates of a set of template conforming outer perimeters for each integer zero through nine of a specific font.

Clause 18. The method of clause 1, wherein the method is performed by one or more processors of a mobile device having a camera.

Clause 19. A set of one or more non-transitory computer-readable media having instructions thereon that when executed by a set of one or more processors, cause the set to perform the method of clause 1.

Clause 20. An apparatus comprising the set of one or more processors and the set of one or more non-transitory computer-readable media of clause 19.

Image Processing with Convex Hull

Clause 21. A method comprising:

receiving an image having a region of interest;

performing a binary conversion on the image to produce a binarized image;

generating contours for region of interest in the binarized image;

applying a convex hull operation to the generated contours for the binarized image;

obtaining a set of corners from the generated contours following the application of the convex hull operation;

evaluating the set of corners;

determining that the set of corners passes the evaluation;

evaluating a quality of the image;

determining that the image passes the evaluation of quality; and providing the image for further processing.

Clause 22. The method of clause 21, wherein evaluating the set of corners includes performing at least one operation from the corner evaluation group consisting of:

evaluating absolute size defined by the corners;

evaluating relative size defined by the corners;

evaluating whether a region of interest is in frame based on the corners;

evaluating corner angles of the corners;

validating consistency based on the corners; and validating an aspect ratio based on the corners.

Clause 23. The method of clause 22, wherein evaluating the set of corners includes performing at least three operations from the corner evaluation group.

Clause 24. The method of clause 22, wherein evaluating the set of corners includes performing at least five operations from the corner evaluation group.

Clause 25. The method of clause 22, wherein evaluating absolute size defined by the corners includes deriving a height from at least two of the corners and a length from at least two of the corners and comparing the height and length to respective thresholds;

wherein evaluating relative size defined by the corners includes calculating an area of the image bounded by the contours relative the overall size of the image;

wherein evaluating whether a region of interest is in frame based on the corners includes determining whether the corners lie within a threshold distance away from an edge of the image;

wherein evaluating corner angles of the corners includes determining whether angles of the corners fall within a predetermined acceptable range;

wherein validating consistency based on the corners includes:

determining that a left height a left side and a right height of a right side are within a certain threshold amount or percentage of each other; and determining that a top length of a top side and a bottom length of a bottom side are within a certain threshold amount or percentage of each other; and wherein validating an aspect ratio based on the corners includes deriving a height from at least two of the corners and a length from at least two of the corners and comparing a ratio based on the height and length to an acceptable ratio.

Clause 26. The method of clause 21, wherein evaluating the quality of the image includes performing at least one operation from a quality evaluation group consisting of:

a noise detection operation;

a minimal background validation operation;

a brightness validation operation;

a contrast validation operation;

a text contrast validation operation;

an image focus validation operation; and a glare detection operation.

Clause 27. The method of clause 26, wherein evaluating the quality includes performing at least three operations from the quality evaluation group.

Clause 28. The method of clause 26, wherein evaluating the quality includes performing at least five operations from the quality evaluation group.

Clause 29. The method of clause 26, wherein the noise detection operation includes:

comparing the image to a blurred version of the image to form a comparison;

measuring a variance of pixel intensities based on the comparison; and flagging the image as noisy responsive to the variance being below a predetermined threshold;

wherein the minimal background validation operation includes:

detecting a main rectangle in the image;

determining a ratio of the area of the main rectangle to an overall area of the image; and flagging the image responsive to the ratio exceeding a threshold;

wherein the brightness validation operation includes:

creating a grayscale version of the image;

determining an average brightness of the grayscale version;

flagging the image responsive to the average brightness not falling within an acceptable brightness range;

wherein the contrast validation operation includes:

creating a grayscale version of the image;

determining an average contrast of the grayscale version;

flagging the image responsive to the average contrast not falling within an acceptable brightness range;

wherein the text contrast validation operation includes:

calculating a text region average pixel intensity of a text region in the image;

calculating a non-text region average pixel intensity of a non-text region in the image;

flagging the image if a ratio between the text region pixel intensity and the non-text region average pixel intensity does not satisfy a threshold;

wherein the image focus validation operation includes:

applying a filter to a grayscale version of the image;

measuring a variance based on the filtered grayscale version; and flagging the image responsive to the variance failing to satisfy a threshold; and wherein the glare detection operation includes:

calculating an area of regions having significant brightness in a grayscale version of the image;

comparing the area of regions having significant brightness with a total image area of the image to form a ratio; and flagging the image responsive to the ratio exceeding or failing to satisfy a threshold.

Clause 30. The method of clause 21, further comprising: performing one or more image conversion or cleanup steps with respect to the image.

Clause 31. The method of clause 21, further comprising: applying one or more morphological modifications to the binarized image selected from the group consisting of: light erosion, heavy erosion, inversion with light erosion, and inversion with heavy erosion.

Clause 32. The method of clause 21, further comprising: applying a correction selected from the group consisting of: a position normalizing operation; a proportion normalizing operation; a skewing operation; a deskewing operation; a rotation operation; a scaling operation; a stretching operation; and a moving operation.

Clause 33. The method of clause 21, wherein determining that the image passes the evaluation of quality includes determining that the evaluation of quality did not flag the image.

Clause 34. The method of clause 21, wherein providing the image for further processing includes applying an optical character recognition technique to the image.

Clause 35. The method of clause 21, wherein the method is performed by one or more processors of a mobile device having a camera.

Clause 36. The method of clause 21, wherein the region of interest is a check within the image.

Clause 37. The method of clause 36, wherein generating the contours for the region of interest includes incorrectly generating a convexity within the check; and wherein applying the convex hull operation results in correcting the convexity.

Clause 38. The method of clause 21, further comprising: capturing the image using a camera of a device; and wherein the device performs the method.

Clause 39. A set of one or more non-transitory computer-readable media having instructions thereon that when executed by a set of one or more processors, cause the set to perform the method of clause 21.

Clause 40. An apparatus comprising the set of one or more processors and the set of one or more non-transitory computer-readable media of clause 39.

Image Processing with Corner Validation

Clause 51. A method comprising:

receiving an image having a region of interest;

performing a binary conversion on the image to produce a binarized image;

generating contours for region of interest in the binarized image;

evaluating the set of corners;

determining that the set of corners passes the evaluation;

providing the image for further processing, wherein evaluating the set of corners includes performing at least one evaluation operation from an evaluation group consisting of:

an evaluating absolute size operation that includes evaluating an absolute size defined by the corners includes deriving a height from at least two of the corners and a length from at least two of the corners and comparing the height and length to respective thresholds;

a relative size operation that includes evaluating relative size defined by the corners includes calculating an area of the image bounded by the contours relative the overall size of the image;

an in-frame operation that includes evaluating whether a region of interest is in frame based on the corners includes determining whether the corners lie within a threshold distance away from an edge of the image;

a corner angles operation that includes evaluating corner angles of the corners includes determining whether angles of the corners fall within a predetermined acceptable range;

a consistency operation that includes:

determining that a left height a left side and a right height of a right side are within a certain threshold amount or percentage of each other; and determining that a top length of a top side and a bottom length of a bottom side are within a certain threshold amount or percentage of each other; and an aspect ratio operation that includes validating an aspect ratio based on the corners includes deriving a height from at least two of the corners and a length from at least two of the corners and comparing a ratio based on the height and length to an acceptable ratio.

Clause 52. The method of clause 51, wherein evaluating the set of corners includes performing at least two evaluation operations from the evaluation group.

Clause 53. The method of clause 51, wherein evaluating the set of corners includes performing at least three evaluation operations from the evaluation group.

Clause 54. The method of clause 51, wherein evaluating the set of corners includes performing at least four evaluation operations from the evaluation group.

Clause 55. The method of clause 51, wherein evaluating the set of corners includes performing at least five evaluation operations from the evaluation group.

Clause 56. The method of clause 51, further comprising:
applying a convex hull operation to the generated contours for the binarized image; and
obtaining a set of corners from the generated contours following the application of the convex hull operation.

Clause 57. The method of clause 51, further comprising:
evaluating a quality of the image; and
determining that the image passes the evaluation of quality.

Clause 58. The method of clause 57, wherein evaluating the quality of the image includes performing at least one operation from a quality evaluation group consisting of:
a noise detection operation;
a minimal background validation operation;
a brightness validation operation;
a contrast validation operation;
a text contrast validation operation;
an image focus validation operation; and
a glare detection operation.

Clause 59. The method of clause 58, wherein evaluating the quality includes performing at least three operations from the quality evaluation group.

Clause 60. The method of clause 58, wherein evaluating the quality includes performing at least five operations from the quality evaluation group.

Clause 61. The method of clause 58,
wherein the noise detection operation includes:
comparing the image to a blurred version of the image to form a comparison;
measuring a variance of pixel intensities based on the comparison; and
flagging the image as noisy responsive to the variance being below a predetermined threshold;
wherein the minimal background validation operation includes:
detecting a main rectangle in the image;
determining a ratio of the area of the main rectangle to an overall area of the image; and
flagging the image responsive to the ratio exceeding a threshold;
a brightness validation operation includes:
creating a grayscale version of the image;
determining an average brightness of the grayscale version;
flagging the image responsive to the average brightness not falling within an acceptable brightness range;
wherein a contrast validation operation includes:
creating a grayscale version of the image;
determining an average contrast of the grayscale version;
flagging the image responsive to the average contrast not falling within an acceptable brightness range;
wherein the text contrast validation operation includes:
calculating a text region average pixel intensity of a text region in the image;
calculating a non-text region average pixel intensity of a non-text region in the image;
flagging the image if a ratio between the text region pixel intensity and the non-text region average pixel intensity does not satisfy a threshold;
wherein the image focus validation operation includes:
applying a filter to a grayscale version of the image;
measuring a variance based on the filtered grayscale version; and
flagging the image responsive to the variance failing to satisfy a threshold; and
wherein the glare detection operation includes:
calculating an area of regions having significant brightness in a grayscale version of the image;
comparing the area of regions having significant brightness with a total image area of the image to form a ratio; and
flagging the image responsive to the ratio exceeding or failing to satisfy a threshold.

Clause 62. The method of clause 51, further comprising:
performing one or more image conversion or cleanup steps with respect to the image.

Clause 63. The method of clause 51, further comprising:
applying one or more morphological modifications to the binarized image selected from the group consisting of: light erosion, heavy erosion, inversion with light erosion, and inversion with heavy erosion.

Clause 64. The method of clause 51, further comprising:
applying a correction selected from the group consisting of: a position normalizing operation; a proportion normalizing operation; a skewing operation; a deskewing operation; a rotation operation; a scaling operation; a stretching operation; and a moving operation.

Clause 65. The method of clause 51, wherein providing the image for further processing includes applying an optical character recognition technique to the image.

Clause 66. The method of clause 51, wherein the method is performed by one or more processors of a mobile device having a camera.

Clause 67. The method of clause 51, wherein the region of interest is a check within the image.

Clause 68. The method of clause 51, further comprising:
capturing the image using a camera of a device; and
wherein the device performs the method.

Clause 69. A set of one or more non-transitory computer-readable media having instructions thereon that when executed by a set of one or more processors, cause the set to perform the method of clause 51.

Clause 70. An apparatus comprising the set of one or more processors and the set of one or more non-transitory computer-readable media of clause 69.

Image Processing with Quality Validation

Clause 71. A method comprising:
receiving an image having a region of interest;
performing a binary conversion on the image to produce a binarized image;
generating contours for region of interest in the binarized image;
determining that the set of corners passes the evaluation;
evaluating a quality of the image;
determining that the image passes the evaluation of quality; and
providing the image for further processing,
wherein evaluating the quality of the image includes performing one or more quality operations selected from the quality group consisting of:
a noise detection operation that includes:
comparing the image to a blurred version of the image to form a comparison;
measuring a variance of pixel intensities based on the comparison; and
flagging the image as noisy responsive to the variance being below a predetermined threshold;

a minimal background validation operation that includes:

detecting a main rectangle in the image;

determining a ratio of the area of the main rectangle to an overall area of the image; and flagging the image responsive to the ratio exceeding a threshold;

a brightness validation operation that includes:

creating a grayscale version of the image;

determining an average brightness of the grayscale version;

flagging the image responsive to the average brightness not falling within an acceptable brightness range;

a contrast validation operation that includes:

creating a grayscale version of the image;

determining an average contrast of the grayscale version;

flagging the image responsive to the average contrast not falling within an acceptable brightness range;

a text contrast validation operation that includes:

calculating a text region average pixel intensity of a text region in the image;

calculating a non-text region average pixel intensity of a non-text region in the image;

flagging the image if a ratio between the text region pixel intensity and the non-text region average pixel intensity does not satisfy a threshold;

a image focus validation operation that includes:

applying a filter to a grayscale version of the image;

measuring a variance based on the filtered grayscale version; and flagging the image responsive to the variance failing to satisfy a threshold; and a glare detection operation that includes:

calculating an area of regions having significant brightness in a grayscale version of the image;

comparing the area of regions having significant brightness with a total image area of the image to form a ratio; and flagging the image responsive to the ratio exceeding or failing to satisfy a threshold.

Clause 72. The method of clause 71, wherein evaluating the quality performing at least two quality operations from the quality group.

Clause 73. The method of clause 71, wherein evaluating the quality performing at least three quality operations from the quality group.

Clause 74. The method of clause 71, wherein evaluating the quality performing at least four quality operations from the quality group.

Clause 75. The method of clause 71, wherein evaluating the quality performing at least five quality operations from the quality group.

Clause 76. The method of clause 71, wherein evaluating the quality performing at least six quality operations from the quality group.

Clause 77. The method of clause 71, further comprising:

applying a convex hull operation to the generated contours for the binarized image; and obtaining a set of corners from the generated contours following the application of the convex hull operation.

Clause 78. The method of clause 71, further comprising: evaluating the set of corners.

Clause 79. The method of clause 78, wherein evaluating the set of corners includes performing at least one evaluation operation from an evaluation group consisting of:

an evaluating absolute size operation that includes evaluating an absolute size defined by the corners includes deriving a height from at least two of the corners and a length from at least two of the corners and comparing the height and length to respective thresholds;

a relative size operation that includes evaluating relative size defined by the corners includes calculating an area of the image bounded by the contours relative the overall size of the image;

an in-frame operation that includes evaluating whether a region of interest is in frame based on the corners includes determining whether the corners lie within a threshold distance away from an edge of the image;

a corner angles operation that includes evaluating corner angles of the corners includes determining whether angles of the corners fall within a predetermined acceptable range;

a consistency operation that includes:

determining that a left height a left side and a right height of a right side are within a certain threshold amount or percentage of each other; and determining that a top length of a top side and a bottom length of a bottom side are within a certain threshold amount or percentage of each other; and an aspect ratio operation that includes validating an aspect ratio based on the corners includes deriving a height from at least two of the corners and a length from at least two of the corners and comparing a ratio based on the height and length to an acceptable ratio.

Clause 80. The method of clause 79, wherein evaluating the set of corners includes performing at least two evaluation operations from the evaluation group.

Clause 81. The method of clause 79, wherein evaluating the set of corners includes performing at least three evaluation operations from the evaluation group.

Clause 82. The method of clause 79, wherein evaluating the set of corners includes performing at least four evaluation operations from the evaluation group.

Clause 83. The method of clause 71, further comprising: applying one or more morphological modifications to the binarized image selected from the group consisting of: light erosion, heavy erosion, inversion with light erosion, and inversion with heavy erosion.

Clause 84. The method of clause 71, further comprising: applying a correction selected from the group consisting of: a position normalizing operation; a proportion normalizing operation; a skewing operation; a deskewing operation; a rotation operation; a scaling operation; a stretching operation; and a moving operation.

Clause 85. The method of clause 71, wherein providing the image for further processing includes applying an optical character recognition technique to the image.

Clause 86. The method of clause 71, wherein the method is performed by one or more processors of a mobile device having a camera.

Clause 87. The method of clause 71, wherein the region of interest is a check within the image.

Clause 88. The method of clause 71, further comprising: capturing the image using a camera of a device; and wherein the device performs the method.

Clause 89. A set of one or more non-transitory computer-readable media having instructions thereon that when executed by a set of one or more processors, cause the set to perform the method of clause 71.

Clause 90. An apparatus comprising the set of one or more processors and the set of one or more non-transitory computer-readable media of clause 89.

Split Processing

Clause 91. A method for remote processing of an object, the method comprising:
- activating an image capture device of the mobile device;
- receiving a first image of the object, the first image captured by the image capture device of a mobile device; and
- extracting a first snippet from the first image;
- extracting a second snippet from the first image;
- performing, using the first mobile device, optical character recognition on the first snippet to generate first optical character recognition data;
- sending the second snippet to another device for processing;
- receiving second optical character recognition data from the another device;
- verifying the first optical character recognition data and the second optical character recognition data;
- responsive to the verifying, providing the first optical character recognition data and the second optical character recognition data to a server for validation processing;
- after providing the first and second optical character recognition data, receiving a confirmation notification from the server responsive to the providing;
- after receiving the confirmation notification, presenting, on a user interface of the mobile device, a request for confirmation from the user for further processing; and
- receiving a user confirmation from the user in response to the request for confirmation; and
- only after receiving the user confirmation, providing by the mobile device an image of the entire object to the server for further processing.

Clause 92. The method of clause 91, wherein the providing by the mobile device the image of the entire object to the server for further processing after receiving the user confirmation is the first time that an image of the entire object has left the mobile device.

Clause 93. The method of clause 91, wherein the another device is the server.

Clause 94. The method of clause 91, wherein the another device is a different server than the server.

Clause 95. The method of clause 91, further comprising: sending an account identification number from the mobile device to the server only after receiving the user confirmation.

Clause 96. The method of clause 91, further comprising: presenting at least a portion of the first image or an image derived from the first image to the user for a first time only after the first image was sent to the server for additional processing.

Clause 97. The method of clause 91, wherein manual user actuation directly causes the image capture device to capture the first image.

Clause 98. The method of clause 91, further comprising:
- generating a representation image including at least some of the first optical character recognition data; and
- presenting the representation image but not the first image to the user.

Clause 99. The method of clause 91, further comprising:
- at the mobile device and prior to providing the first optical character recognition data to the server for validation processing:
  - determining a similarity value between the first optical character recognition data and prior optical character recognition data sent to the server,
  - wherein providing the second optical character recognition data to the server for validation processing occurs responsive to the similarity failing to pass a threshold.

Clause 100. The method of clause 91, wherein providing the image of the entire object to the server includes providing an image of the entire front of the object.

Clause 101. The method of clause 100, wherein providing the image of the entire object to the server includes providing an image of the entire front and the entire back of the object.

Clause 102. The method of clause 91, wherein an image is of the entire object if the image contains at least four outer corners of the object.

Clause 103. A method for remote processing of an object, the method comprising:
- activating an image capture device of the mobile device;
- receiving a first image of the object, the first image captured by the image capture device of a mobile device; and
- extracting a first snippet from the first image;
- extracting a second snippet from the first image;
- performing, using the first mobile device, optical character recognition on the first snippet to generate first optical character recognition data;
- sending the second snippet to another device for processing;
- verifying the first optical character recognition data;
- responsive to the verifying, providing the first optical character recognition data to a server for validation processing;
- after providing the first optical character recognition data, receiving a confirmation notification from the server based on the first optical character recognition data and the second optical character recognition data;
- after receiving the confirmation notification, presenting, on a user interface of the mobile device, a request for confirmation from the user for further processing; and
- receiving a user confirmation from the user in response to the request for confirmation; and
- only after receiving the user confirmation, providing by the mobile device an image of the entire object to the server for further processing.

Clause 104. The method of clause 103, wherein the providing by the mobile device the image of the entire object to the server for further processing after receiving the user confirmation is the first time that an image of the entire object has left the mobile device.

Clause 105. The method of clause 103, wherein the another device is the server.

Clause 106. The method of clause 103, wherein the another device is a different server than the server.

Clause 107. The method of clause 103, wherein manual user actuation directly causes the image capture device to capture the first image.

Clause 108. The method of clause 103, further comprising:

generating a representation image including at least some of the first optical character recognition data; and presenting the representation image but not the first image to the user.

Clause 109. The method of clause 103, further comprising:

at the mobile device and prior to providing the first optical character recognition data to the server for validation processing:

determining a similarity value between the first optical character recognition data and prior optical character recognition data sent to the server, wherein providing the second optical character recognition data to the server for validation processing occurs responsive to the similarity failing to pass a threshold.

Clause 110. The method of clause 103, wherein an image is of the entire object if the image contains at least four outer corners of the object.

Image Processing

Clause 111. A method comprising:

reading image data;

processing the image data to form a processed image, including:

converting the image to grayscale;

identifying a shadow mask based on shadow regions in the image data;

refining the shadow mask;

modify the shadow regions in the image data using the shadow mask;

reducing noise in the image data;

enhancing contrast in the image data; and adjusting brightness or contrast in the image data; and saving the processed image.

Clause 112. The method of clause 111, wherein reading the image data includes loading the image data without altering bit depth or color channels of the image data.

Clause 113. The method of clause 111, wherein identifying the shadow mask includes:

applying an inverse binary threshold to the image data such that pixels below a certain intensity are white in the mask and others are black in the mask.

Clause 114. The method of clause 111, wherein refining the shadow mask includes:

filling in small holes in the mask by applying a dilation morphological operation; and after performing the dilation morphological operation, applying an erosion morphological operation.

Clause 115. The method of clause 111, wherein modifying the shadow regions includes filling in at least a portion of the shadow regions using nearby pixel information.

Clause 116. The method of clause 111, wherein enhancing the contrast in the image data includes applying contrast limited adaptive histogram equalization.

Clause 117. The method of clause 111, wherein saving the processed image includes saving the processed image in a TIFF format using lossless compression.

Clause 118. The method of clause 111, further comprising:

extracting a first snippet from the processed image;

extracting a second snippet from the processed image;

performing optical character recognition on the first snippet to generate first optical character recognition data;

sending the second snippet to another device for processing;

receiving second optical character recognition data from the another device;

verifying the first optical character recognition data and the second optical character recognition data; and responsive to the verifying, providing the first optical character recognition data and the second optical character recognition data to a server for validation processing.

Clause 119. The method of clause 118, further comprising:

after providing the first and second optical character recognition data, receiving a confirmation notification from the server responsive to the providing;

after receiving the confirmation notification, presenting, on a user interface of the mobile device, a request for confirmation from the user for further processing; and receiving a user confirmation from the user in response to the request for confirmation; and only after receiving the user confirmation, providing by the mobile device an image of the entire object to the server for further processing.

Clause 120. The method of clause 111, further comprising:

obtaining the image data from a camera of a mobile device, wherein the method is performed by a mobile device.

Teller & ATM

Clause 121. A building comprising:

a vault;

a teller station comprising:

a teller device comprising:

an imager;

a set of one or more processors; and a set of memory comprising instructions thereon that, when executed by the one or more processors cause the one or more processors to:

use the imager to capture a first image of check;

perform optical character recognition on the first image to generate first optical character recognition data;

verify that the first optical character recognition data includes all data required for processing;

responsive to the verifying, provide the first optical character recognition data to a server for validation processing;

after providing the first optical character recognition data, receive a confirmation notification from the server;

only after receiving the confirmation notification, providing by the teller device, the first image to the server for further processing.

Clause 122. The building of clause 121, wherein no entire image of the check is sent from the teller device to the server until after receiving the confirmation notification.

Clause 123. The building of clause 121, wherein the instructions, when executed, further cause the one or more processors to:

sending an account identification number from the mobile device to the server only after receiving the confirmation notification.

Clause 124. The building of clause 121, wherein the instructions, when executed, further cause the one or more processors to:

determine a similarity value between the first optical character recognition data and prior optical character recognition data, wherein providing the first optical character recognition data to the server for validation processing occurs responsive to the similarity failing to pass a threshold.

Clause 125. The building of clause 121, wherein to perform optical character recognition on the first image includes to:

determine a first set of bounding boxes for a first subset of the characters in the first image, wherein a second subset of the characters are not associated with a respective bounding box of the first set of bounding boxes;

define a set of search regions within the image snippet, wherein each respective search region of the set of search regions is an area within the image snippet that is not contained within one of the determined bounding boxes of the first set of bounding boxes;

define additional bounding boxes based on the set of search regions, thereby defining a second set of bounding boxes that includes the first set of bounding boxes for the first subset of the characters and one or more additional bounding boxes associated with the second subset of characters;

process each respective bounding box of the second set of bounding boxes; and return a result of the processing.

Clause 126. The building of clause 125, wherein to process each respective bounding box includes to determine a character represented by a character snippet within a region of the image snippet defined by the respective bounding box.

Clause 127. The method of clause 126, wherein the determining the character represented by the respective character snippet includes comparing each of the one or more character snippets to one or more templates.

Clause 128. The building of clause 127, wherein comparing each of the one or more character snippets to one or more templates includes:

for each respective character snippet of the one or more character snippets:

for each respective template of the one or more templates:

calculating an exclusive- or operation between the respective character snippet and the respective template; and summing the resulting values to form a difference score;

identifying a character-template pair having the lowest difference score, wherein the character-template pair comprises the respective character snippet and one of the one or more templates;

assigning to the respective character snippet a character associated with the template of the character-template pair.

Clause 129. The building of clause 128, further comprising:

calculating an acceptance ratio based on a dividing the difference score associated with the character-template pair by a sum of values in the character snippet of the character-template pair, wherein determining the character represented by each of the one or more character snippets includes determining an acceptance ratio.

Clause 130. The building of clause 127, wherein comparing each of the one or more character snippets to one or more templates includes:

generating a conforming outer perimeter of a respective character within a respective character snippet; and comparing the conforming outer perimeter of the respective character with one or more templates of a set of template conforming outer perimeters for each integer zero through nine of a specific font.

Clause 131. An apparatus comprising:

a vault;

a dispenser;

a display;

a card reader;

a PIN pad;

an imager;

a set of one or more processors; and a set of memory comprising instructions thereon that, when executed by the one or more processors cause the one or more processors to:

use the imager to capture a first image of check;

perform optical character recognition on the first image to generate first optical character recognition data;

verify that the first optical character recognition data includes all data required for processing;

responsive to the verifying, provide the first optical character recognition data to a server for validation processing;

after providing the first optical character recognition data, receive a confirmation notification from the server; and only after receiving the confirmation notification, providing by the apparatus, the first image to the server for further processing.

Clause 132. The apparatus of clause 131, wherein the apparatus is an automated teller machine; and wherein no entire image of the check is sent from the apparatus to the server until after receiving the confirmation notification.

Clause 133. The apparatus of clause 131, wherein the instructions, when executed, further cause the one or more processors to:

sending an account identification number from the mobile device to the server only after receiving the confirmation notification.

Clause 134. The apparatus of clause 11, wherein the instructions, when executed, further cause the one or more processors to:

determine a similarity value between the first optical character recognition data and prior optical character recognition data, wherein providing the first optical character recognition data to the server for validation processing occurs responsive to the similarity failing to pass a threshold.

Clause 135. The apparatus of clause 131, wherein to perform optical character recognition on the first image includes to:
- determine a first set of bounding boxes for a first subset of the characters in the first image, wherein a second subset of the characters are not associated with a respective bounding box of the first set of bounding boxes;
- define a set of search regions within the image snippet, wherein each respective search region of the set of search regions is an area within the image snippet that is not contained within one of the determined bounding boxes of the first set of bounding boxes;
- define additional bounding boxes based on the set of search regions, thereby defining a second set of bounding boxes that includes the first set of bounding boxes for the first subset of the characters and one or more additional bounding boxes associated with the second subset of characters;
- process each respective bounding box of the second set of bounding boxes; and
- return a result of the processing.

Clause 136. The apparatus of clause 135, wherein to process each respective bounding box includes to determine a character represented by a character snippet within a region of the image snippet defined by the respective bounding box.

Clause 137. The apparatus of clause 136, wherein the determining the character represented by the respective character snippet includes comparing each of the one or more character snippets to one or more templates.

Clause 138. The apparatus of clause 137, wherein comparing each of the one or more character snippets to one or more templates includes:
- for each respective character snippet of the one or more character snippets:
  - for each respective template of the one or more templates:
    - calculating an exclusive- or operation between the respective character snippet and the respective template; and
    - summing the resulting values to form a difference score;
  - identifying a character-template pair having the lowest difference score, wherein the character-template pair comprises the respective character snippet and one of the one or more templates;
  - assigning to the respective character snippet a character associated with the template of the character-template pair.

Clause 139. The apparatus of clause 138, further comprising:
- calculating an acceptance ratio based on a dividing the difference score associated with the character-template pair by a sum of values in the character snippet of the character-template pair,
- wherein determining the character represented by each of the one or more character snippets includes determining an acceptance ratio.

140. The apparatus of clause 137, wherein comparing each of the one or more character snippets to one or more templates includes:
- generating a conforming outer perimeter of a respective character within a respective character snippet; and
- comparing the conforming outer perimeter of the respective character with one or more templates of a set of template conforming outer perimeters for each integer zero through nine of a specific font.

Background Based Processing

Clause 141. A non-transitory computer-readable medium having instructions thereon that, when executed by one or more processors, cause the one or more processors to perform a method comprising:
- reading image data;
- classifying a background of the image data as being a light background or a dark background;
- applying a first image processing pipeline rather than a second image processing pipeline to the image data responsive to determining that the image data includes the object on a light background rather than a dark background;
- applying the second image processing pipeline rather than the first image processing pipeline to the image data responsive to determining that the image data includes the object on a dark background rather than a light background; and
- saving the processed image.

Clause 142. The non-transitory computer readable medium of clause 141, wherein the first image processing pipeline includes:
- inverting the image data; and
- applying an edge enhancement process to the image data.

Clause 143. The non-transitory computer readable medium of clause 141, wherein the first image processing pipeline does not include any of the following processes:
- converting the image data to grayscale;
- applying a blur process to the image; and
- applying adaptive thresholding.

Clause 144. The non-transitory computer readable medium of clause 141, wherein the second image processing pipeline includes:
- converting the image data into grayscale image data;
- applying a blur to the image data; and
- applying adaptive thresholding to the image data.

Clause 145. The non-transitory computer readable medium of clause 141, wherein the second image processing pipeline does not include any operations selected from the group consisting of:
- a color inversion operation; and
- an edge enhancement operation.

Clause 146. The non-transitory computer readable medium of clause 141, wherein classifying a background of the image data as being a light background or a dark background includes:
- calculating a mean color of the image data;
- determining a brightness of the mean color; and
- classifying the background as being a light background responsive to the brightness being less than a threshold amount.

What is claimed is:

1. A method for remote processing of an object, the method comprising:
- at a mobile device:
- receiving a first image of the object, the first image captured by an image capture device of the mobile device; and
- extracting first and second snippets from the first image;
- performing optical character recognition on the first snippet to generate first optical character recognition data;
- sending the second snippet to another device for processing;

receiving second optical character recognition data from the another device;

verifying the first optical character recognition data and the second optical character recognition data;

after the verifying, providing the first optical character recognition data or the second optical character recognition data to a server for validation processing;

after providing the first or second optical character recognition data, receiving a confirmation notification from the server responsive to the providing;

after receiving the confirmation notification, presenting, on a user interface of the mobile device, a request for confirmation from the user for further processing; and receiving a user confirmation from the user in response to the request for confirmation; and only after receiving the user confirmation, providing by the mobile device an image of the entire object to the server for further processing.

2. The method of claim 1, wherein the providing by the mobile device the image of the entire object to the server for further processing after receiving the user confirmation is the first time that an image of the entire object has left the mobile device.

3. The method of claim 1, wherein the another device is the server.

4. The method of claim 1, wherein the another device is another server different from the server.

5. The method of claim 1, further comprising: sending an account identification number from the mobile device to the server only after receiving the user confirmation.

6. The method of claim 1, further comprising: presenting at least a portion of the first image or an image derived from the first image to the user for a first time only after the first image was sent to the server for additional processing.

7. The method of claim 1, wherein manual user actuation directly causes the image capture device to capture the first image.

8. The method of claim 1, further comprising: generating a representation image including at least some of the first optical character recognition data; and presenting the representation image but not the first image to the user.

9. The method of claim 1, further comprising: at the mobile device and prior to providing the first optical character recognition data to the server for validation processing: determining a similarity value between the first optical character recognition data and prior optical character recognition data sent to the server, wherein providing the second optical character recognition data to the server for validation processing occurs responsive to the similarity failing to pass a threshold.

10. The method of claim 1, wherein providing the image of the entire object to the server includes providing an image of the entire front of the object.

11. The method of claim 10, wherein providing the image of the entire object to the server includes providing an image of the entire front and the entire back of the object.

12. The method of claim 1, wherein an image is of the entire object if the image contains at least four outer corners of the object.

13. A method for remote processing of an object, the method comprising:

activating an image capture device of a mobile device;

receiving a first image of the object, the first image captured by the image capture device of the mobile device; and extracting a first snippet from the first image;

extracting a second snippet from the first image;

performing, using the mobile device, optical character recognition on the first snippet to generate first optical character recognition data;

sending the second snippet to another device for processing to generate second optical character recognition data;

verifying the first optical character recognition data;

after the verifying, providing the first optical character recognition data to a server for validation processing;

after providing the first optical character recognition data, receiving a confirmation notification from the server based on the first optical character recognition data and the second optical character recognition data;

after receiving the confirmation notification, presenting, on a user interface of the mobile device, a request for confirmation from the user for further processing; and receiving a user confirmation from the user in response to the request for confirmation; and only after receiving the user confirmation, providing by the mobile device an image of the entire object to the server for further processing.

14. The method of claim 13, wherein the providing by the mobile device the image of the entire object to the server for further processing after receiving the user confirmation is the first time that an image of the entire object has left the mobile device.

15. The method of claim 13, wherein the another device is the server.

16. The method of claim 13, wherein the another device is a different server than the server.

17. The method of claim 13, wherein manual user actuation directly causes the image capture device to capture the first image.

18. The method of claim 13, further comprising: generating a representation image including at least some of the first optical character recognition data; and presenting the representation image but not the first image to the user.

19. The method of claim 13, further comprising: at the mobile device and prior to providing the first optical character recognition data to the server for validation processing: determining a similarity value between the first optical character recognition data and prior optical character recognition data sent to the server; and providing the second optical character recognition data to the server for validation processing, wherein providing occurs responsive to the similarity failing to pass a threshold.

20. The method of claim 13, wherein an image is of the entire object if the image contains at least four outer corners of the object.

* * * * *